United States Patent
Lee et al.

(10) Patent No.: US 10,642,104 B2
(45) Date of Patent: May 5, 2020

(54) METHOD OF CONTROLLING THE PRETILT ANGLE IN POLYMER STABILISED LIQUID CRYSTAL DISPLAYS

(71) Applicant: Merck Patent GmbH, Darmstadt (DE)

(72) Inventors: Eun-Kyu Lee, Gyeonggi-do (KR); Hyun-Jin Yoon, Gyeonggi-do (KR); In-Young Cho, Chungcheongnam-do (KR); Yong-Jun Ji, Gyeonggi-do (KR)

(73) Assignee: Merck Patent GmbH, Darmstadt (DE)

( * ) Notice: Subject to any disclaimer, the term of this patent is extended or adjusted under 35 U.S.C. 154(b) by 61 days.

(21) Appl. No.: 15/762,587

(22) PCT Filed: Aug. 24, 2016

(86) PCT No.: PCT/EP2016/001425
§ 371 (c)(1),
(2) Date: Mar. 23, 2018

(87) PCT Pub. No.: WO2017/050413
PCT Pub. Date: Mar. 30, 2017

(65) Prior Publication Data
US 2018/0307103 A1   Oct. 25, 2018

(30) Foreign Application Priority Data

Sep. 23, 2015 (EP) .................................. 15002750

(51) Int. Cl.
*G02F 1/1337* (2006.01)
*C09K 19/56* (2006.01)
(Continued)

(52) U.S. Cl.
CPC ...... *G02F 1/133788* (2013.01); *C09K 19/542* (2013.01); *C09K 19/56* (2013.01); *G02F 1/137* (2013.01); *G02F 1/1337* (2013.01); *G02F 1/1339* (2013.01); *G02F 1/1341* (2013.01); *G02F 1/133711* (2013.01); *G02F 1/133723* (2013.01); *C09K 2019/0448* (2013.01);
(Continued)

(58) Field of Classification Search
CPC .......................................... G02F 2001/133773
See application file for complete search history.

(56) References Cited

U.S. PATENT DOCUMENTS

2009/0128744 A1*  5/2009  Mitov ................... C09K 19/02
                                                              349/88
2009/0314997 A1* 12/2009  Heeney ................ C07D 495/04
                                                              252/500
(Continued)

FOREIGN PATENT DOCUMENTS

WO     WO 2006048168 A1 *  5/2006  ............ C08F 297/04

OTHER PUBLICATIONS

International Search Report dated Nov. 8, 2016 issued in corresponding PCT/EP2016/001425 application (3 pages).

*Primary Examiner* — Joseph L Williams
*Assistant Examiner* — Jacob R Stern
(74) *Attorney, Agent, or Firm* — Millen, White, Zelano and Branigan, P.C.

(57) ABSTRACT

The present invention relates to a method of controlling the pretilt angle in liquid crystal (LC) displays of the polymer sustained alignment (PSA) type, to a method of manufacturing a PSA display with different pretilt angles at the two substrates, and to PSA displays made by this method.

26 Claims, 1 Drawing Sheet

(a)

(b)

(c)

(51) Int. Cl.
  *C09K 19/54* (2006.01)
  *G02F 1/1339* (2006.01)
  *G02F 1/1341* (2006.01)
  *G02F 1/137* (2006.01)
  C09K 19/12 (2006.01)
  C09K 19/04 (2006.01)
  G02F 1/1333 (2006.01)

(52) U.S. Cl.
  CPC .. *C09K 2019/123* (2013.01); *C09K 2019/124* (2013.01); *C09K 2019/548* (2013.01); *G02F 2001/13415* (2013.01); *G02F 2001/13775* (2013.01); *G02F 2001/133368* (2013.01); *G02F 2001/133715* (2013.01); *G02F 2001/133773* (2013.01); *G02F 2201/56* (2013.01)

(56) References Cited

U.S. PATENT DOCUMENTS

2015/0029455 A1  1/2015  Kim et al.
2015/0241741 A1  8/2015  Lee et al.

\* cited by examiner

METHOD OF CONTROLLING THE PRETILT ANGLE IN POLYMER STABILISED LIQUID CRYSTAL DISPLAYS

The present invention relates to a method of controlling the pretilt angle in liquid crystal (LC) displays of the polymer sustained alignment (PSA) type, to a method of manufacturing a PSA display with different pretilt angles at the two substrates, and to PSA displays made by this method.

BACKGROUND OF THE INVENTION

A liquid crystal display mode which has meanwhile found widespread interest and commercial use is the so-called PS ("polymer sustained") or PSA ("polymer sustained alignment") mode, for which the term "polymer stabilised" is also occasionally used. In PSA displays an LC medium is used that contains an LC mixture (hereinafter also referred to as "host mixture") and a small amount, typically <1% by weight, for example 0.2 to 0.4% by weight, of a polymerisable component comprising one or more polymerisable compounds, preferably polymerisable monomeric compounds, very preferably polymerisable mesogenic or liquid-crystalline compounds, also known as reactive mesogens or "RMs". After filling the LC medium into the display, the polymerisable compounds are polymerised or crosslinked in situ, usually by UV photopolymerisation, preferably while a voltage is applied to the electrodes of the display. The polymerisation is carried out at a temperature where the LC medium exhibits a liquid crystal phase, usually at room temperature. As a result the polymerised or crosslinked RMs will phase-separate from the LC medium and form a layer on the inner surface of the substrates, where they induce a pretilt angle of the LC molecules relative to the substrates.

The PS(A) mode is meanwhile used in various conventional LC display types. Thus, for example, PS-VA ("vertically aligned"), PS-OCB ("optically compensated bend"), PS-IPS ("in-plane switching"), PS-FFS ("fringe-field switching"), PS-UB-FFS ("Ultra Brightness FFS) and PS-TN ("twisted nematic") displays are known. The polymerisation of the RMs preferably takes place with an applied voltage in the case of PS-VA and PS-OCB displays, and with or without, preferably without, an applied voltage in the case of PS-IPS displays. In case of PS-OCB displays, for example, it is possible for the bend structure to be stabilised so that an offset voltage is unnecessary or can be reduced. In case of PS-VA displays, the pretilt has a positive effect on the response times. For PS-VA displays, a standard MVA ("multidomain VA") or PVA ("patterned VA") pixel and electrode layout can be used. It is also possible to use only one structured electrode without protrusions, which significantly simplifies production and improves contrast and transparency.

Furthermore, the so-called posi-VA mode ("positive VA") has proven to be particularly suitable. Like in conventional VA and PS-VA displays, the initial orientation of the LC molecules in posi-VA displays is homeotropic, i.e. substantially perpendicular to the substrates, in the initial state when no voltage is applied. However, in contrast to conventional VA and PS-VA displays, in posi-VA displays LC media with positive dielectric anisotropy are used. Like in IPS and PS-IPS displays, the two electrodes in posi-VA displays are arranged only on one of the two substrates, and preferably exhibit intermeshed, comb-shaped (interdigital) structures. Upon application of a voltage to the interdigital electrodes, which create an electrical field that is substantially parallel to the layer of the LC medium, the LC molecules are switched to an orientation substantially parallel to the substrates. In posi-VA displays, a polymer stabilisation by addition of RMs to the LC medium, which are then polymerised in the display, has also proven to be advantageous. Thereby a significant reduction of the switching times can be achieved.

PS-VA displays are described for example in K. Hanaoka et al., SID 04 Digest 2004, 1203, 233-236, EP1170626 A2, U.S. Pat. Nos. 6,861,107, 7,169,449, US2004/0191428A1, US2006/0066793A1 and US2006/0103804A1. PS-OCB displays are described for example in T.-J-Chen et al., Jpn. J. Appl. Phys. 45, 2006, 2702-2704 and S. H. Kim, L.-C-Chien, Jpn. J. Appl. Phys. 43, 2004, 7643-7647. PS-IPS displays are described for example in U.S. Pat. No. 6,177,972 and Appl. Phys. Lett. 1999, 75(21), 3264. PS-TN displays are described for example in Optics Express 2004, 12(7), 1221.

PSA displays can be operated as either active-matrix (AM) or passive-matrix (PM) displays. In case of AM displays individual pixels are usually addressed by integrated, non-linear active elements like for example transistors (such as thin-film transistors or "TFTs"), whereas in PM displays individual pixels are usually addressed by the multiplex method as known from prior art.

A PSA display preferably comprises an alignment layer on one or both of the substrates forming the display cell. The alignment layer is usually applied on the electrodes (in case such electrodes are present) such that it is in contact with the LC medium and induces initial alignment of the LC molecules. The alignment layer may comprise or consist of, for example, a polyimide, which may also be rubbed or prepared by a photoalignment method. The alignment layer is usually formed by depositing a solution of an alignment layer material like for example polyimide, or a precursor thereof like for example a polyimide precursor, on the substrate, for example by coating or printing methods, and curing the alignment layer material or its precursor by exposure to heat and (or actinic radiation, for example UV radiation.

In particular for monitor and especially TV applications optimisation of the response times, but also of the contrast and luminance (and thus transmission) of the LC display is still desired. The PSA method can provide significant advantages here. Especially in case of PS-VA, PS-IPS, PS-FFS and PS-posi-VA displays, a shortening of the response times, which correlate with a measurable pretilt in test cells, can be achieved without significant adverse effects on other parameters.

Curved displays have gained interest for use in the TV market. Curved displays can enhance the optical viewing experience for viewers sitting off-center, because it is possible to keep a uniform distance between the viewer and the display. Thereby it is possible to reduce the image distortion which is caused in case of conventional, uncurved displays by the phenomenon that the sides of the display are farther away from the viewer than its center.

In curved displays the radius of the top and bottom substrates should be different from each other in order to maintain a constant cell gap. This is exemplarily and schematically illustrated in FIG. 1. As shown in FIG. 1(a) a flat panel display with two plane-parallel substrates (11, 12) usually has a constant cell gap (indicated by the double arrows) over the entire display area. On the other hand, as shown in FIG. 1(b) if in a curved display the curved substrates (11, 12) would have the same radius of curvature, the cell gap (indicated by the double arrows) would be smaller at the edges than at the center of the panel. Therefore, it is necessary in a curved display to use two substrates as shown in FIG. 1(c), where the radius of curvature of the bottom substrate (12) is longer than the radius of curvature of the top substrate (11), i.e. the degree of curvature of the bottom substrate (12) is lower than the degree of curvature of the top substrate (11).

In curved displays of the PSA mode, especially in curved displays of the PS-VA mode, the problem arises that different curvature of the two substrates will lead to a distortion of the pretilt angle between the top and the bottom substrate.

This is illustrated in FIG. 2, which exemplarily and schematically depicts a PSVA display with a top substrate (21) and a bottom substrate (22), and LC molecules (23) oriented with a certain pretilt angle relative to the top and bottom substrates (21, 22). As shown in FIG. 2(a), in a flat panel PS-VA display with plane-parallel substrates (21, 22) the pretilt angle α of the LC molecules (23), which is generated by the PS-VA process, is the same at the top substrate (21) and the bottom substrate (22). On the other hand, as shown in FIG. 2(b), in a curved display with a constant cell gap the LC molecules (23) at the top substrate (21) and the bottom substrate (22) are aligned at the same pretilt angle α relative to the tangent lines (24, 25) on the top and bottom substrate (21, 22) (indicated by the broken lines, hereinafter also referred to as "base lines"). However, the slopes of the base lines (24, 25) on the top and bottom substrate (21, 22) relative to the normal (26) at the center of the display (indicated by the broken line) differ from each other due to the fact that the top substrate (21) and bottom substrate (22) have different radius of curvature. Consequently, if as shown in FIG. 2c parallel base lines (24, 25) would be applied to both the top substrate (21) and the bottom substrate (22), the pretilt angle α' at the top substrate (21) and the pretilt angle α" at the bottom substrate (22) would be different from each other, with α' being higher than α", causing a distortion of the orientation of the LC molecules (23).

Therefore there arises a need to control or change the pretilt angle of the LC molecules relative to the top substrate and the bottom substrate in a PSA display, especially in a curved PSA display, such that an undesired distortion of the orientation of the LC molecules can be reduced or prevented.

The invention is based on the object of providing improved means and methods for manufacturing PSA displays and improved materials used therein, like RMs, LC host mixtures, additives, and LC media comprising the same, which can contribute to solve the above-mentioned problem.

Another object of the invention is to provide improved means and methods for manufacturing PSA displays and improved materials used therein which have high specific resistance values, high VHR values, high reliability, low threshold voltages, short response times, high birefringence, show good UV absorption especially at longer wavelengths, allow quick and complete polymerisation of the RMs contained therein, allow the generation of a low pretilt angle as quickly as possible, enable a high stability of the pretilt even after longer time and/or after UV exposure, reduce or prevent the occurrence of image sticking in the display, reduce or prevent the occurrence of ODF mura in the display, and reduce or prevent distortion of the orientation of the LC molecules.

The above objects have been achieved in accordance with the present invention by the methods and materials as described and claimed in the present application.

It has surprisingly been found that the above-mentioned problem can be solved by providing a method of manufacturing a PSA display, and a method of controlling the pretilt angle at the top and bottom substrate in a curved PSA display, as disclosed and claimed hereinafter.

In order to solve the above-mentioned problem of controlling the pretilt angles in curved displays as described above, the pretilt angle at the top substrate (hereinafter also referred to as "first substrate") should be lower than the pretilt angle at the bottom substrate (hereinafter also referred to as "second substrate").

In the method according to the present invention this is achieved by providing a PSA display comprising on each substrate an alignment layer that is formed from an alignment layer material or a precursor thereof. To the material forming the alignment layer is added either a polymerisation inhibitor which inhibits polymerisation of the polymerisable component of the LC medium, or a polymerisation initiator which initiates the polymerisation of the polymerisable component of the LC medium. For example, if an inhibitor is added only to the material that forms the alignment layer on the first substrate, polymerisation of the polymerisable component of the LC medium is inhibited in proximity to the first substrate, and a lower pretilt angle is generated at the first substrate. On the other hand, if an initiator is added only to the material that forms the alignment layer on the second substrate, polymerisation of the polymerisable component of the LC medium is inhibited in proximity to the first substrate and a higher pretilt angle is generated at the second substrate. Both methods can also be combined.

The method according to the present invention can also be used in flat panel displays without curvature of the substrates, in case it is necessary to control or change the pretilt angle at the substrates.

In addition, the methods and materials as disclosed and claimed hereinafter yield PSA displays with high specific resistance values, high VHR values, high reliability, low threshold voltages, short response times, high birefringence, good UV absorption especially at long UV wavelengths, quick and complete polymerisation of the RMs, quick and strong pretilt angle generation, high pretilt angle stability over long time especially under stress caused by heat, voltage and/or UV light, reduced image sticking, reduced ODF mura, and reduced distortion of the orientation of the LC molecule.

Moreover, the methods and materials according to the present invention facilitate a quick and complete UV-photopolymerisation reaction in particular at low UV energy and/or longer UV wavelengths in the range from 300-380 nm and especially above 340 nm, which are considerable advantages for the display manufacturing process.

SUMMARY OF THE INVENTION

The invention relates to a method of manufacturing a liquid crystal (LC) display of the polymer stabilised alignment (PSA) mode, which comprises
a) providing a first substrate and a second substrate,
b) depositing an alignment layer material, or a precursor thereof, on the first substrate and the second substrate, to form a first alignment layer on the first substrate and a second alignment layer on the second substrate,
c) optionally curing the alignment layer material, or the precursor thereof, preferably by photocuring, d) interposing an LC medium comprising a polymerisable component between the first and the second substrate, such that it is in contact with the first alignment layer and the second alignment layer, e) polymerising the polymerisable component of the LC medium between the first and second substrate, preferably by exposure to UV radiation, characterized in that in step b) the alignment layer material, or the precursor thereof, deposited on the first substrate contains a polymerisation inhibitor which inhibits polymerisation of the polymerisable component of the LC medium, or in step b) the alignment layer material, or the precursor thereof, deposited on the second substrate contains a polymerisation initiator which initiates polymerisation of the polymerisable component of the LC medium, or in step b) the alignment layer material, or the precursor thereof, deposited on the first substrate contains a polymerisation inhibitor which inhibits polymerisation of the polymerisable component of the LC medium, and the alignment layer material, or the precursor thereof, deposited on the second substrate contains a polymerisation initiator which initiates polymerisation of the polymerisable component of the LC medium.

The invention further relates to a method of controlling and/or changing the pretilt angle of the LC molecules in a PSA display at one of the two substrates independently from the pretilt angle of the LC molecules at the other of the two substrates, said method comprising steps a) to e) as described above and below.

The LC medium preferably comprises a polymerisable component A) comprising, preferably consisting of, one or more polymerisable compounds, and a liquid-crystalline component B) comprising, preferably consisting of, one or more mesogenic or liquid-crystalline compounds.

The liquid-crystalline component B) of an LC medium according to the present invention is hereinafter also referred to as "LC host mixture", and preferably contains only LC compounds that are selected from low-molecular-weight compounds which are unpolymerisable, and optionally contains additives like polymerisation initiators, inhibitors etc.

The invention furthermore relates to an LC display of the PSA type obtained from a process as described above and below.

The LC display is preferably a PS-VA, PS-OCB, PS-IPS, PS-FFS, PS-UB-FFS, PS-posi-VA or PS-TN display.

The PSA displays according to the invention comprise two electrodes, preferably in the form of transparent layers, which are applied onto one or both of the substrates. In some displays, for example in PS-VA, PS-OCB or PS-TN displays, one electrode is applied on each of the two substrates. In other displays, for example in PS-posi-VA, PS-IPS or PS-FFS or PS-UB-FFS displays, both electrodes are applied on only one of the two substrates.

In a preferred embodiment the polymerisable component is polymerised in the LC display while a voltage is applied to the electrodes of the display.

The polymerisable compounds of the polymerisable component of the LC medium are preferably polymerised by photopolymerisation, very preferably by UV photopolymerisation.

TERMS AND DEFINITIONS

Figure 1:
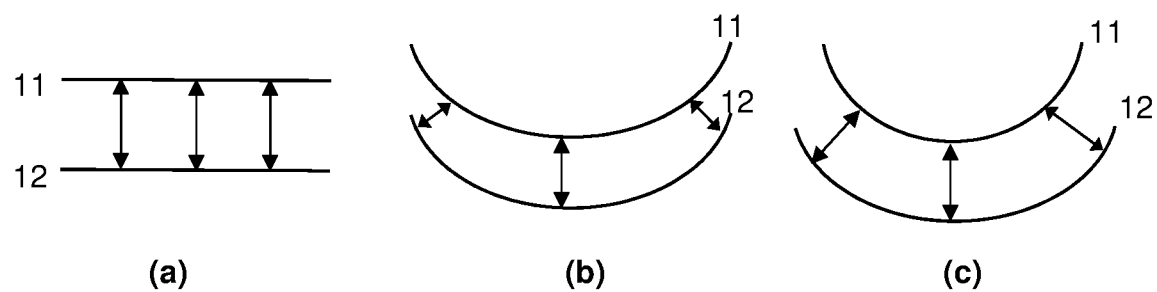
FIG. 1 exemplarily and schematically depicts an LC display with uncurved substrates and constant cell gap (a), an LC display with curved substrates having the same radius of curvature and varying cell gap (b), and an LC display with curved substrates having different radius of curvature and constant cell gap (c).
Figure 2:
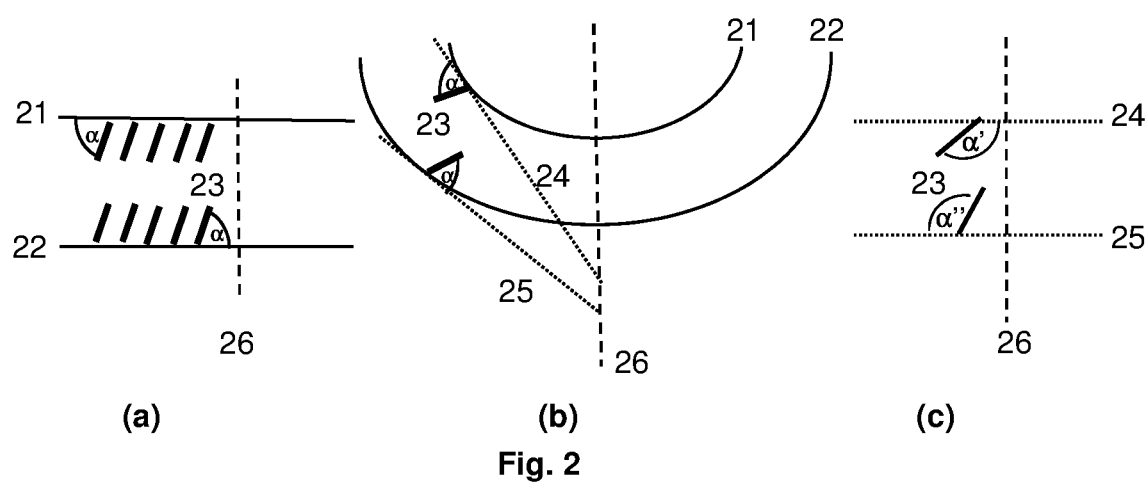
FIG. 2 exemplarily and schematically depicts the pretilt angle in a PS-VA display with uncurved substrates (a), and in a PS-VA display with curved substrates having different radius of curvature and constant cell gap (b, c).

Unless stated otherwise, the polymerisable compounds are preferably selected from achiral compounds.

As used herein, the term "electrode structure" includes an electrode layer which may be a continuous layer, or a patterned electrode or pixel electrode, or an array of electrodes, patterned electrodes or pixel electrodes.

As used herein, the terms "active layer" and "switchable layer" mean a layer in an electrooptical display, for example an LC display, that comprises one or more molecules having structural and optical anisotropy, like for example LC molecules, which change their orientation upon an external stimulus like an electric or magnetic field, resulting in a change of the transmission of the layer for polarized or unpolarized light.

As used herein, the terms "tilt" and "tilt angle" will be understood to mean a tilted alignment of the LC molecules of an LC medium relative to the surfaces of the cell in an LC display (here preferably a PSA display). The terms "pretilt" and "pretilt angle" will be understood to mean the initial tilt angle of the LC molecules in the non-addressed display cell, which is generated by the PSA process including polymerisation of the polymerisable component of the LC medium.

The (pre)tilt angle here denotes the average angle (<90°) between the longitudinal molecular axes of the LC molecules (LC director) and the surface of the substrates which form the LC cell. In curved displays, the (pre)tilt angle is given relative to the tangent on the respective substrate.

A low (pre)tilt angle value (i.e. a large deviation from 90°) corresponds to a large (pre)tilt and indicates a strong (pre)tilt angle generation, whereas a high (pre)tilt angle value (i.e. a small deviation from 90°) corresponds to a small (pre)tilt and indicates a weak tilt angle generation. A suitable method for measurement of the (pre)tilt angle is given in the examples. Unless indicated otherwise, (pre)tilt angle values disclosed above and below relate to this measurement method.

As used herein, the term "vertical alignment" will be understood to mean alignment of the LC molecules with their molecular long axes substantially perpendicular relative to the substrates.

As used herein, the terms "reactive mesogen" and "RM" will be understood to mean a compound containing a mesogenic or liquid crystalline skeleton, and one or more functional groups attached thereto which are suitable for polymerisation and are also referred to as "polymerisable group" or "P".

Unless stated otherwise, the term "polymerisable compound" as used herein will be understood to mean a polymerisable monomeric compound.

As used herein, the term "low-molecular-weight compound" will be understood to mean to a compound that is monomeric and/or is not prepared by a polymerisation reaction, as opposed to a "polymeric compound" or a "polymer".

As used herein, the term "unpolymerisable compound" will be understood to mean a compound that does not contain a functional group that is suitable for polymerisation under the conditions usually applied for the polymerisation of the RMs.

As used herein, the term "precursor" will be understood to mean a compound or material that can be reacted to form another compound or material. The precursor of an alignment layer material is thus a compound or material that can be reacted to form the alignment layer material. If the alignment layer material is for example a polyimide, the precursor is for example a monomer or oligomer that can be polymerised or crosslinked to form the polyimide.

The term "mesogenic group" as used herein is known to the person skilled in the art and described in the literature, and means a group which, due to the anisotropy of its attracting and repelling interactions, essentially contributes to causing a liquid-crystal (LC) phase in low-molecular-weight or polymeric substances. Compounds containing mesogenic groups (mesogenic compounds) do not necessarily have to have an LC phase themselves. It is also possible for mesogenic compounds to exhibit LC phase behaviour only after mixing with other compounds and/or after polymerisation. Typical mesogenic groups are, for example, rigid rod- or disc-shaped units. An overview of the terms and definitions used in connection with mesogenic or LC compounds is given in *Pure Appl. Chem.* 2001, 73(5), 888 and C. Tschierske, G. Pelzl, S. Diele, *Angew. Chem.* 2004, 116, 6340-6368.

The term "spacer group", hereinafter also referred to as "Sp", as used herein is known to the person skilled in the art and is described in the literature, see, for example, *Pure Appl. Chem.* 2001, 73(5), 888 and C. Tschierske, G. Pelzl, S. Diele, *Angew. Chem.* 2004, 116, 6340-6368. As used herein, the terms "spacer group" or "spacer" mean a flexible group, for example an alkylene group, which connects the mesogenic group and the polymerisable group(s) in a polymerisable mesogenic compound.

Above and below,

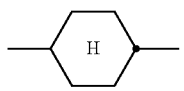

denotes a trans-1,4-cyclohexylene ring, and

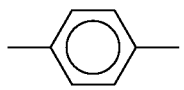

denotes a 1,4-phenylene ring.

Above and below "organic group" denotes a carbon or hydrocarbon group.

"Carbon group" denotes a mono- or polyvalent organic group containing at least one carbon atom, where this either contains no further atoms (such as, for example, —C≡C—) or optionally contains one or more further atoms, such as, for example, N, O, S, B, P, Si, Se, As, Te or Ge (for example carbonyl, etc.). The term "hydrocarbon group" denotes a carbon group which additionally contains one or more H atoms and optionally one or more heteroatoms, such as, for example, N, O, S, B, P, Si, Se, As, Te or Ge.

"Halogen" denotes F, Cl, Br or I.

"—CO—", "—C(=O)—" and "—C(O)—" denote a carbonyl group, i.e.

"O●" denotes an oxygen free radical.

A carbon or hydrocarbon group can be a saturated or unsaturated group. Unsaturated groups are, for example, aryl, alkenyl or alkynyl groups. A carbon or hydrocarbon radical having more than 3 C atoms can be straight-chain, branched and/or cyclic and may also contain spiro links or condensed rings.

The terms "alkyl", "aryl", "heteroaryl", etc., also encompass polyvalent groups, for example alkylene, arylene, heteroarylene, etc.

The term "aryl" denotes an aromatic carbon group or a group derived therefrom. The term "heteroaryl" denotes "aryl" as defined above, containing one or more heteroatoms, preferably selected from N, O, S, Se, Te, Si and Ge.

Preferred carbon and hydrocarbon groups are optionally substituted, straight-chain, branched or cyclic, alkyl, alkenyl, alkynyl, alkoxy, alkylcarbonyl, alkoxycarbonyl, alkylcarbonyloxy and alkoxycarbonyloxy having 1 to 40, preferably 1 to 20, very preferably 1 to 12, C atoms, optionally substituted aryl or aryloxy having 5 to 30, preferably 6 to 25, C atoms, or optionally substituted alkylaryl, arylalkyl, alkylaryloxy, arylalkyloxy, arylcarbonyl, aryloxycarbonyl, arylcarbonyloxy and aryloxycarbonyloxy having 5 to 30, preferably 6 to 25, C atoms, wherein one or more C atoms may also be replaced by a hetero atom, preferably selected from N, O, S, Se, Te, Si and Ge.

Further preferred carbon and hydrocarbon groups are $C_1$-$C_{20}$ alkyl, $C_2$-$C_{20}$ alkenyl, $C_2$-$C_{20}$ alkynyl, $C_3$-$C_{20}$ allyl, $C_4$-$C_{20}$ alkyldienyl, $C_4$-$C_{20}$ polyenyl, $C_6$-$C_{20}$ cycloalkyl, $C_4$-$C_{15}$ cycloalkenyl, $C_6$-$C_{30}$ aryl, $C_6$-$C_{30}$ alkylaryl, $C_6$-$C_{30}$ arylalkyl, $C_6$-$C_{30}$ alkylaryloxy, $C_6$-$C_{30}$ arylalkyloxy, $C_2$-$C_{30}$ heteroaryl, $C_2$-$C_{30}$ heteroaryloxy.

Particular preference is given to $C_1$-$C_{12}$ alkyl, $C_2$-$C_{12}$ alkenyl, $C_2$-$C_{12}$ alkynyl, $C_6$-$C_{25}$ aryl and $C_2$-$C_{25}$ heteroaryl.

Further preferred carbon and hydrocarbon groups are straight-chain, branched or cyclic alkyl having 1 to 20, preferably 1 to 12, C atoms, which are unsubstituted or mono- or polysubstituted by F, Cl, Br, I or CN and in which one or more non-adjacent $CH_2$ groups may each be replaced, independently of one another, by —C($R^x$)=C($R^x$)—, —C≡C—, —N($R^x$)—, —O—, —S—, —CO—, —CO—O—, —O—CO—, —O—CO—O— in such a way that O and/or S atoms are not linked directly to one another.

$R^x$ preferably denotes H, F, Cl, CN, a straight-chain, branched or cyclic alkyl chain having 1 to 25 C atoms, in which, in addition, one or more non-adjacent C atoms may be replaced by —O—, —S—, —CO—, —CO—O—, —O—CO—, —O—CO—O— and in which one or more H atoms may be replaced by F or Cl, or denotes an optionally substituted aryl or aryloxy group with 6 to 30 C atoms, or an optionally substituted heteroaryl or heteroaryloxy group with 2 to 30 C atoms.

Preferred alkyl groups are, for example, methyl, ethyl, n-propyl, isopropyl, n-butyl, isobutyl, s-butyl, t-butyl, 2-methylbutyl, n-pentyl, s-pentyl, cyclopentyl, n-hexyl, cyclohexyl, 2-ethylhexyl, n-heptyl, cycloheptyl, n-octyl, cyclooctyl, n-nonyl, n-decyl, n-undecyl, n-dodecyl, dodecanyl, trifluoromethyl, perfluoron-butyl, 2,2,2-trifluoroethyl, perfluorooctyl, perfluorohexyl, etc.

Preferred alkenyl groups are, for example, ethenyl, propenyl, butenyl, pentenyl, cyclopentenyl, hexenyl, cyclohexenyl, heptenyl, cycloheptenyl, octenyl, cyclooctenyl, etc.

Preferred alkynyl groups are, for example, ethynyl, propynyl, butynyl, pentynyl, hexynyl, octynyl, etc.

Preferred alkoxy groups are, for example, methoxy, ethoxy, 2-methoxyethoxy, n-propoxy, i-propoxy, n-butoxy, i-butoxy, s-butoxy, t-butoxy, 2-methylbutoxy, n-pentoxy, n-hexoxy, n-heptoxy, n-octoxy, n-nonoxy, ndecoxy, n-undecoxy, n-dodecoxy, etc.

Preferred amino groups are, for example, dimethylamino, methylamino, methylphenylamino, phenylamino, etc.

Aryl and heteroaryl groups can be monocyclic or polycyclic, i.e. they can contain one ring (such as, for example, phenyl) or two or more rings, which may also be fused (such as, for example, naphthyl) or covalently bonded (such as, for example, biphenyl), or contain a combination of fused and linked rings. Heteroaryl groups contain one or more heteroatoms, preferably selected from O, N, S and Se.

Particular preference is given to mono-, bi- or tricyclic aryl groups having 6 to 25 C atoms and mono-, bi- or tricyclic heteroaryl groups having 5 to 25 ring atoms, which optionally contain fused rings and are optionally substituted. Preference is furthermore given to 5-, 6- or 7-membered aryl and heteroaryl groups, in which, in addition, one or more CH groups may be replaced by N, S or O in such a way that O atoms and/or S atoms are not linked directly to one another.

Preferred aryl groups are, for example, phenyl, biphenyl, terphenyl, [1,1':3',1"]terphenyl-2'-yl, naphthyl, anthracene, binaphthyl, phenanthrene, 9,10-dihydro-phenanthrene, pyrene, dihydropyrene, chrysene, perylene, tetracene, pentacene, benzopyrene, fluorene, indene, indenofluorene, spirobifluorene, etc.

Preferred heteroaryl groups are, for example, 5-membered rings, such as pyrrole, pyrazole, imidazole, 1,2,3-triazole, 1,2,4-triazole, tetrazole, furan, thiophene, selenophene, oxazole, isoxazole, 1,2-thiazole, 1,3-thiazole, 1,2,3-oxadiazole, 1,2,4-oxadiazole, 1,2,5-oxadiazole, 1,3,4-oxadiazole, 1,2,3-thiadiazole, 1,2,4-thiadiazole, 1,2,5-thiadiazole, 1,3,4-thiadiazole, 6-membered rings, such as pyridine, pyridazine, pyrimidine, pyrazine, 1,3,5-triazine, 1,2,4-triazine, 1,2,3-triazine, 1,2,4,5-tetrazine, 1,2,3,4-tetrazine, 1,2,3,5-tetrazine, or condensed groups, such as indole, isoindole, indolizine, indazole, benzimidazole, benzotriazole, purine, naphthimidazole, phenanthrimidazole, pyridimidazole, pyrazinimidazole, quinoxalinimidazole, benzoxazole, naphthoxazole, anthroxazole, phenanthroxazole, isoxazole, benzothiazole, benzofuran, isobenzofuran, dibenzofuran, quinoline, isoquinoline, pteridine, benzo-5,6-quinoline, benzo-6,7-quinoline, benzo-7,8-quinoline, benzoisoquinoline, acridine, phenothiazine, phenoxazine, benzopyridazine, benzopyrimidine, quinoxaline, phenazine, naphthyridine, azacarbazole, benzocarboline, phenanthridine, phenanthroline, thieno[2,3b]thiophene, thieno[3,2b]thiophene, dithienothiophene, isobenzothiophene, dibenzothiophene, benzothiadiazothiophene, or combinations of these groups.

The aryl and heteroaryl groups mentioned above and below may also be substituted by alkyl, alkoxy, thioalkyl, fluorine, fluoroalkyl or further aryl or heteroaryl groups.

The (non-aromatic) alicyclic and heterocyclic groups encompass both saturated rings, i.e. those containing exclusively single bonds, and also partially unsaturated rings, i.e. those which may also contain multiple bonds. Heterocyclic rings contain one or more heteroatoms, preferably selected from Si, O, N, S and Se.

The (non-aromatic) alicyclic and heterocyclic groups can be monocyclic, i.e. contain only one ring (such as, for example, cyclohexane), or polycyclic, i.e. contain a plurality of rings (such as, for example, decahydronaphthalene or bicyclooctane). Particular preference is given to saturated groups. Preference is furthermore given to mono-, bi- or tricyclic groups having 5 to 25 ring atoms, which optionally contain fused rings and are optionally substituted. Preference is furthermore given to 5-, 6-, 7- or 8-membered carbocyclic groups, in which, in addition, one or more C atoms may be replaced by Si and/or one or more CH groups may be replaced by N and/or one or more non-adjacent $CH_2$ groups may be replaced by —O— and/or —S—.

Preferred alicyclic and heterocyclic groups are, for example, 5-membered groups, such as cyclopentane, tetrahydrofuran, tetrahydrothiofuran, pyrrolidine, 6-membered groups, such as cyclohexane, silinane, cyclohexene, tetrahydropyran, tetrahydrothiopyran, 1,3-dioxane, 1,3-dithiane, piperidine, 7-membered groups, such as cycloheptane, and fused groups, such as tetrahydronaphthalene, decahydronaphthalene, indane, bicyclo[1.1.1]-pentane-1,3-diyl, bicyclo[2.2.2]octane-1,4-diyl, spiro[3.3]heptane-2,6-diyl, octahydro-4,7-methanoindane-2,5-diyl.

Preferred substituents are, for example, solubility-promoting groups, such as alkyl or alkoxy, electron-withdrawing groups, such as fluorine, nitro or nitrile, or substituents for increasing the glass transition temperature (Tg) in the polymer, in particular bulky groups, such as, for example, t-butyl or optionally substituted aryl groups.

Preferred substituents, hereinafter also referred to as "L", are, for example, F, Cl, Br, I, —CN, —$NO_2$, —NCO, —NCS, —OCN, —SCN, —C(=O)N($R^x$)$_2$, —C(=O)$Y^1$, —C(=O)$R^x$, —N($R^x$)$_2$, straight-chain or branched alkyl, alkoxy, alkylcarbonyl, alkoxycarbonyl, alkylcarbonyloxy or alkoxycarbonyloxy each having 1 to 25 C atoms, in which one or more H atoms may optionally be replaced by F or Cl, optionally substituted silyl having 1 to 20 Si atoms, or optionally substituted aryl having 6 to 25, preferably 6 to 15, C atoms, wherein $R^x$ denotes H, F, Cl, CN, or straight chain, branched or cyclic alkyl having 1 to 25 C atoms, wherein one or more non-adjacent $CH_2$-groups are optionally replaced by —O—, —S—, —CO—, —CO—O—, —O—CO—, —O—CO—O— in such a manner that O- and/or S-atoms are not directly connected with each other, and wherein one or more H atoms are each optionally replaced by F, Cl, P— or P-Sp—, and $Y^1$ denotes halogen.

"Substituted silyl or aryl" preferably means substituted by halogen, —CN, $R^0$, —$OR^0$, —CO—$R^0$, —CO—O—$R^0$, —O—CO—$R^0$ or —O—CO—O—$R^0$, wherein $R^0$ denotes H or alkyl with 1 to 20 C atoms.

Particularly preferred substituents L are, for example, F, Cl, CN, $NO_2$, $CH_3$, $C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$, furthermore phenyl.

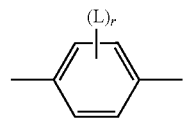

is preferably

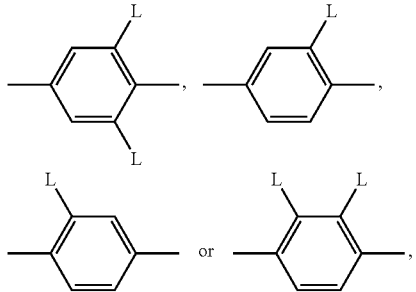

in which L has one of the meanings indicated above.

The polymerisable group P is a group which is suitable for a polymerisation reaction, such as, for example, free-radical or ionic chain polymerisation, polyaddition or polycondensation, or for a polymer-analogous reaction, for example addition or condensation onto a main polymer chain. Particular preference is given to groups for chain polymerisation, in particular those containing a C=C double bond or —C≡C— triple bond, and groups which are suitable for polymerisation with ring opening, such as, for example, oxetane or epoxide groups.

Preferred groups P are selected from the group consisting of $CH_2=CW^1$—CO—O—, $CH_2=CW^1$—CO—,

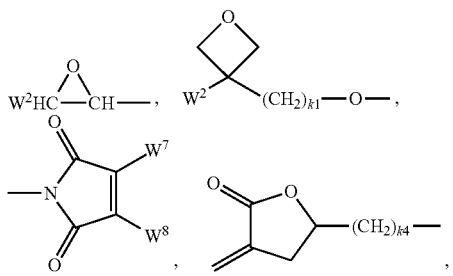

$CH_2=CW^2$—$(O)_{k3}$—, $CW^1$=CH—CO—$(O)_{k3}$—, $CW^1$=CH—CO—NH—, $CH_2=CW^1$—CO—NH—, $CH_3$—CH=CH—O—, $(CH_2=CH)_2$CHOCO—, $(CH_2=CH$—$CH_2)_2$CH—OCO—, $(CH_2=CH)_2$CH—O—, $(CH_2=CH$—$CH_2)_2$N—, $(CH_2=CH$—$CH_2)_2$N—CO—, HO—$CW^2W^3$—, HS—$CW^2W^3$—, H$W^2$N—, HO—$CW^2W^3$—NH—, $CH_2=CW^1$—CO—NH—, $CH_2=CH$—$(COO)_{k1}$-Phe-$(O)_{k2}$—, $CH_2=CH$—$(CO)_{k1}$-Phe-$(O)_{k2}$—, Phe-CH=CH—, HOOC—, OCN— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, which is optionally substituted by one or more radicals L as defined above which are other than P-Sp—, $k_1$, $k_2$ and $k_3$ each, independently of one another, denote 0 or 1, $k_3$ preferably denotes 1, and $k_4$ denotes an integer from 1 to 10.

Very preferred groups P are selected from the group consisting of $CH_2=CW^1$—CO—O—, $CH_2=CW^1$—CO—,

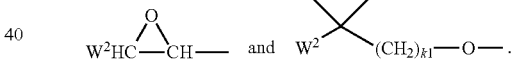

$CH_2=CW^2$—O—, $CH_2=CW^2$—, $CW^1$=CH—CO—$(O)_{k3}$—, $CW^1$=CH—CO—NH—, $CH_2=CW^1$—CO—NH—, $(CH_2=CH)_2$CH—OCO—, $(CH_2=CH$—$CH_2)_2$CH—OCO—, $(CH_2=CH)_2$CH—O—, $(CH_2=CH$—$CH_2)_2$N—, $(CH_2=CHCH_2)_2$N—CO—, $CH_2=CW^1$—CO—NH—, $CH_2=CH$—$(COO)_{k1}$-Phe-$(O)_{k2}$—, $CH_2=CH$$(CO)_{k1}$-Phe-$(O)_{k2}$—, Phe-CH=CH— and $W^4W^5W^6$Si—, in which $W^1$ denotes H, F, Cl, CN, $CF_3$, phenyl or alkyl having 1 to 5 C atoms, in particular H, F, Cl or $CH_3$, $W^2$ and $W^3$ each, independently of one another, denote H or alkyl having 1 to 5 C atoms, in particular H, methyl, ethyl or n-propyl, $W^4$, $W^5$ and $W^6$ each, independently of one another, denote Cl, oxaalkyl or oxacarbonylalkyl having 1 to 5 C atoms, $W^7$ and $W^8$ each, independently of one another, denote H, Cl or alkyl having 1 to 5 C atoms, Phe denotes 1,4-phenylene, $k_1$, $k_2$ and $k_3$ each, independently of one another, denote 0 or 1, $k_3$ preferably denotes 1, and $k_4$ denotes an integer from 1 to 10.

Very particularly preferred groups P are selected from the group consisting of $CH_2=CW^1$—CO—O—, in particular $CH_2=CH$—CO—O—, $CH_2=C(CH_3)$—CO—O— and $CH_2=CF$—CO—O—, furthermore $CH_2=CH$—O—, $(CH_2=CH)_2$CH—O—CO—, $(CH_2=CH)_2$CH—O—, $W^2HC$—CH— and $W^2$(CH$_2$)$_{k1}$—O—.

Further preferred polymerisable groups P are selected from the group consisting of vinyloxy, acrylate, methacrylate, fluoroacrylate, chloroacrylate, oxetane and epoxide, most preferably from acrylate and methacrylate.

Preferred spacer groups Sp which are different from a single bond are selected of the formula Sp"-X", so that the respective radical P-Sp— conforms to the formula P-Sp"-X"—, wherein Sp" denotes alkylene having 1 to 20, preferably 1 to 12, C atoms, which is optionally mono- or polysubstituted by F, Cl, Br, I or CN and in which, in addition, one or more non-adjacent $CH_2$ groups may each be replaced, independently of one another, by —O—, —S—, —NH—, —N(R$^0$)—, —Si(R$^0$R$^{00}$)—, —CO—, —CO—O—, —O—CO—, —O—CO—O—, —S—CO—, —CO—S—, —N(R$^{00}$)—CO—O—, —O—CO—N(R$^0$)—, —N(R$^0$)—CO—N(R$^{00}$)—, —CH=CH— or —C≡C— in such a way that O and/or S atoms are not linked directly to one another, X" denotes —O—, —S—, —CO—, —CO—O—, —O—CO—, —O—CO—O—, —CO—N(R$^0$)—, —N(R$^0$)—CO—, —N(R$^0$)—CO—N(R$^{00}$)—, —OCH$_2$—, —CH$_2$O—, —SCH$_2$—, —CH$_2$S—, —CF$_2$O—, —OCF$_2$—, —CF$_2$S—, —SCF$_2$—, —CF$_2$CH$_2$—, —CH$_2$CF$_2$—, —CF$_2$CF$_2$—, —CH=N—, —N=CH—, —N=N—, —CH=CR$^0$—, —CY$^2$=CY$^3$—, —C≡C—, —CH=CH—CO—O—, —O—CO—CH=CH— or a single bond, R$^0$ and R$^{00}$ each, independently of one another, denote H or alkyl having 1 to 20 C atoms, and Y$^2$ and Y$^3$ each, independently of one another, denote H, F, Cl or CN.

X" is preferably —O—, —S—, —CO—, —COO—, —OCO—, —O—COO—, —CO—NR$^0$—, —NR$^0$—CO—, —NR$^0$—CO—NR$^{00}$— or a single bond.

Typical spacer groups Sp and -Sp"-X"— are, for example, —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, —(CH$_2$CH$_2$O)$_{q1}$—CH$_2$CH$_2$, —CH$_2$CH$_2$—S—CH$_2$CH$_2$—, —CH$_2$CH$_2$—NH—CH$_2$CH$_2$— or —(SiR$^0$R$^{00}$—O)$_{p1}$—, in which p1 is an integer from 1 to 12, q1 is an integer from 1 to 3, and R$^0$ and R$^{00}$ have the meanings indicated above.

Very preferred groups Sp and -Sp"-X"— are —(CH$_2$)$_{p1}$—, —(CH$_2$)$_{p1}$—O—, —(CH$_2$)$_{p1}$—O—CO—, —(CH$_2$)$_{p1}$—CO—O—, —(CH$_2$)$_{p1}$—O—CO—O—, in which p1 has the meanings indicated above, and wherein these groups are linked to the polymerisable group P such that two O-atoms are not directly adjacent to each other.

Particularly preferred groups Sp" are, in each case straight-chain, ethylene, propylene, butylene, pentylene, hexylene, heptylene, octylene, nonylene, decylene, undecylene, dodecylene, octadecylene, ethyleneoxyethylene, methyleneoxybutylene, ethylenethioethylene, ethylene-N-methylimino-ethylene, 1-methylalkylene, ethenylene, propenylene and butenylene.

In another preferred embodiment of the invention the polymerisable compounds of formula I and their subformulae contain a spacer group Sp that is substituted by one or more polymerisable groups P, so that the group Sp—P corresponds to Sp(P)$_s$, with s being 22 (branched polymerisable groups).

Preferred polymerisable compounds of formula I according to this preferred embodiment are those wherein s is 2, i.e. compounds which contain a group Sp(P)$_2$.

Preferred groups Sp(P)$_2$ in the polymerisable compounds of formula I and their subformulae are selected from the following formulae:

| | |
|---|---|
| —X-alkyl-CHPP | Sp1 |
| —X-alkyl-CH((CH$_2$)$_{aa}$P)((CH$_2$)$_{bb}$P) | Sp2 |
| —X—N((CH$_2$)$_{aa}$P)((CH$_2$)$_{bb}$P) | Sp3 |
| —X-alkyl-CHP—CH$_2$—CH$_2$P | Sp4 |
| —X-alkyl-C(CH$_2$P)(CH$_2$P)—C$_{aa}$H$_{2aa+1}$ | Sp5 |
| —X-alkyl-CHP—CH$_2$P | Sp6 |
| —X-alkyl-CPP—C$_{aa}$H$_{2aa+1}$ | Sp7 |
| —X-alkyl-CHPCHP—C$_{aa}$H$_{2aa+1}$ | Sp8 | in which P is as defined in formula I, alkyl denotes a single bond or straight-chain or branched alkylene having 1 to 12 C atoms which is unsubstituted or mono- or polysubstituted by F, Cl or CN and in which one or more non-adjacent CH$_2$ groups may each, independently of one another, be replaced by —C(R$^0$)=C(R$^0$)—, —C≡C—, —N(R$^0$)—, —O—, —S—, —CO—, —CO—O—, —O—CO—, —O—CO—O— in such a way that O and/or S atoms are not linked directly to one another, where R$^0$ has the meaning indicated above, aa and bb each, independently of one another, denote 0, 1, 2, 3, 4, 5 or 6, X has one of the meanings indicated for X", and is preferably O, CO, SO$_2$, O—CO—, CO—O or a single bond.

Preferred spacer groups Sp(P)$_2$ are selected from formulae Sp1, Sp2 and Sp3.

Very preferred spacer groups Sp(P)$_2$ are selected from the following subformulae:

| | |
|---|---|
| —CHPP | Sp1a |
| —O—CHPP | Sp1b |
| —CH$_2$—CHPP | Sp1c |
| —OCH$_2$—CHPP | Sp1d |
| —CH(CH$_2$—P)(CH$_2$—P) | Sp2a |
| —OCH(CH$_2$—P)(CH$_2$—P) | Sp2b |
| —CH$_2$—CH(CH$_2$—P)(CH$_2$—P) | Sp2c |
| —OCH$_2$—CH(CH$_2$—P)(CH$_2$—P) | Sp2d |
| —CO—NH((CH$_2$)$_2$P)((CH$_2$)$_2$P) | Sp3a | wherein P is as defined in formula I.

DETAILED DESCRIPTION OF THE INVENTION

The method according to the present invention, which comprises steps a) to e) as described above and below, provides a simple way to control the pretilt angle in a PSA display, which contains an alignment layer on each substrate that is formed from an alignment layer material, or a precursor thereof.

This is achieved by a) using for one of the two substrates an alignment layer material, or a precursor thereof, that contains a polymerisation inhibitor which inhibits polymerisation of the polymerisable component of the LC medium, or b) using for the other of the two substrates an alignment layer material, or a precursor thereof, that contains a polymerisation initiator which initiates the polymerisation of the polymerisable component of the LC medium, or combining both a) and b).

For example, if an inhibitor is added only to the material that forms the alignment layer on the first substrate, polymerisation of the polymerisable component of the LC medium is inhibited in proximity to the first substrate, and a lower pretilt angle is generated at the first substrate. On the other hand, if an initiator is added only to the material that forms the alignment layer on the second substrate, polymerisation of the polymerisable component of the LC medium is inhibited in proximity to the first substrate and a higher pretilt angle is generated at the second substrate.

The method according to the present invention is especially suitable for curved displays, but can also be used in uncurved displays, i.e. displays having plane-parallel substrates.

The method according to the present invention can also be applied to displays with multiple curvature, e.g. with a "wave-shape", wherein each of the top substrate and the bottom substrate comprises regions with higher degree of curvature and regions with lower degree of curvature. In this case the alignment layer on each substrate should be patterned such that in regions at either substrate with higher degree of curvature (shorter radius) the pretilt angle is reduced, and in regions at either substrate with lower degree of curvature (longer radius) the pretilt angle is increased.

In step a) a first and a second substrate are provided which form the LC display cell. The structure of the PSA displays according to the invention corresponds to the usual geometry for PSA displays, as described in the prior art cited at the outset. Geometries without protrusions are preferred, in particular those in which, in addition, the electrode on the colour filter side is unstructured and only the electrode on the TFT side has slots. Particularly suitable and preferred electrode structures for PS-VA displays are described, for example, in US 2006/0066793 A1.

A preferred PSA type LC display of the present invention comprises:
- a first (or "top") substrate comprising a first electrode, and a first alignment layer disposed on the electrode,
- a second (or "bottom") substrate comprising a second electrode, and a second alignment layer disposed on the electrode,
- wherein one of the first and second electrodes is a pixel electrode defining pixel areas, the pixel electrode being connected to a switching element disposed in each pixel area and optionally including a micro-slit pattern, and
- wherein the other of the first and second electrodes is a common electrode layer, which may be disposed on the entire portion of the substrate facing the other substrate,
- an LC layer disposed between the first and second substrates and including an LC medium comprising a polymerisable component A) and a liquid crystal component B) as described above and below, wherein the polymerisable component A) is preferably polymerised.

Preferably glass or quartz substrates are used. At least one substrate should be transmissive for the photoradiation used for curing the alignment layer material or its material and for polymerising the polymerisable component of the LC medium.

It is also possible to use plastic substrates, for example comprising or being made from polyester such as polyethyleneterephthalate (PET) or polyethylene-naphthalate (PEN), polyvinylalcohol (PVA), polycarbonate (PC) or triacetylcellulose (TAC).

The electrode structures can be designed by the skilled person depending on the individual display type based on methods and materials known from common general knowledge or from the literature.

For example for PS-VA displays a multi-domain orientation of the LC molecules can be induced by providing electrodes having slits and/or bumps or protrusions in order to create two, four or more different tilt alignment directions.

In step b) the alignment layer material or its precursor is deposited on each of the substrates, preferably from solution.

The first and second alignment layers control the alignment direction of the LC molecules of the LC layer. For example, in PS-VA displays the alignment layers are selected such that they impart to the LC molecules homeotropic (or vertical) alignment (i.e. perpendicular to the surface) or tilted alignment. Such an alignment layer may for example comprise a polyimide, which may also be rubbed, or may be prepared by a photoalignment method.

The alignment layer material preferably comprises, very preferably consists of, a polyimide. The polyimide is selected such that it induces vertical alignment of the LC molecules of the LC medium.

Suitable vertical polyimide alignment layer materials are commercially available material, like for example AL60702 (from JSR).

The polyimide may also be cured after deposition, as described in step c) below.

In a preferred embodiment of the present invention, the first and second alignment layer are made from an alignment layer precursor material. For example, if the alignment layer comprises a polyimide, it is preferably made from a polyimide precursor, which is then cured to form a polyimide layer. Such materials are commercially available.

Very preferred are solution processable alignment layer materials. These are preferably processed from solution in a solvent, preferably an organic solvent. Suitable solvents are for example N-methylpyrrolidone, butyl cellosolve or γ-butyrolactone.

The alignment layer material, or the precursor thereof, contains a polymerisation inhibitor which inhibits, or a photoinitiator which initiates, respectively, the photopolymerisation of the polymerisable component of the LC medium.

Suitable inhibitors and initiators can be easily selected by the skilled person depending on the polymerisable component used in the LC medium, and depending on the desired polymerisation method.

Suitable inhibitors are for example the commercially available stabilisers from the Irganox® series (Ciba AG), like for example, Irganox1076® or Irganox®1010. Further suitable and preferred inhibitors are those selected from Table D below.

The concentration of the inhibitor, based on the total amount of the alignment layer material (not including solvents), is preferably from 1 to 10,000 ppm, very preferably from 10 to 500 ppm.

Suitable initiators for free-radical polymerisation are, for example, the commercially available photoinitiators of the Irgacure® or Darocure® series (Ciba AG), like for example Irgacure651®, Irgacure184®, Irgacure907®, Irgacure 189®, Irgacure369® or Darocure1173®.

The concentration of the initiator, based on the total amount of the alignment layer material (not including solvents), is preferably from 1 to 10,000 ppm, very preferably from 10 to 500 ppm.

The pretilt angle of the LC molecules at each of the two substrates can thereby be controlled independently and individually by using an initiator and/or an inhibitor in each alignment layer as follows:

1) The alignment layer material of the top substrate contains an inhibitor, and the alignment layer of the bottom substrate does not contain an inhibitor.
2) The alignment layer material of the bottom substrate contains an initiator, and the alignment layer material of the top substrate does not contain an initiator.
3) The alignment layer material of the top substrate contains an inhibitor, and the alignment layer of the bottom substrate contains an initiator.

In prior art it is known to to add a polymerisation initiator to the LC medium to enhance polymerisation of the polymerisable component. In prior art it is also known to to add an inhibitor or stabiliser to the LC medium, for example to prevent undesired spontaneous polymerisation of the polymerisable component during storage or during other display manufacturing steps. However, since the initiator and/or inhibitor is evenly distributed throughout the LC medium, polymerisation of the polymerisable component is usually proceeding in the same way in the proximity to either of the substrates.

In contrast thereto, in the method according to the present invention there is no need to add an inhibitor or initiator to the LC medium. Instead an inhibitor or initiator is added specifically to the alignment layer material on only one of the substrates, or an initiator is added to one alignment layer and an inhibitor is added to the other alignment layer. As a result polymerisation of the polymerisable component is proceeding in a different way in proximity to each of the two substrates.

The alignment layer material, or precursor thereof, can be applied on the substrates for example by coating or printing methods.

Preferred deposition techniques include, without limitation, dip coating, spin coating, ink jet printing, nozzle printing, letter-press printing, screen printing, gravure printing, doctor blade coating, roller printing, reverse-roller printing, offset lithography printing, dry offset lithography printing, flexographic printing, web printing, spray coating, curtain coating, brush coating, slot dye coating or pad printing. For the fabrication of flexible LC displays area printing methods compatible with flexible substrates are preferred, for example slot dye coating, spray coating and the like.

In case a solvent is used for deposition of the alignment layer material, it is preferably dried off or evaporated off after deposition. Solvent evaporation can be supported for example by applying heat and/or reduced pressure.

In optional step c) the alignment layer material, or the precursor thereof, material is cured to form an alignment layer on each of the substrates.

Preferred curing methods are thermal curing and photocuring, very preferably photocuring. Photocuring is for example carried out by exposure to UV radiation. Suitable curing conditions can be selected by the skilled person depending on the precursor material used, based on his common knowledge and as described in the literature. In case of commercially available materials suitable processing and/or curing conditions are often provided together with the sales or sampling of the material.

In step d) an LC medium comprising a photopolymerisable component is interposed between the first and second substrate, such that it is in contact with the alignment layers provided on each of the substrates. The LC medium can be interposed between the two substrates by methods that are known to the skilled person and are described in the literature.

The two substrates are then assembled, for example glued or otherwise fixed together, to form a display cell.

The LC medium is preferably interposed between the two substrates by the one drop filling process (ODF).

A preferred ODF process comprises the following steps:
d1) dispensing an array of droplets of an LC medium comprising a polymerisable component, preferably comprising components A) and B) as described above and below, on one of the first and second substrates as described above and below,
d2) providing the other one of the first and second substrates on top of substrate that is covered by the dispensed droplets of the LC medium, preferably under vacuum conditions, causing the droplets of the LC medium to spread and form a continuous layer between the two substrates.

Preferably the first and second substrate are fixed or glued together by means of a sealant material that is provided on the first substrate and/or the second substrate, or between the first substrate and the second substrate, preferably in the region between the droplets of the LC material and the edges of the respective substrate.

Preferably the sealant material is cured, for example by exposure to heat and/or photoradiation. In case the sealant material is cured by exposure to photoradiation, preferably the photoradiation is selected such that it does not cause polymerisation of the polymerisable component A) of the LC medium, and/or the LC medium is protected from the photoradiation used for curing the sealant material, for example by a photomask.

The PSA display may comprise further elements, like a colour filter, a black matrix, a passivation layer, optical retardation layers, transistor elements for addressing the individual pixels, etc., all of which are well known to the person skilled in the art and can be employed without inventive skill.

In step e) the polymerisable compounds of the polymerisable component contained in the LC medium are polymerised, or crosslinked (if one compound contains two or more polymerisable groups), by in-situ polymerisation in the LC medium between the substrates of the LC display, optionally while a voltage is applied to the electrodes.

Upon polymerisation the polymerisable compounds of the polymerisable component form a polymer or crosslinked polymer, which generates a pretilt angle of the LC molecules in the LC medium. Without wishing to be bound to a specific theory, it is believed that at least a part of the crosslinked polymer, which is formed by the polymerisable compounds, will phase-separate or precipitate from the LC medium and form a polymer layer on the substrates or electrodes, or the alignment layer provided thereon. Microscopic measurement data (like SEM and AFM) have confirmed that at least a part of the formed polymer accumulates at the LC/substrate interface.

The polymerisation of the polymerisable compounds of the polymerisable component can be carried out in one step. It is also possible to carry out polymerisation in two steps, a first polymerisation step, preferably with an applied voltage, for generating a pretilt angle, and a second polymerisation step, preferably without an applied voltage, for polymerising the compounds which did not, or not completely react, in the first step ("end curing").

Suitable and preferred polymerisation methods are, for example, thermal or photopolymerisation, preferably photopolymerisation, in particular UV induced photopolymerisation, which can be achieved by exposure of the polymerisable compounds to UV radiation.

Preferably the polymerisable component of the LC medium is photopolymerised by exposure to UV radiation.

Preferably a voltage is applied to the electrodes during polymerisation of the polymerisable component of the LC medium.

As mentioned above, in the method according to the present invention there is no need to add an initiator to the LC medium. Nevertheless it is still possible that one or more polymerisation initiators are added to the LC medium. Suitable conditions for the polymerisation and suitable types and amounts of initiators are known to the person skilled in the art and are described in the literature. Suitable for free-radical polymerisation are, for example, the commercially available photoinitiators Irgacure651®, Irgacure184®, Irgacure907®, Irgacure 189®, Irgacure369® or Darocurel 173® (Ciba AG).

If a polymerisation initiator is added to the LC medium, its proportion, based on the total amount of polymerisable compounds in the polymerisable component of the LC medium (not including solvents), is preferably 0.001 to 5% by weight, particularly preferably 0.001 to 3% by weight.

Preferably the polymerisable compounds used in the polymerisable component of the LC medium are selected such that they are suitable for polymerisation without an initiator. This is accompanied by considerable advantages, like for example lower material costs and less contamination of the LC medium by possible residual amounts of the initiator or degradation products thereof.

Preferably the LC medium does not contain a polymerisation initiator when being interposed between the substrates in step d) of the process according to the present invention. The only initiator that is then effectively initiating polymerisation in the LC medium comes from the alignment layer.

In addition to the inhibitor added to the alignment layer, it is also possible that the LC medium also comprises one or more inhibitors or stabilisers in order to prevent undesired spontaneous polymerisation of the polymerisable component of the LC medium, for example during storage or transport. Suitable types and amounts of inhibitors stabilisers are known to the person skilled in the art and are described in the literature. Particularly suitable are, for example, the commercially available stabilisers from the Irganox® series (Ciba AG), such as, for example, Irganox® 1076. If an inhibitor or stabiliser is added to the LC medium, its proportion, based on the total amount of polymerisable compounds in the polymerisable component of the LC medium (not including solvents), is preferably 10-500,000 ppm, particularly preferably 50-50,000 ppm.

Preferably the LC medium does not contain an inhibitor when being interposed between the substrates in step d) of the process according to the present invention. The only inhibitor that is then effectively inhibiting polymerisation in the LC medium comes from the alignment layer.

Preferred is an LC medium according to the present invention that shows high absorption at longer UV wavelengths, enabling the use of longer UV wavelengths for polymerisation which is advantageous for the display manufacturing process.

The polymerisable compounds as used in the polymerisable component show good UV absorption, and are therefore especially suitable for a process of preparing a PSA display including one or more of the following features:
the polymerisable medium is exposed to UV light in the display in a 2-step process, including a first UV exposure step ("UV-1 step") to generate the tilt angle, and a second UV exposure step ("UV-2 step") to finish polymerization,
the polymerisable medium is exposed to UV light in the display generated by an energy-saving UV lamp (also known as "green UV lamps"). These lamps are characterized by a relative low intensity ($\frac{1}{100}$-$\frac{1}{10}$ of a conventional UV1 lamp) in their absorption spectra from 300-380 nm, and are preferably used in the UV2 step, but are optionally also used in the UV1 step when avoiding high intensity is necessary for the process.
the polymerisable medium is exposed to UV light in the display generated by a UV lamp with a radiation spectrum that is shifted to longer wavelengths, preferably 340 nm or more, to avoid short UV light exposure in the PS-VA process.

Both using lower intensity and a UV shift to longer wavelengths protect the organic layer against damage that may be caused by the UV light.

A preferred embodiment of the present invention relates to a process for preparing a PSA display as described above and below, comprising one or more of the following features:
the polymerisable LC medium is exposed to UV light in a 2-step process, including a first UV exposure step ("UV-1 step") to generate the tilt angle, and a second UV exposure step ("UV-2 step") to finish polymerization,
the polymerisable LC medium is exposed to UV light generated by a UV lamp having an intensity of from 0.5 mW/cm² to 10 mW/cm² in the wavelength range from 300-380 nm, preferably used in the UV2 step, and optionally also in the UV1 step,
the polymerisable LC medium is exposed to UV light having a wavelength of 340 nm or more, and preferably 400 nm or less.

This preferred process can be carried out for example by using the desired UV lamps or by using a band pass filter and/or a cut-off filter, which are substantially transmissive for UV light with the respective desired wavelength(s) and are substantially blocking light with the respective undesired wavelengths. For example, when irradiation with UV light of wavelengths λ of 300-400 nm is desired, UV exposure can be carried out using a wide band pass filter being substantially transmissive for wavelengths 300 nm<λ<400 nm. When irradiation with UV light of wavelength λ of more than 340 nm is desired, UV exposure can be carried out using a cut-off filter being substantially transmissive for wavelengths λ>340 nm.

"Substantially transmissive" means that the filter transmits a substantial part, preferably at least 50% of the intensity, of incident light of the desired wavelength(s). "Substantially blocking" means that the filter does not transmit a substantial part, preferably at least 50% of the intensity, of incident light of the undesired wavelengths. "Desired (undesired) wavelength" e.g. in case of a band pass filter means the wavelengths inside (outside) the given range of λ, and in case of a cut-off filter means the wavelengths above (below) the given value of λ.

This preferred process enables the manufacture of displays by using longer UV wavelengths, thereby reducing or even avoiding the hazardous and damaging effects of short UV light components.

UV radiation energy is preferably from 6 to 100 J, depending on the production process conditions.

The proportion of the entire polymerisable component in the LC medium is preferably from >0 to ≤5%, very preferably from >0 to ≤1%, most preferably from 0.05 to 0.5%.

Preference is given to achiral polymerisable compounds, and to LC media in which the compounds of the polymerisable component are selected exclusively from the group consisting of achiral compounds.

In a preferred embodiment of the present invention the polymerisable component of the LC medium comprises, very preferably consists of, one or more polymerisable compounds selected from formula I

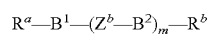

in which the individual radicals, on each occurrence identically or differently, and each, independently of one another, have the following meaning:
$R^a$ and $R^b$ P, P-Sp—, H, F, Cl, Br, I, —CN, —NO$_2$, —NCO, —NCS, —OCN, —SCN, SF$_5$ or straight-chain or branched alkyl having 1 to 25 C atoms, in which, in addition, one or more non-adjacent CH$_2$ groups may each be replaced, independently of one another, by —C(R⁰)

=C(R$^{oo}$)—, —C≡C—, —N(R$^{oo}$)—, —O—, —S—, —CO—, —CO—O—, —O—CO—, —O—CO—O— in such a way that O and/or S atoms are not linked directly to one another, and in which, in addition, one or more H atoms may be replaced by F, Cl, Br, I, CN, P or P-Sp—, where, if B$^1$ and/or B$^2$ contain a saturated C atom, R$^a$ and/or R$^b$ may also denote a radical which is spiro-linked to this saturated C atom, wherein at least one of the radicals R$^a$ and R$^b$ denotes or contains a group P or P-Sp—, P a polymerisable group, Sp a spacer group or a single bond, B$^1$ and B$^2$ an aromatic, heteroaromatic, alicyclic or heterocyclic group, preferably having 4 to 25 ring atoms, which may also contain fused rings, and which is unsubstituted, or mono- or polysubstituted by L, Z$^b$ —O—, —S—, —CO—, —CO—O—, —OCO—, —O—CO—O—, —OCH$_2$—, —CH$_2$O—, —SCH$_2$—, —CH$_2$S—, —CF$_2$O—, —OCF$_2$—, —CF$_2$S—, —SCF$_2$—, —(CH$_2$)$_{n1}$—, —CF$_2$CH$_2$—, —CH$_2$CF$_2$—, —(CF$_2$)$_{n1}$—, —CH=CH—, —CF=CF—, —C≡C—, —CH=CH—COO—, —OCO—CH=CH—, CR$^0$R$^{00}$ or a single bond, R$^0$ and R$^{00}$ each, independently of one another, denote H or alkyl having 1 to 12 C atoms, m denotes 0, 1, 2, 3 or 4, n1 denotes 1, 2, 3 or 4, L P, P-Sp—, OH, CH$_2$OH, F, Cl, Br, I, —CN, —NO$_2$, —NCO, —NCS, —OCN, —SCN, —C(=O)N(R$^x$)$_2$, —C(=O)Y$^1$, —C(=O)R$^x$, —N(R$^x$)$_2$, optionally substituted silyl, optionally substituted aryl having 6 to 20 C atoms, or straight-chain or branched alkyl, alkoxy, alkylcarbonyl, alkoxycarbonyl, alkylcarbonyloxy or alkoxycarbonyloxy having 1 to 25 C atoms, in which, in addition, one or more H atoms may be replaced by F, Cl, P or P-Sp—, P and Sp have the meanings indicated above, Y$^1$ denotes halogen, R$^x$ denotes P, P-Sp—, H, halogen, straight-chain, branched or cyclic alkyl having 1 to 25 C atoms, in which, in addition, one or more non-adjacent CH$_2$ groups may be replaced by —O—, —S—, —CO—, —CO—O—, —O—CO—, —O—CO—O— in such a way that O and/or S atoms are not linked directly to one another, and in which, in addition, one or more H atoms may be replaced by F, Cl, P or P-Sp—, an optionally substituted aryl or aryloxy group having 6 to 40 C atoms, or an optionally substituted heteroaryl or heteroaryloxy group having 2 to 40 C atoms.

Preferred compounds of formula I are those in which B$^1$ and B$^2$ each, independently of one another, denote 1,4-phenylene, 1,3-phenylene, naphthalene-1,4-diyl, naphthalene-2,6-diyl, phenanthrene-2,7-diyl, 9,10-dihydro-phenanthrene-2,7-diyl, anthracene-2,7-diyl, fluorene-2,7-diyl, coumarine, flavone, where, in addition, one or more CH groups in these groups may be replaced by N, cyclohexane-1,4-diyl, in which, in addition, one or more non-adjacent CH$_2$ groups may be replaced by O and/or S, 1,4-cyclohexenylene, bicycle[1.1.1]pentane-1,3-diyl, bicyclo[2.2.2]octane-1,4-diyl, spiro[3.3]heptane-2,6-diyl, piperidine-1,4-diyl, decahydronaphthalene-2,6-diyl, 1,2,3,4-tetrahydronaphthalene-2,6-diyl, indane-2,5-diyl or octahydro-4,7-methanoindane-2,5-diyl, where all these groups may be unsubstituted or mono- or polysubstituted by L as defined above.

Very preferred compounds of formula I are those in which B$^1$ and B$^2$ each, independently of one another, denote 1,4-phenylene, 1,3-phenylene, naphthalene-1,4-diyl or naphthalene-2,6-diyl.

Very preferred compounds of formula I are selected from the following formulae:

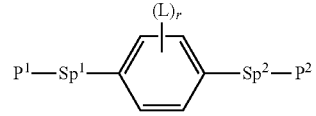

M1

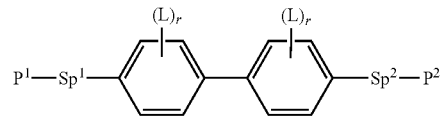

M2

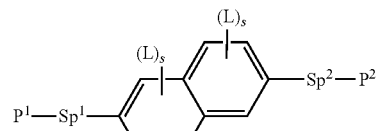

M3

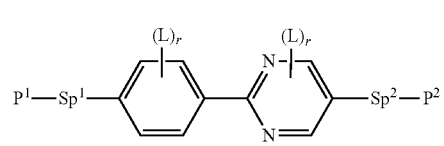

M4

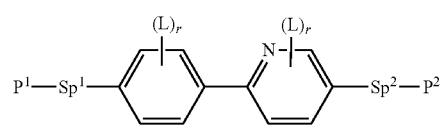

M5

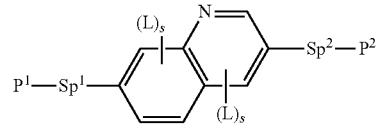

M6

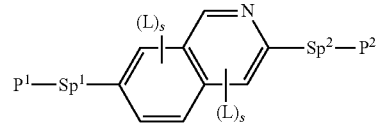

M7

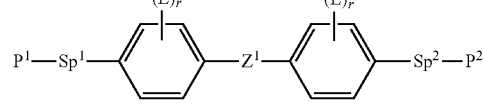

M8

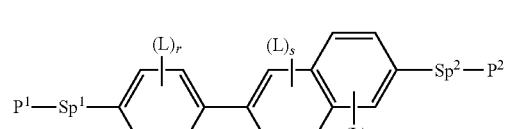

M9

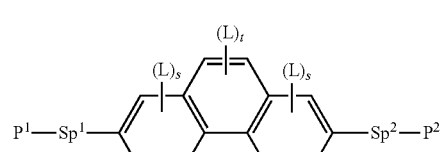

M10

M11
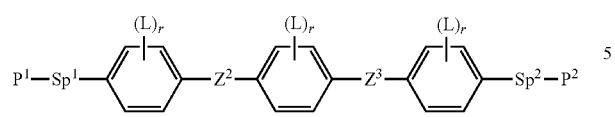
M12
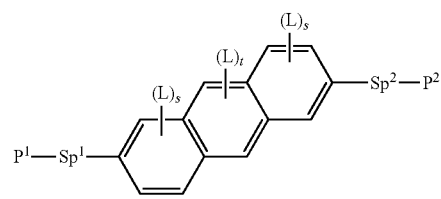
M13
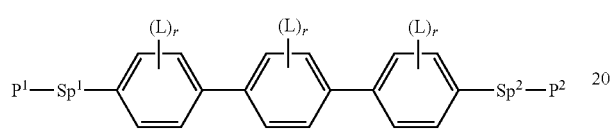
M14
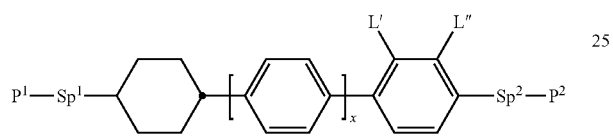
M15
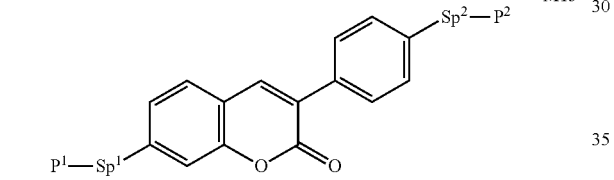
M16
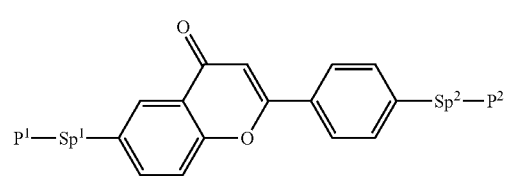
M17
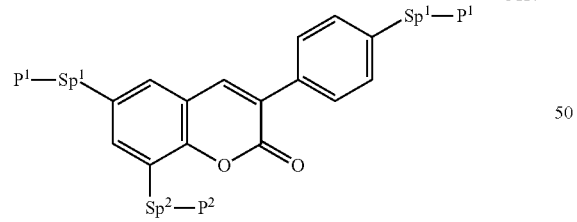
M18
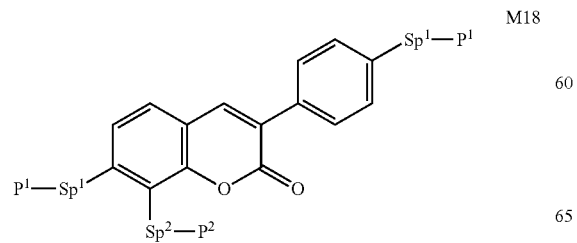
M19
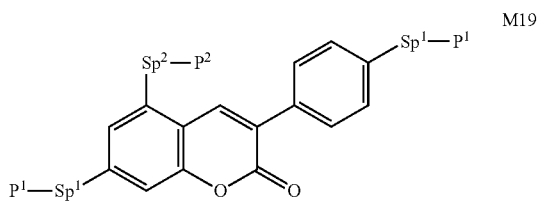
M20
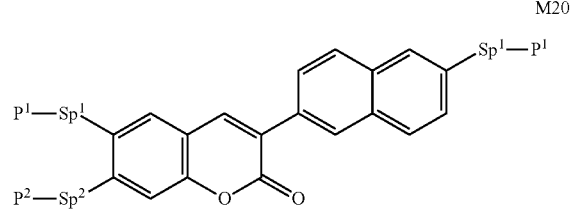
M21
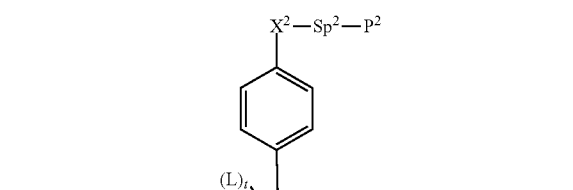
M22
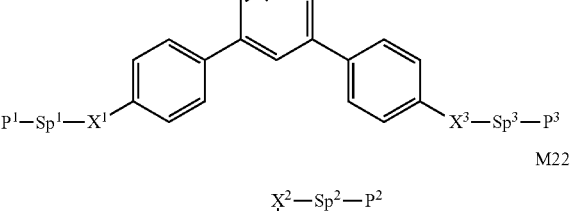
M23
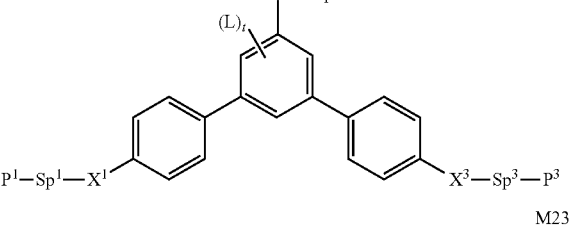
M24
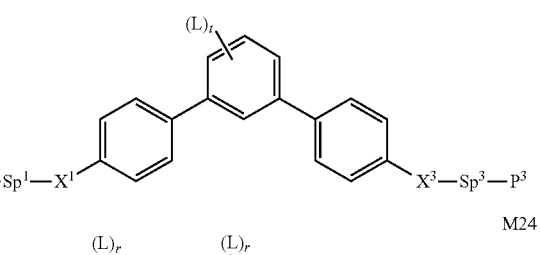
M25
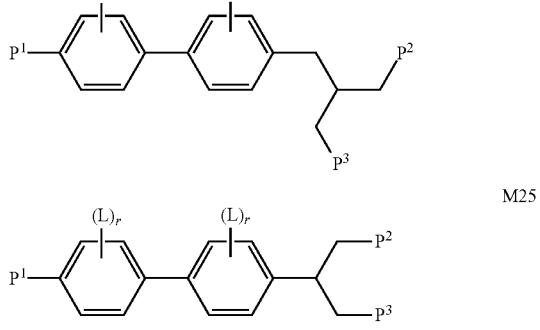

M26

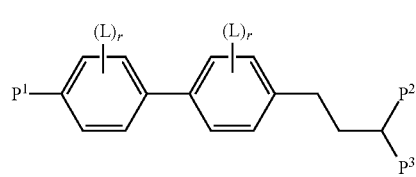

M27

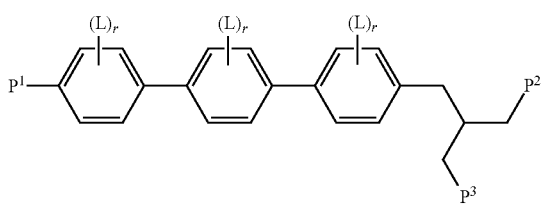

M28

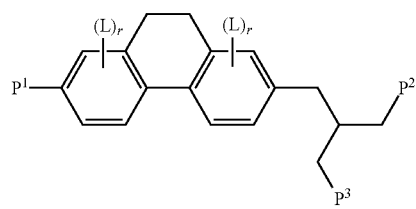

M29

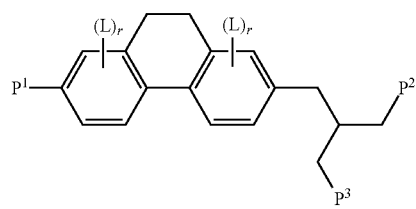

M30

P¹—Sp¹—[ring(L)r]—[ring(L)r]—Sp³—P³
                                |
                              Sp²—P²

M31

P¹—Sp¹—[ring(L)r]—[ring(L)r]—Sp³—P³
                                |
                              Sp²—P² in which the individual radicals, on each occurrence identically or differently, and each, independently of one another, have the following meaning:

$P^1$, $P^2$, $P^3$ a vinyloxy, acrylate, methacrylate, fluoroacrylate, chloroacrylate, oxetane or epoxy group, $Sp^1$, $Sp^2$, $Sp^3$ a single bond or a spacer group as defined for Sp where, in addition, one or more of the radicals $P^1$-$Sp^1$-, $P^1$-$Sp^2$- and $P^3$-$Sp^3$- may denote $R^{aa}$, with the proviso that at least one of the radicals $P^1$-$Sp^1$-, $P^2$-$Sp^2$ and $P^3$-$Sp^3$- present is different from $R^{aa}$, $R^{aa}$ H, F, Cl, CN or straight-chain or branched alkyl having 1 to 25 C atoms, in which, in addition, one or more non-adjacent $CH_2$ groups may each be replaced, independently of one another, by $(R^o)=C(R^{oo})$—, —C≡C—, —N($R^o$)—, —O—, —S—, —CO—, —CO—O—, —O—CO—, —O—CO—O— in such a way that O and/or S atoms are not linked directly to one another, and in which, in addition, one or more H atoms may be replaced by F, Cl, CN or $P^1$-$Sp^1$-, particularly preferably straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms (where the alkenyl and alkynyl radicals have at least two C atoms and the branched radicals have at least three C atoms), $R^o$, $R^{oo}$ H or alkyl having 1 to 12 C atoms, $R^y$ and $R^z$ H, F, $CH_3$ or $CF_3$, $X^1$, $X^2$, $X^3$ —CO—O—, —O—CO— or a single bond, $Z^1$ —O—, —CO—, —C($R^y R^z$)— or —$CF_2CF_2$—, $Z^2$, $Z^3$ —CO—O—, —O—CO—, —$CH_2$O—, —O$CH_2$—, —$CF_2$O—, —O$CF_2$— or —$(CH_2)_n$—, where n is 2, 3 or 4, L F, Cl, CN or straight-chain or branched, optionally mono- or polyfluorinated alkyl, alkoxy, alkenyl, alkynyl, alkylcarbonyl, alkoxycarbonyl, alkylcarbonyloxy or alkoxycarbonyloxy having 1 to 12 C atoms, L', L'' H, F or Cl, r 0, 1, 2, 3 or 4, s 0, 1, 2 or 3, t 0, 1 or 2, x 0 or 1.

Especially preferred are compounds of formulae M2, M13, M17, M22, M23, M24 and M30.

Further preferred are trireactive compounds M15 to M30, in particular M17, M18, M19, M22, M23, M24, M25, M26, M30 and M31.

In the compounds of formulae M1 to M31 the group

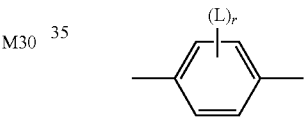

is preferably

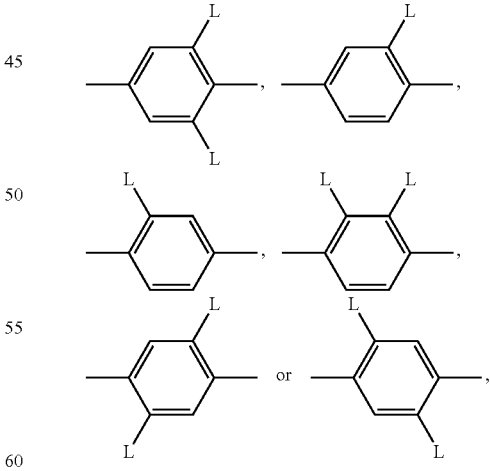

wherein L on each occurrence, identically or differently, has one of the meanings given above or below, and is preferably F, Cl, CN, $NO_2$, $CH_3$, $C_2H_5$, $C(CH_3)_3$, $CH(CH_3)_2$, $CH_2CH(CH_3)C_2H_5$, $OCH_3$, $OC_2H_5$, $COCH_3$, $COC_2H_5$, $COOCH_3$, $COOC_2H_5$, $CF_3$, $OCF_3$, $OCHF_2$, $OC_2F_5$ or P-Sp—, very preferably F, Cl, CN, $CH_3$, $C_2H_5$, OCH₃, COCH₃, OCF₃ or P-Sp—, more preferably F, Cl, CH₃, OCH₃, COCH₃ oder OCF₃, especially F or CH₃.

Preferred compounds of formulae M1 to M31 are those wherein P¹, P² and P³ denote an acrylate, methacrylate, oxetane or epoxy group, very preferably an acrylate or methacrylate group.

Further preferred compounds of formulae M1 to M31 are those wherein Sp¹, Sp² and Sp³ are a single bond.

Further preferred compounds of formulae M1 to M31 are those wherein one of Sp¹, Sp² and Sp³ is a single bond and another one of Sp¹, Sp² and Sp³ is different from a single bond.

Further preferred compounds of formulae M1 to M31 are those wherein those groups Sp¹, Sp² and Sp³ that are different from a single bond denote —(CH₂)$_{s1}$—X"—, wherein s1 is an integer from 1 to 6, preferably 2, 3, 4 or 5, and X" is X" is the linkage to the benzene ring and is —O—, —O—CO—, —CO—O—, —O—CO—O— or a single bond.

Further preferred polymerisable compounds and RMs are those selected from Table E below.

Particular preference is given to LC media comprising one, two or three polymerisable compounds of formula I.

Preferably the proportion of compounds of formula I in the LC medium is from 0.01 to 5%, very preferably from 0.05 to 1%, most preferably from 0.1 to 0.5%.

Besides the polymerisable component A) as described above, the LC media according to the present invention comprise an LC component B), or LC host mixture, comprising one or more, preferably two or more LC compounds which are selected from low-molecular-weight compounds that are unpolymerisable.

These LC compounds are selected such that they stable and/or unreactive to a polymerisation reaction under the conditions applied to the polymerisation of the polymerisable compounds.

The proportion of the LC component B) in the LC medium is preferably from 95 to <100%, very preferably from 99 to <100%.

Examples of these compounds are the compounds shown below.

Preference is given to LC media in which the LC component B), or the LC host mixture, has a nematic LC phase, and preferably has no chiral liquid crystal phase.

Preference is furthermore given to achiral polymerisable compounds, and to LC media in which the compounds of component A) and/or B) are selected exclusively from the group consisting of achiral compounds.

The LC component B), or LC host mixture, is preferably a nematic LC mixture.

In a first preferred embodiment the LC medium contains an LC component B), or LC host mixture, based on compounds with negative dielectric anisotropy.

Such LC media are especially suitable for use in PS-VA and PS-UB-FFS displays. Particularly preferred embodiments of such an LC medium are those of sections a)-z4) below:

a) LC medium wherein the component B) or LC host mixture comprises one or more compounds selected from formulae CY and PY:

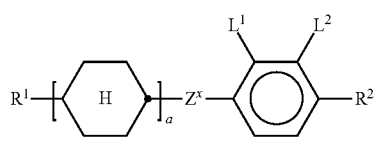
CY

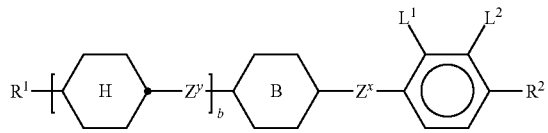
PY wherein
a denotes 1 or 2,
b denotes 0 or 1,

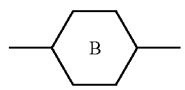

denotes

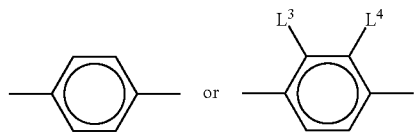

R¹ and R² each, independently of one another, denote alkyl having 1 to 12 C atoms, where, in addition, one or two non-adjacent CH₂ groups may be replaced by —O—, —CH═CH—, —CO—, —OCO— or —COO— in such a way that O atoms are not linked directly to one another, preferably alkyl or alkoxy having 1 to 6 C atoms, Z$^x$ and Z$^y$ each, independently of one another, denote —CH₂CH₂—, —CH═CH—, —CF₂O—, —OCF₂—, —CH₂O—, —OCH₂—, —CO—O—, —O—CO—, —C₂F₄—, —CF═CF—, —CH═CH—CH₂O— or a single bond, preferably a single bond, L$^{1-4}$ each, independently of one another, denote F, Cl, OCF₃, CF₃, CH₃, CH₂F, CHF₂.

Preferably, both L¹ and L² denote F or one of L¹ and L² denotes F and the other denotes Cl, or both L³ and L⁴ denote F or one of L³ and L⁴ denotes F and the other denotes Cl.

The compounds of the formula CY are preferably selected from the group consisting of the following sub-formulae:

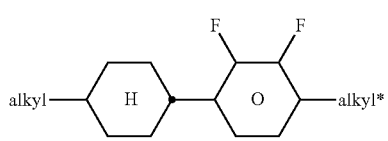
CY1

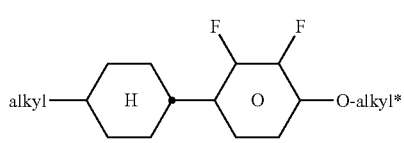
CY2

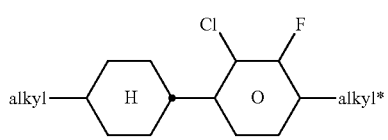
CY3

CY4
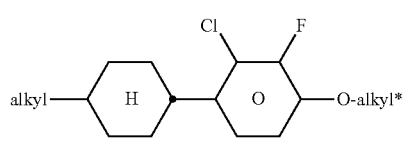
CY5
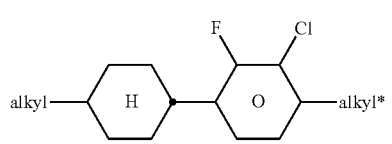
CY6
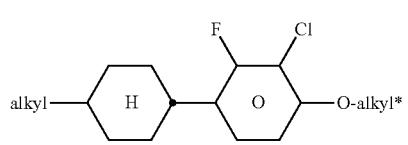
CY7
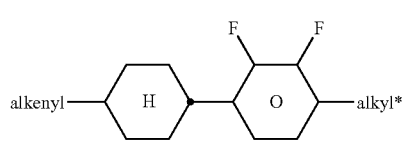
CY8
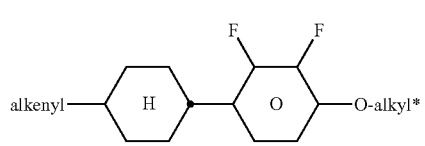
CY9
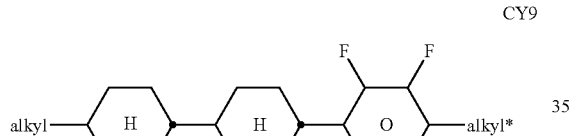
CY10
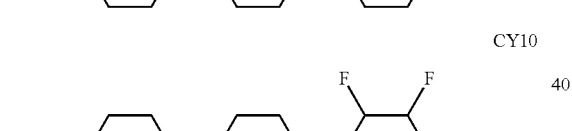
CY11
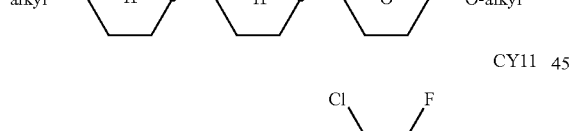
CY12
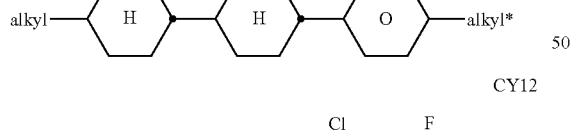
CY13
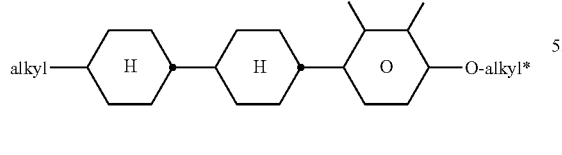
CY14
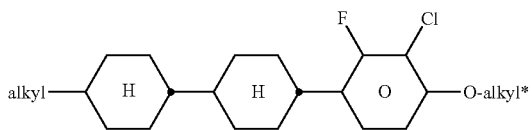
CY15
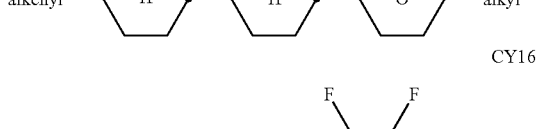
CY16
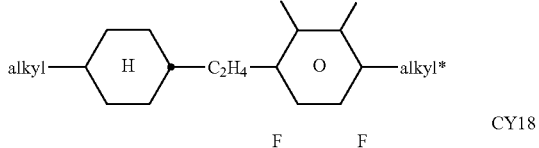
CY17
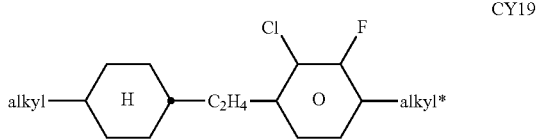
CY18
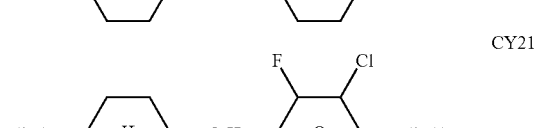
CY19
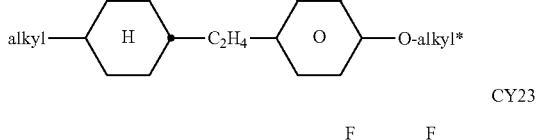
CY20
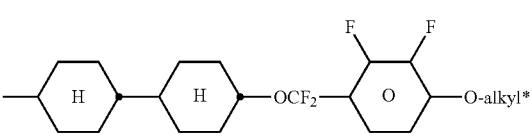
CY21
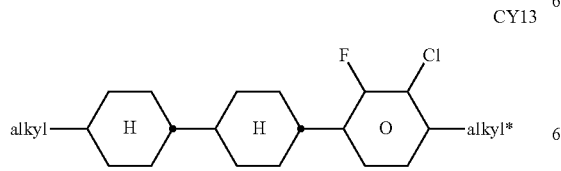
CY22
CY23
CY24

-continued

CY25
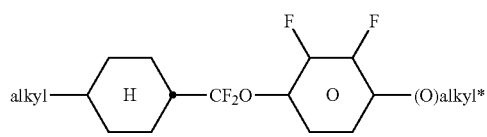

CY26
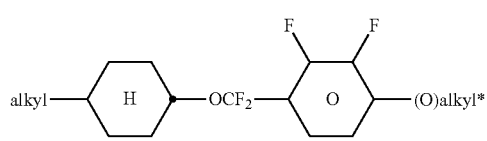

CY27
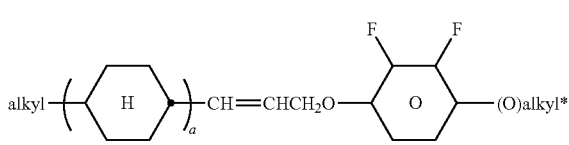

CY28
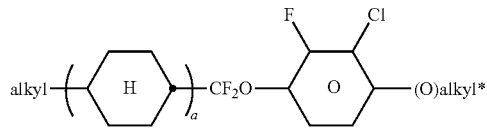

CY29
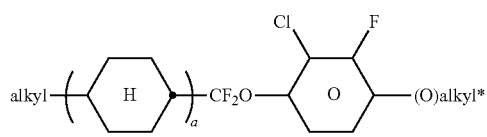

CY30
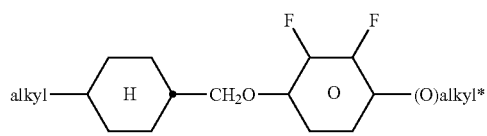

CY31
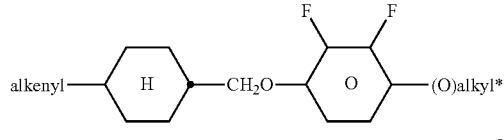

CY32
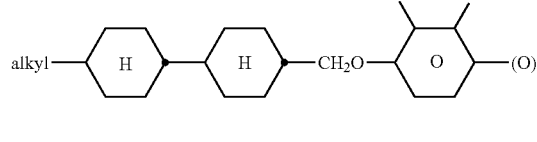

CY33
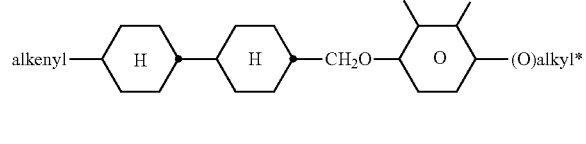

in which a denotes 1 or 2, alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Especially preferred are compounds selected from formulae CY2, CY8, CY10 and CY16, very preferably those of formula CY2 and CY10.

The compounds of the formula PY are preferably selected from the group consisting of the following sub-formulae:

PY1
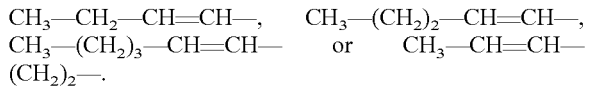

PY2
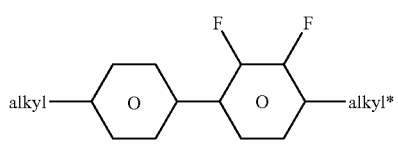

PY3
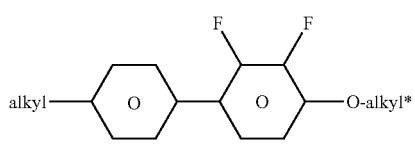

PY4
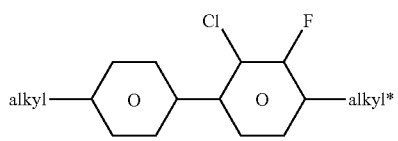

PY5
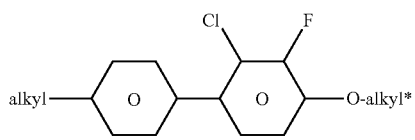

PY6
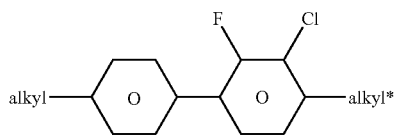

PY7
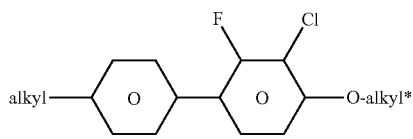

PY8
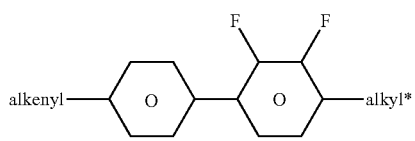

PY9
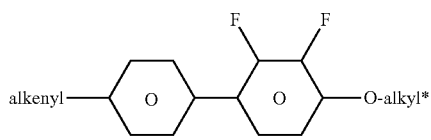

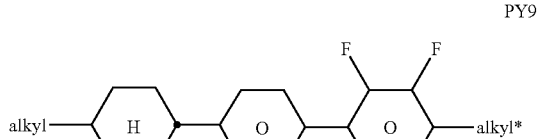

PY10
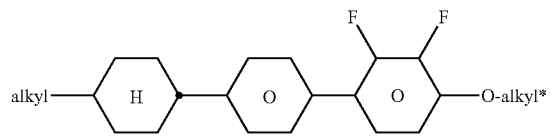

PY11
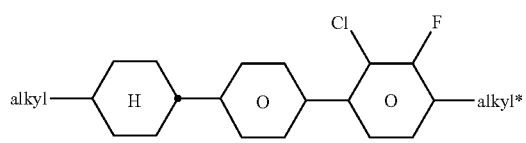

PY12
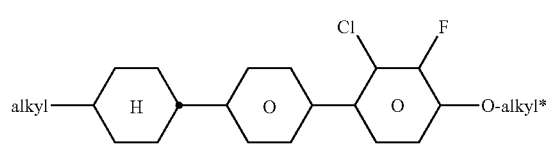

PY13
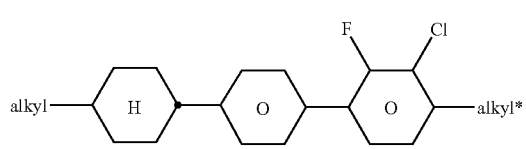

PY14
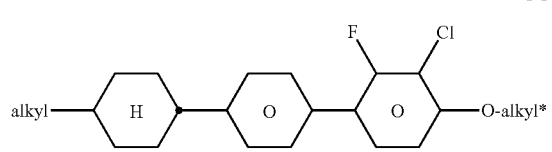

PY15
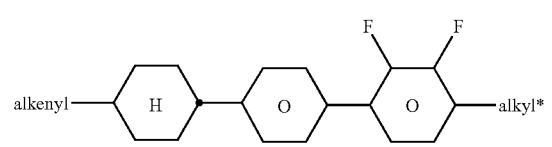

PY16
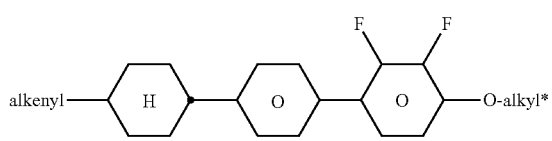

PY17
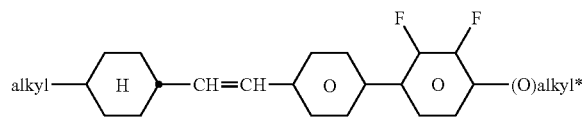

PY18
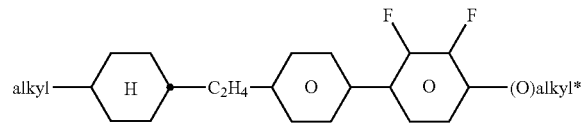

PY19
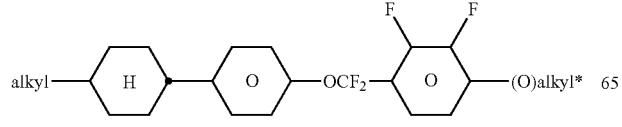

PY20
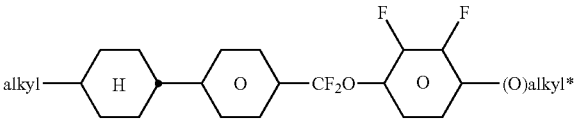

in which alkyl and alkyl* each, independently of one another, denote a straight-chain alkyl radical having 1-6 C atoms, and alkenyl denotes a straight-chain alkenyl radical having 2-6 C atoms, and (O) denotes an oxygen atom or a single bond. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds selected from formulae PY2, PY8, PY10 and PY16, very preferably those of formula PY2 and PY10.

Preferably the component B) or LC host mixture comprises one or more compounds of formula PY2, preferably in an amount from 1 to 20%, very preferably from 8 to 20% by weight.

b) LC medium wherein the component B) or LC host mixture comprises one or more mesogenic or LC compounds comprising an alkenyl group (hereinafter also referred to as "alkenyl compounds"), wherein said alkenyl group is stable to a polymerisation reaction under the conditions used for polymerisation of the polymerisable compounds contained in the LC medium.

Preferably the component B) or LC host mixture comprises one or more alkenyl compounds selected from formulae AN and AY AN
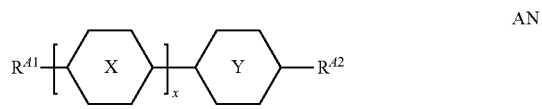

AY
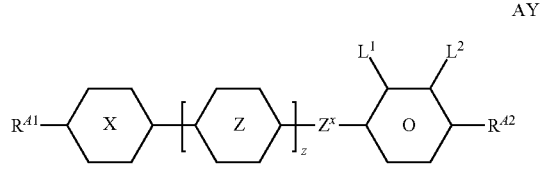

in which the individual radicals, on each occurrence identically or differently, and each, independently of one another, have the following meaning:

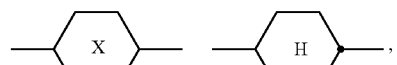
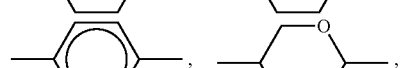
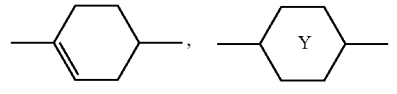

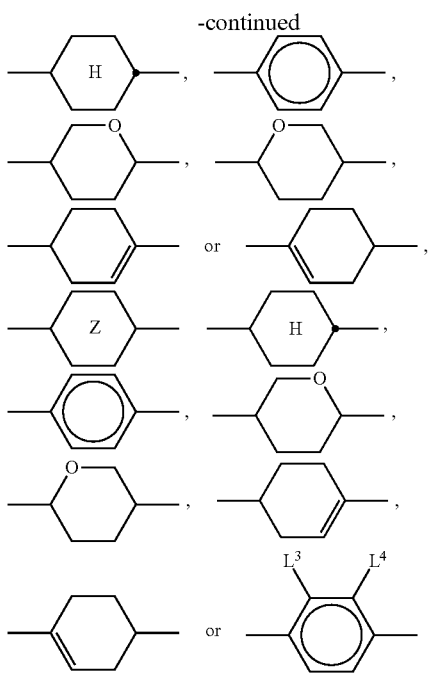

$R^{A1}$ alkenyl having 2 to 9 C atoms or, if at least one of the rings X, Y and Z denotes cyclohexenyl, also one of the meanings of $R^{A2}$,
$R^{A2}$ alkyl having 1 to 12 C atoms, in which, in addition, one or two non-adjacent CH$_2$ groups may be replaced by —O—, —CH=CH—, —CO—, —OCO— or —COO— in such a way that O atoms are not linked directly to one another,
$Z^x$ —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O—, or a single bond, preferably a single bond,
$L^{1,2}$ H, F, Cl, OCF$_3$, CF$_3$, CH$_3$, CH$_2$F or CHF$_2$H, preferably H, F or Cl,
x 1 or 2,
z 0 or 1.

Preferred compounds of formula AN and AY are those wherein $R^{A2}$ is selected from ethenyl, propenyl, butenyl, pentenyl, hexenyl and heptenyl.

In a preferred embodiment the component B) or LC host mixture comprises one or more compounds of formula AN selected from the following sub-formulae:

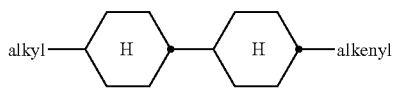

AN1

AN2

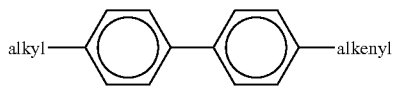

AN3

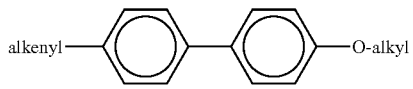

AN4

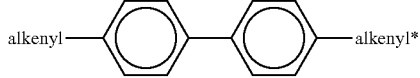

AN5

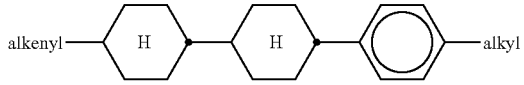

AN6

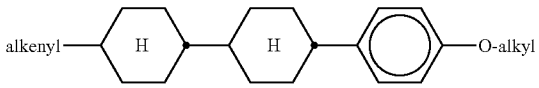

AN7

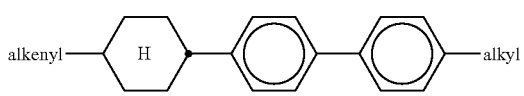

AN8

AN9

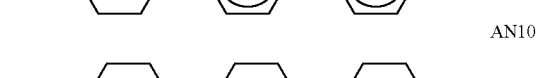

AN10

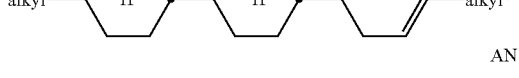

AN11

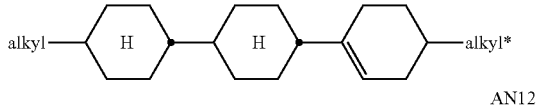

AN12 in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Preferably the component B) or LC host mixture comprises one or more compounds selected from formulae AN1, AN2, AN3 and AN6, very preferably one or more compounds of formula AN1.

In another preferred embodiment the component B) or LC host mixture comprises one or more compounds of formula AN selected from the following sub-formulae:

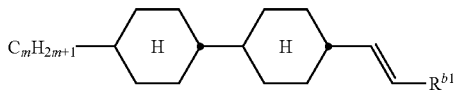

AN1a

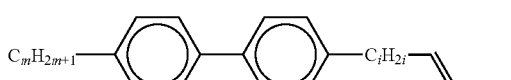

AN3a

AN6a

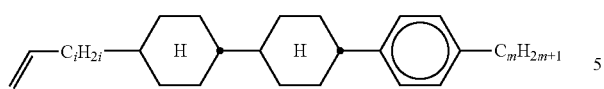

in which m denotes 1, 2, 3, 4, 5 or 6, i denotes 0, 1, 2 or 3, and $R^{b1}$ denotes H, $CH_3$ or $C_2H_5$.

In another preferred embodiment the component B) or LC host mixture comprises one or more compounds selected from the following sub-formulae:

AN1a1

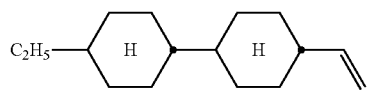

AN1a2

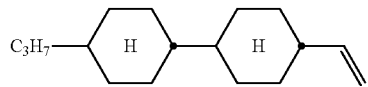

AN1a3

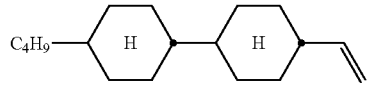

AN1a4

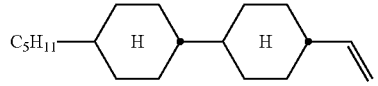

AN1a5

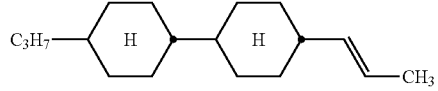

Most preferred are compounds of formula AN1a2 and AN1a5.

In another preferred embodiment the component B) or LC host mixture comprises one or more compounds of formula AY selected from the following sub-formulae:

AY1

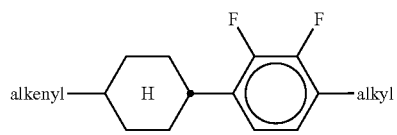

AY2

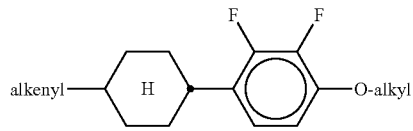

AY3

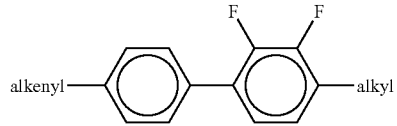

AY4

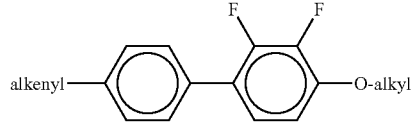

AY5

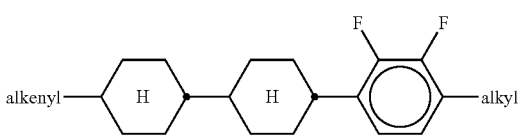

AY6

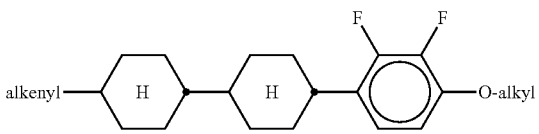

AY7

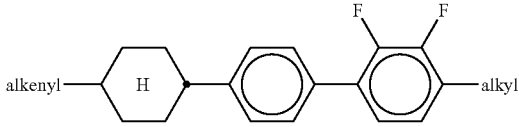

AY8

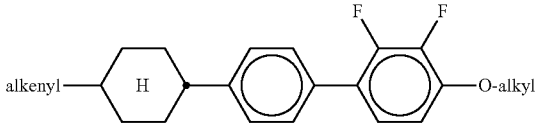

AY9

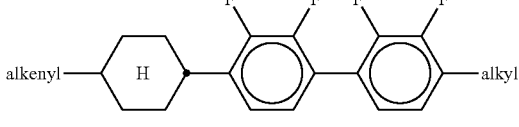

AY10

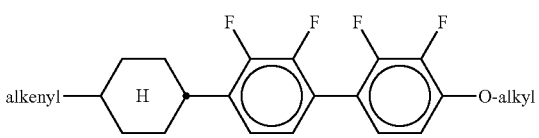

AY11

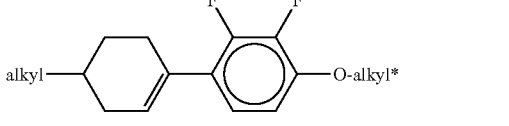

AY12

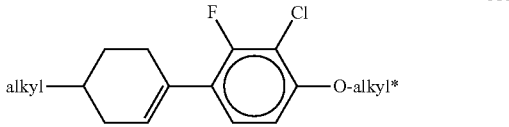

AY13

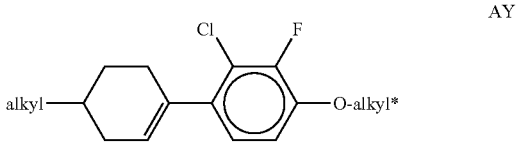

AY14

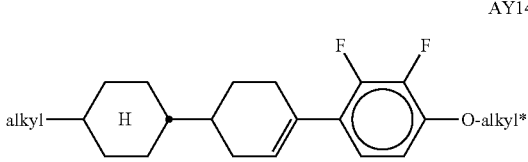

-continued

AY15
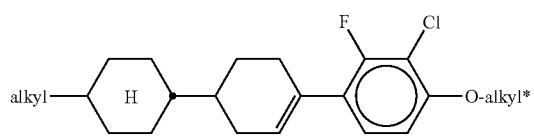

AY16
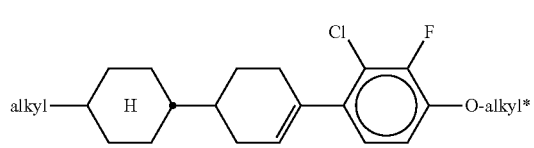

AY17
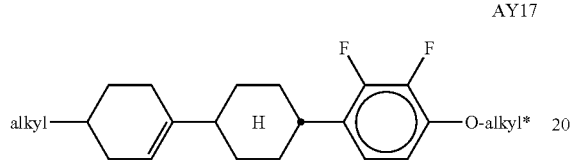

AY18
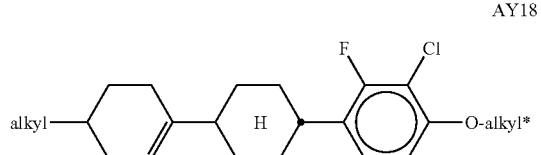

AY19
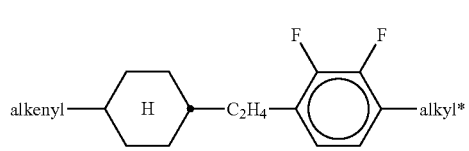

AY20
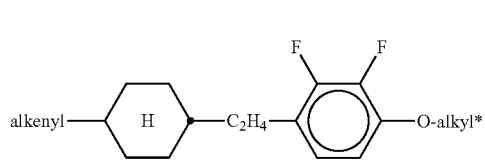

AY21
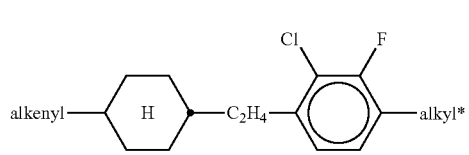

AY22
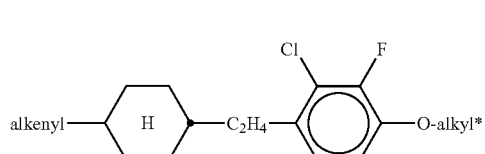

AY23
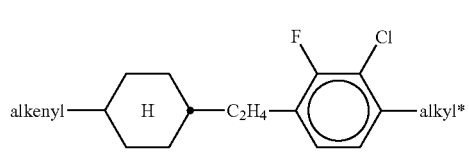

AY24
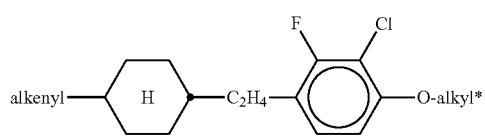

-continued

AY25
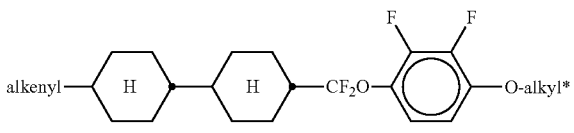

AY26
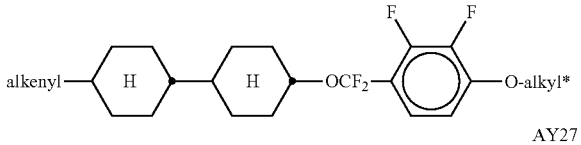

AY27
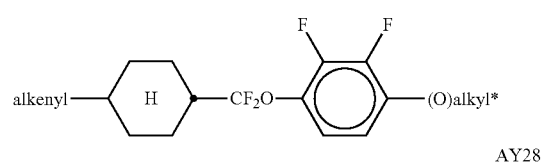

AY28
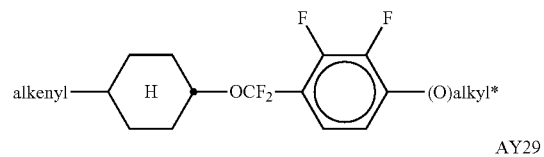

AY29
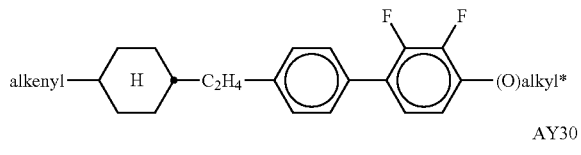

AY30
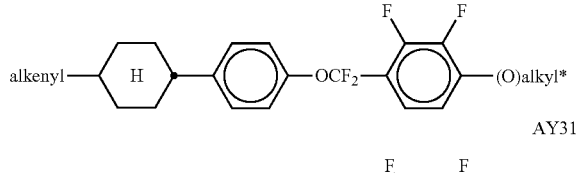

AY31
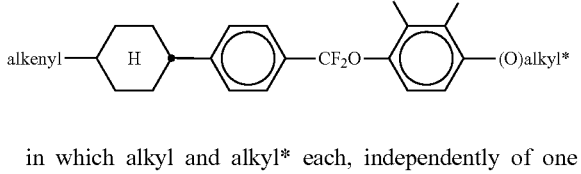

in which alkyl and alkyl* each, independently of one another, denote a straight-chain alkyl radical having 1-6 C atoms, "(O)" denotes an O-atom or a single bond, and alkenyl and alkenyl* each, independently of one another, denote a straight-chain alkenyl radical having 2-7 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

In another preferred embodiment the component B) or LC host mixture comprises one or more compounds of formula AY selected from the following sub-formulae:

AY5a
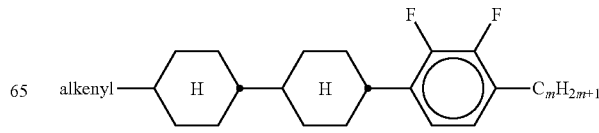

-continued

AY6a alkenyl—[H]—[H]—[F,F-phenyl]—O—C$_m$H$_{2m+1}$

AY9a alkenyl—[H]—[F,F-phenyl]—[F,F-phenyl]—C$_m$H$_{2m+1}$

AY10a alkenyl—[H]—[F,F-phenyl]—[F,F-phenyl]—O—C$_m$H$_{2m+1}$

AY11a

C$_n$H$_{2n+1}$—[cyclohexene]—[F,F-phenyl]—O—C$_m$H$_{2m+1}$

AY14a

C$_n$H$_{2n+1}$—[H]—[cyclohexene]—[F,F-phenyl]—O—C$_m$H$_{2m+1}$ in which m and n each, independently of one another, denote 1, 2, 3, 4, 5 or 6, and alkenyl denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

Preferably the proportion of compounds of formula AN and AY in the LC medium is from 2 to 70% by weight, very preferably from 5 to 60% by weight, most preferably from 10 to 50% by weight.

Preferably the LC medium or LC host mixture contains 1 to 5, preferably 1, 2 or 3 compounds selected from formulae AN and AY.

The addition of alkenyl compounds of formula AN and/or AY enables a reduction of the viscosity and response time of the LC medium.

c) LC medium wherein the component B) or LC host mixture comprises one or more compounds of the following formula:

R$^3$—[C]—Z$^y$—[D]—R$^4$ in which the individual radicals have the following meanings:

—[C]— denotes

—[H]—, —[tetrahydropyran]—, —[tetrahydropyran]—, —[phenyl]— or —[cyclohexene]—,

—[D]— denotes

—[H]— or —[phenyl]—,

R$^3$ and R$^4$ each, independently of one another, denote alkyl having 1 to 12 C atoms, in which, in addition, one or two non-adjacent CH$_2$ groups may be replaced by —O—, —CH=CH—, —CO—, —O—CO— or —CO—O— in such a way that O atoms are not linked directly to one another, Z$^y$ denotes —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond.

The compounds of the formula ZK are preferably selected from the group consisting of the following sub-formulae:

ZK1
alkyl—[H]—[H]—alkyl*

ZK2
alkyl—[H]—[H]—O-alkyl*

ZK3
alkenyl—[H]—[H]—alkyl

ZK4
alkenyl—[H]—[H]—alkenyl*

ZK5
alkyl—[H]—[phenyl]—alkyl*

ZK6
alkyl—[H]—[phenyl]—O-alkyl*

-continued

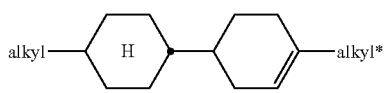 ZK7

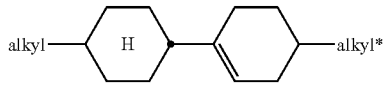 ZK8

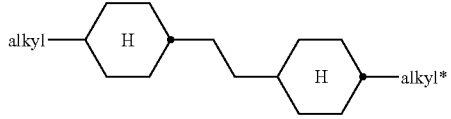 ZK9

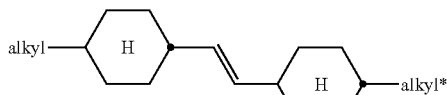 ZK10 in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Especially preferred are compounds of formula ZK1.

Particularly preferred compounds of formula ZK are selected from the following sub-formulae:

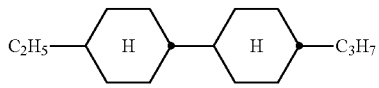 ZK1a

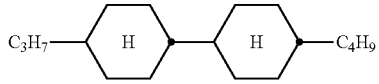 ZK1b

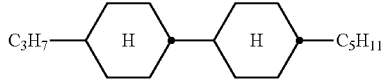 ZK1c wherein the propyl, butyl and pentyl groups are straight-chain groups.

Most preferred are compounds of formula ZK1a.

d) LC medium wherein component B) or the LC host mixture additionally comprises one or more compounds of the following formula:

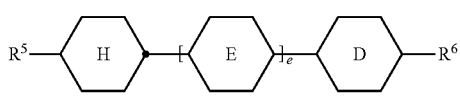 DK in which the individual radicals on each occurrence, identically or differently, have the following meanings:
$R^5$ and $R^6$ each, independently of one another, denote alkyl having 1 to 12 C atoms, where, in addition, one or two non-adjacent $CH_2$ groups may be replaced by $-O-$, $-CH=CH-$, $-CO-$, $-OCO-$ or $-COO-$ in such a way that O atoms are not linked directly to one another, preferably alkyl or alkoxy having 1 to 6 C atoms,

denotes

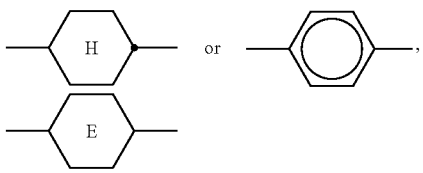

denotes

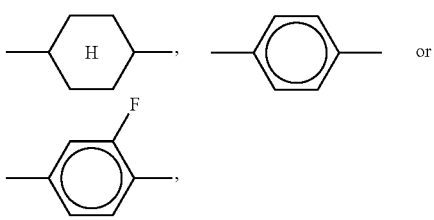

and
e denotes 1 or 2.

The compounds of the formula DK are preferably selected from the group consisting of the following sub-formulae:

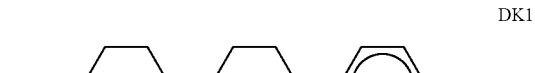 DK1

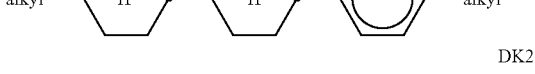 DK2

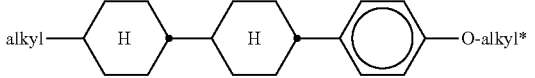 DK3

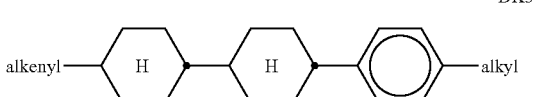 DK4

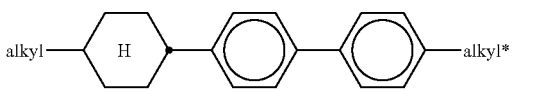 DK5

 DK6

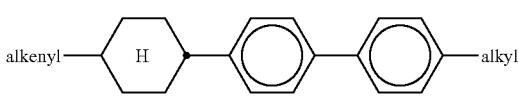

DK7
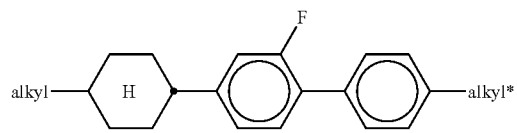

DK8
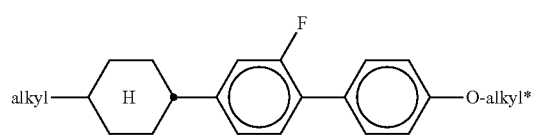

DK9
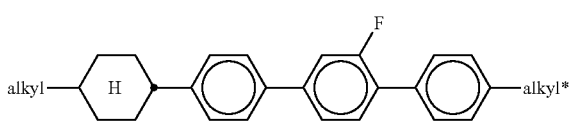

DK10
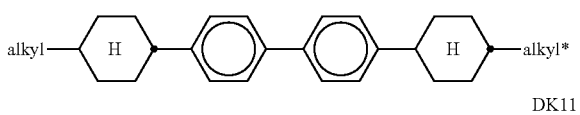

DK11
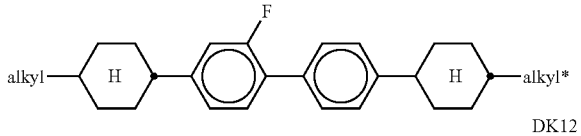

DK12
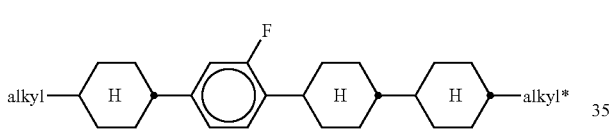

in which alkyl and alkyl* each, independently of one another, denote a straight-chain alkyl radical having 1-6 C atoms, and alkenyl denotes a straight-chain alkenyl radical having 2-6 C atoms. Alkenyl preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

e) LC medium wherein component B) or the LC host mixture additionally comprises one or more compounds of the following formula:

LY
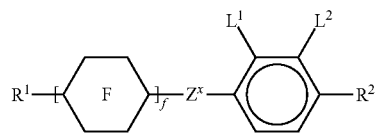

in which the individual radicals have the following meanings:

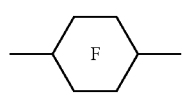

denotes

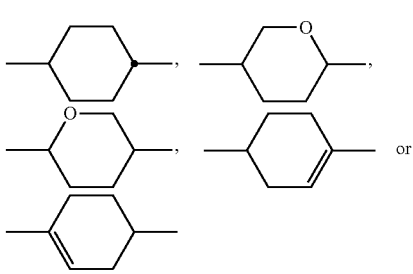

with at least one ring F being different from cyclohexylene, f denotes 1 or 2,

R$^1$ and R$^2$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, Z$^x$ denotes —CH$_2$CH$_2$—, —CH=CH—, —CF$_2$O—, —OCF$_2$—, —CH$_2$O—, —OCH$_2$—, —CO—O—, —O—CO—, —C$_2$F$_4$—, —CF=CF—, —CH=CH—CH$_2$O— or a single bond, preferably a single bond, L$^1$ and L$^2$ each, independently of one another, denote F, Cl, OCF$_3$, CF$_3$, CH$_3$, CH$_2$F, CHF$_2$.

Preferably, both radicals L$^1$ and L$^2$ denote F or one of the radicals L$^1$ and L$^2$ denotes F and the other denotes Cl.

The compounds of the formula LY are preferably selected from the group consisting of the following sub-formulae:

LY1
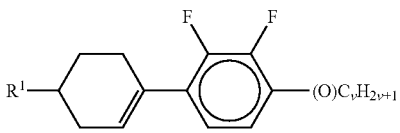

LY2
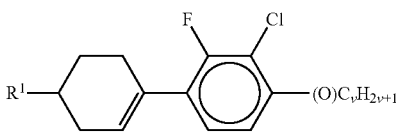

LY3
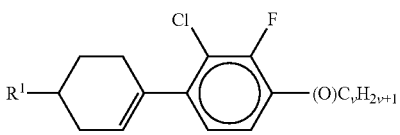

LY4
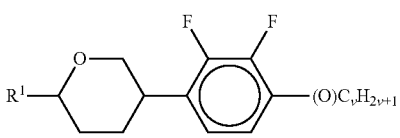

LY5
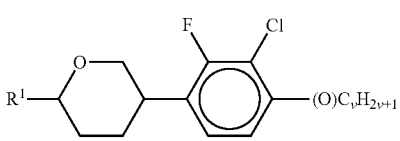

LY6
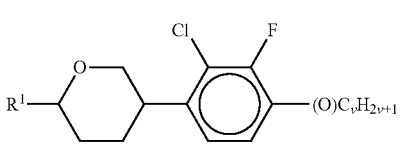

LY7 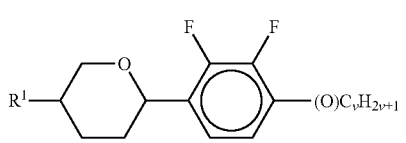

LY8 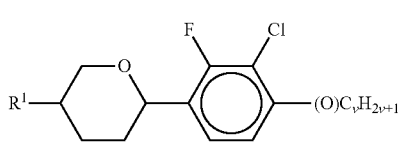

LY9 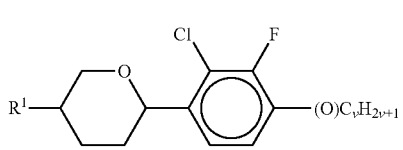

LY10 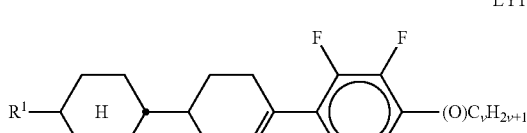

LY11 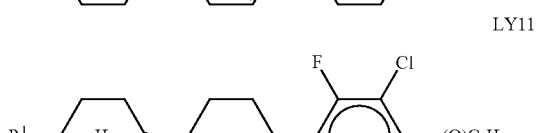

LY12 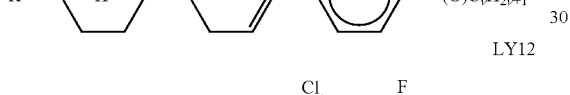

LY13 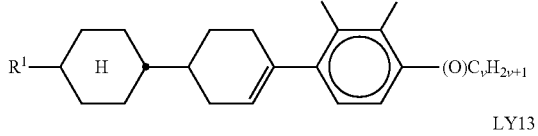

LY14 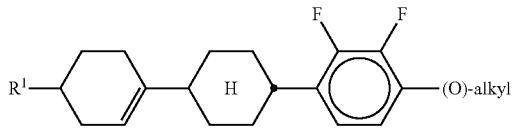

LY15 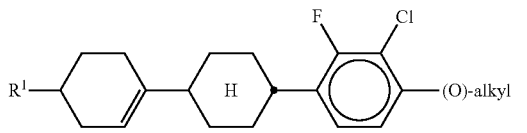

LY16 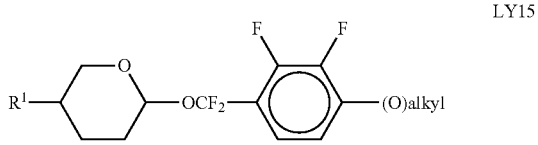

LY17 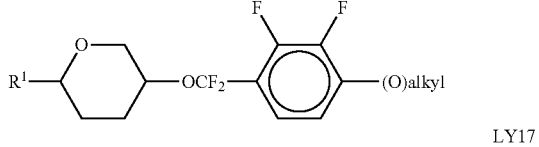

LY18

LY19

LY20

LY21

LY22

LY23

LY24 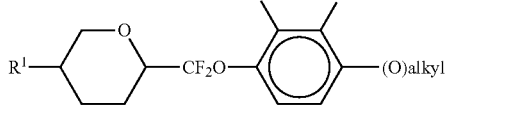

in which $R^1$ has the meaning indicated above, alkyl denotes a straight-chain alkyl radical having 1-6 C atoms, (O) denotes an oxygen atom or a single bond, and v denotes an integer from 1 to 6. $R^1$ preferably denotes straight-chain alkyl having 1 to 6 C atoms or straight-chain alkenyl having 2 to 6 C atoms, in particular $CH_3$, $C_2H_5$, n-$C_3H_7$, n-$C_4H_9$, n-$C_5H_{11}$, $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

Especially preferably the component B) or LC host mixture comprises one or more compounds of formula LY10.

f) LC medium wherein component B) or the LC host mixture additionally comprises one or more compounds selected from the group consisting of the following formulae:

G1

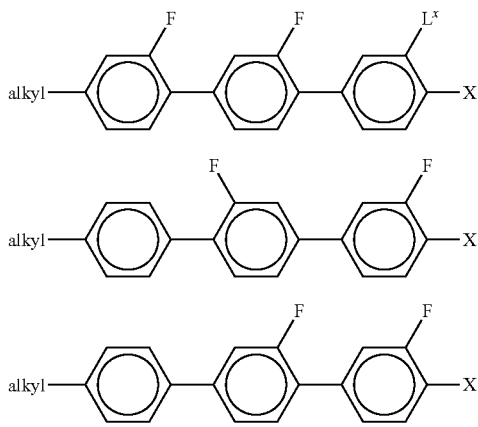

in which alkyl denotes $C_{1-6}$-alkyl, $L^x$ denotes H or F, and X denotes F, Cl, $OCF_3$, $OCHF_2$ or $OCH=CF_2$. Particular preference is given to compounds of the formula G1 in which X denotes F.

g) LC medium wherein component B) or the LC host mixture additionally comprises one or more compounds selected from the group consisting of the following formulae:

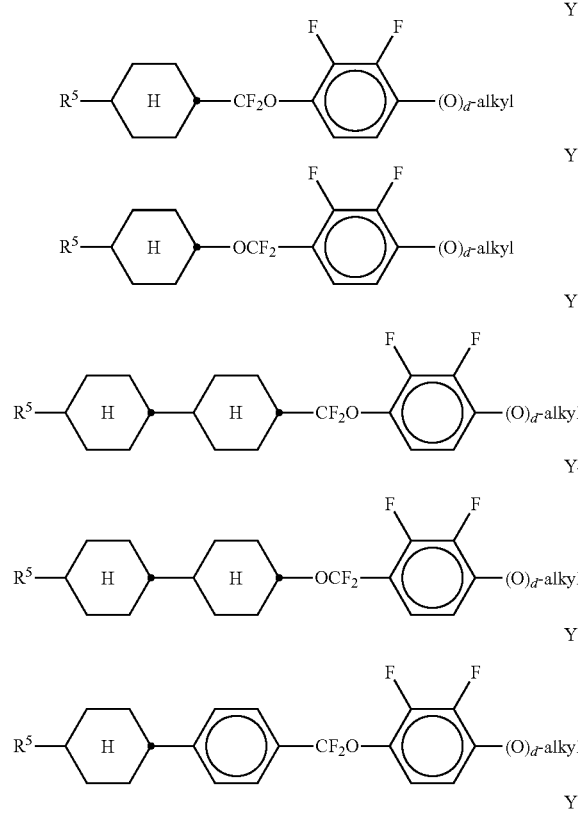

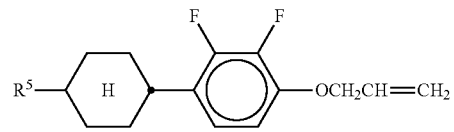

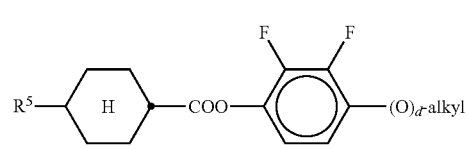

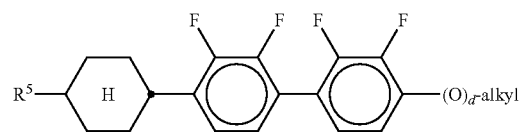

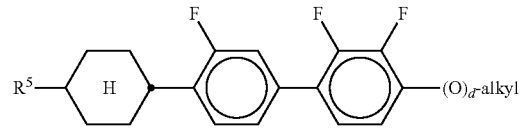

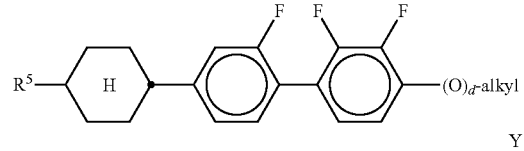

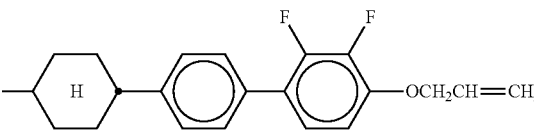

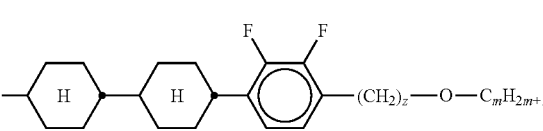

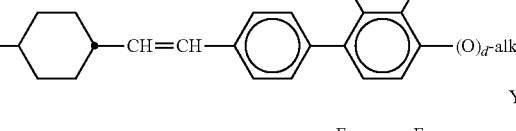

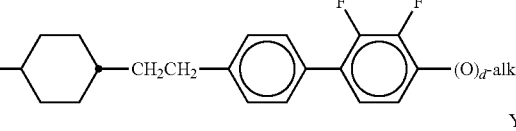

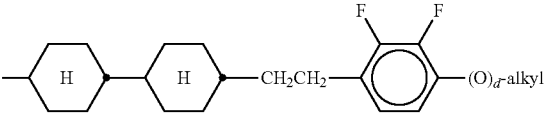

in which $R^5$ has one of the meanings indicated above for $R^1$, alkyl denotes $C_{1-6}$-alkyl, d denotes 0 or 1, and z and m each, independently of one another, denote an integer from 1 to 6. $R^5$ in these compounds is particularly preferably $C_{1-6}$-alkyl or -alkoxy or $C_{2-6}$-alkenyl, d is preferably 1. The LC medium according to the invention preferably comprises one or more compounds of the above-mentioned formulae in amounts of ≥5% by weight.

h) LC medium wherein component B) or the LC host mixture additionally comprises one or more biphenyl compounds selected from the group consisting of the following formulae:

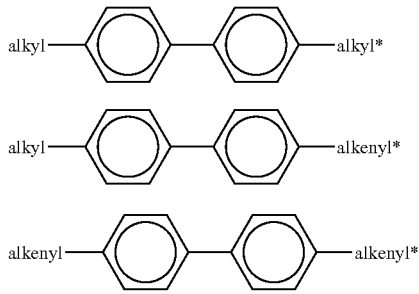

in which alkyl and alkyl* each, independently of one another, denote a straight-chain alkyl radical having 1-6 C atoms, and alkenyl and alkenyl* each, independently of one another, denote a straight-chain alkenyl radical having 2-6 C atoms. Alkenyl and alkenyl* preferably denote $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

The proportion of the biphenyls of the formulae B1 to B3 in the LC host mixture is preferably at least 3% by weight, in particular ≥5% by weight.

The compounds of the formula B2 are particularly preferred.

The compounds of the formulae B1 to B3 are preferably selected from the group consisting of the following sub-formulae:

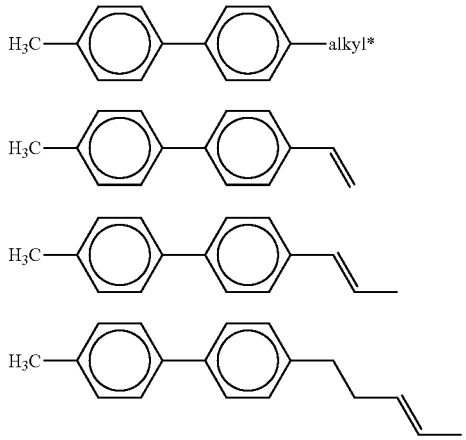

in which alkyl* denotes an alkyl radical having 1-6 C atoms. The medium according to the invention particularly preferably comprises one or more compounds of the formulae B1a and/or B2c.

i) LC medium wherein component B) or the LC host mixture additionally comprises one or more terphenyl compounds of the following formula:

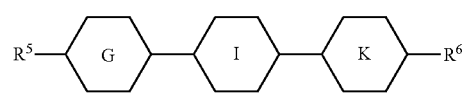

in which $R^5$ and $R^6$ each, independently of one another, have one of the meanings indicated above, and

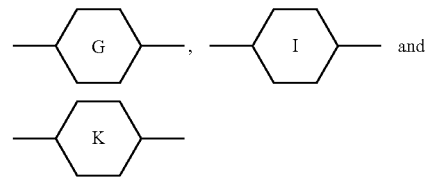

each, independently of one another, denote

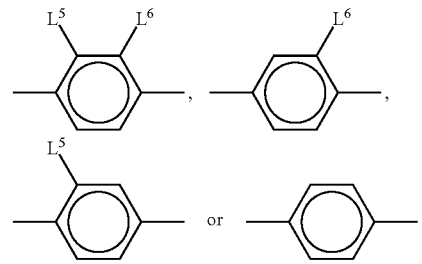

in which $L^5$ denotes F or Cl, preferably F, and $L^6$ denotes F, Cl, $OCF_3$, $CF_3$, $CH_3$, $CH_2F$ or $CHF_2$, preferably F.

The compounds of the formula T are preferably selected from the group consisting of the following sub-formulae:

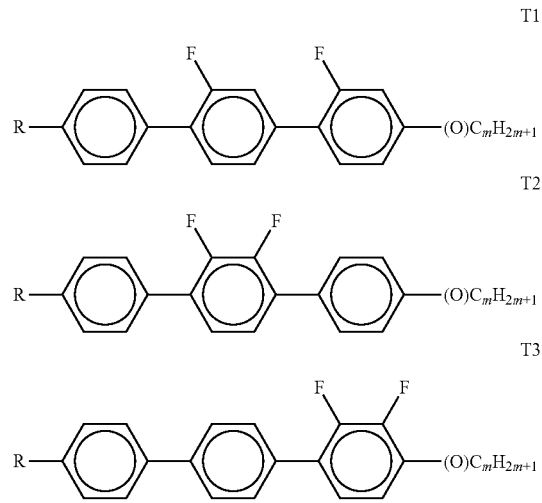

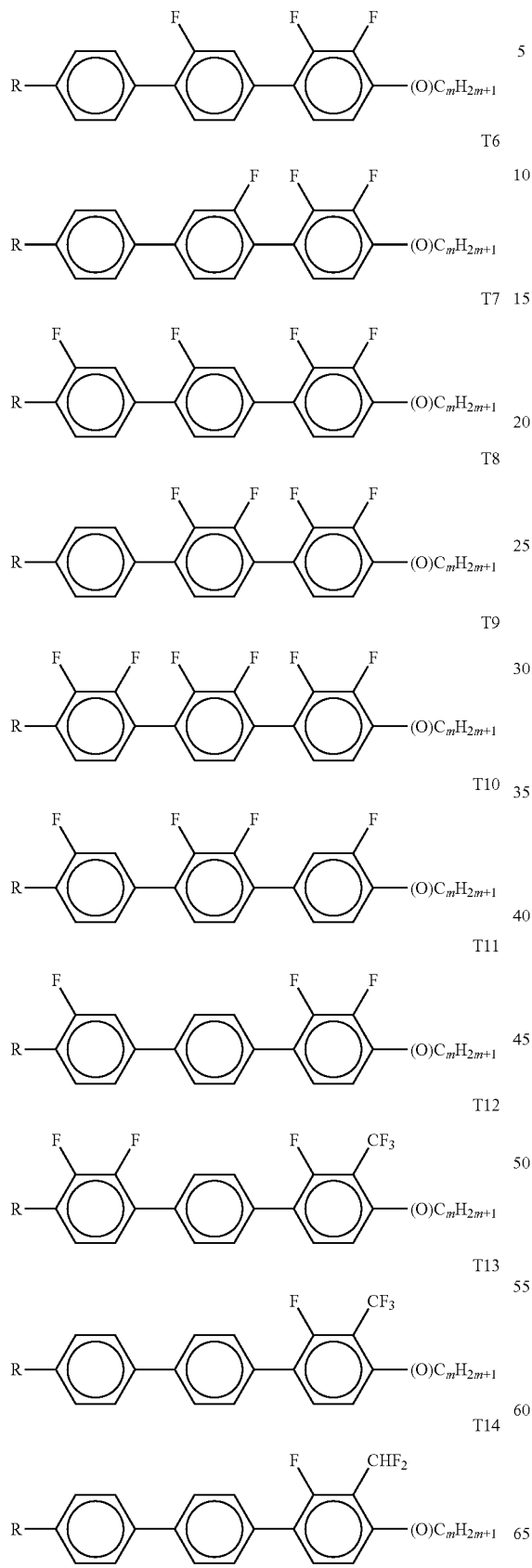
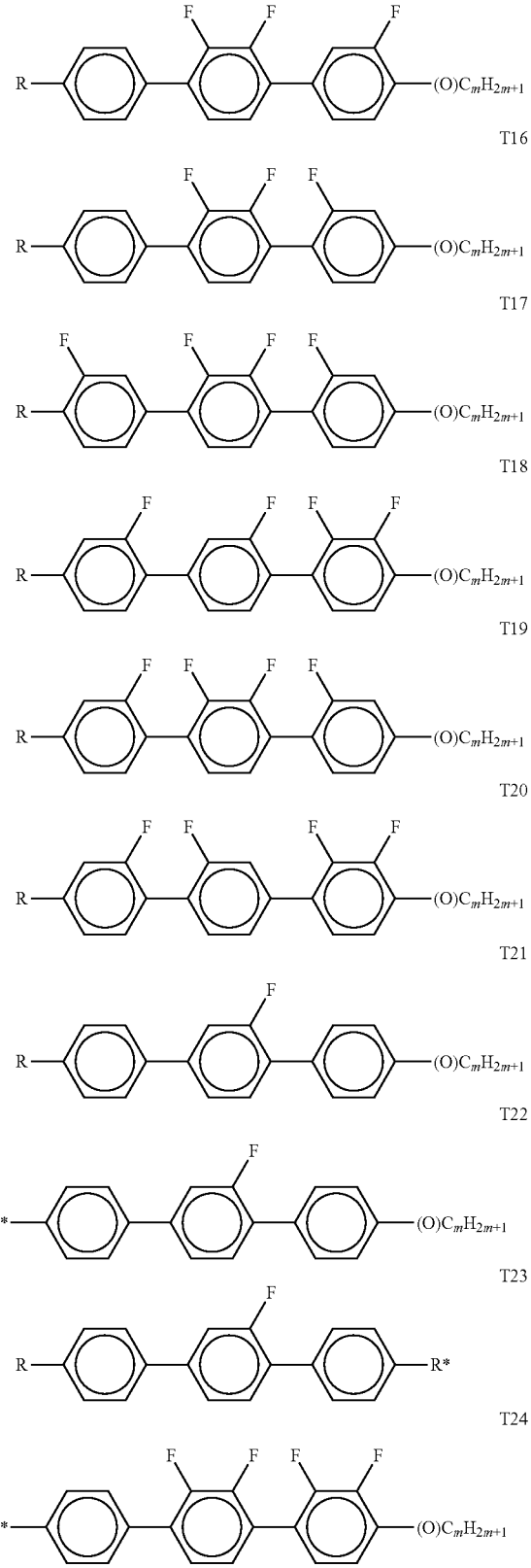
in which R denotes a straight-chain alkyl or alkoxy radical having 1-7 C atoms, R* denotes a straight-chain alkenyl radical having 2-7 C atoms, (O) denotes an oxygen atom or a single bond, and m denotes an integer from 1 to 6. R* preferably denotes CH$_2$=CH—, CH$_2$=CHCH$_2$CH$_2$—, CH$_3$—CH=CH—, CH$_3$—CH$_2$—CH=CH—, CH$_3$—(CH$_2$)$_2$—CH=CH—, CH$_3$—(CH$_2$)$_3$—CH=CH— or CH$_3$—CH=CH—(CH$_2$)$_2$—.

R preferably denotes methyl, ethyl, propyl, butyl, pentyl, hexyl, methoxy, ethoxy, propoxy, butoxy or pentoxy.

The LC host mixture according to the invention preferably comprises the terphenyls of the formula T and the preferred sub-formulae thereof in an amount of 0.5-30% by weight, in particular 1-20% by weight.

Very preferred are compounds of formulae T1, T2, T3, T5 and T21, especially those of formula T1 and T2 and T5. In these compounds, R preferably denotes alkyl, furthermore alkoxy, each having 1-5 C atoms.

The terphenyls are preferably employed in LC media according to the invention if the Δn value of the mixture is to be ≥0.1. Preferred LC media comprise 2-20% by weight of one or more terphenyl compounds of the formula T, preferably selected from the group of compounds T1 to T24.

k) LC medium wherein component B) or the LC host mixture additionally comprises one or more quaterphenyl compounds selected from the group consisting of the following formulae:

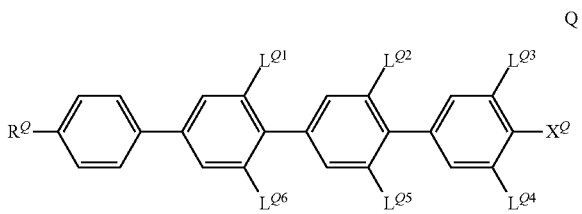

Q wherein
R$^Q$ is alkyl, alkoxy, oxaalkyl or alkoxyalkyl having 1 to 9 C atoms or alkenyl or alkenyloxy having 2 to 9 C atoms, all of which are optionally fluorinated, X$^Q$ is F, Cl, halogenated alkyl or alkoxy having 1 to 6 C atoms or halogenated alkenyl or alkenyloxy having 2 to 6 C atoms, L$^{Q1}$ to L$^{Q6}$ independently of each other are H or F, with at least one of L$^{Q1}$ to L$^{Q6}$ being F.

Preferred compounds of formula Q are those wherein R$^e$ denotes straight-chain alkyl with 2 to 6 C-atoms, very preferably ethyl, n-propyl or n-butyl.

Preferred compounds of formula Q are those wherein L$^{Q3}$ and L$^{Q4}$ are F. Further preferred compounds of formula Q are those wherein L$^{Q3}$, L$^{Q4}$ and one or two of L$^{e1}$ and L$^{Q2}$ are F.

Preferred compounds of formula Q are those wherein X$^e$ denotes F or OCF$_3$, very preferably F.

The compounds of formula Q are preferably selected from the following subformulae

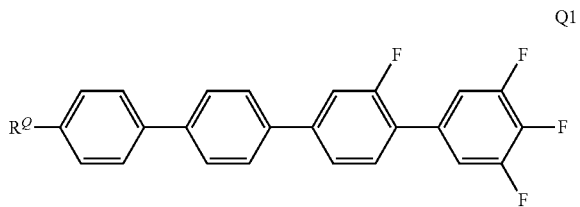

Q1

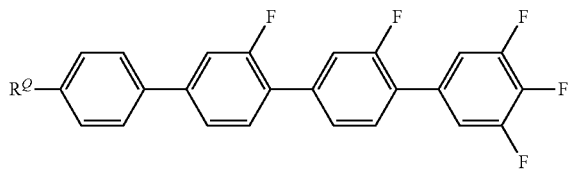

Q2 wherein R$^Q$ has one of the meanings of formula Q or one of its preferred meanings given above and below, and is preferably ethyl, n-propyl or n-butyl.

Especially preferred are compounds of formula Q1, in particular those wherein R$^Q$ is n-propyl.

Preferably the proportion of compounds of formula Q in the LC host mixture is from >0 to ≤5% by weight, very preferably from 0.1 to 2% by weight, most preferably from 0.2 to 1.5% by weight.

Preferably the LC host mixture contains 1 to 5, preferably 1 or 2 compounds of formula Q.

The addition of quaterphenyl compounds of formula Q to the LC host mixture enables to reduce ODF mura, whilst maintaining high UV absorption, enabling quick and complete polymerisation, enabling strong and quick tilt angle generation, and increasing the UV stability of the LC medium.

Besides, the addition of compounds of formula Q, which have positive dielectric anisotropy, to the LC medium with negative dielectric anisotropy allows a better control of the values of the dielectric constants ε$_∥$ and ε$_⊥$, and in particular enables to achieve a high value of the dielectric constant ε$_∥$ while keeping the dielectric anisotropy Δε constant, thereby reducing the kick-back voltage and reducing image sticking.

l) LC medium wherein component B) or the LC host mixture additionally comprises one or more compounds of formula C:

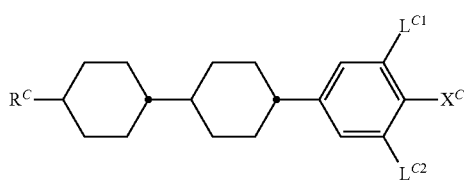

C wherein
R$^C$ denotes alkyl, alkoxy, oxaalkyl or alkoxyalkyl having 1 to 9 C atoms or alkenyl or alkenyloxy having 2 to 9 C atoms, all of which are optionally fluorinated, X$^C$ denotes F, Cl, halogenated alkyl or alkoxy having 1 to 6 C atoms or halogenated alkenyl or alkenyloxy having 2 to 6 C atoms, L$^{C1}$, L$^{C2}$ independently of each other denote H or F, with at least one of L$^{C1}$ and L$^{C2}$ being F.

Preferred compounds of formula C are those wherein R$^C$ denotes straight-chain alkyl with 2 to 6 C-atoms, very preferably ethyl, n-propyl or n-butyl.

Preferred compounds of formula C are those wherein L$^{C1}$ and L$^{C2}$ are F.

Preferred compounds of formula C are those wherein X$^C$ denotes F or OCF$_3$, very preferably F.

Preferred compounds of formula C are selected from the following formula

C1

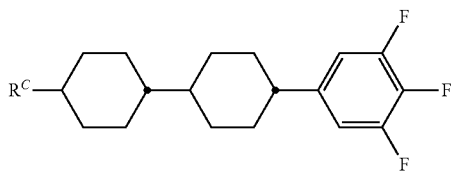

wherein R^C has one of the meanings of formula C or one of its preferred meanings given above and below, and is preferably ethyl, n-propyl or n-butyl, very preferably n-propyl.

Preferably the proportion of compounds of formula C in the LC host mixture is from >0 to ≤10% by weight, very preferably from 0.1 to 8% by weight, most preferably from 0.2 to 5% by weight.

Preferably the LC host mixture contains 1 to 5, preferably 1, 2 or 3 compounds of formula C.

The addition of compounds of formula C, which have positive dielectric anisotropy, to the LC medium with negative dielectric anisotropy allows a better control of the values of the dielectric constants $\varepsilon_{\parallel}$ and $\varepsilon_{\perp}$, and in particular enables to achieve a high value of the dielectric constant $\varepsilon_{\parallel}$ while keeping the dielectric anisotropy $\Delta\varepsilon$ constant, thereby reducing the kick-back voltage and reducing image sticking. Besides, the addition of compounds of formula C enables to reduce the viscosity and the response time of the LC medium.

m) LC medium wherein component B) or the LC host mixture additionally comprises one or more compounds selected from the group consisting of the following formulae:

in which $R^1$ and $R^2$ have the meanings indicated above and preferably each, independently of one another, denote straight-chain alkyl having 1 to 6 C atoms or straight-chain alkenyl having 2 to 6 C atoms.

Preferred media comprise one or more compounds selected from the formulae O1, O3 and O4.

n) LC medium wherein component B) or the LC host mixture additionally comprises one or more compounds of the following formula:

in which denotes

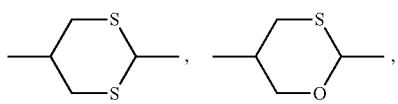

R⁹ denotes H, CH₃, C₂H₅ or n-C₃H₇, (F) denotes an optional fluorine substituent, and q denotes 1, 2 or 3, and R⁷ has one of the meanings indicated for R¹, preferably in amounts of >3% by weight, in particular ≥5% by weight and very particularly preferably 5-30% by weight.

Particularly preferred compounds of the formula FI are selected from the group consisting of the following sub-formulae:

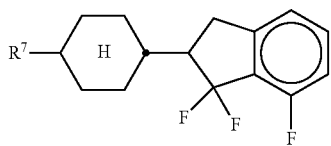

FI1

FI2

FI3

FI4

FI5

FI6

FI7

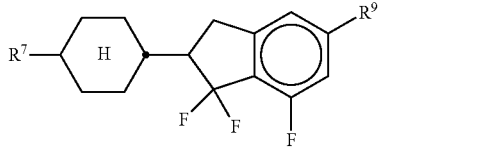

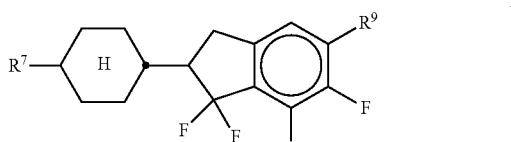

FI8

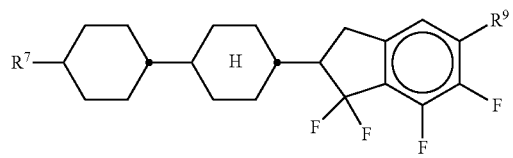

in which R⁷ preferably denotes straight-chain alkyl, and R⁹ denotes CH₃, C₂H₅ or n-C₃H₇. Particular preference is given to the compounds of the formulae FI1, FI2 and FI3.

o) LC medium wherein component B) or the LC host mixture additionally comprises one or more compounds selected from the group consisting of the following formulae:

VK1

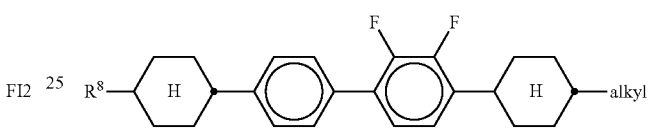

VK2

VK3

VK4

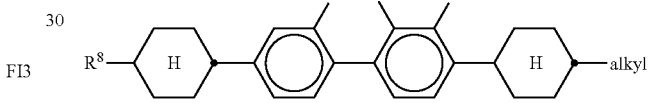

in which R⁸ has the meaning indicated for R¹, and alkyl denotes a straight-chain alkyl radical having 1-6 C atoms.

p) LC medium wherein component B) or the LC host mixture additionally comprises one or more compounds which contain a tetrahydronaphthyl or naphthyl unit, such as, for example, the compounds selected from the group consisting of the following formulae:

N1

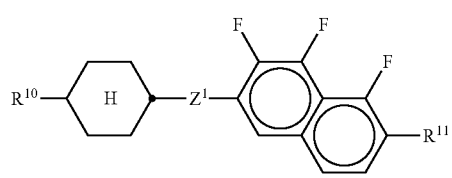

N2 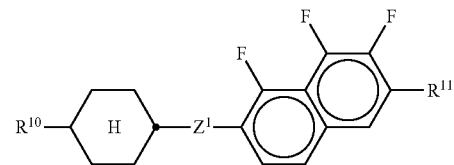

N3 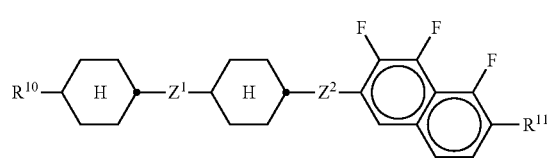

N4 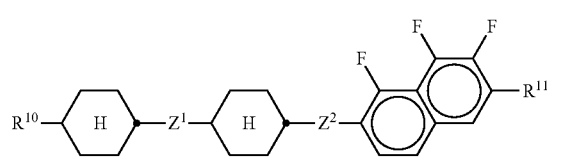

N5 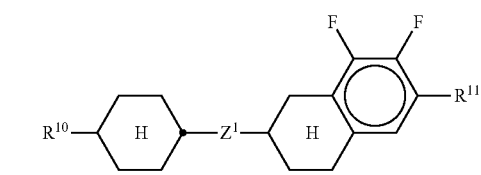

N6 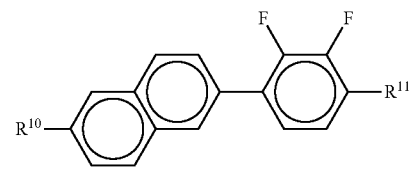

N7 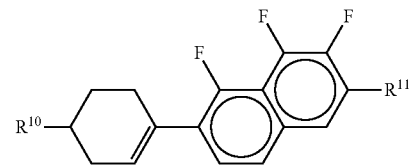

N8 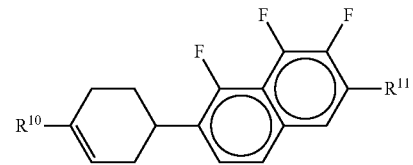

N9 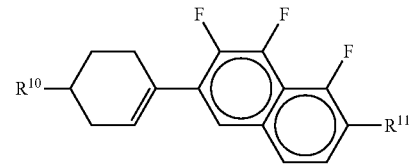

N10 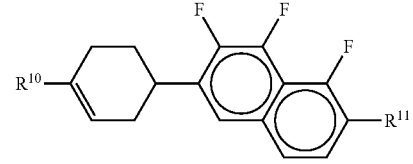

in which $R^{10}$ and $R^{11}$ each, independently of one another, denote alkyl having 1 to 12 C atoms, where, in addition, one or two non-adjacent CH$_2$ groups may be replaced by —O—, —CH=CH—, —CO—, —OCO— or —COO— in such a way that O atoms are not linked directly to one another, preferably alkyl or alkoxy having 1 to 6 C atoms, and $R^{10}$ and $R^{11}$ preferably denote straight-chain alkyl or alkoxy having 1 to 6 C atoms or straight-chain alkenyl having 2 to 6 C atoms, and $Z^1$ and $Z^2$ each, independently of one another, denote —C$_2$H$_4$—, —CH=CH—, —(CH$_2$)$_4$—, —(CH$_2$)$_3$O—, —O(CH$_2$)$_3$—, —CH=CH—CH$_2$CH$_2$—, —CH$_2$CH$_2$CH=CH—, —CH$_2$O—, —OCH$_2$—, —CO—O—, —O—CO—, —C$_2$F$_4$—, —CF=CF—, —CF=CH—, —CH=CF—, —CH$_2$— or a single bond.

q) LC medium wherein component B) or the LC host mixture additionally comprises one or more difluorodibenzochromans and/or chromans of the following formulae:

BC 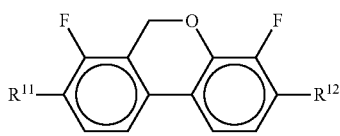

CR 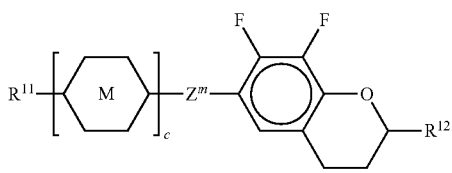

RC 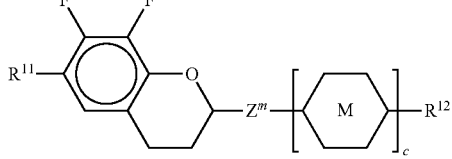

in which $R^{11}$ and $R^{12}$ each, independently of one another, have one of the meanings indicated above for $R^{11}$, ring M is trans-1,4-cyclohexylene or 1,4-phenylene, $Z^m$ —C$_2$H$_4$—, —CH$_2$O—, —OCH$_2$—, —CO—O— or —O—CO—, c is 0, 1 or 2, preferably in amounts of 3 to 20% by weight, in particular in amounts of 3 to 15% by weight.

Particularly preferred compounds of the formulae BC, CR and RC are selected from the group consisting of the following sub-formulae:

BC1 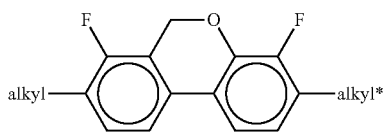

BC2 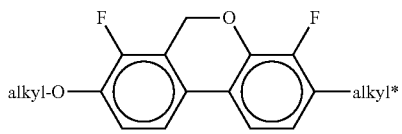

-continued

BC3
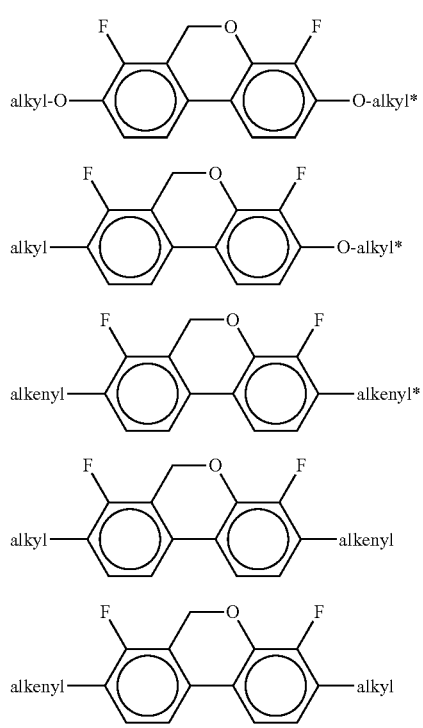
BC4

BC5

BC6

BC7

CR1
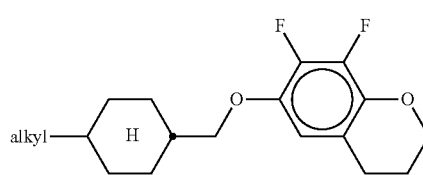

CR2
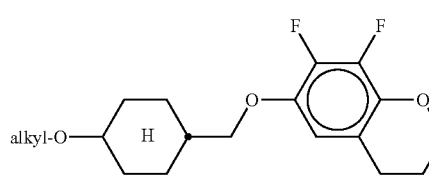

CR3
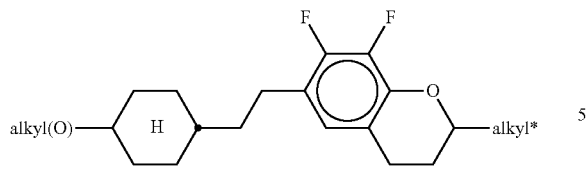

CR4
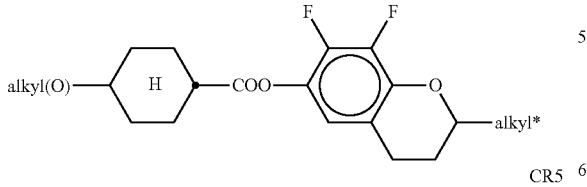

CR5
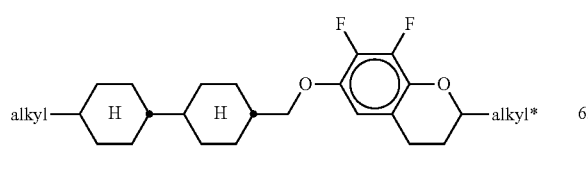

-continued

CR6
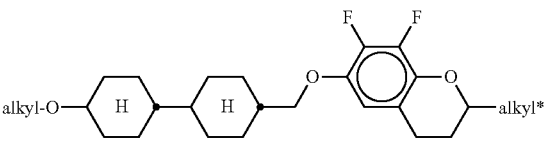

CR7
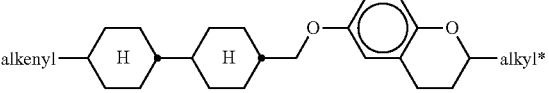

CR8
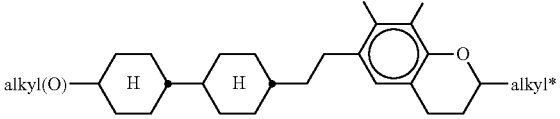

CR9
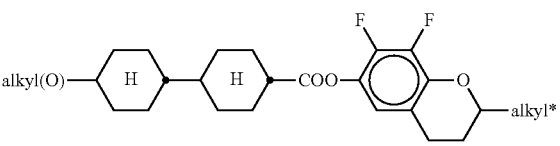

RC1
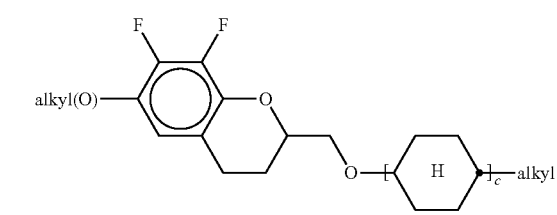

RC2
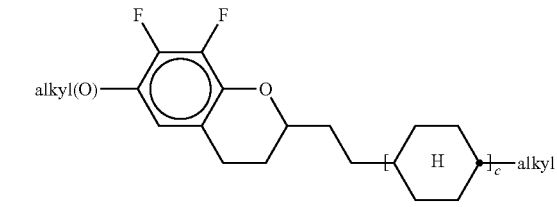

RC3
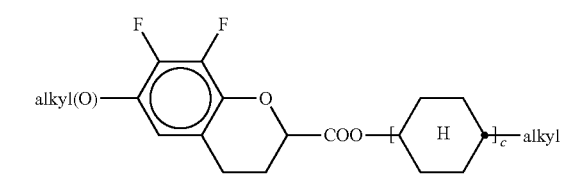

in which alkyl and alkyl* each, independently of one another, denote a straight-chain alkyl radical having 1-6 C atoms, (O) denotes an oxygen atom or a single bond, c is 1 or 2, and alkenyl and alkenyl* each, independently of one another, denote a straight-chain alkenyl radical having 2-6 C atoms. Alkenyl and alkenyl* preferably denote $CH_2$=CH—, $CH_2$=CHCH$_2$CH$_2$—, $CH_3$—CH=CH—, $CH_3$—CH$_2$—CH=CH—, $CH_3$—(CH$_2$)$_2$—CH=CH—, $CH_3$—(CH$_2$)$_3$—CH=CH— or $CH_3$—CH=CH—(CH$_2$)$_2$—.

Very particular preference is given to LC host mixtures comprising one, two or three compounds of the formula BC-2.

r) LC medium wherein component B) or the LC host mixture additionally comprises one or more fluorinated phenanthrenes and/or dibenzofurans of the following formulae:

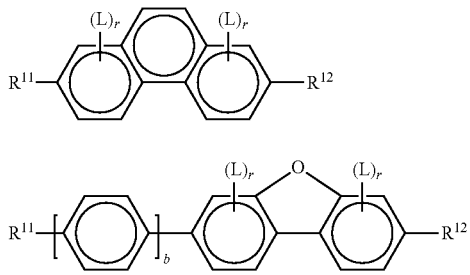

PH

BF in which $R^{11}$ and $R^{12}$ each, independently of one another, have one of the meanings indicated above for $R^{11}$, b denotes 0 or 1, L denotes F, and r denotes 1, 2 or 3.

Particularly preferred compounds of the formulae PH and BF are selected from the group consisting of the following sub-formulae:

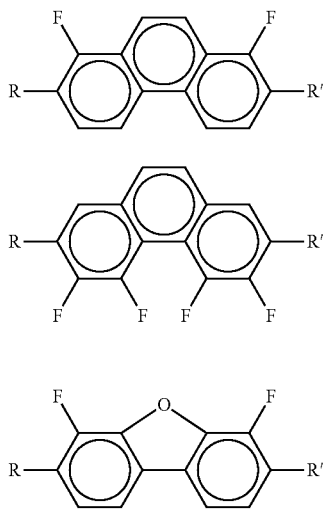

PH1

PH2

BF1

BF2 in which R and R' each, independently of one another, denote a straight-chain alkyl or alkoxy radical having 1-7 C atoms.

Preferably the component B) or the LC host mixture comprises one or more compounds of formula BF1, preferably selected of subformula BF1a

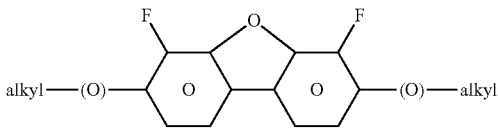

BF1a wherein alkyl denotes a straight-chain alkyl radical having 1-6 C atoms, and (O) denotes an oxygen atom or a single bond. Very preferred are compounds of formula BF1a wherein both groups (O) denote an oxygen atom and alkyl is methyl, ethyl, propyl, butyl of pentyl or hexyl, which are preferably straight-chained.

Preferably the proportion of compounds of formula BF1 or B1Fa in the LC medium is from 0.5 to 20%, very preferably from 0.5 to 10%, most preferably from 1 to 5%.

Preferably the LC medium contains 1 to 5, preferably 1, 2 or 3 compounds of formula BF1 or BF1a.

s) LC medium wherein component B) or the LC host mixture additionally comprises one or more monocyclic compounds of the following formula

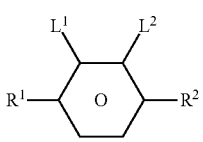

Y wherein $R^1$ and $R^2$ each, independently of one another, denote alkyl having 1 to 12 C atoms, where, in addition, one or two non-adjacent $CH_2$ groups may be replaced by —O—, —CH=CH—, —CO—, —OCO— or —COO— in such a way that O atoms are not linked directly to one another, preferably alkyl or alkoxy having 1 to 6 C atoms, $L^1$ and $L^2$ each, independently of one another, denote F, Cl, $OCF_3$, $CF_3$, $CH_3$, $CH_2F$, $CHF_2$.

Preferably, both $L^1$ and $L^2$ denote F or one of $L^1$ and $L^2$ denotes F and the other denotes Cl, The compounds of the formula Y are preferably selected from the group consisting of the following sub-formulae:

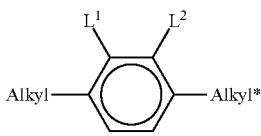

Y1

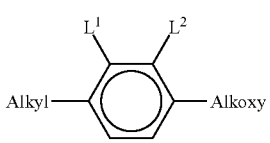

Y2

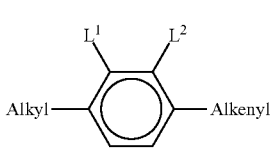

Y3

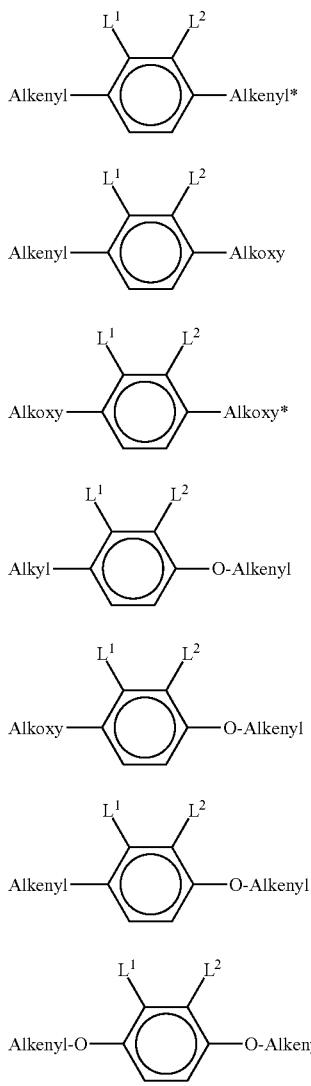

in which, Alkyl and Alkyl* each, independently of one another, denote a straight-chain alkyl radical having 1-6 C atoms, Alkoxy denotes a straight-chain alkoxy radical having 1-6 C atoms, Alkenyl and Alkenyl* each, independently of one another, denote a straight-chain alkenyl radical having 2-6 C atoms, and O denotes an oxygen atom or a single bond. Alkenyl and Alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Particularly preferred compounds of the formula Y are selected from the group consisting of the following sub-formulae:

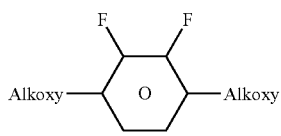

Y6A

Y6B wherein Alkoxy preferably denotes straight-chain alkoxy with 3, 4, or 5 C atoms.

t) LC medium which, apart from the polymerisable compounds as described above and below, does not contain a compound which contains a terminal vinyloxy group ($-O-CH=CH_2$).

u) LC medium wherein component B) or the LC host mixture comprises 1 to 8, preferably 1 to 5, compounds of the formulae CY1, CY2, PY1 and/or PY2. The proportion of these compounds in the LC host mixture as a whole is preferably 5 to 70%, particularly preferably 10 to 35%. The content of these individual compounds is preferably in each case 2 to 20%.

v) LC medium wherein component B) or the LC host mixture comprises 1 to 8, preferably 1 to 5, compounds of the formulae CY9, CY10, PY9 and/or PY10. The proportion of these compounds in the LC host mixture as a whole is preferably 5 to 60%, particularly preferably 10 to 35%. The content of these individual compounds is preferably in each case 2 to 20%.

w) LC medium wherein component B) or the LC host mixture comprises 1 to 10, preferably 1 to 8, compounds of the formula ZK, in particular compounds of the formulae ZK1, ZK2 and/or ZK6. The proportion of these compounds in the LC host mixture as a whole is preferably 3 to 25%, particularly preferably 5 to 45%. The content of these individual compounds is preferably in each case 2 to 20%.

x) LC medium in which the proportion of compounds of the formulae CY, PY and ZK in the LC host mixture as a whole is greater than 70%, preferably greater than 80%.

y) LC medium in which the LC host mixture contains one or more compounds containing an alkenyl group, preferably selected from formulae AN and AY, very preferably selected from formulae AN1, AN3 and AN6, most preferably from formulae AN1a, AN3a and AN6a. The concentration of these compounds in the LC host mixture is preferably from 2 to 70%, very preferably from 3 to 55%.

z1) LC medium wherein component B) or the LC host mixture contains one or more, preferably 1 to 5, compounds selected of formula PY1-PY8, very preferably of formula PY2. The proportion of these compounds in the LC host mixture as a whole is preferably 1 to 30%, particularly preferably 2 to 20%. The content of these individual compounds is preferably in each case 1 to 20%.

z2) LC medium wherein component B) or the LC host mixture contains one or more, preferably 1, 2 or 3, compounds selected from formulae T1, T2, T3, T5 and T21, very preferably from formula T2. The content of these compounds in the LC host mixture as a whole is preferably 1 to 20%.

z3) LC medium in which the LC host mixture contains one or more compounds selected from formulae CY and PY, one or more compounds selected from formulae AN and AY, and one or more compounds of formula ZK.

z4) LC medium in which the LC host mixture contains one or more, preferably 1, 2 or 3, compounds of formula AY14, preferably of formula AY14a, one or more, preferably 1, 2 or 3, compounds of formula BF1, preferably of formula BF1a, and one or more, preferably 1, 2 or 3, compounds of formula PY2. The proportion of the compounds of formula AY14 or AY14a in the LC host mixture is preferably from 0.05 to 2%, very preferably from 0.1 to 1%. The proportion of the compounds of formula BF1 or BF1a in the LC host mixture is preferably from 0.5 to 10%, very preferably from 1 to 5%. The proportion of the compounds of formula PY2 in the LC host mixture is preferably from 1 to 20%, very preferably from 10 to 20%.

In a second preferred embodiment the LC medium contains an LC host mixture based on compounds with positive dielectric anisotropy. Such LC media are especially suitable for use in PS-OCB-, PS-TN-, PS-Posi-VA-, PS-IPS- or PS-FFS-displays.

A

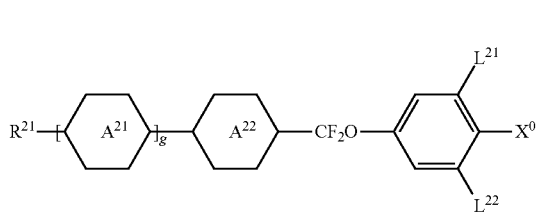

B

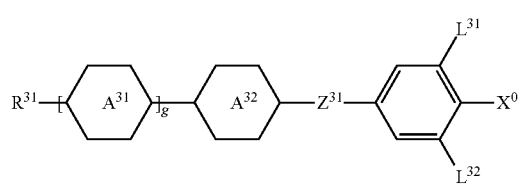

in which the individual radicals have, independently of each other and on each occurrence identically or differently, the following meanings:

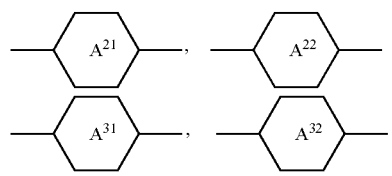

each, independently of one another, and on each occurrence, identically or differently

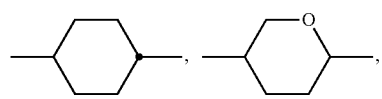

-continued

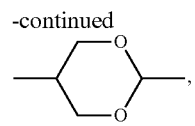

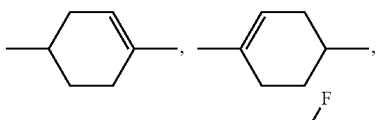

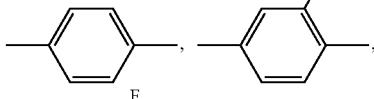

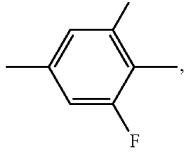

$R^{21}$, $R^{31}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, $X^0$ F, Cl, halogenated alkyl or alkoxy having 1 to 6 C atoms or halogenated alkenyl or alkenyloxy having 2 to 6 C atoms, $Z^{31}$ —CH$_2$CH$_2$—, —CF$_2$CF$_2$—, —COO—, trans-CH═CH—, trans-CF═CF—, —CH$_2$O— or a single bond, preferably —CH$_2$CH$_2$—, —COO—, trans-CH═CH— or a single bond, particularly preferably —COO—, trans-CH═CH— or a single bond, $L^{21}$, $L^{22}$, $L^{31}$, $L^{32}$ each, independently of one another, H or F, g 0, 1, 2 or 3.

In the compounds of formula A and B, $X^0$ is preferably F, Cl, CF$_3$, CHF$_2$, OCF$_3$, OCHF$_2$, OCFHCF$_3$, OCFHCHF$_2$, OCFHCHF$_2$, OCF$_2$CH$_3$, OCF$_2$CHF$_2$, OCF$_2$CHF$_2$, OCF$_2$CF$_2$CHF$_2$, OCF$_2$CF$_2$CHF$_2$, OCFHCF$_2$CF$_3$, OCFHCF$_2$CHF$_2$, OCF$_2$CF$_2$CF$_3$, OCF$_2$CF$_2$CClF$_2$, OCClFCF$_2$CF$_3$ or CH═CF$_2$, very preferably F or OCF$_3$, most preferably F.

In the compounds of formula A and B, $R^{21}$ and $R^{31}$ are preferably selected from straight-chain alkyl or alkoxy with 1, 2, 3, 4, 5 or 6 C atoms, and straight-chain alkenyl with 2, 3, 4, 5, 6 or 7 C atoms.

In the compounds of formula A and B, g is preferably 1 or 2.

In the compounds of formula B, $Z^{31}$ is preferably COO, trans-CH═CH or a single bond, very preferably COO or a single bond.

Preferably component B) of the LC medium comprises one or more compounds of formula A selected from the group consisting of the following formulae:

A1

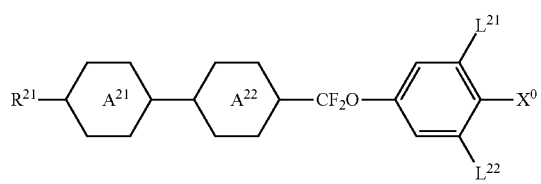

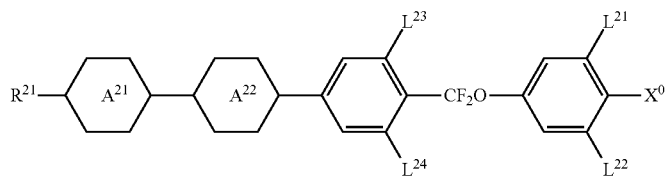

A2

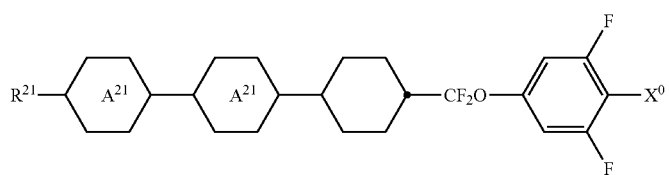

A3

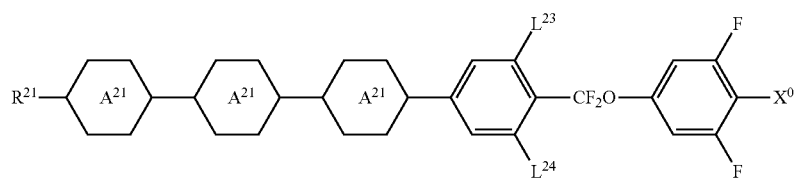

A4 in which $A^{21}$, $R^{21}$, $X^0$, $L^{21}$ and $L^{22}$ have the meanings given in formula A, $L^{23}$ and $L^{24}$ each, independently of one another, are H or F, and $X^0$ is preferably F. Particularly preferred are compounds of formulae A1 and A2.

Particularly preferred compounds of formula A1 are selected from the group consisting of the following subformulae:

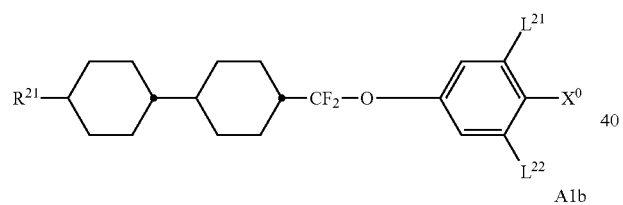

A1a

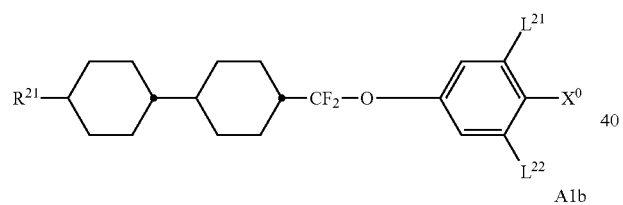

A1b

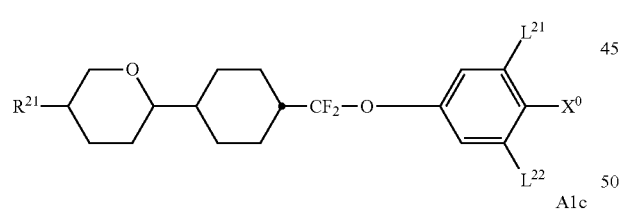

A1c

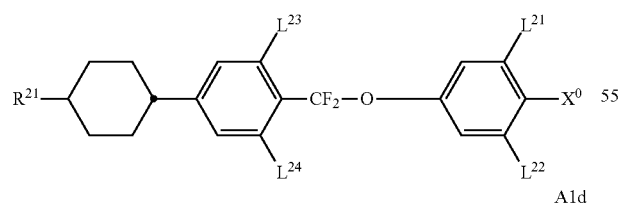

A1d

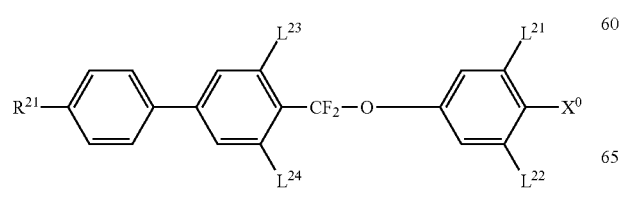

-continued

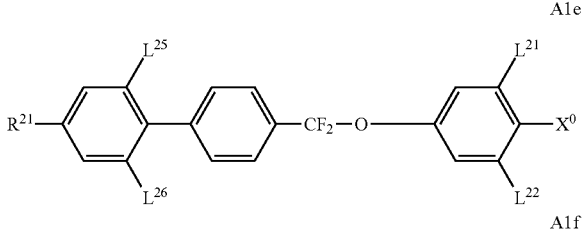

A1e

A1f in which $R^{21}$, $X^0$, $L^{21}$ and $L^{22}$ have the meaning given in formula A1, $L^{23}$, $L^{24}$, $L^{25}$ and $L^{26}$ are each, independently of one another, H or F, and $X^0$ is preferably F.

Very particularly preferred compounds of formula A1 are selected from the group consisting of the following subformulae:

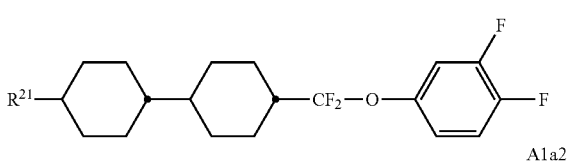

A1a1

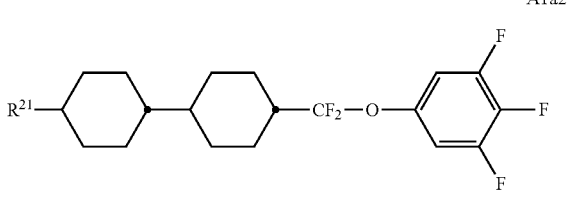

A1a2

A1b1
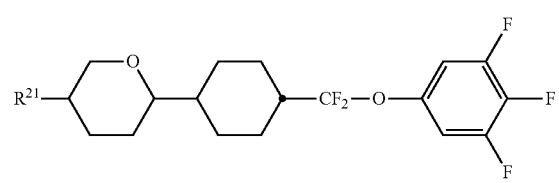

A1d1
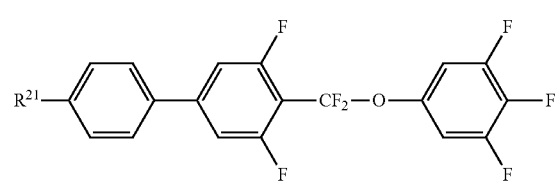

A1e1
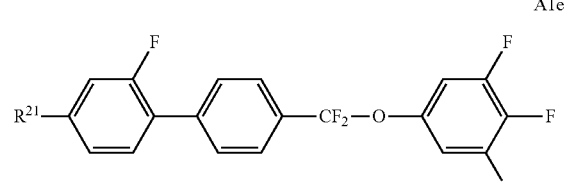

A1f1
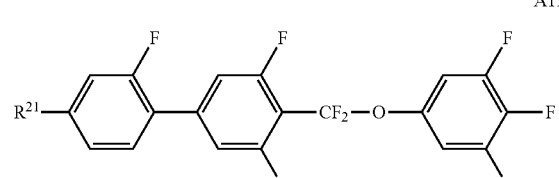

In which R²¹ is as defined in formula A1.

Particularly preferred compounds of formula A2 are selected from the group consisting of the following subformulae:

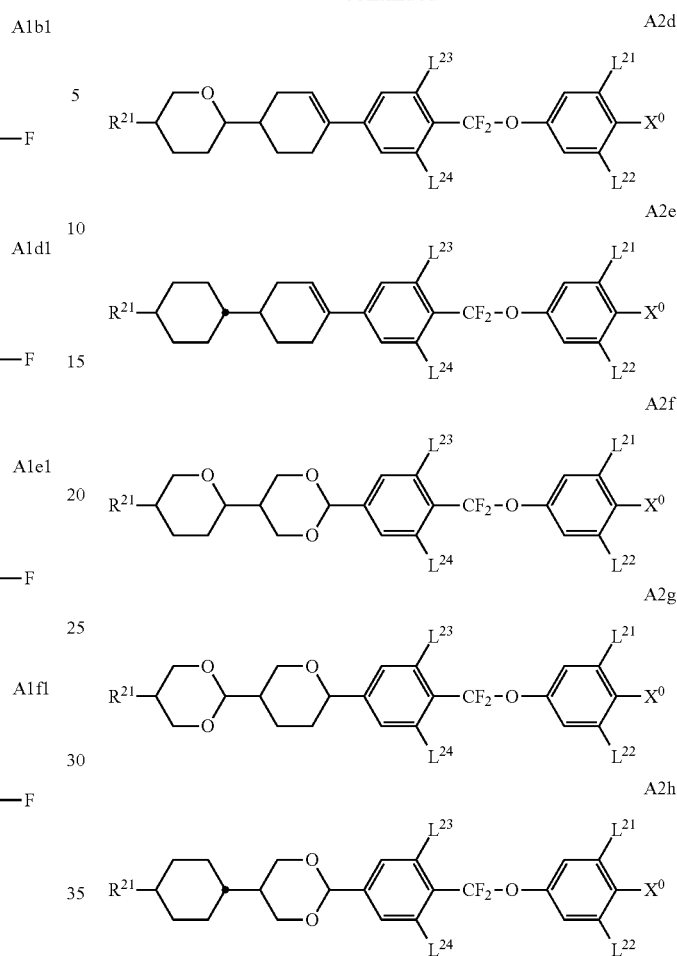

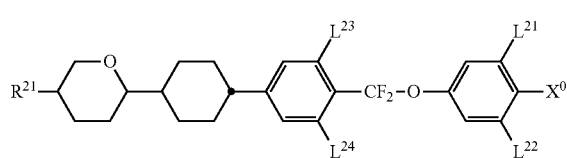

in which $R^{21}$, $X_0$, $L^{21}$ and $L^{22}$ have the meaning given in formula A2, $L^{23}$, $L^{24}$, $L^{25}$ and $L^{26}$ each, independently of one another, are H or F, and $X^0$ is preferably F.

Very particularly preferred compounds of formula A2 are selected from the group consisting of the following subformulae:

A2a1
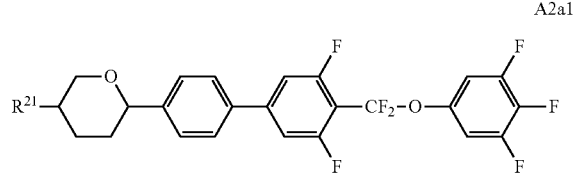

A2c1
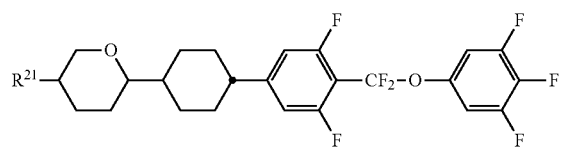

A2d1
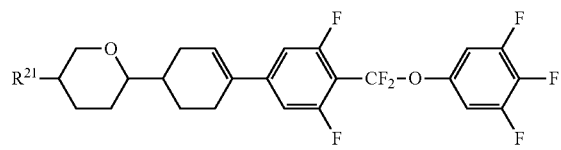

A2e1
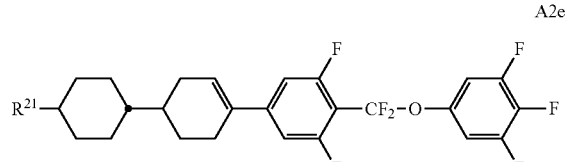

A2f1
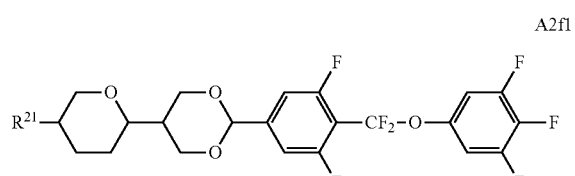

A2h1
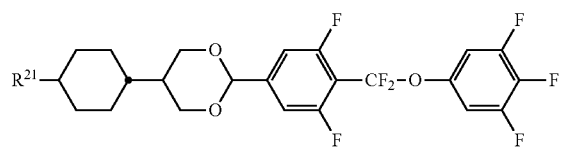

A2i1
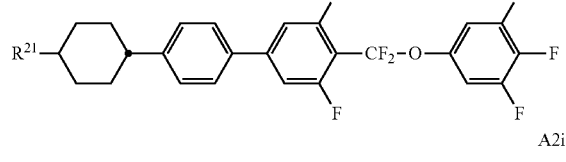

A2i2
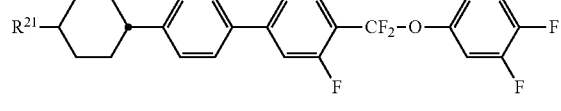

A2k1
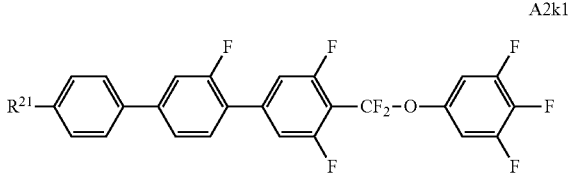

A2k2
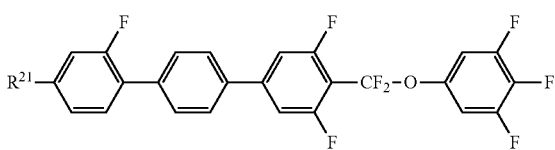

A2l2
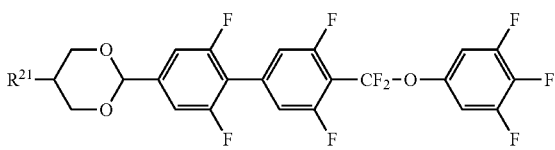

in which $R^{21}$ and $X^0$ are as defined in formula A2.

Particularly preferred compounds of formula A3 are selected from the group consisting of the following subformulae:

A3a
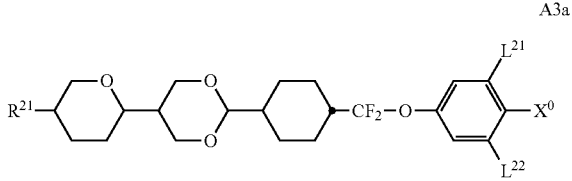

A3b
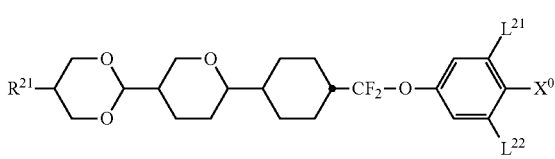

A3c
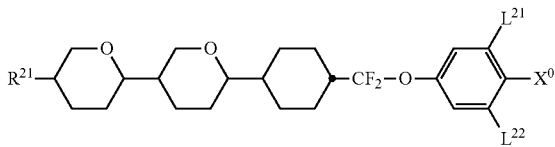

in which $R^{21}$, $X^0$, $L^{21}$ and $L^{22}$ have the meaning given in formula A3, and $X^0$ is preferably F.

Particularly preferred compounds of formula A4 are selected from the group consisting of the following subformulae:

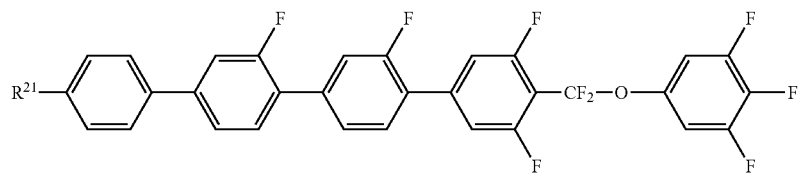

A4a in which R²¹ is as defined in formula A4.

Preferably component B) of the LC medium comprises one or more compounds of formula B selected from the group consisting of the following formulae:

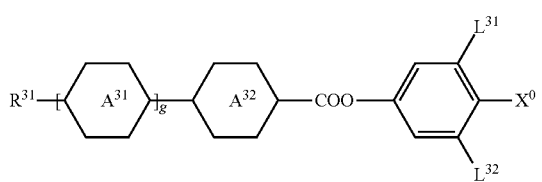

B1

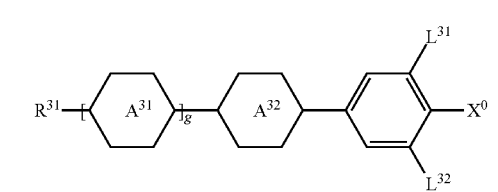

B2

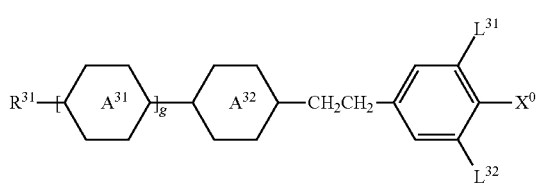

B3 in which g, A³¹, A³², R³¹, X⁰, L³¹ and L³² have the meanings given in formula B, and X⁰ is preferably F. Particularly preferred are compounds of formulae B1 and B2.

Particularly preferred compounds of formula B1 are selected from the group consisting of the following subformulae:

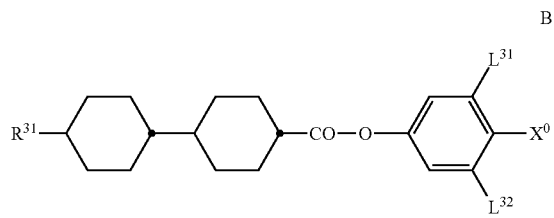

B1a

-continued

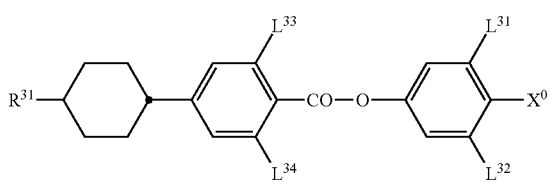

B1b in which R³¹, X⁰, L³¹ and L³² have the meaning given in formula B1, and X⁰ is preferably F.

Very particularly preferred compounds of formula B1a are selected from the group consisting of the following subformulae:

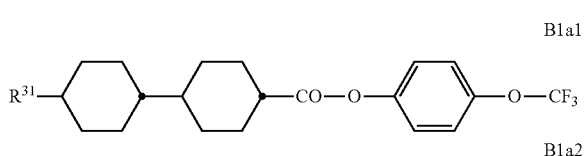

B1a1

B1a2

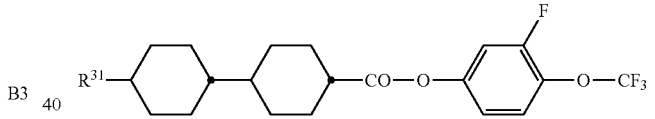

B1a3

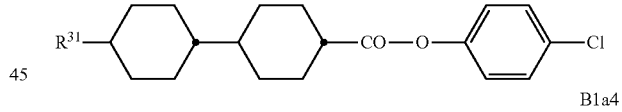

B1a4

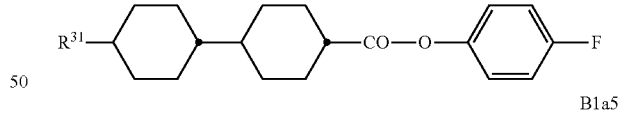

B1a5

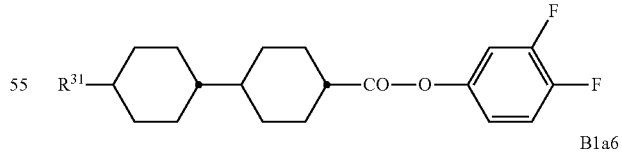

B1a6

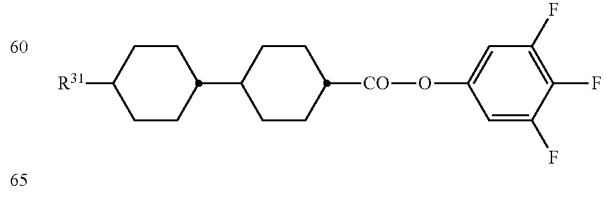

in which R³¹ is as defined in formula B1.

Very particularly preferred compounds of formula B1 b are selected from the group consisting of the following subformulae:

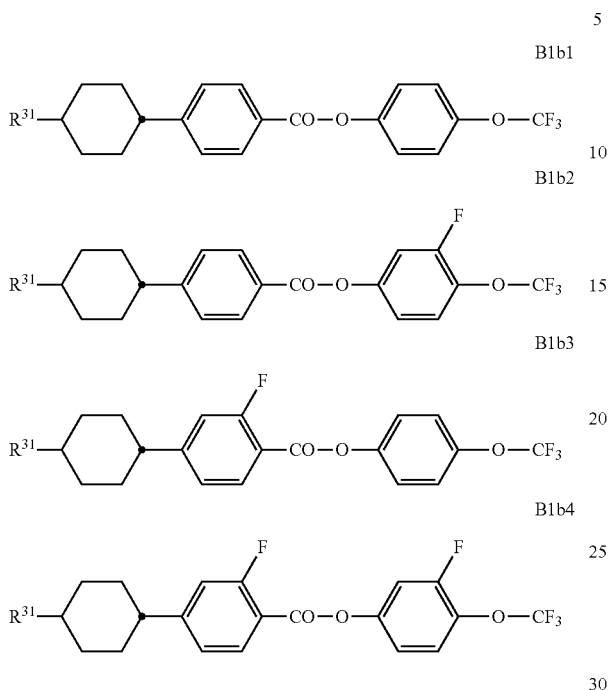

in which $R^{31}$ is as defined in formula B1.

Particularly preferred compounds of formula B2 are selected from the group consisting of the following subformulae:

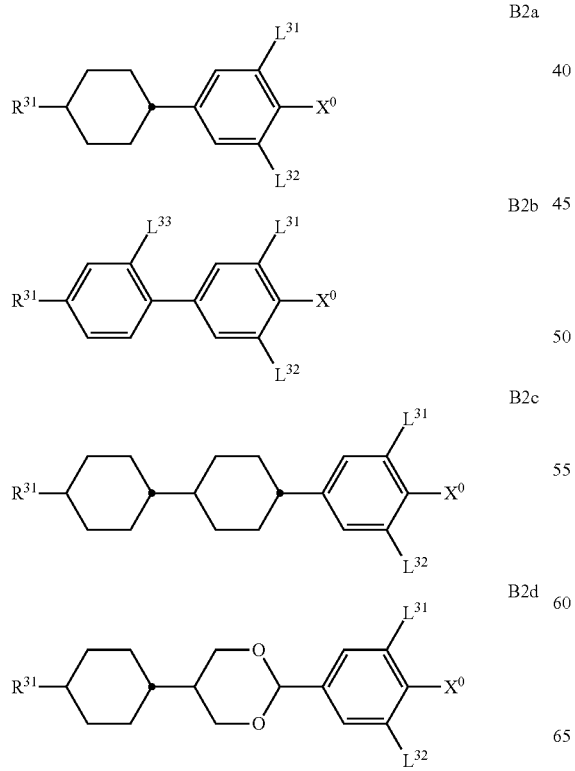

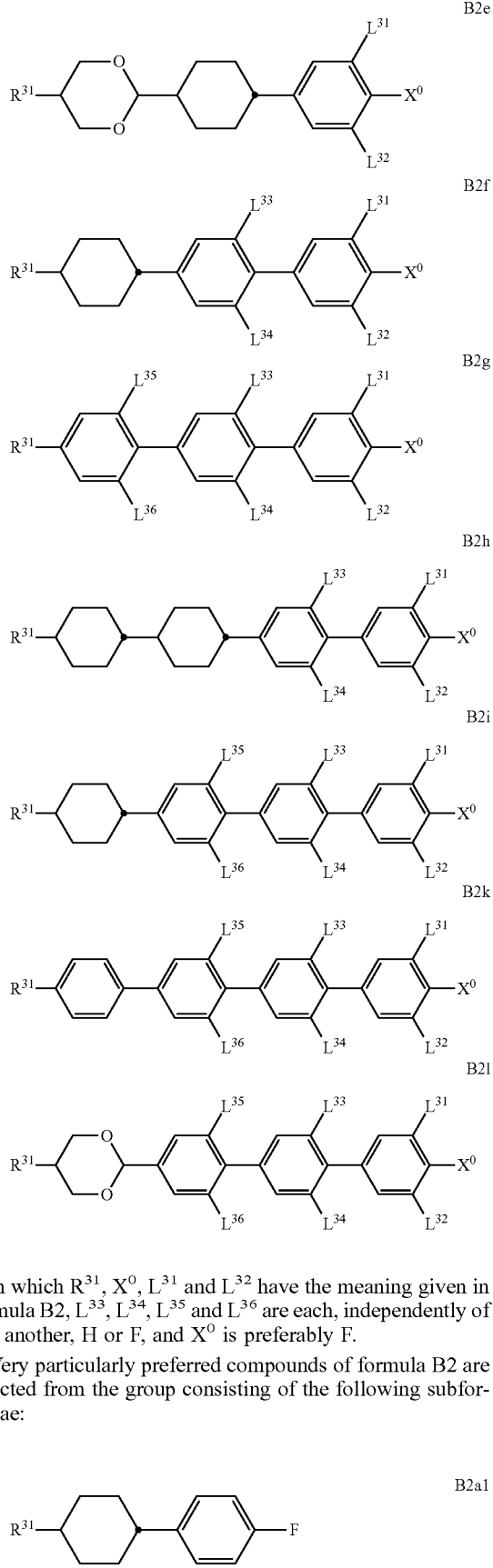

in which $R^{31}$, $X^0$, $L^{31}$ and $L^{32}$ have the meaning given in formula B2, $L^{33}$, $L^{34}$, $L^{35}$ and $L^{36}$ are each, independently of one another, H or F, and $X^0$ is preferably F.

Very particularly preferred compounds of formula B2 are selected from the group consisting of the following subformulae:

-continued

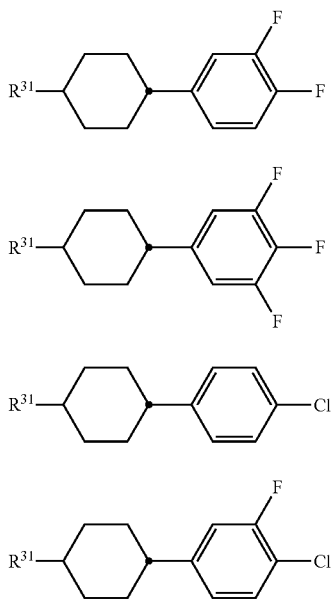

in which R³¹ is as defined in formula B2.

Very particularly preferred compounds of formula B2b are selected from the group consisting of the following subformulae

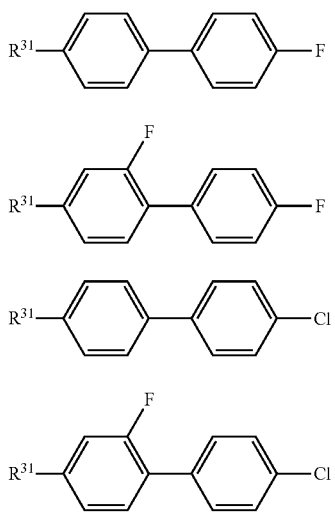

in which R³¹ is as defined in formula B2.

Very particularly preferred compounds of formula B2c are selected from the group consisting of the following subformulae:

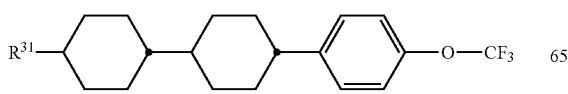

-continued

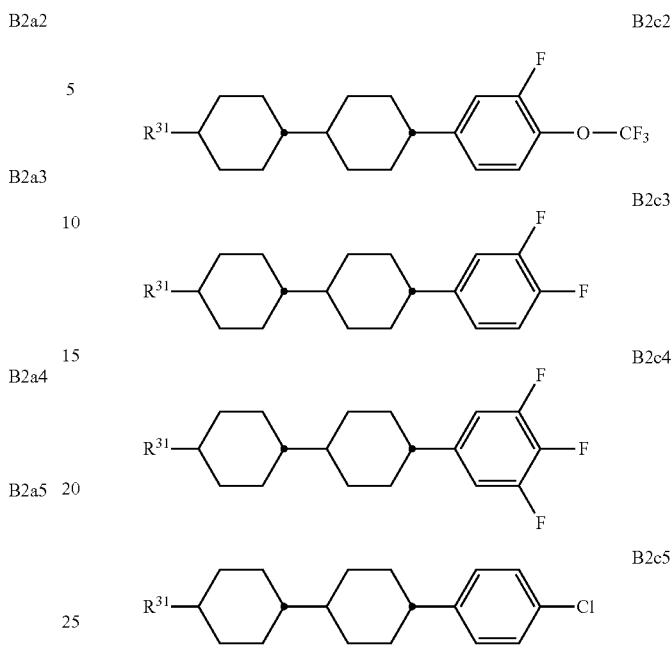

in which R³¹ is as defined in formula B2.

Very particularly preferred compounds of formula B2d and B2e are selected from the group consisting of the following subformulae:

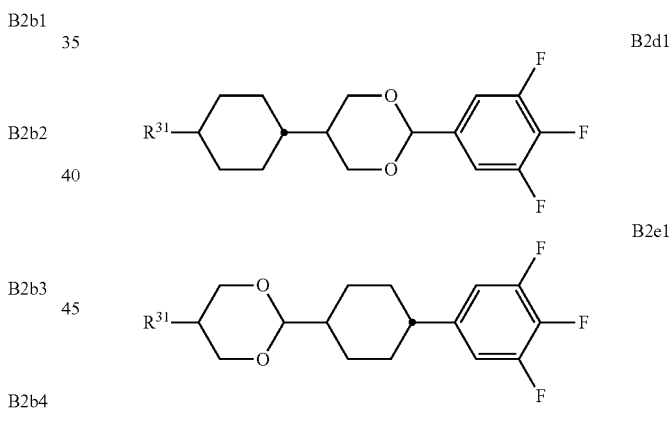

in which R³¹ is as defined in formula B2.

Very particularly preferred compounds of formula B2f are selected from the group consisting of the following subformulae:

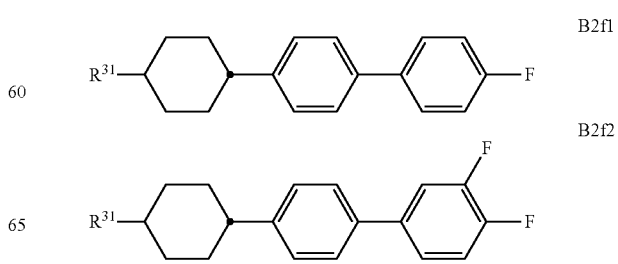

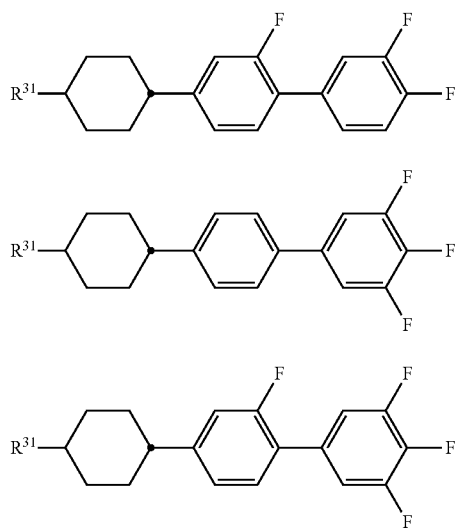

B2f3

B2f4

B2f5 in which R³¹ is as defined in formula B2.

Very particularly preferred compounds of formula B2g are selected from the group consisting of the following subformulae:

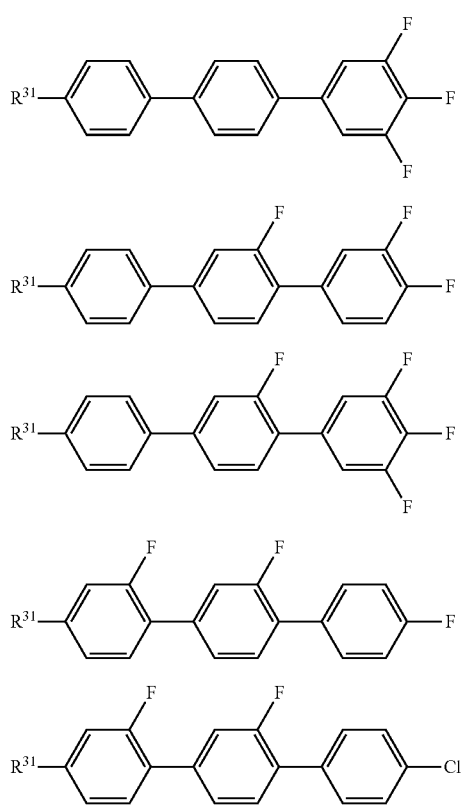

B2g1

B2g2

B2g3

B2g4

B2g5 in which R³¹ is as defined in formula B2.

Very particularly preferred compounds of formula B2h are selected from the group consisting of the following subformulae:

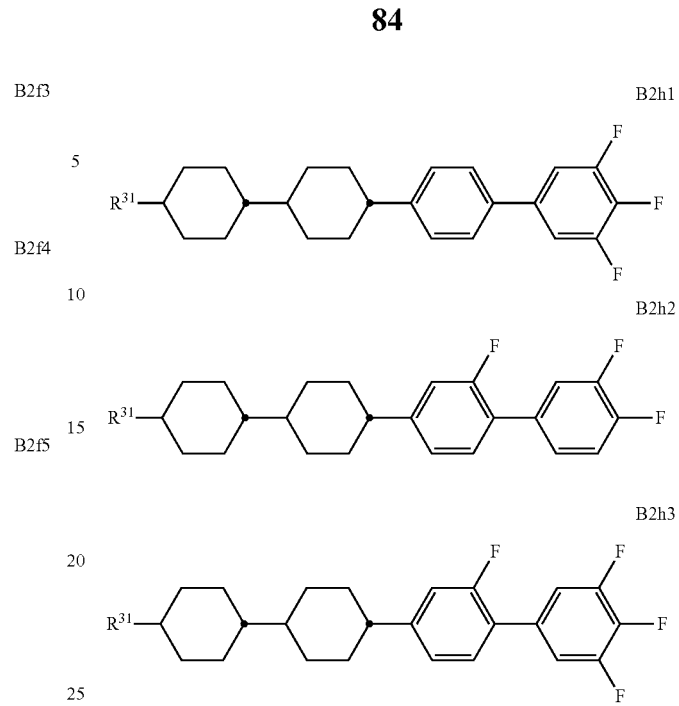

B2h1

B2h2

B2h3 in which R³¹ is as defined in formula B2.

Very particularly preferred compounds of formula B2i are selected from the group consisting of the following subformulae:

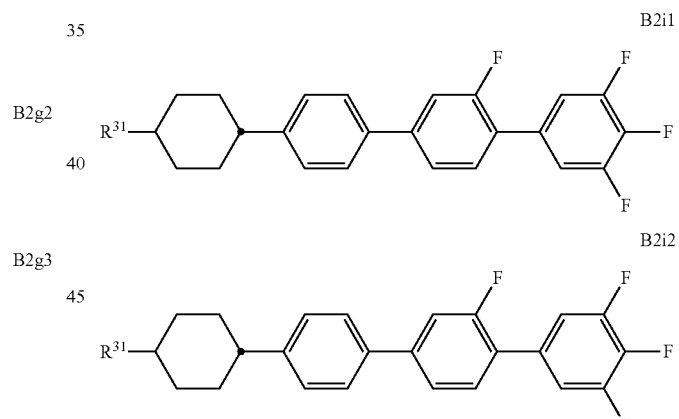

B2i1

B2i2 in which R³¹ is as defined in formula B2.

Very particularly preferred compounds of formula B2k are selected from the group consisting of the following subformulae:

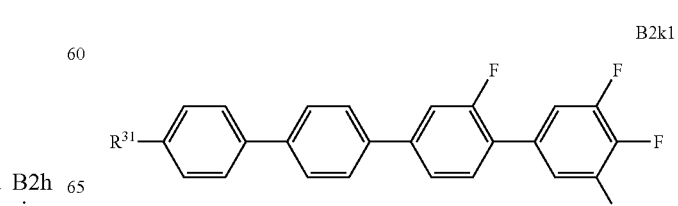

B2k1

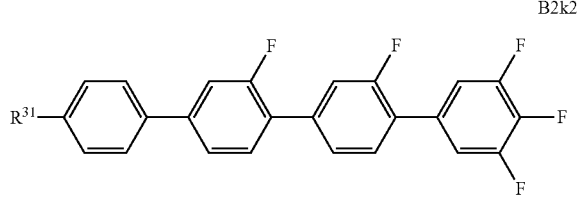
B2k2 in which R³¹ is as defined in formula B2.

Very particularly preferred compounds of formula B21 are selected from the group consisting of the following subformulae:

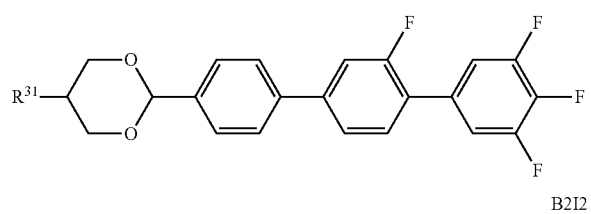
B2l1, B2l2 in which R³¹ is as defined in formula B2.

Alternatively to, or in addition to, the compounds of formula B1 and/or B2 component B) of the LC medium may also comprise one or more compounds of formula B3 as defined above.

Particularly preferred compounds of formula B3 are selected from the group consisting of the following subformulae:

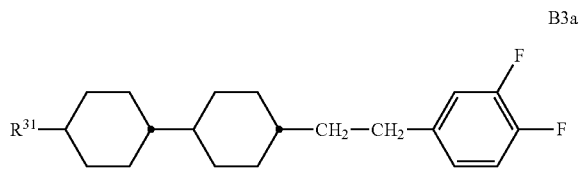
B3a

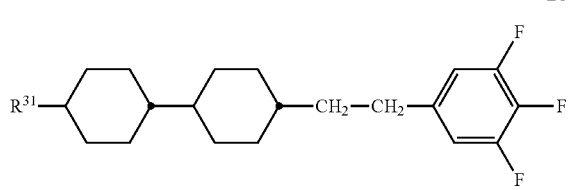
B3b in which R³¹ is as defined in formula B3.

Preferably component B) of the LC medium comprises, in addition to the compounds of formula A and/or B, one or more compounds of formula C

C in which the individual radicals have the following meanings:

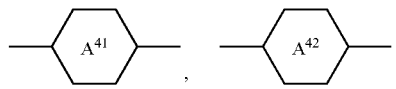

each, independently of one another, and on each occurrence, identically or differently

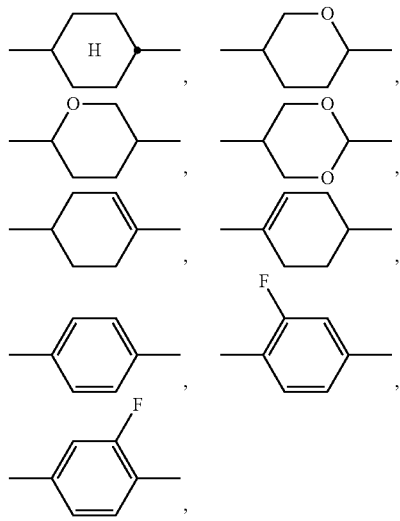

R⁴¹, R⁴² each, independently of one another, alkyl, alkoxy, oxaalkyl or alkoxyalkyl having 1 to 9 C atoms or alkenyl or alkenyloxy having 2 to 9 C atoms, all of which are optionally fluorinated, Z⁴¹, Z⁴² each, independently of one another, —CH₂CH₂—, —COO—, trans-CH═CH—, trans-CF═CF—, —CH₂O—, —CF₂O—, —C≡C— or a single bond, preferably a single bond, h 0, 1, 2 or 3.

In the compounds of formula C, R⁴¹ and R⁴² are preferably selected from straight-chain alkyl or alkoxy with 1, 2, 3, 4, 5 or 6 C atoms, and straight-chain alkenyl with 2, 3, 4, 5, 6 or 7 C atoms.

In the compounds of formula C, h is preferably 0, 1 or 2.

In the compounds of formula C, Z⁴¹ and Z⁴² are preferably selected from COO, trans-CH═CH and a single bond, very preferably from COO and a single bond.

Preferred compounds of formula C are selected from the group consisting of the following subformulae:

C1

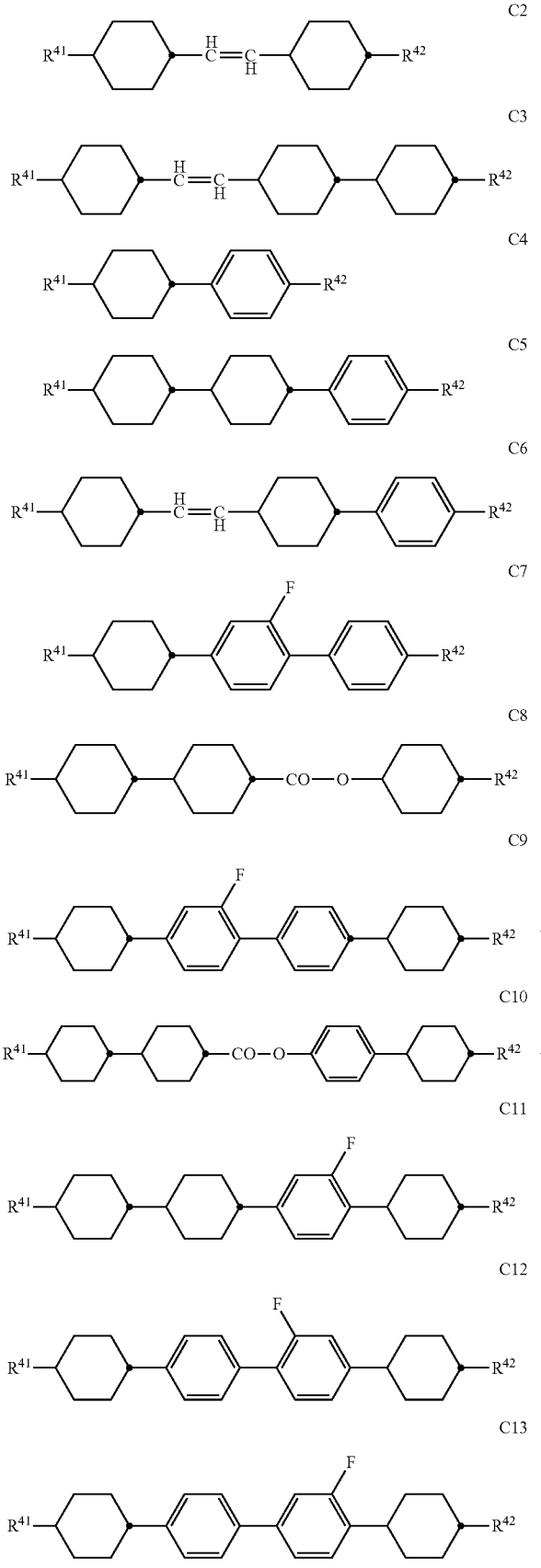

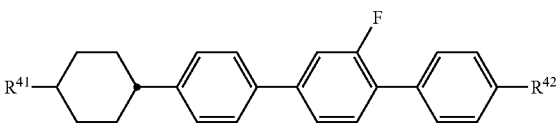

wherein $R^{41}$ and $R^{42}$ have the meanings given in formula C, and preferably denote each, independently of one another, alkyl, alkoxy, fluorinated alkyl or fluorinated alkoxy with 1 to 7 C atoms, or alkenyl, alkenyloxy, alkoxyalkyl or fluorinated alkenyl with 2 to 7 C atoms.

Further preferably component B) of the LC medium comprises, in addition to the compounds of formula A and/or B, one or more compounds of formula D

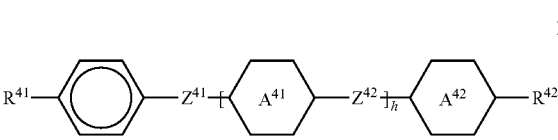

in which $A^{41}$, $A^{42}$, $Z^{41}$, $Z^{42}$, $R^{41}$, $R^{42}$ and h have the meanings given in formula C or one of the preferred meanings given above.

Preferred compounds of formula D are selected from the group consisting of the following subformulae:

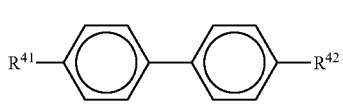

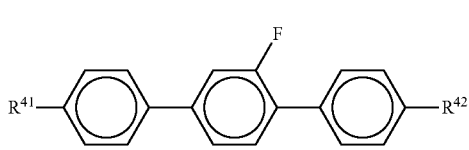

in which $R^{41}$ and $R^{42}$ have the meanings given in formula D and $R^{41}$ preferably denotes alkyl bedeutet, and in formula D1 $R^{42}$ preferably denotes alkenyl, particularly preferably —(CH$_2$)$_2$—CH=CH—CH$_3$, and in formula D2 $R^{42}$ preferably denotes alkyl, —(CH$_2$)$_2$—CH=CH$_2$ or —(CH$_2$)$_2$—CH=CH—CH$_3$.

Further preferably component B) of the LC medium comprises, in addition to the compounds of formula A and/or B, one or more compounds of formula E containing an alkenyl group

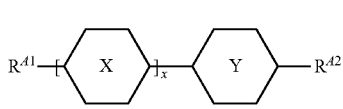

in which the individual radicals, on each occurrence identically or differently, each, independently of one another, have the following meaning:

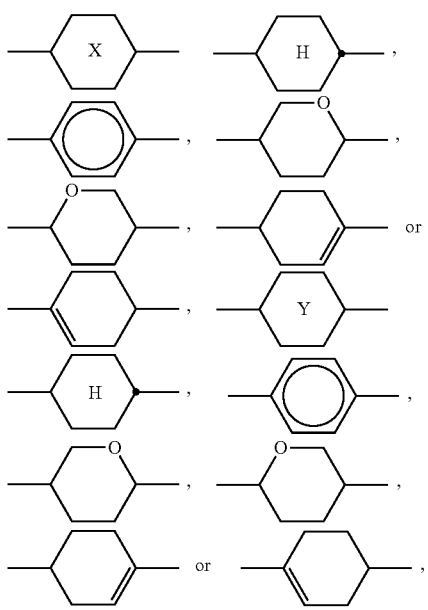

$R^{A1}$ alkenyl having 2 to 9 C atoms or, if at least one of the rings X, Y and Z denotes cyclohexenyl, also one of the meanings of $R^{A2}$, $R^{A2}$ alkyl having 1 to 12 C atoms, in which, in addition, one or two non-adjacent $CH_2$ groups may be replaced by —O—, —CH=CH—, —CO—, —OCO— or —COO— in such a way that O atoms are not linked directly to one another, x 1 or 2.

$R^{A2}$ is preferably straight-chain alkyl or alkoxy having 1 to 8 C atoms or straight-chain alkenyl having 2 to 7 C atoms.

Preferred compounds of formula E are selected from the following sub-formulae:

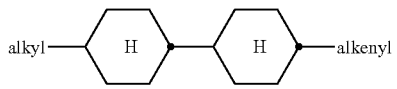
E1

E2

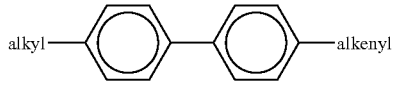
E3

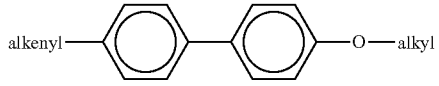
E4

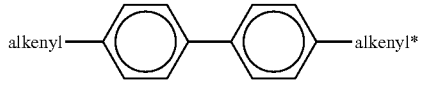
E5

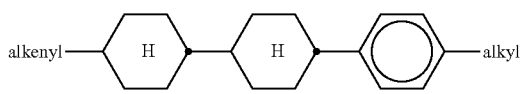
E6

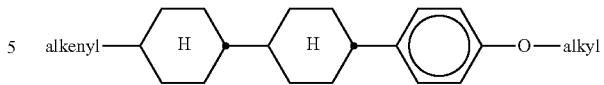
E7

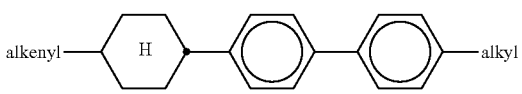
E8

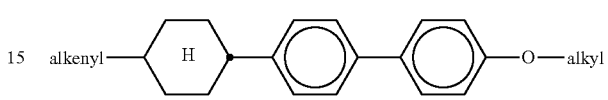
E9

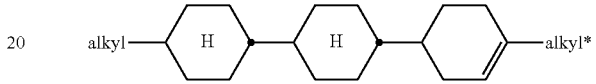
E10

E11

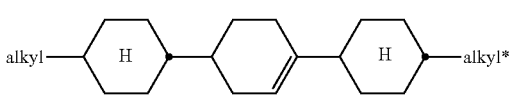
E12 in which alkyl and alkyl* each, independently of one another, denote a straight-chain alkyl radical having 1-6 C atoms, and alkenyl and alkenyl* each, independently of one another, denote a straight-chain alkenyl radical having 2-7 C atoms. Alkenyl and alkenyl* preferably denote $CH_2=CH-$, $CH_2=CHCH_2CH_2-$, $CH_3-CH=CH-$, $CH_3-CH_2-CH=CH-$, $CH_3-(CH_2)_2-CH=CH-$, $CH_3-(CH_2)_3-CH=CH-$ or $CH_3-CH=CH-(CH_2)_2-$.

Very preferred compounds of the formula E are selected from the following sub-formulae:

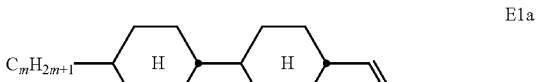
E1a

E3a

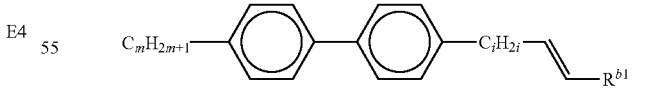
E6a

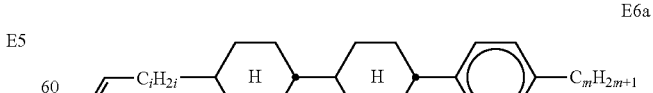

in which m denotes 1, 2, 3, 4, 5 or 6, i denotes 0, 1, 2 or 3, and $R^{b1}$ denotes H, $CH_3$ or $C_2H_5$.

Very particularly preferred compounds of the formula E are selected from the following sub-formulae:

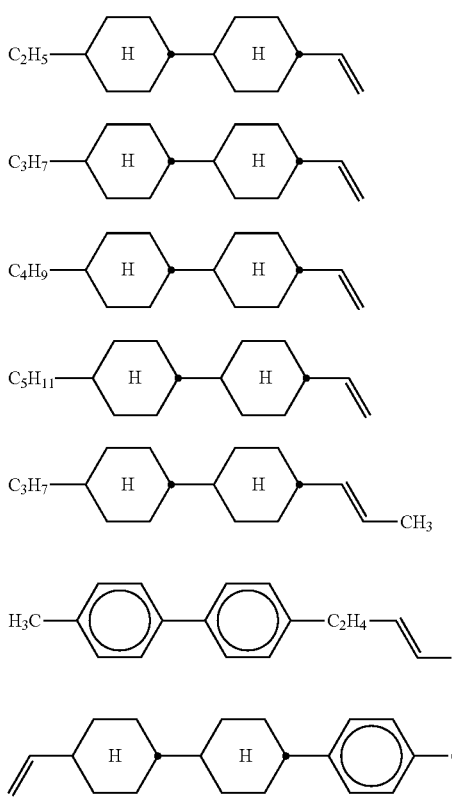

E1a1

E1a2

E1a3

E1a4

E1a5

E3a1

E6a1

Most preferred are compounds of formula E1a2, E1a5, E3a1 and E6a1.

Further preferably component B) of the LC medium comprises, in addition to the compounds of formula A and/or B, one or more compounds of formula F

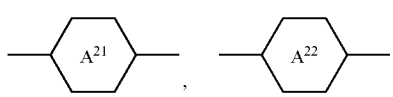

F in which the individual radicals have, independently of each other and on each occurrence identically or differently, the following meanings:

denote

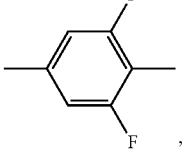

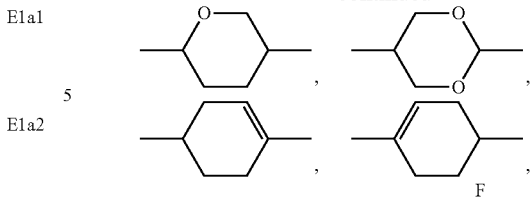

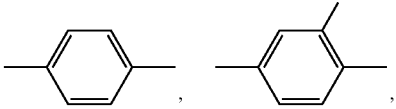

$R^{21}$, $R^{31}$ each, independently of one another, alkyl, alkoxy, oxaalkyl or alkoxyalkyl having 1 to 9 C atoms or alkenyl or alkenyloxy having 2 to 9 C atoms, all of which are optionally fluorinated, $X^0$ F, Cl, halogenated alkyl or alkoxy having 1 to 6 C atoms or halogenated alkenyl or alkenyloxy having 2 to 6 C atoms, $Z^{21}$ —$CH_2CH_2$—, —$CF_2CF_2$—, —COO—, trans-CH═CH—, trans-CF═CF—, —$CH_2O$— or a single bond, preferably —$CH_2CH_2$—, —COO—, trans-CH═CH— or a single bond, particularly preferably —COO—, trans-CH═CH— or a single bond, $L^{21}$, $L^{22}$, $L^{23}$, $L^{24}$ each, independently of one another, H or F, g 0, 1, 2 or 3.

Particularly preferred compounds of formula F are selected from the group consisting of the following formulae:

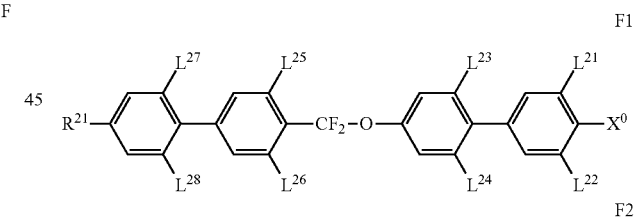

F1

F2

F3 in which $R^{21}$, $X^0$, $L^{21}$ and $L^{22}$ have the meaning given in formula F, $L^{25}$ and $L^{26}$ are each, independently of one another, H or F, and $X^0$ is preferably F.

Very particularly preferred compounds of formula $F_1$-$F_3$ are selected from the group consisting of the following subformulae:

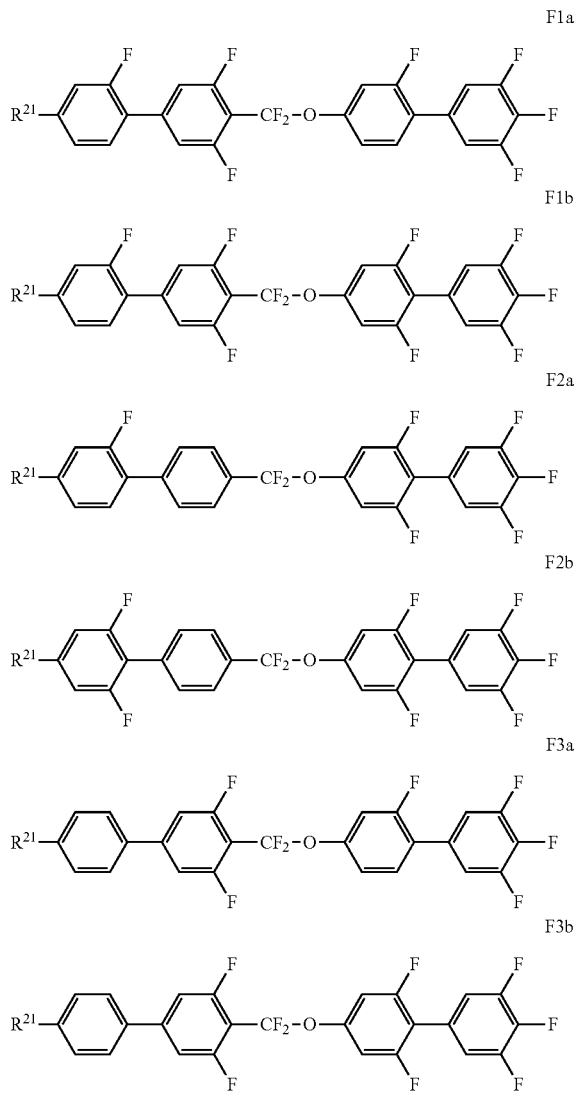

In which $R^{21}$ is as defined in formula $F_1$.

The concentration of the compounds of formula A and B in the LC host mixture is preferably from 2 to 60%, very preferably from 3 to 45%, most preferably from 4 to 35%.

The concentration of the compounds of formula C and D in the LC host mixture is preferably from 2 to 70%, very preferably from 5 to 65%, most preferably from 10 to 60%.

The concentration of the compounds of formula E in the LC host mixture is preferably from 5 to 50%, very preferably from 5 to 35%.

The concentration of the compounds of formula F in the LC host mixture is preferably from 2 to 30%, very preferably from 5 to 20%.

Further preferred embodiments of this second preferred embodiment of the present invention are listed below, including any combination thereof.

2a) The LC host mixture comprises one or more compounds of formula A and/or B with high positive dielectric anisotropy, preferably with $\Delta\varepsilon > 15$.

2b) The LC host mixture comprises one or more compounds selected from the group consisting of formulae A1a2, A1b1, A1d1, A1f1, A2a1, A2h1, A2l2, A2k1, B2h3, B2l1, F1a. The proportion of these compounds in the LC host mixture is preferably from 4 to 40%, very preferably from 5 to 35%.

2c) The LC host mixture comprises one or more compounds selected from the group consisting of formulae B2c1, B2c4, B2f4, C14. The proportion of these compounds in the LC host mixture is preferably from 4 to 40%, very preferably from 5 to 35%.

2d) The LC host mixture comprises one or more compounds selected from the group consisting of formulae C3, C4, C5, C9 and D2. The proportion of these compounds in the LC host mixture is preferably from 8 to 70%, very preferably from 10 to 60%.

2e) The LC host mixture comprises one or more compounds selected from the group consisting of formulae G1, G2 and G5, preferably G1a, G2a and G5a. The proportion of these compounds in the LC host mixture is preferably from 4 to 40%, very preferably from 5 to 35%.

2f) The LC host mixture comprises one or more compounds selected from the group consisting of formulae E1, E3 and E6, preferably E1a, E3a and E6a, very preferably E1a2, E1a5, E3a1 and E6a1. The proportion of these compounds in the LC host mixture is preferably from 5 to 60%, very preferably from 10 to 50%.

The combination of compounds of the preferred embodiments mentioned above with the polymerised compounds described above causes low threshold voltages, low rotational viscosities and very good low-temperature stabilities in the LC media according to the invention at the same time as constantly high clearing points and high HR values, and allows the rapid establishment of a particularly low pretilt angle in PSA displays. In particular, the LC media exhibit significantly shortened response times, in particular also the grey-shade response times, in PSA displays compared with the media from prior art.

In the LC medium according to the present invention, the use of an LC host mixture or component B) together with the use of a polymerisable component A) as described above and below leads to advantageous properties in PSA displays, including but not limited to the following:

reduced ODF mura,
reduced image sticking,
good UV absorption also at longer wavelengths,
quick and complete polymerisation of the RMs,
quick generation of a low pretilt angle, especially already at low UV energy and/or at longer UV wavelengths,
high pretilt angle stability after UV exposure,
high reliability and high VHR value after UV exposure and/or heat treatment,
high birefringence,
reduced viscosity
faster response times.

The LC media and LC host mixtures of the present invention preferably have a nematic phase range of at least 80 K, particularly preferably at least 100 K, and a rotational viscosity $\leq 250$ mPa·s, preferably $\leq 200$ mPa·s, at 20° C.

In the VA-type displays according to the invention, the molecules in the layer of the LC medium in the switched-off state are aligned perpendicular to the electrode surfaces (homeotropically) or have a tilted homeotropic alignment. On application of an electrical voltage to the electrodes, a realignment of the LC molecules takes place with the longitudinal molecular axes parallel to the electrode surfaces.

LC media according to the invention based on compounds with negative dielectric anisotropy according to the first preferred embodiment, in particular for use in displays of the PS-VA and PS-UB-FFS type, have a negative dielectric anisotropy Δε, preferably from −0.5 to −10, in particular from −2.5 to −7.5, at 20° C. and 1 kHz.

The birefringence Δn in LC media according to the invention for use in displays of the PS-VA and PS-UB-FFS type is preferably below 0.16, particularly preferably from 0.06 to 0.14, very particularly preferably from 0.07 to 0.12.

In the OCB-type displays according to the invention, the molecules in the layer of the LC medium have a "bend" alignment. On application of an electrical voltage, a realignment of the LC molecules takes place with the longitudinal molecular axes perpendicular to the electrode surfaces.

LC media according to the invention for use in displays of the PS-OCB, PS-TN, PS-IPS, PS-posi-VA and PS-FFS type are preferably those based on compounds with positive dielectric anisotropy according to the second preferred embodiment, and preferably have a positive dielectric anisotropy Δε from +4 to +17 at 20° C. and 1 kHz.

The birefringence Δn in LC media according to the invention for use in displays of the PS-OCB type is preferably from 0.14 to 0.22, particularly preferably from 0.16 to 0.22.

The birefringence Δn in LC media according to the invention for use in displays of the PS-TN-, PS-posi-VA-, PS-IPS-oder PS-FFS-type is preferably from 0.07 to 0.15, particularly preferably from 0.08 to 0.13.

LC media according to the invention, based on compounds with positive dielectric anisotropy according to the second preferred embodiment, for use in displays of the PS-TN-, PS-posi-VA-, PS-IPS-oder PS-FFS-type, preferably have a positive dielectric anisotropy Δε from +2 to +30, particularly preferably from +3 to +20, at 20° C. and 1 kHz.

Preferably the LC medium according to the present invention does essentially consist of a polymerisable component A) and an LC component B) (or LC host mixture) as described above and below. However, the LC medium may additionally comprise one or more further components or additives, preferably selected from the list including but not limited to co-monomers, chiral dopants, polymerisation initiators, inhibitors, stabilizers, surfactants, wetting agents, lubricating agents, dispersing agents, hydrophobing agents, adhesive agents, flow improvers, defoaming agents, deaerators, diluents, reactive diluents, auxiliaries, colourants, dyes, pigments and nanoparticles.

These additives may be polymerisable or non-polymerisable. Polymerisable additives are accordingly ascribed to the polymerisable component or component A). Non-polymerisable additives are accordingly ascribed to the non-polymerisable component or component B).

In a preferred embodiment the LC media contain one or more chiral dopants, preferably in a concentration from 0.01 to 1%, very preferably from 0.05 to 0.5%. The chiral dopants are preferably selected from the group consisting of compounds from Table B below, very preferably from the group consisting of R- or S-1011, R- or S-2011, R- or S-3011, R- or S-4011, and R- or S-5011.

In another preferred embodiment the LC media contain a racemate of one or more chiral dopants, which are preferably selected from the chiral dopants mentioned in the previous paragraph.

Furthermore, it is possible to add to the LC media, for example, 0 to 15% by weight of pleochroic dyes, furthermore nanoparticles, conductive salts, preferably ethyldimethyldodecylammonium 4-hexoxybenzoate, tetrabutyl-ammonium tetraphenylborate or complex salts of crown ethers (cf., for example, Haller et al., Mol. Cryst. Liq. Cryst. 24, 249-258 (1973)), for improving the conductivity, or substances for modifying the dielectric anisotropy, the viscosity and/or the alignment of the nematic phases. Substances of this type are described, for example, in DE-A 22 09 127, 22 40 864, 23 21 632, 23 38 281, 24 50 088, 26 37 430 and 28 53 728.

The individual components of the preferred embodiments a)-z) of the LC media according to the invention are either known or methods for the preparation thereof can readily be derived from the prior art by the person skilled in the relevant art, since they are based on standard methods described in the literature. Corresponding compounds of the formula CY are described, for example, in EP-A-0 364 538. Corresponding compounds of the formula ZK are described, for example, in DE-A-26 36 684 and DE-A-33 21 373.

The LC media which can be used in accordance with the invention are prepared in a manner conventional per se, for example by mixing one or more of the above-mentioned compounds with one or more polymerisable compounds as defined above, and optionally with further liquid-crystalline compounds and/or additives. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing. The invention furthermore relates to the process for the preparation of the LC media according to the invention.

It goes without saying to the person skilled in the art that the LC media according to the invention may also comprise compounds in which, for example, H, N, O, Cl, F have been replaced by the corresponding isotopes like deuterium etc.

The following examples explain the present invention without restricting it. However, they show the person skilled in the art preferred mixture concepts with compounds preferably to be employed and the respective concentrations thereof and combinations thereof with one another. In addition, the examples illustrate which properties and property combinations are accessible.

The following abbreviations are used:
(n, m, z: in each case, independently of one another, 1, 2, 3, 4, 5 or 6)

TABLE A

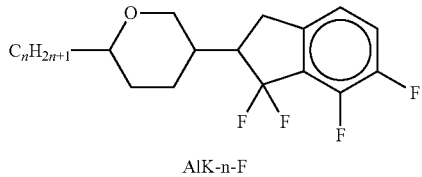

AlK-n-F

TABLE A-continued
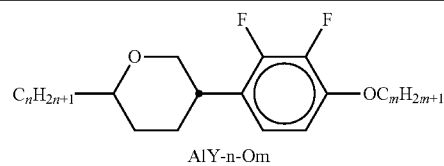
AlY-n-Om
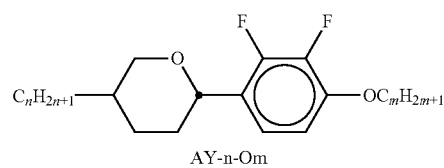
AY-n-Om
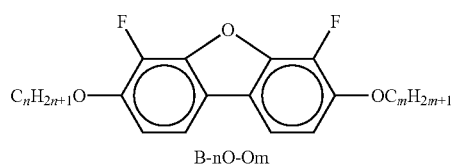
B-nO-Om
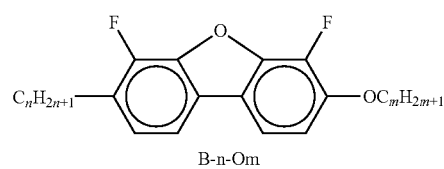
B-n-Om
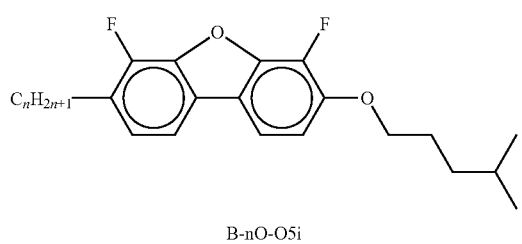
B-nO-O5i
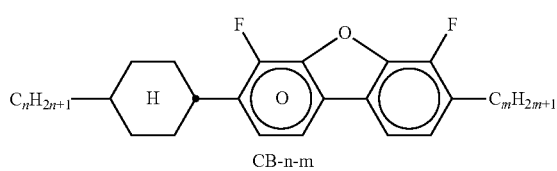
CB-n-m
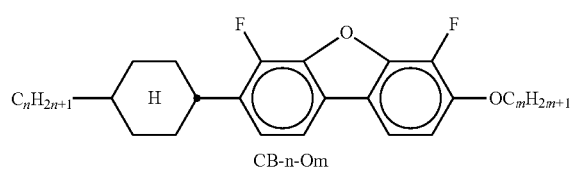
CB-n-Om
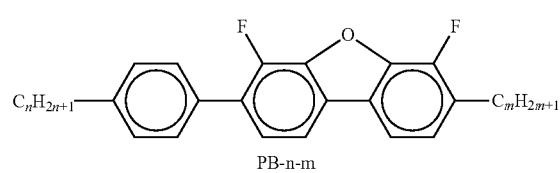
PB-n-m
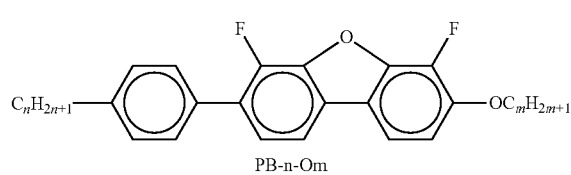
PB-n-Om TABLE A-continued
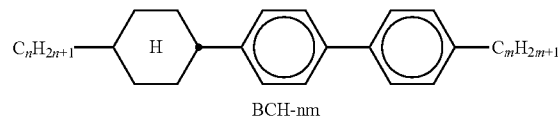
BCH-nm
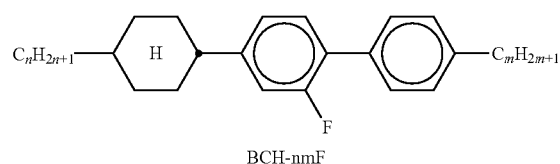
BCH-nmF
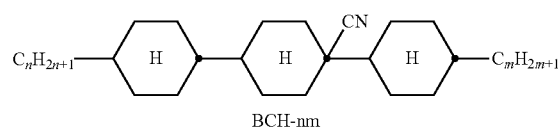
BCH-nm
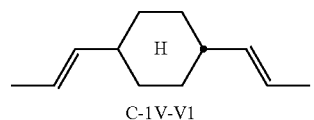
C-1V-V1
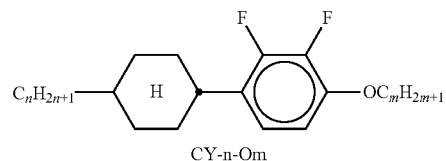
CY-n-Om
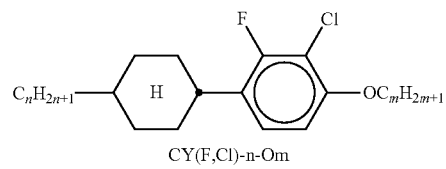
CY(F,Cl)-n-Om
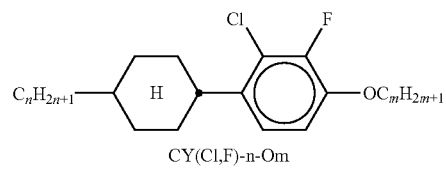
CY(Cl,F)-n-Om
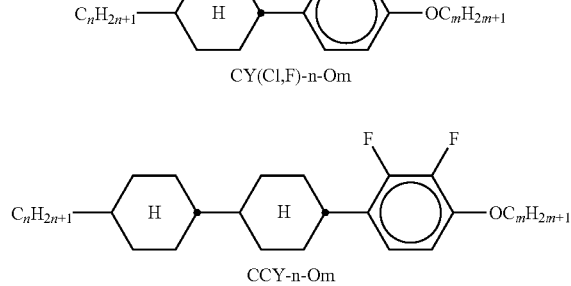
CCY-n-Om
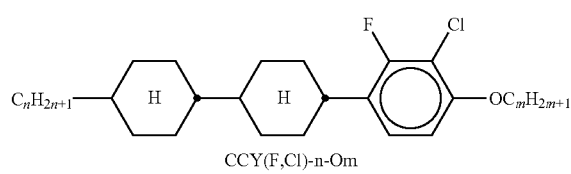
CCY(F,Cl)-n-Om TABLE A-continued
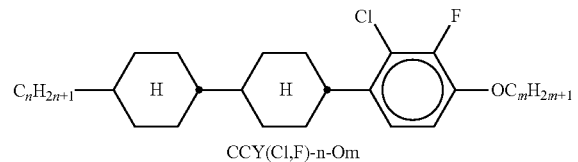
CCY(Cl,F)-n-Om
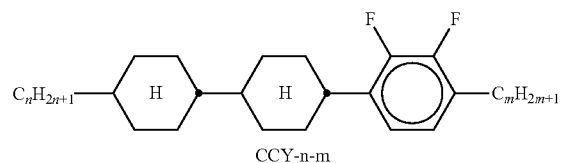
CCY-n-m
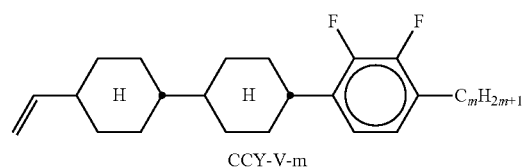
CCY-V-m
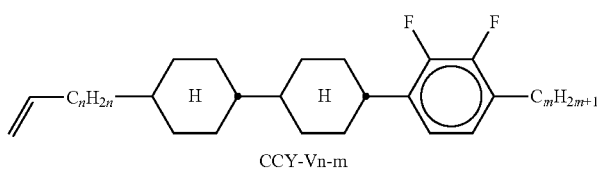
CCY-Vn-m
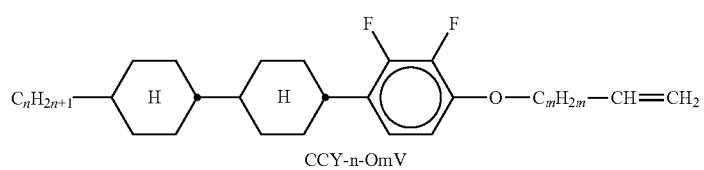
CCY-n-OmV
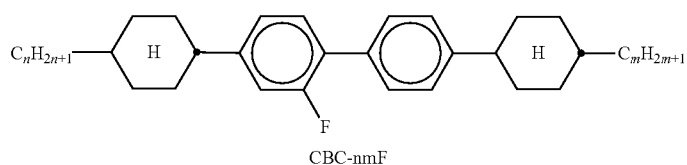
CBC-nmF
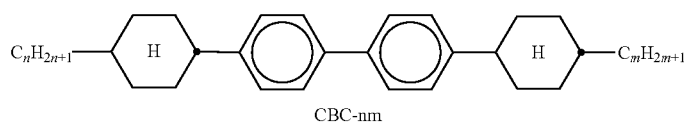
CBC-nm
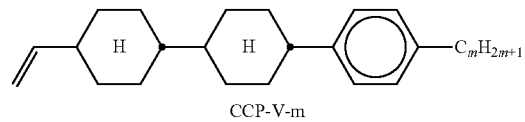
CCP-V-m
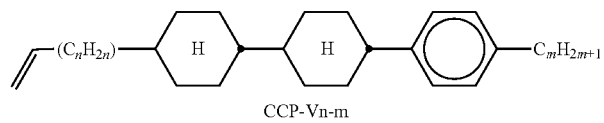
CCP-Vn-m
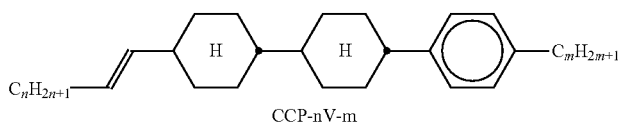
CCP-nV-m TABLE A-continued
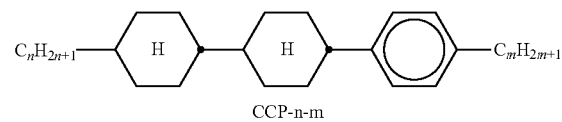
CCP-n-m
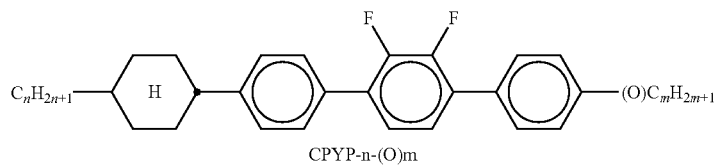
CPYP-n-(O)m
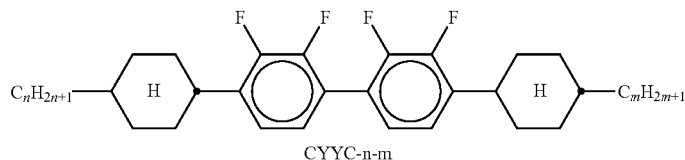
CYYC-n-m
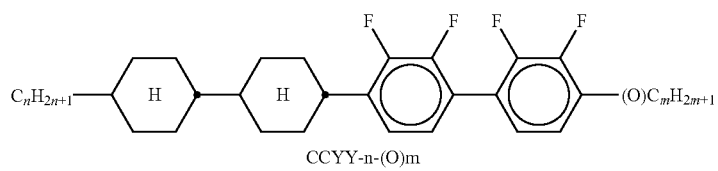
CCYY-n-(O)m
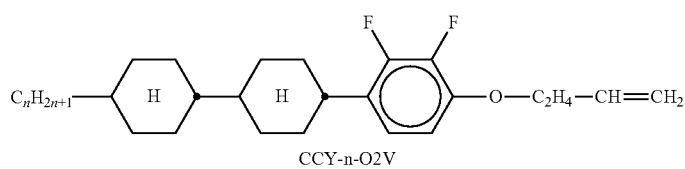
CCY-n-O2V
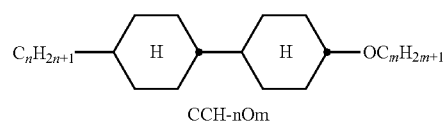
CCH-nOm
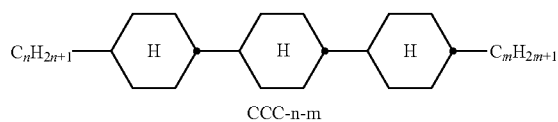
CCC-n-m
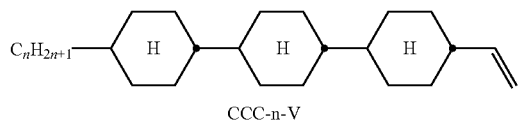
CCC-n-V
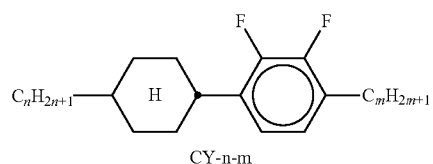
CY-n-m
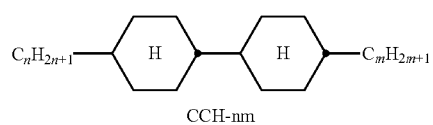
CCH-nm TABLE A-continued
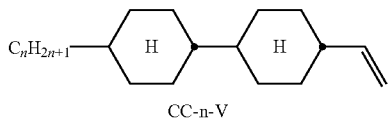
CC-n-V
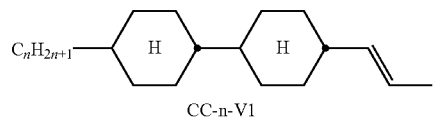
CC-n-V1
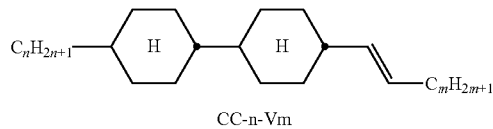
CC-n-Vm
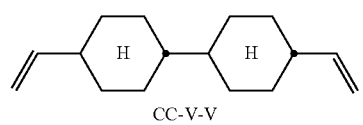
CC-V-V
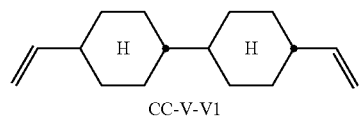
CC-V-V1
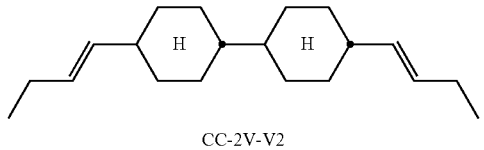
CC-2V-V2
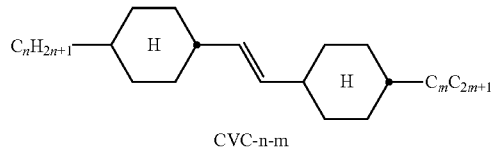
CVC-n-m
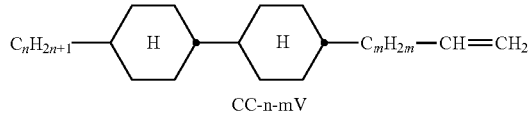
CC-n-mV
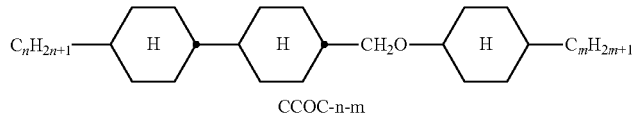
CCOC-n-m
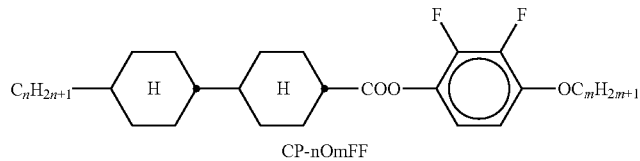
CP-nOmFF
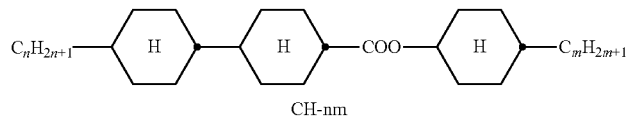
CH-nm TABLE A-continued
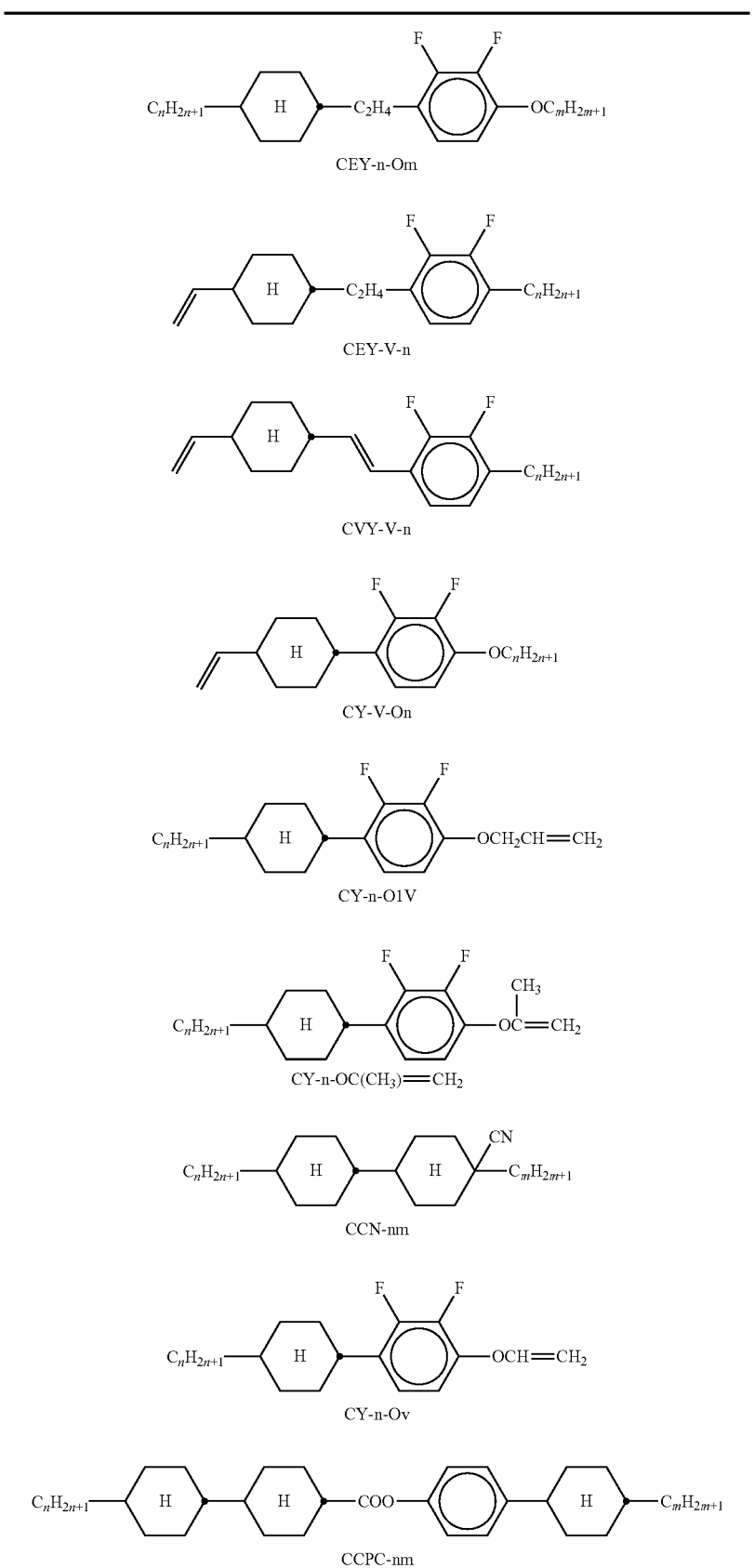

TABLE A-continued
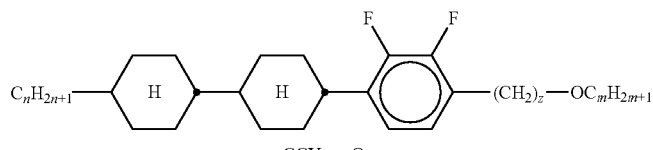
CCY-n-zOm
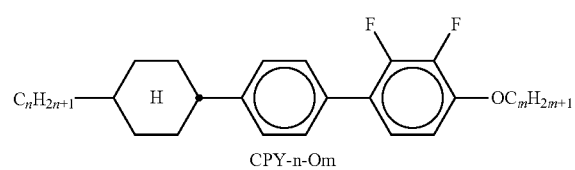
CPY-n-Om
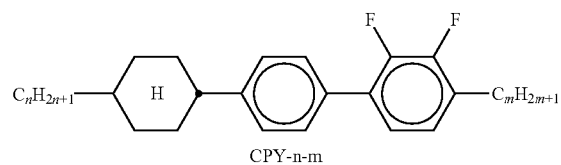
CPY-n-m
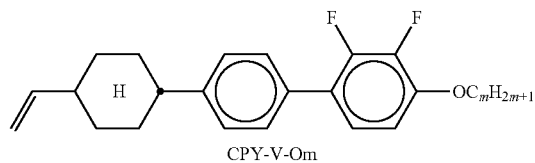
CPY-V-Om
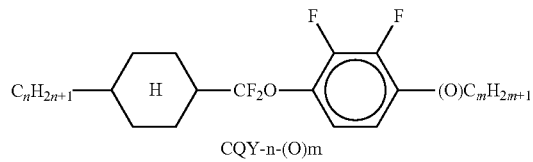
CQY-n-(O)m
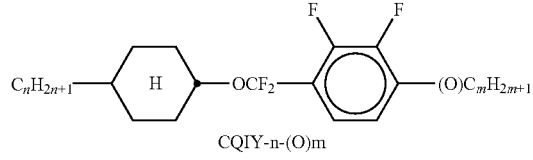
CQIY-n-(O)m
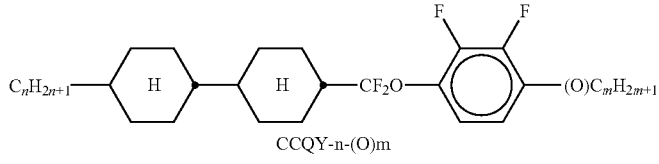
CCQY-n-(O)m
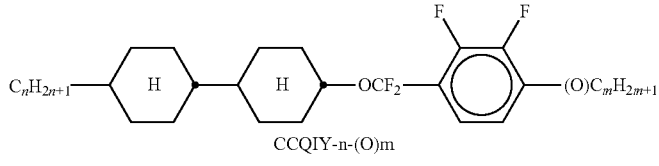
CCQIY-n-(O)m
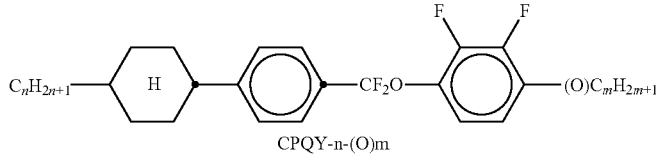
CPQY-n-(O)m TABLE A-continued
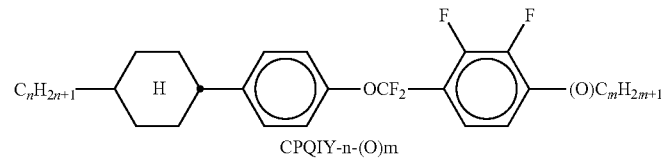
CPQIY-n-(O)m
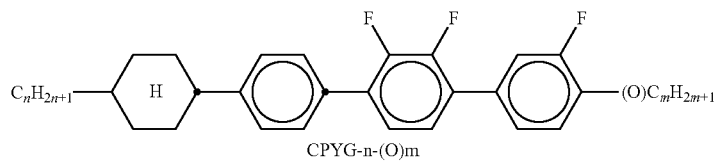
CPYG-n-(O)m
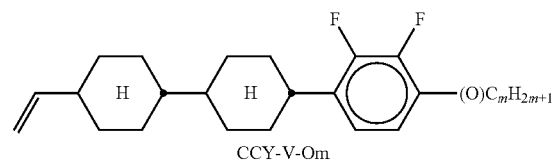
CCY-V-Om
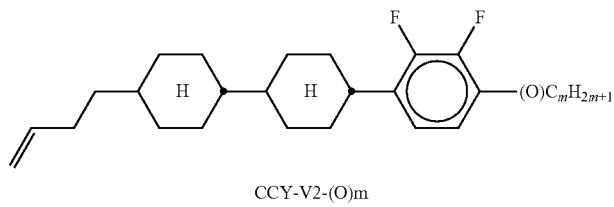
CCY-V2-(O)m
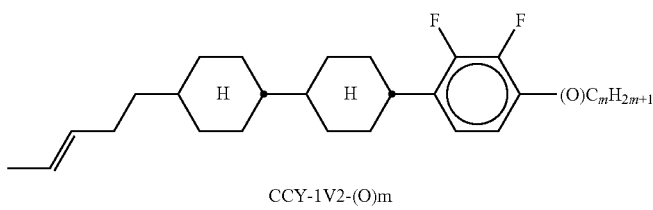
CCY-1V2-(O)m
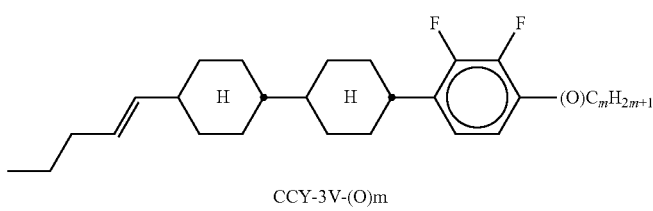
CCY-3V-(O)m
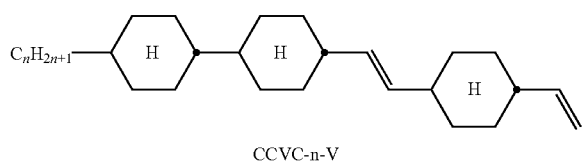
CCVC-n-V
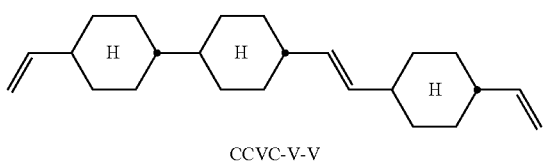
CCVC-V-V
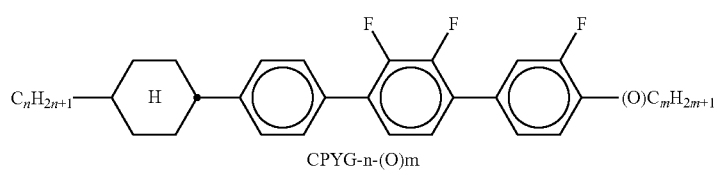
CPYG-n-(O)m TABLE A-continued
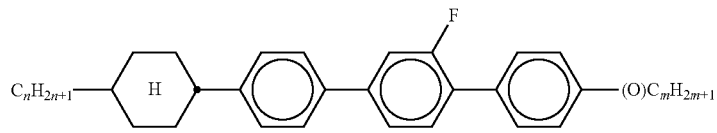
CPGP-n-m
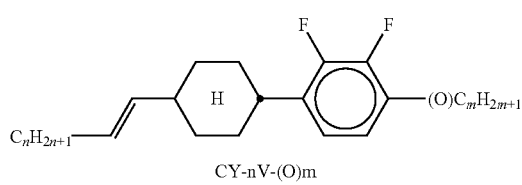
CY-nV-(O)m
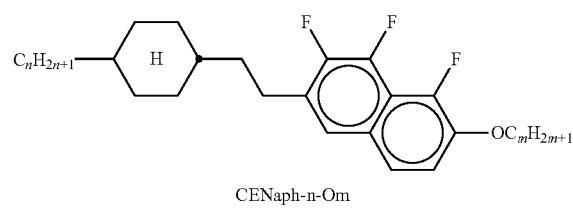
CENaph-n-Om
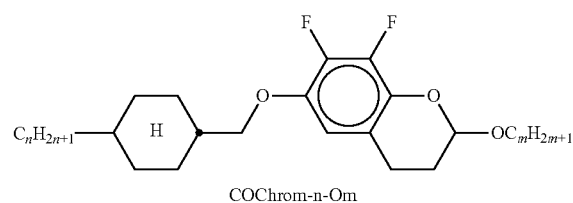
COChrom-n-Om
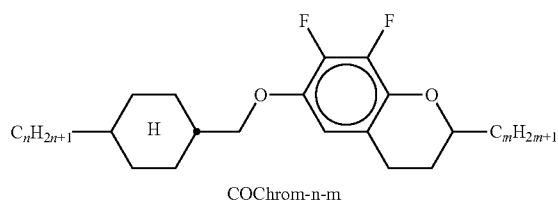
COChrom-n-m
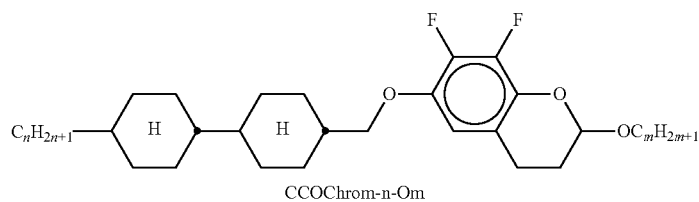
CCOChrom-n-Om
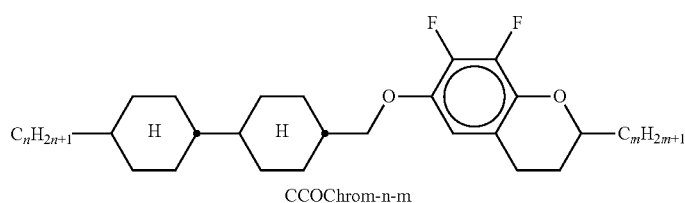
CCOChrom-n-m
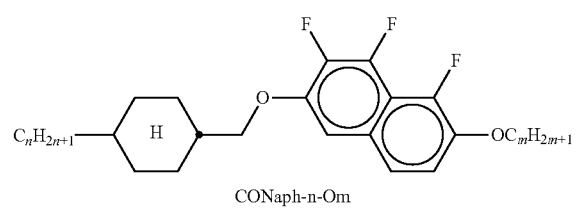
CONaph-n-Om TABLE A-continued
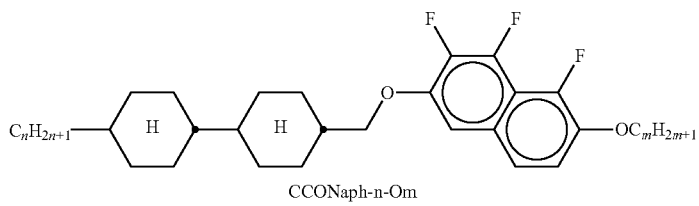
CCONaph-n-Om
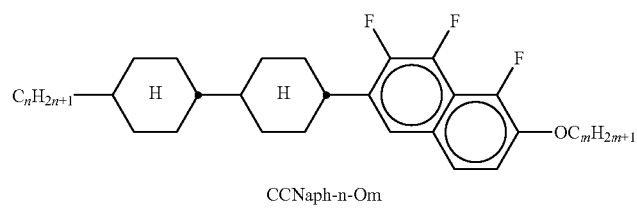
CCNaph-n-Om
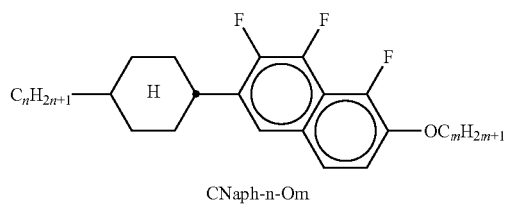
CNaph-n-Om
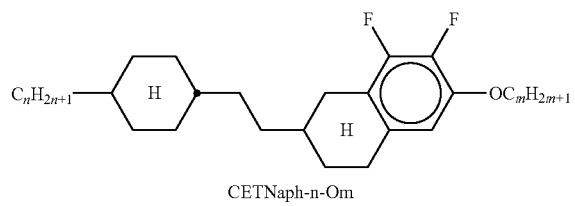
CETNaph-n-Om
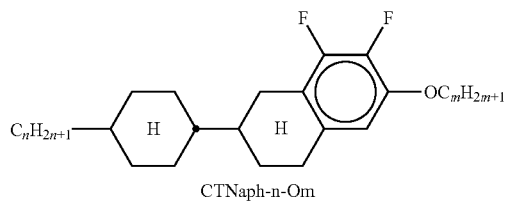
CTNaph-n-Om
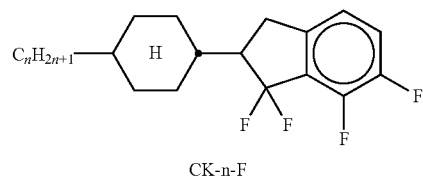
CK-n-F
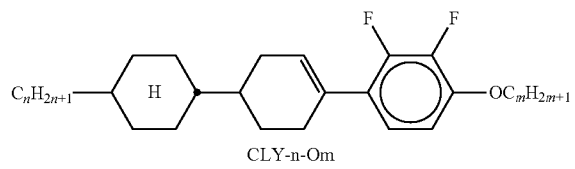
CLY-n-Om
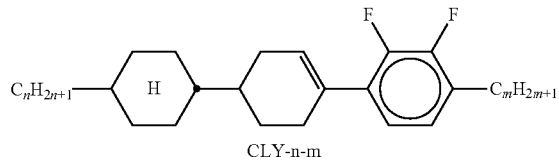
CLY-n-m TABLE A-continued
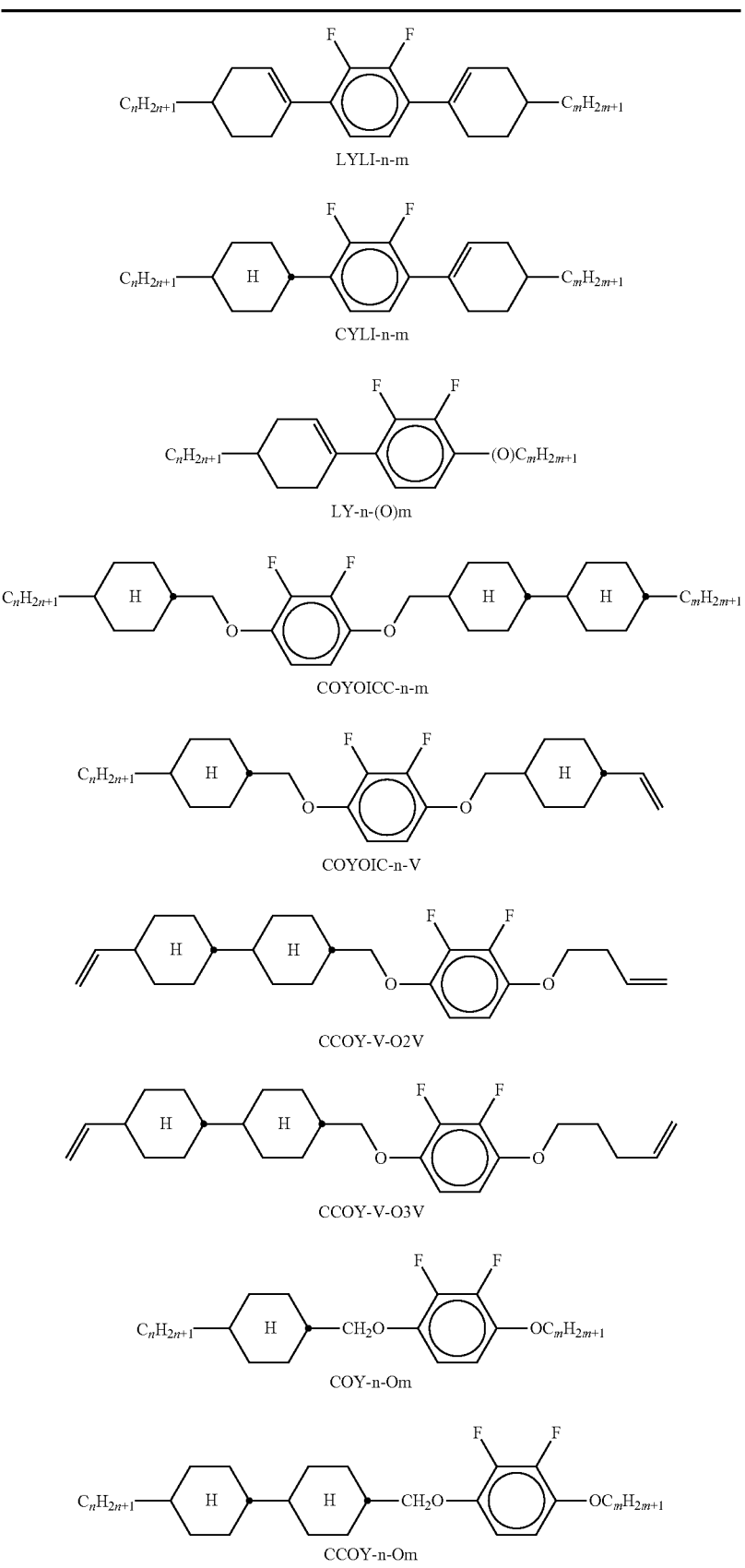

TABLE A-continued
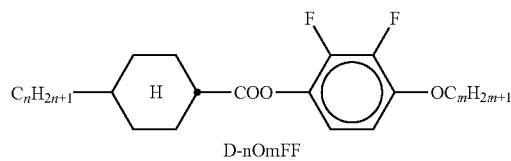
D-nOmFF
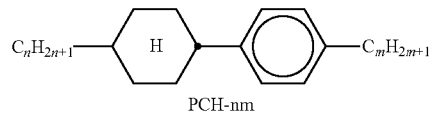
PCH-nm
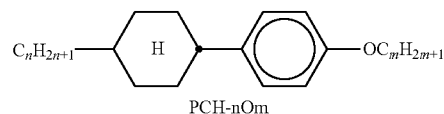
PCH-nOm
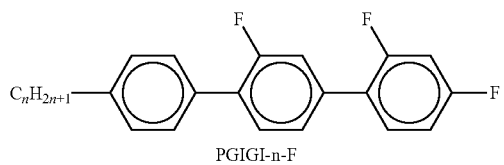
PGIGI-n-F
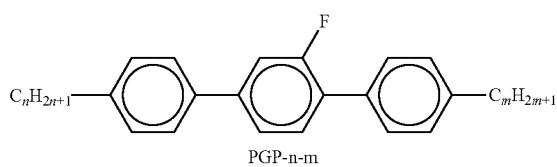
PGP-n-m
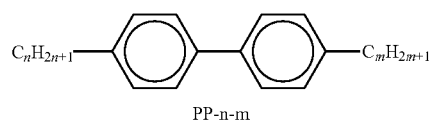
PP-n-m
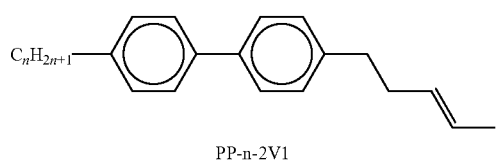
PP-n-2V1
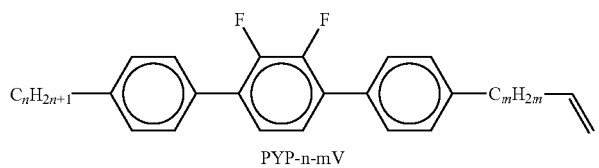
PYP-n-mV
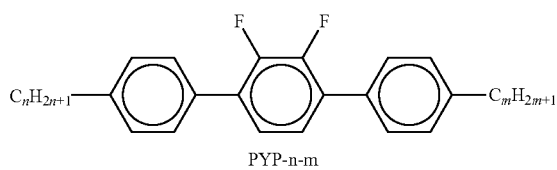
PYP-n-m
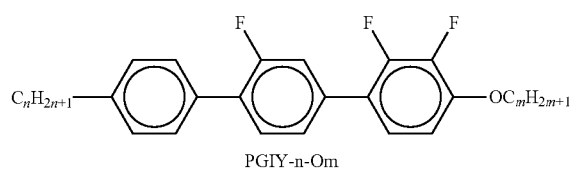
PGIY-n-Om TABLE A-continued
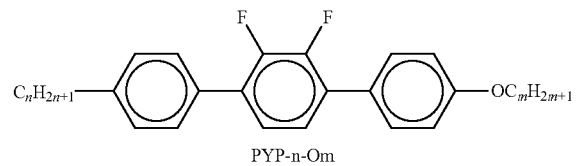
PYP-n-Om
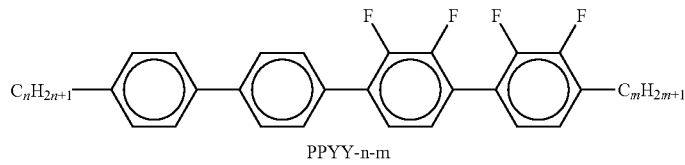
PPYY-n-m
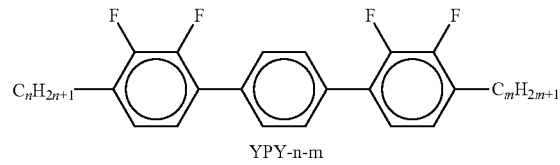
YPY-n-m
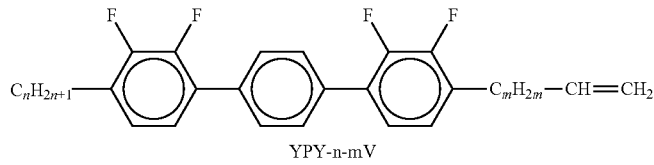
YPY-n-mV
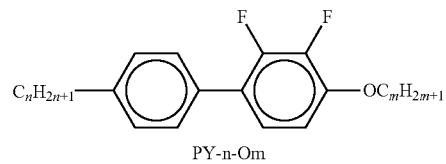
PY-n-Om
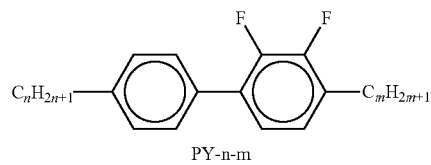
PY-n-m
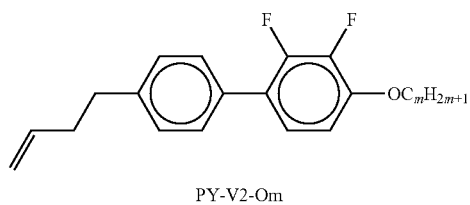
PY-V2-Om
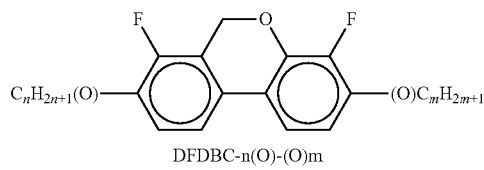
DFDBC-n(O)-(O)m
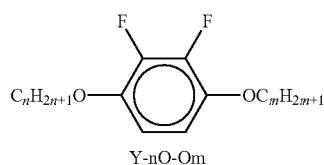
Y-nO-Om TABLE A-continued
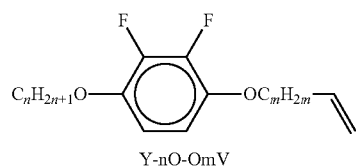
Y-nO-OmV
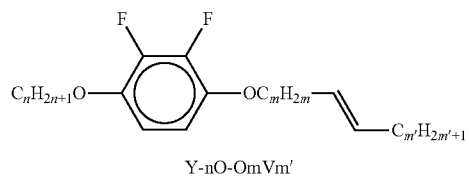
Y-nO-OmVm'
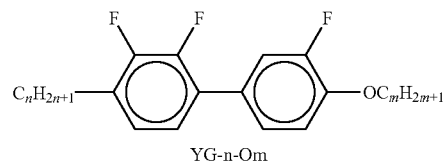
YG-n-Om
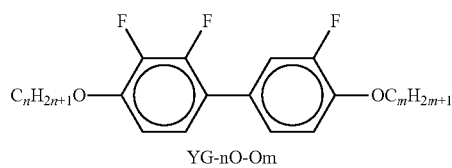
YG-nO-Om
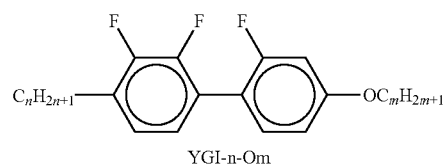
YGI-n-Om
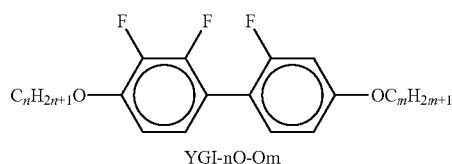
YGI-nO-Om
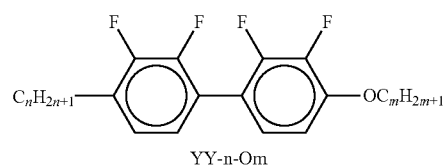
YY-n-Om TABLE A-continued
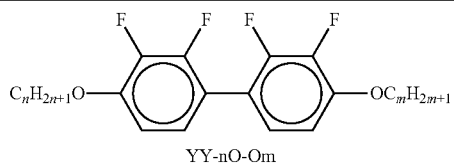
YY-nO-Om
In a preferred embodiment of the present invention, the LC media according to the invention comprise one or more compounds selected from the group consisting of compounds from Table A.
TABLE B
(n = 1-15; (O)$C_nH_{2n+1}$ means $C_nH_{2n+1}$ or $OC_nH_{2n+1}$)
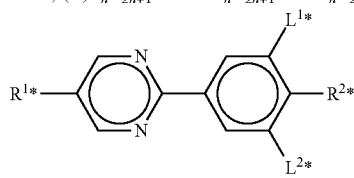
PYP
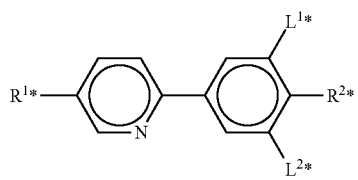
PYRP
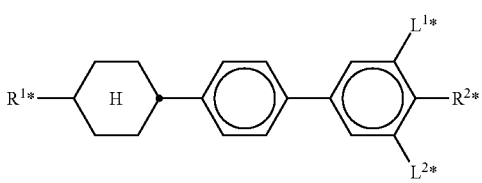
BCH
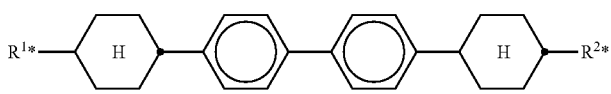
CBC
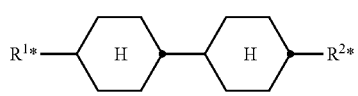
CCH
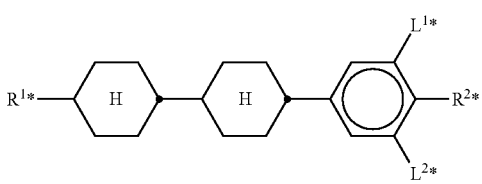
CCP TABLE B-continued
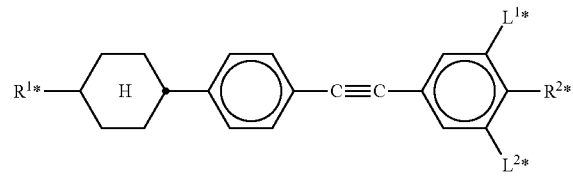
CPTP
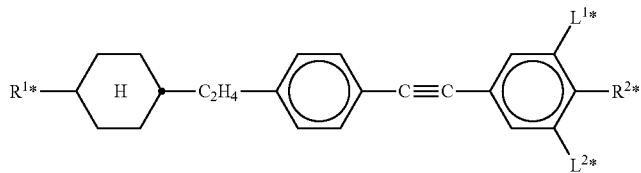
CEPTP
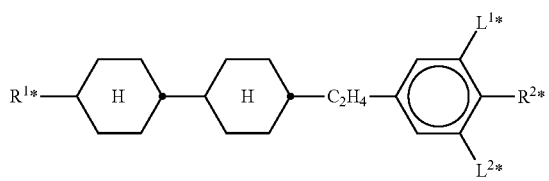
ECCP
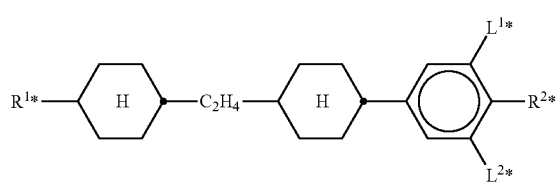
CECP
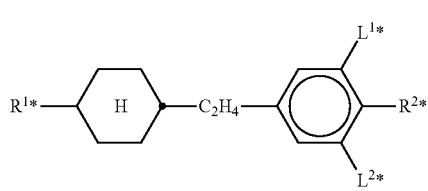
EPCH
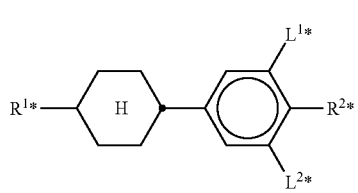
PCH
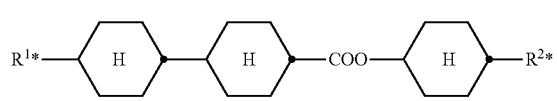
CH TABLE B-continued
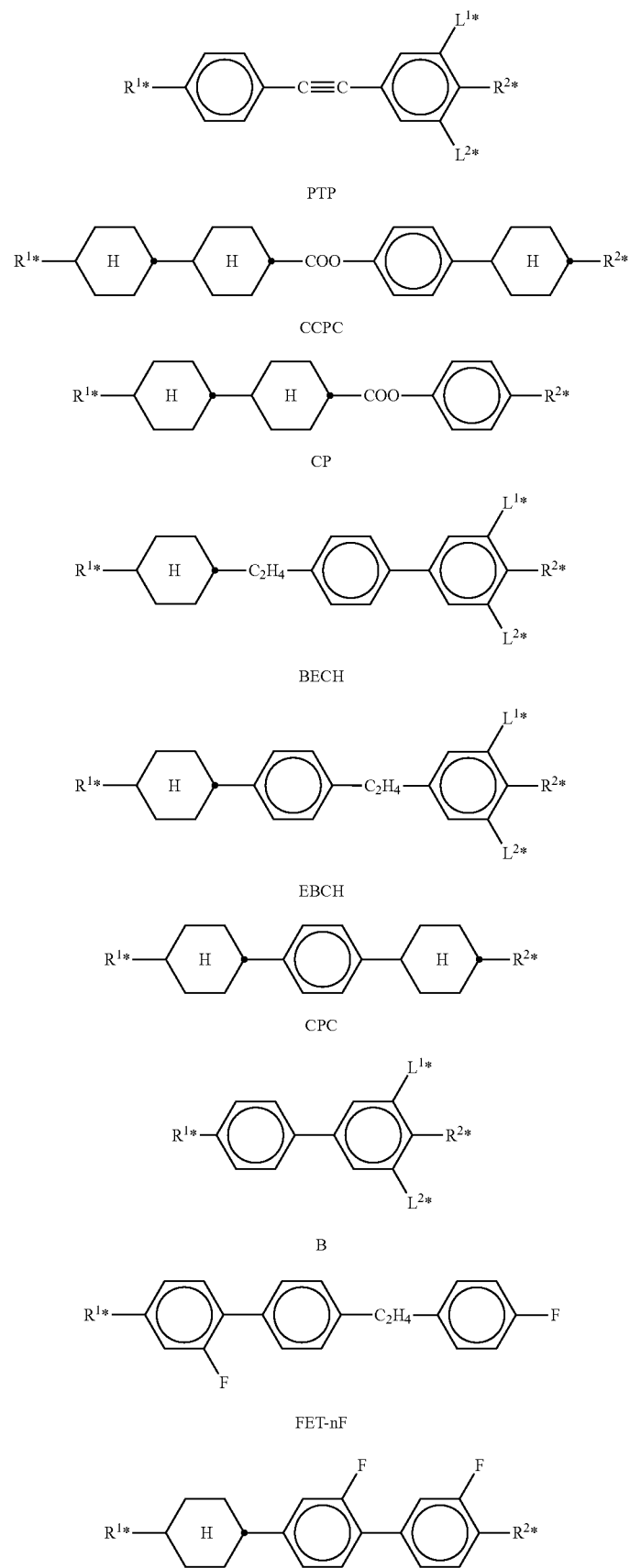
PTP
CCPC
CP
BECH
EBCH
CPC
B
FET-nF TABLE B-continued
CGG
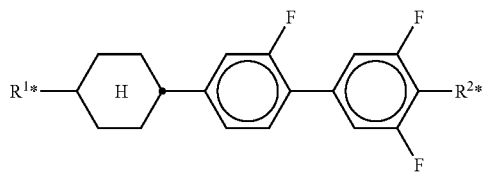
CGU
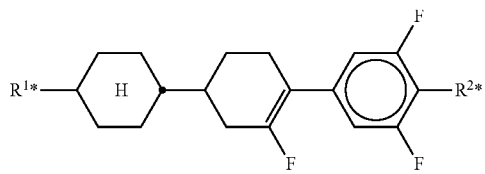
CFU
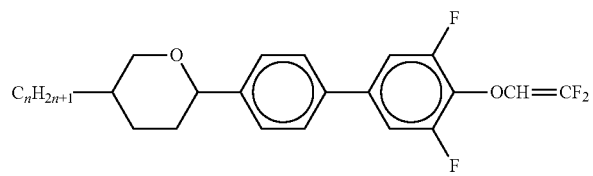
APU-n-OXF
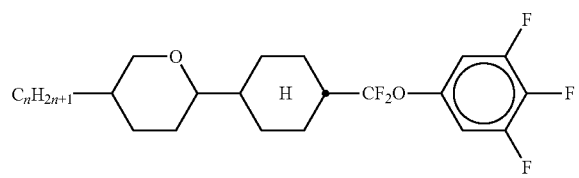
ACQU-n-F
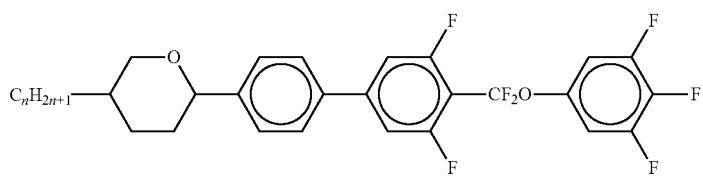
APUQU-n-F
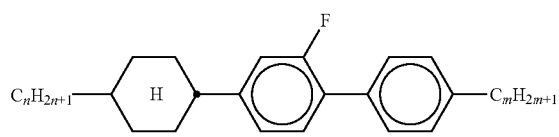
BCH-n•Fm
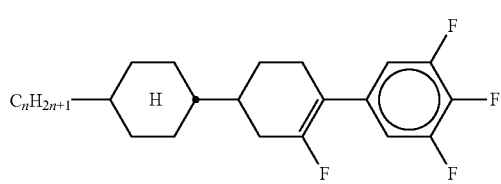
CFU-n-F TABLE B-continued
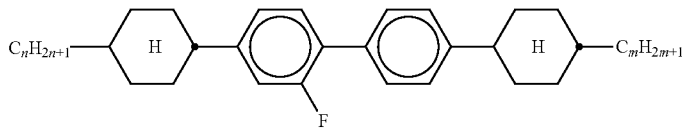
CBC-nmF
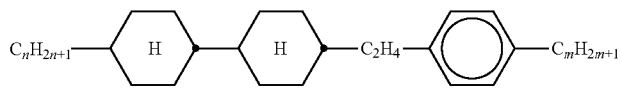
ECCP-nm
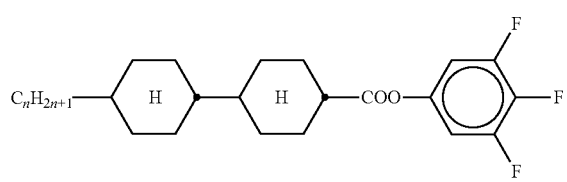
CCZU-n-F
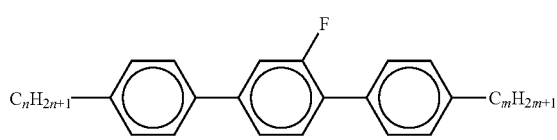
PGP-n-m
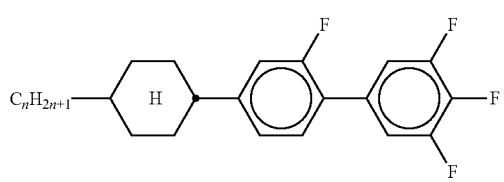
CGU-n-F
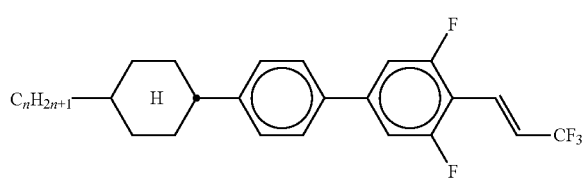
CPU-n-VT
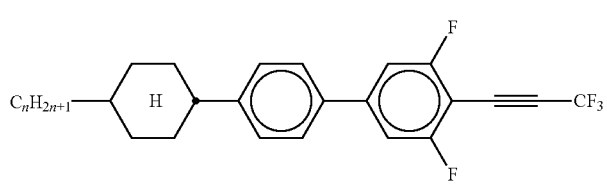
CPU-n-AT
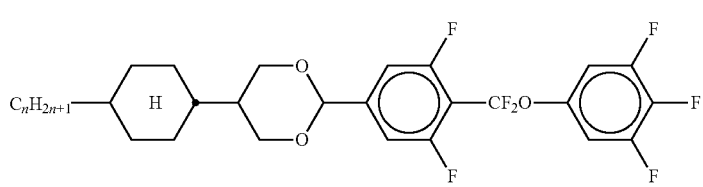
CDUQU-n-F TABLE B-continued
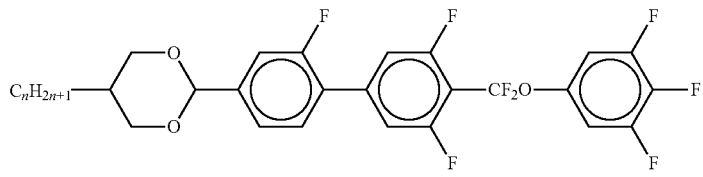
DGUQU-n-F
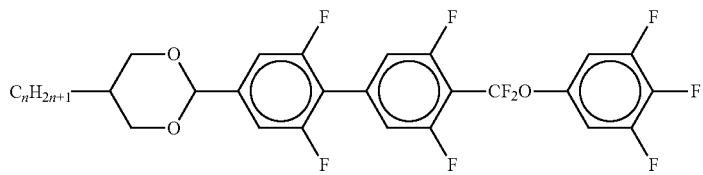
DUUQU-n-F
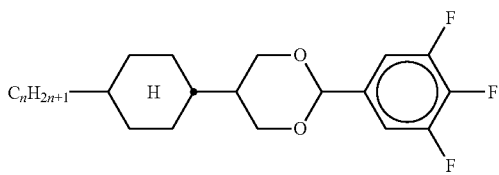
CDU-n-F
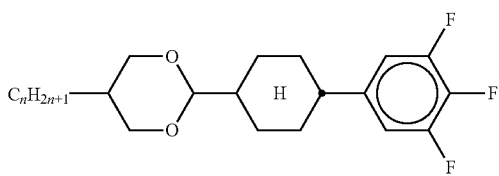
DCU-n-F
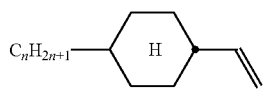
C-n-V
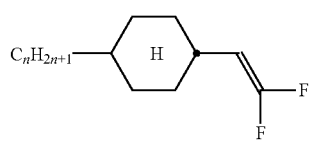
C-n-XF
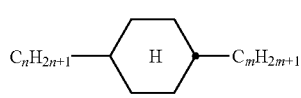
C-n-m
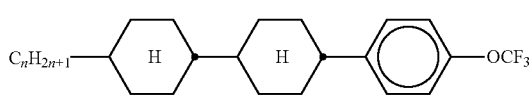
CCP-nOCF$_3$
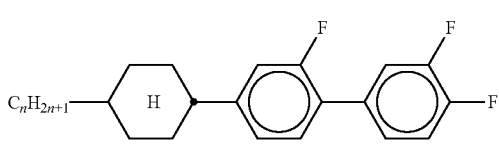

TABLE B-continued
CGG-n-F
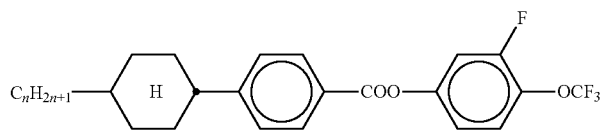
CPZG-n-OT
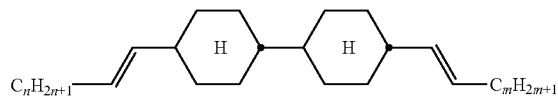
CC-nV-Vm
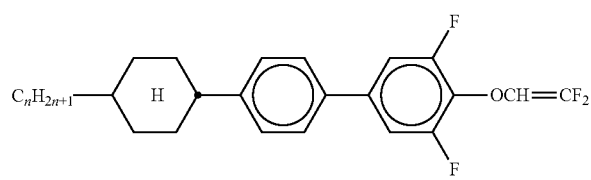
CPU-n-OXF
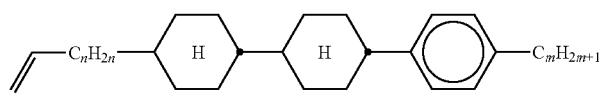
CCP-Vn-m
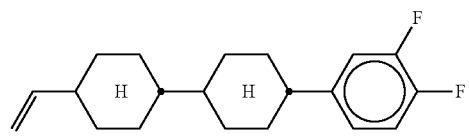
CCG-V-F
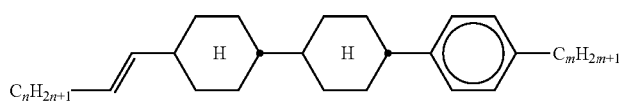
CCP-nV-m
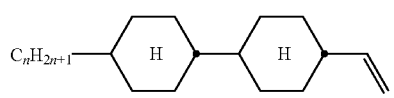
CC-n-V
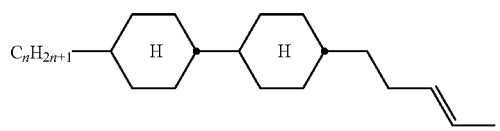
CC-n-2V1
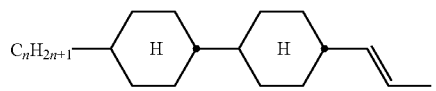
CC-n-V1

TABLE B-continued
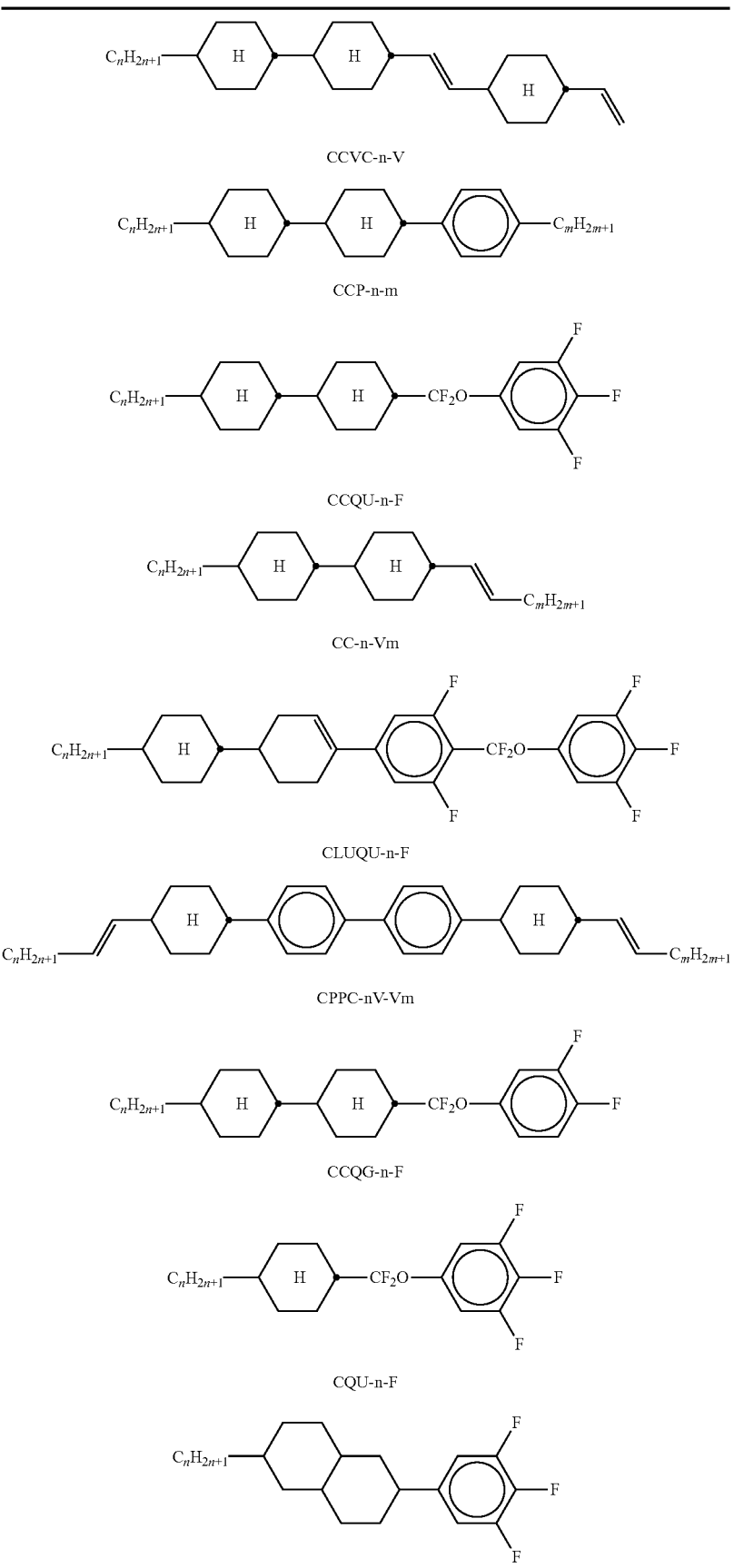

TABLE B-continued
Dec-U-n-F
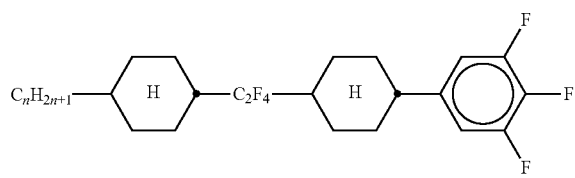
CWCU-n-F
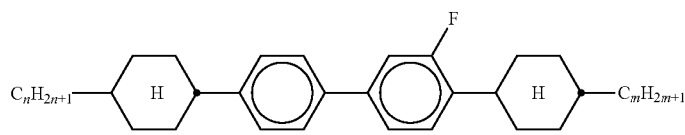
CPGP-n-m
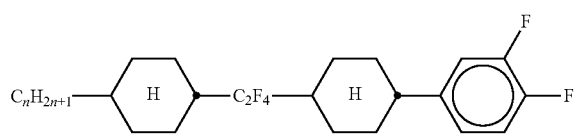
CWCG-n-F
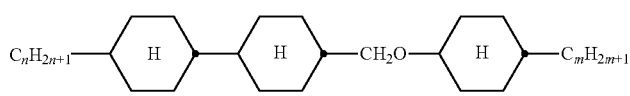
CCOC-n-m
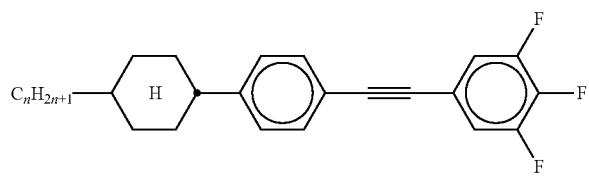
CPTU-n-F
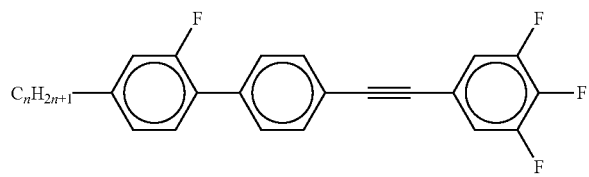
GPTU-n-F
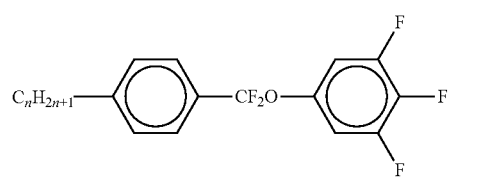
PQU-n-F
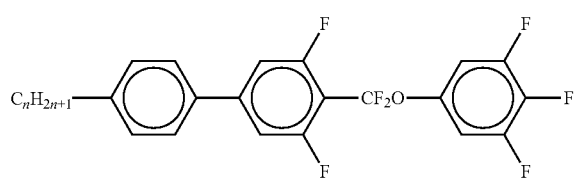

TABLE B-continued
PUQU-n-F
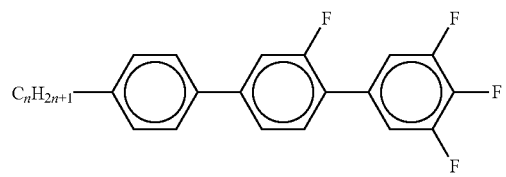
PGU-n-F
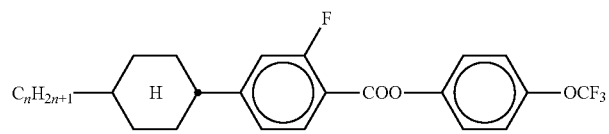
CGZP-n-OT
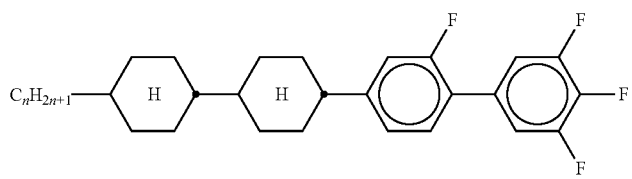
CCGU-n-F
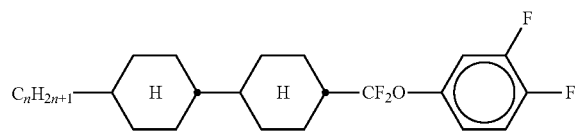
CCQG-n-F
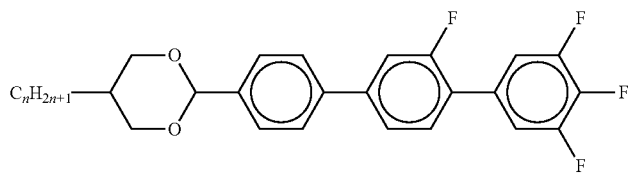
DPGU-n-F
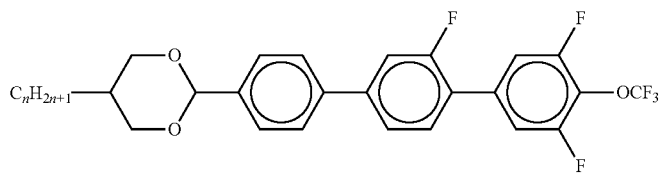
DPGU-n-OT
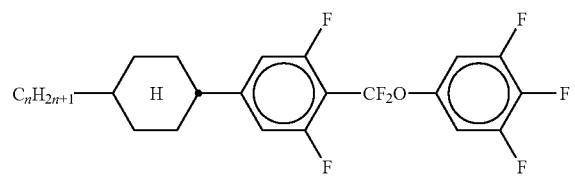
CUQU-n-F TABLE B-continued
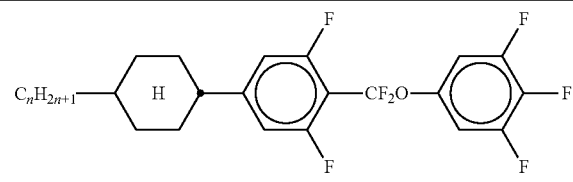
GUQU-n-F
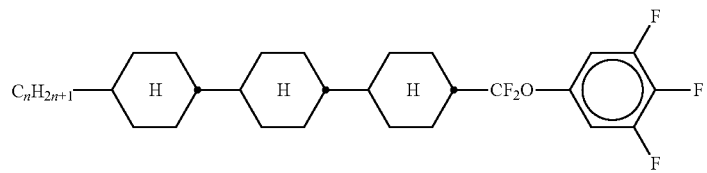
CCCQU-n-F
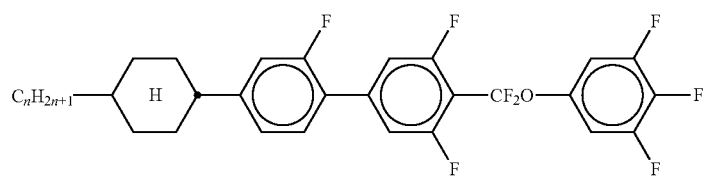
CGUQU-n-F
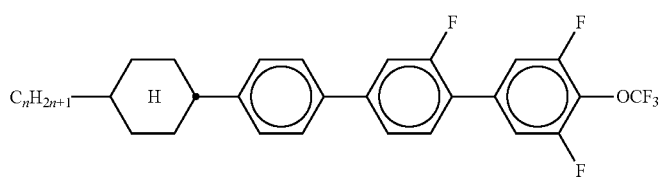
CPGU-n-OT
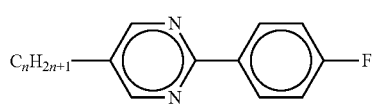
PYP-nF
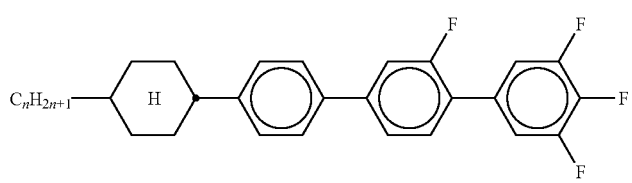
CPGU-n-F
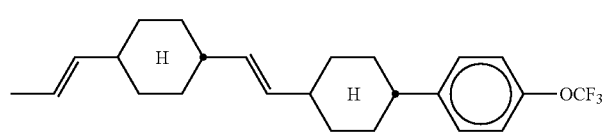
CVCP-1V-OT
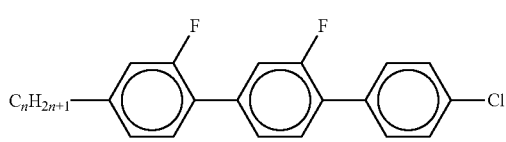
GGP-n-Cl TABLE B-continued
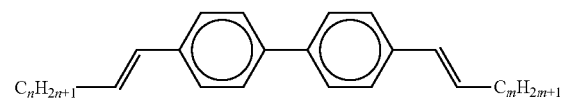
PP-nV-Vm
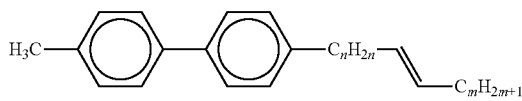
PP-1-nVm
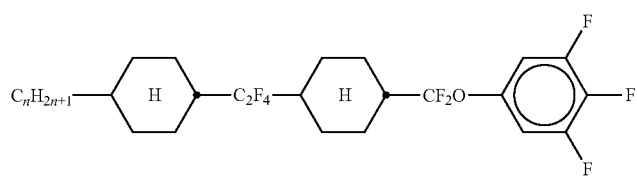
CWCQU-n-F
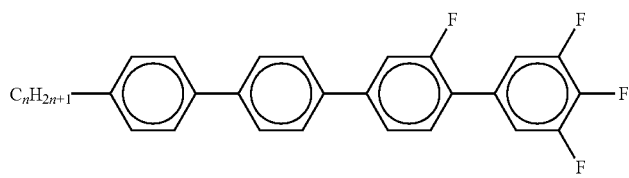
PPGU-n-F
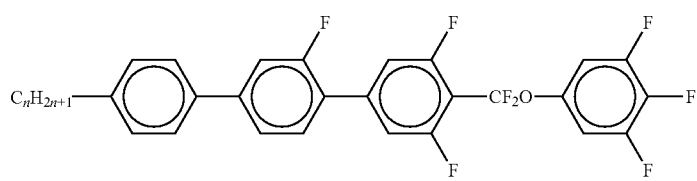
PGUQU-n-F
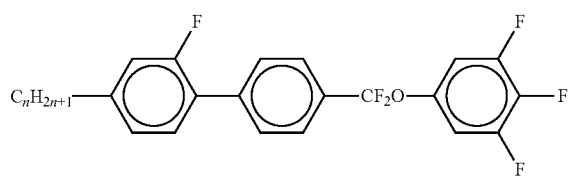
GPQU-n-F
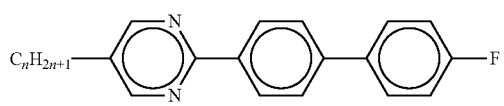
MPP-n-F
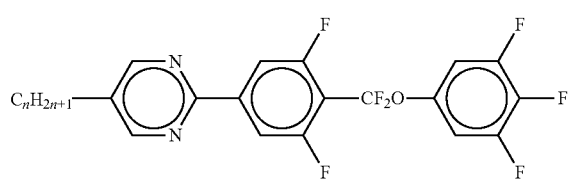
MUQU-n-F TABLE B-continued
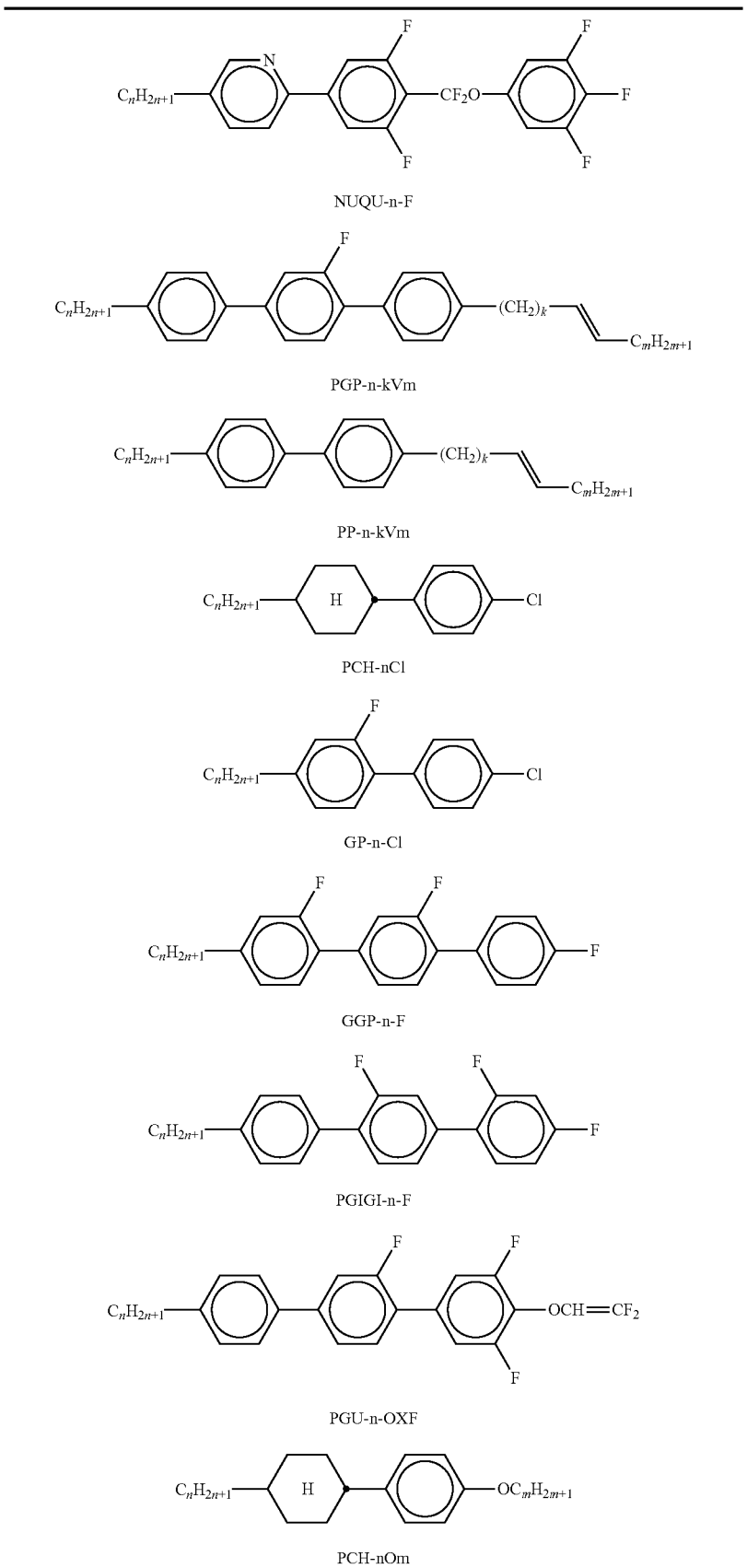
NUQU-n-F
PGP-n-kVm
PP-n-kVm
PCH-nCl
GP-n-Cl
GGP-n-F
PGIGI-n-F
PGU-n-OXF
PCH-nOm TABLE B-continued
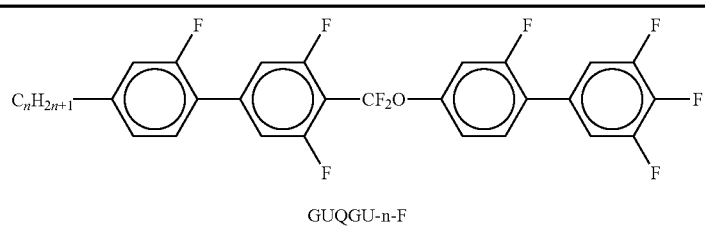
GUQGU-n-F
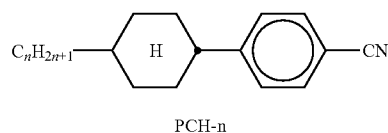
PCH-n
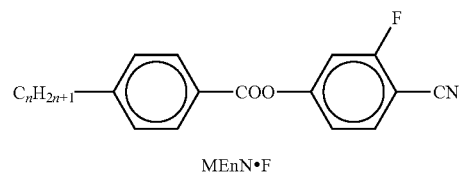
MEnN•F
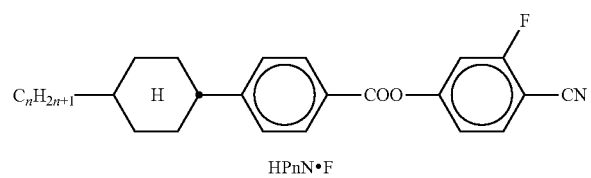
HPnN•F
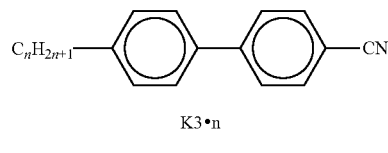
K3•n
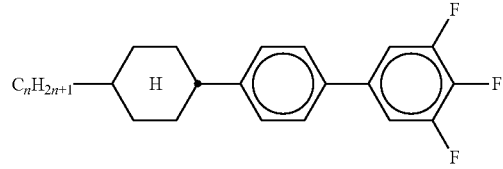
BCH-nF•F•F
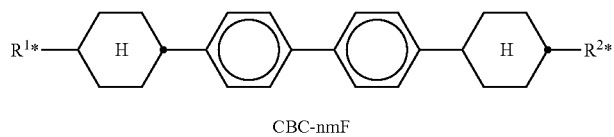
CBC-nmF
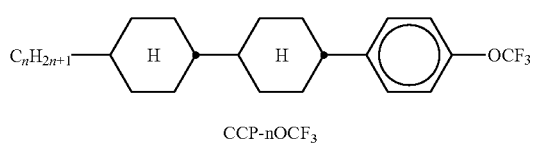
CCP-nOCF$_3$ TABLE B-continued
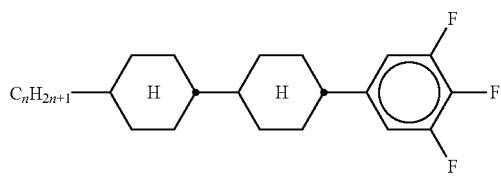
CCP-nF•F•F
In a preferred embodiment of the present invention, the LC media according to the invention comprise one or more compounds selected from the group consisting of compounds from Table B.
TABLE C
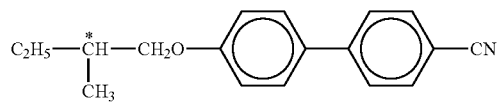
C 15
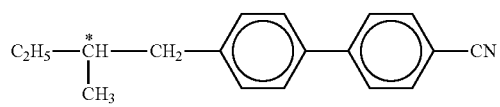
CB 15
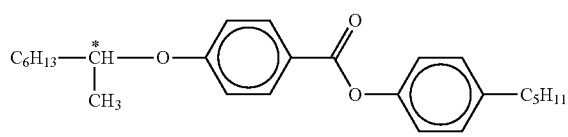
CM 21
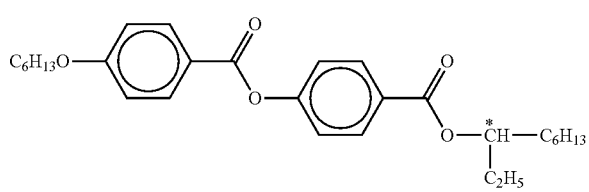
R/S-811
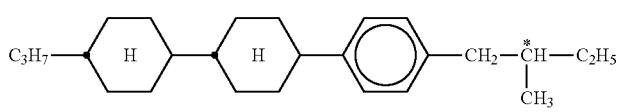
CM 44
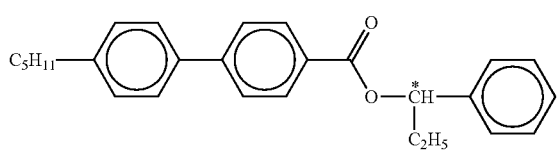
CM 45

TABLE C-continued
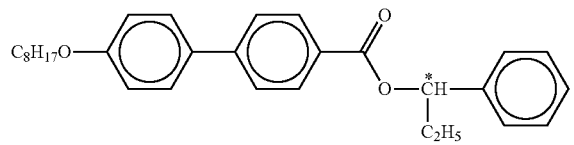
CM 47
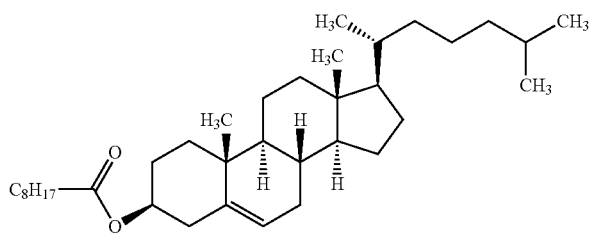
CN
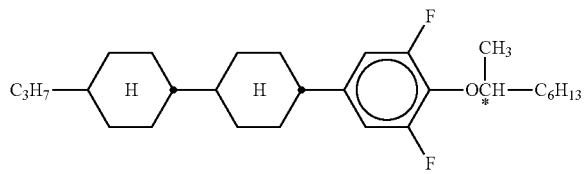
R/S-2011
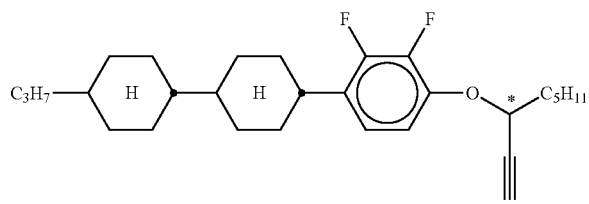
R/S-3011
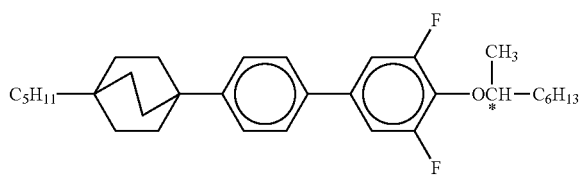
R/S-4011
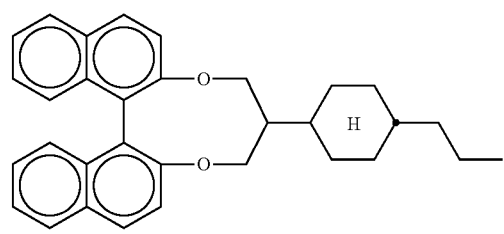
R/S-5011

TABLE C-continued

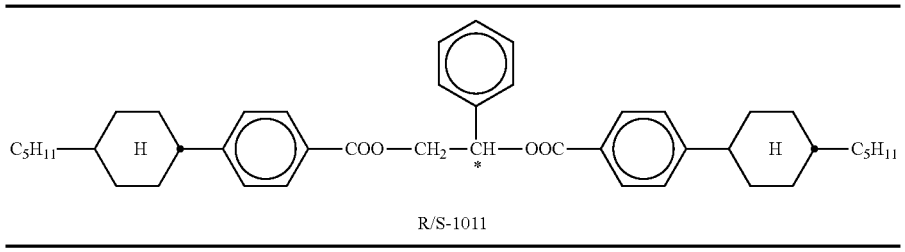

R/S-1011

Table C shows possible chiral dopants which can be added to the LC media according to the invention.

The LC media preferably comprise 0 to 10% by weight, in particular 0.01 to 5% by weight, particularly preferably 0.1 to 3% by weight, of dopants. The LC media preferably comprise one or more dopants selected from the group consisting of compounds from Table C.

TABLE D

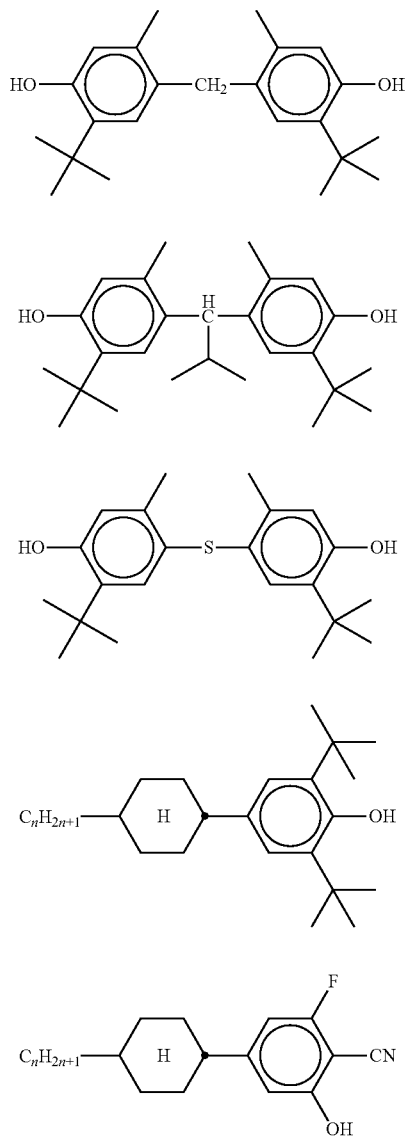

TABLE D-continued
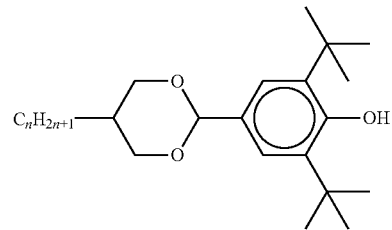
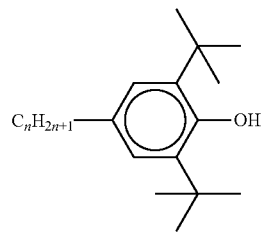
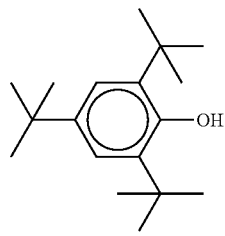
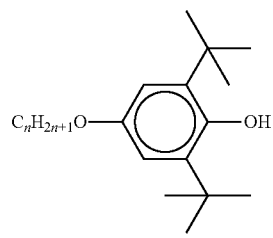
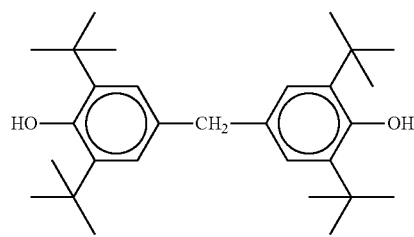
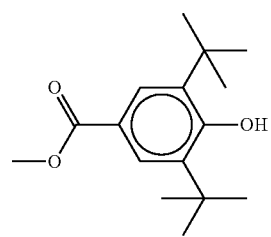

TABLE D-continued
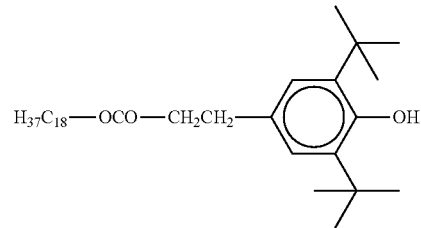
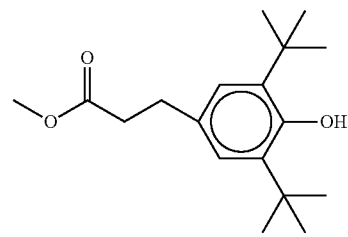
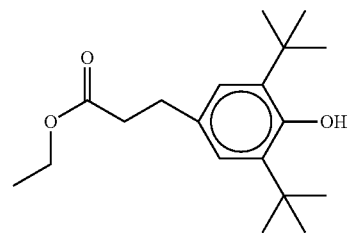
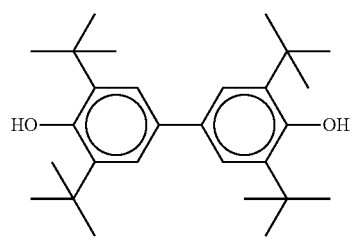
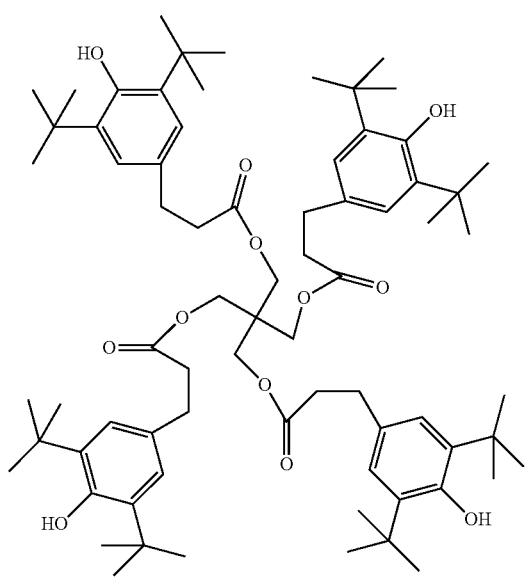 [SMILES: CC(C)(C)c1cc(CCC(=O)OCC(COC(=O)CCc2cc(C(C)(C)C)c(O)c(C(C)(C)C)c2)(COC(=O)CCc2cc(C(C)(C)C)c(O)c(C(C)(C)C)c2)COC(=O)CCc2cc(C(C)(C)C)c(O)c(C(C)(C)C)c2)cc(C(C)(C)C)c1O]

TABLE D-continued
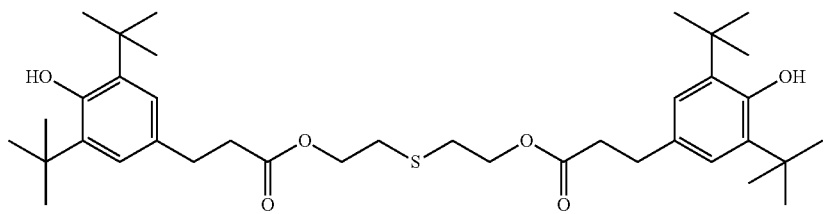 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
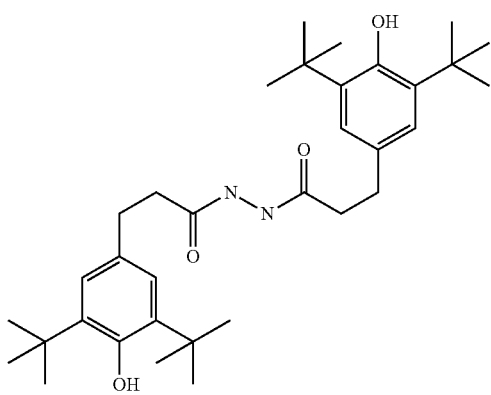 [SMILES: CC(C)(C)c1cc(CCC(=O)NNC(=O)CCc2cc(C(C)(C)C)c(O)c(C(C)(C)C)c2)cc(C(C)(C)C)c1O]
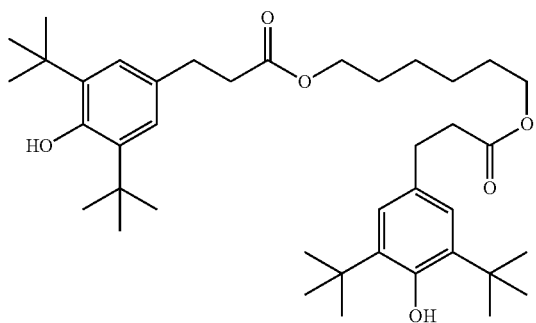 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
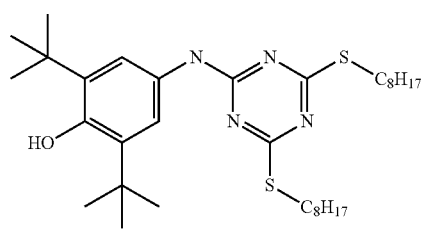

TABLE D-continued
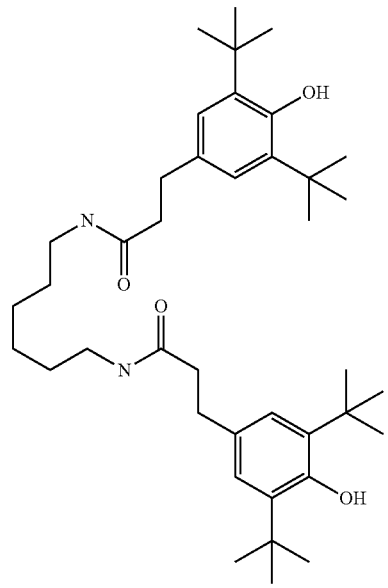 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
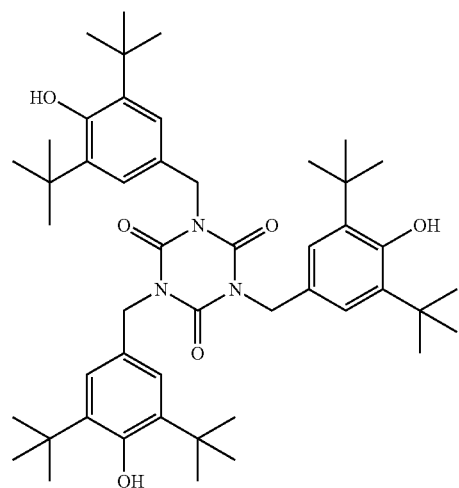 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
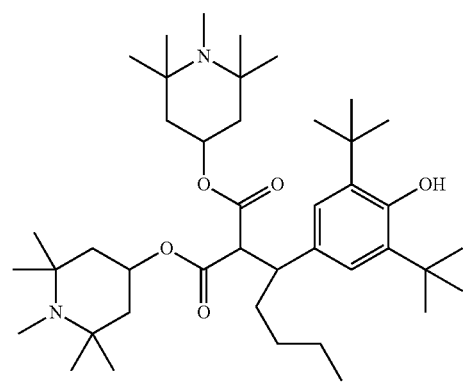 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE D-continued
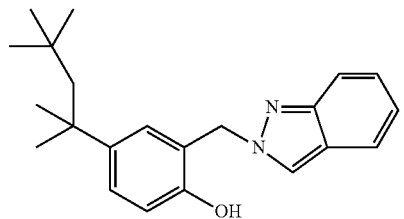 [SMILES: CC(C)(C)CC(C)(C)c1ccc(O)c(Cn2cc3ccccc3n2)c1]
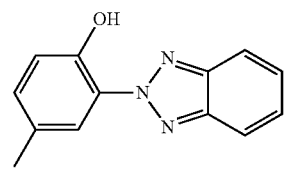 [SMILES: Cc1ccc(O)c(-n2nc3ccccc3n2)c1]
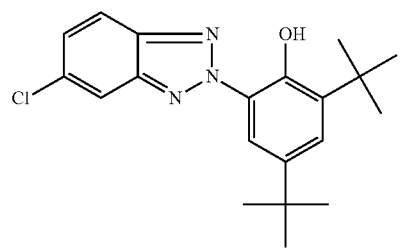 [SMILES: CC(C)(C)c1cc(-n2nc3ccc(Cl)cc3n2)c(O)c(C(C)(C)C)c1]
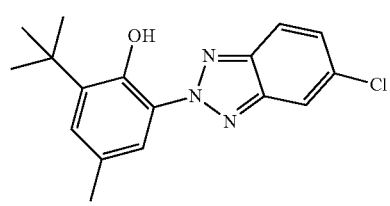 [SMILES: Cc1cc(-n2nc3ccc(Cl)cc3n2)c(O)c(C(C)(C)C)c1]
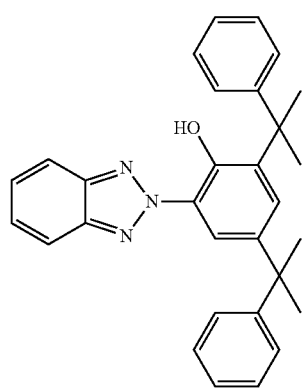 [SMILES: CC(C)(c1ccccc1)c1cc(-n2nc3ccccc3n2)c(O)c(C(C)(C)c2ccccc2)c1]
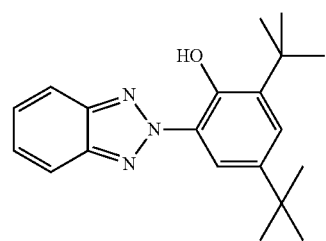 [SMILES: CC(C)(C)c1cc(-n2nc3ccccc3n2)c(O)c(C(C)(C)C)c1]

TABLE D-continued
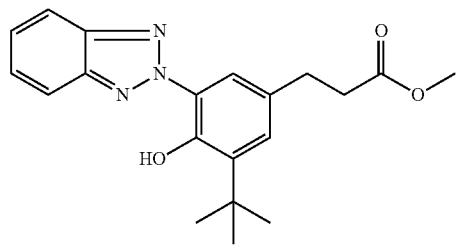 [SMILES: COC(=O)CCc1cc(-n2nc3ccccc3n2)c(O)c(C(C)(C)C)c1]
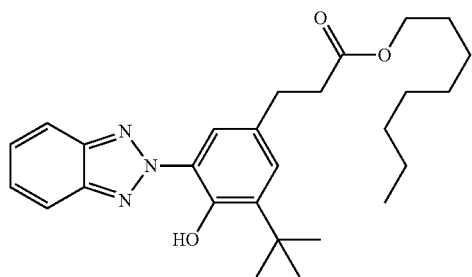 [SMILES: CCCCCCCCOC(=O)CCc1cc(-n2nc3ccccc3n2)c(O)c(C(C)(C)C)c1]
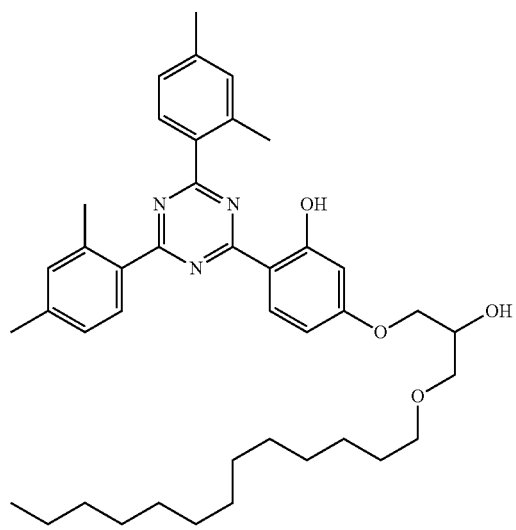 [SMILES: CCCCCCCCCCCCCOCC(O)COc1ccc(-c2nc(-c3ccc(C)cc3C)nc(-c3ccc(C)cc3C)n2)c(O)c1]
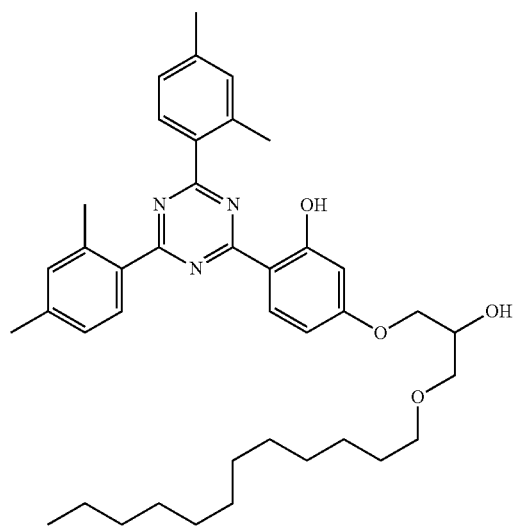 [SMILES: CCCCCCCCCCCCOCC(O)COc1ccc(-c2nc(-c3ccc(C)cc3C)nc(-c3ccc(C)cc3C)n2)c(O)c1]

TABLE D-continued
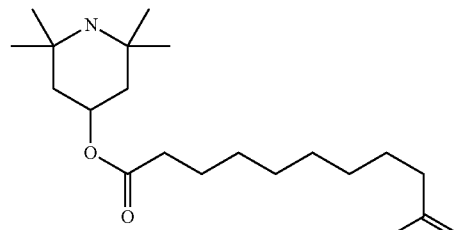
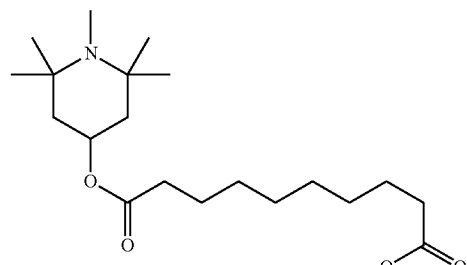
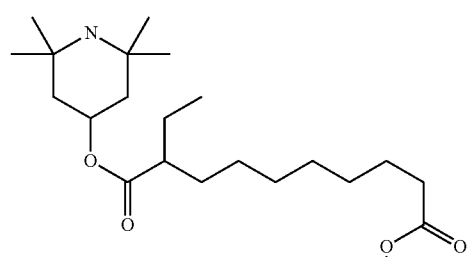
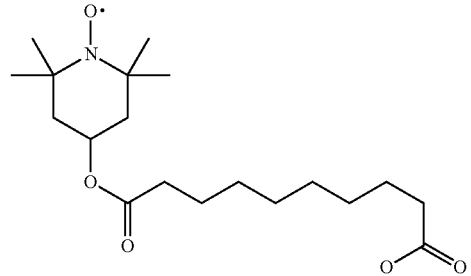

TABLE D-continued
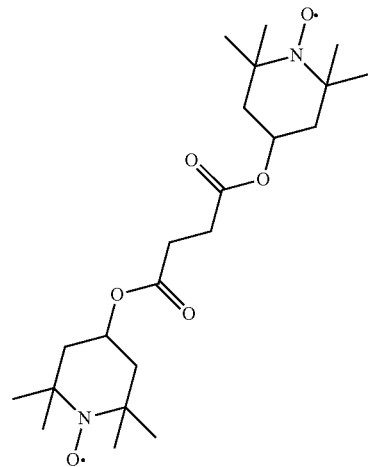
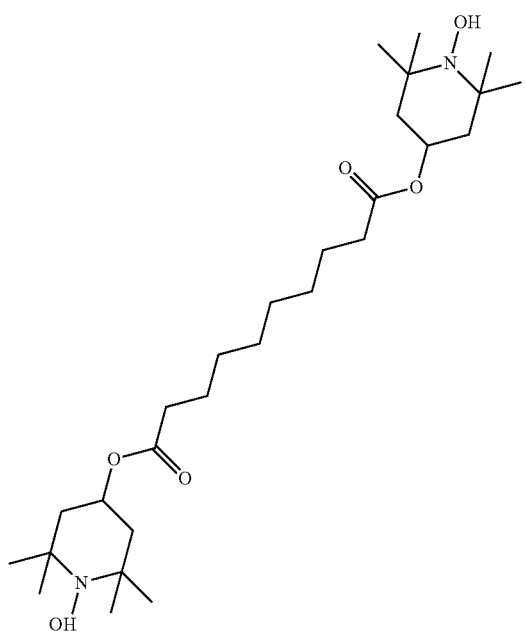
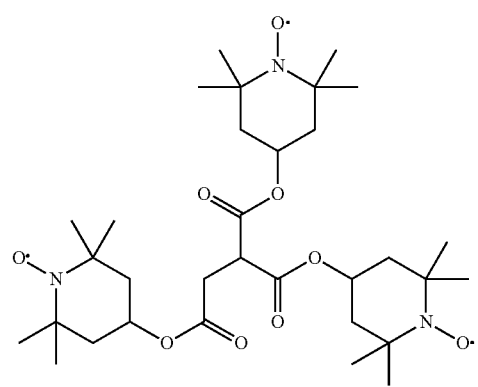

TABLE D-continued

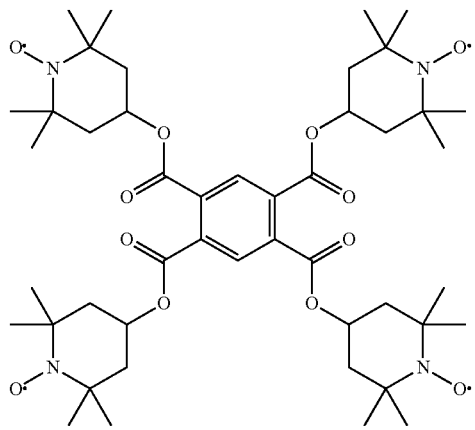

Table D shows possible stabilisers which can be added to the LC media according to the invention.

(n here denotes an integer from 1 to 12, preferably 1, 2, 3, 4, 5, 6, 7 or 8, terminal methyl groups are not shown).

The LC media preferably comprise 0 to 10% by weight, in particular 1 ppm to 5% by weight, particularly preferably 1 ppm to 1% by weight, of stabilisers. The LC media preferably comprise one or more stabilisers selected from the group consisting of compounds from Table D.

TABLE E

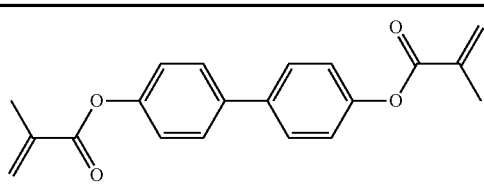

RM-1

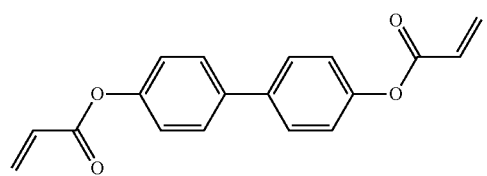 [SMILES: C=CC(=O)Oc1ccc(-c2ccc(OC(=O)C=C)cc2)cc1]

RM-2

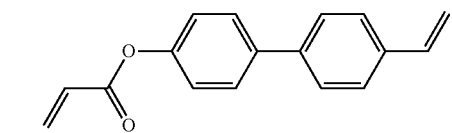 [SMILES: C=CC(=O)Oc1ccc(-c2ccc(C=C)cc2)cc1]

RM-3

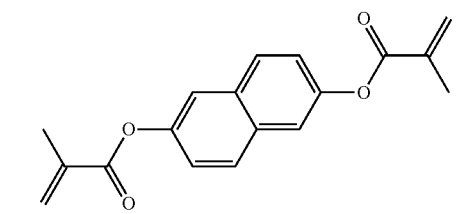 [SMILES: C=C(C)C(=O)Oc1ccc2cc(OC(=O)C(=C)C)ccc2c1]

RM-4

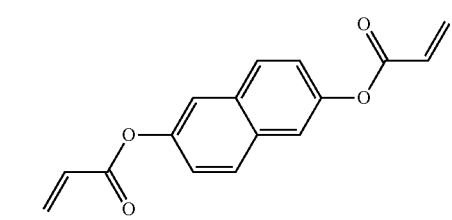 [SMILES: C=CC(=O)Oc1ccc2cc(OC(=O)C=C)ccc2c1]

RM-5

TABLE E-continued
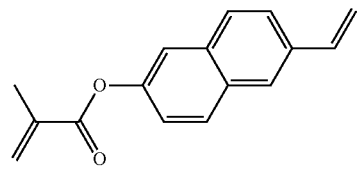 [SMILES: C=Cc1ccc2cc(OC(=O)C(=C)C)ccc2c1]
RM-6
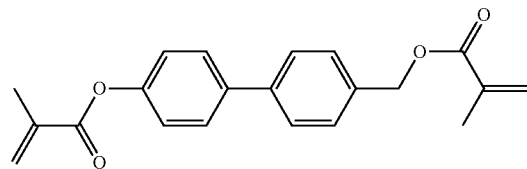 [SMILES: C=C(C)C(=O)OCc1ccc(-c2ccc(OC(=O)C(=C)C)cc2)cc1]
RM-7
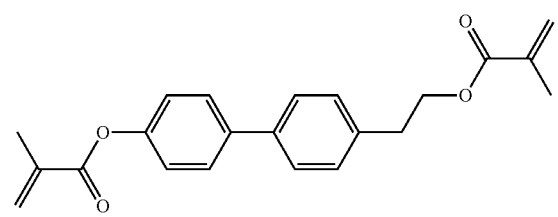 [SMILES: C=C(C)C(=O)OCCc1ccc(-c2ccc(OC(=O)C(=C)C)cc2)cc1]
RM-8
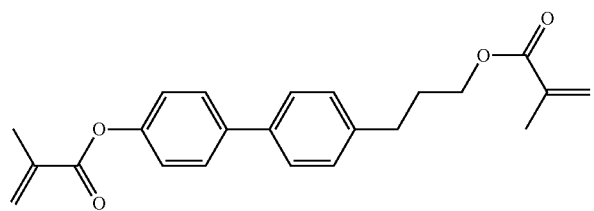 [SMILES: C=C(C)C(=O)OCCCc1ccc(-c2ccc(OC(=O)C(=C)C)cc2)cc1]
RM-9
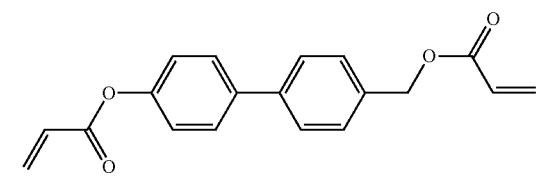 [SMILES: C=CC(=O)OCc1ccc(-c2ccc(OC(=O)C=C)cc2)cc1]
RM-10
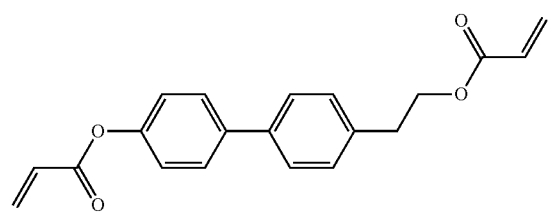 [SMILES: C=CC(=O)OCCc1ccc(-c2ccc(OC(=O)C=C)cc2)cc1]
RM-11
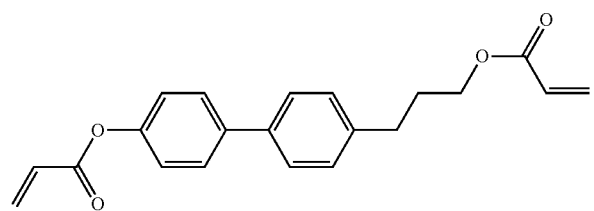 [SMILES: C=CC(=O)OCCCc1ccc(-c2ccc(OC(=O)C=C)cc2)cc1]
RM-12
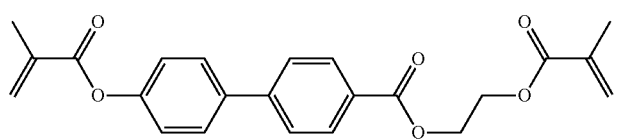 [SMILES: C=C(C)C(=O)OCCOC(=O)c1ccc(-c2ccc(OC(=O)C(=C)C)cc2)cc1]
RM-13

TABLE E-continued
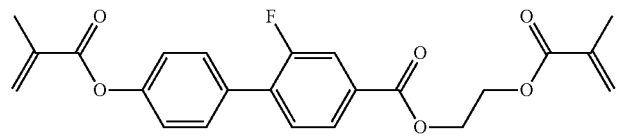 [SMILES: C=C(C)C(=O)OCCOC(=O)c1ccc(-c2ccc(OC(=O)C(=C)C)cc2)c(F)c1]
RM-14
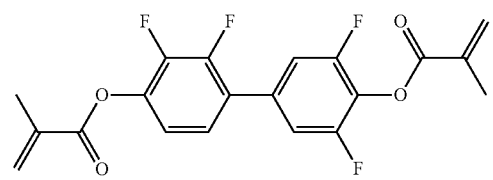 [SMILES: C=C(C)C(=O)Oc1ccc(-c2cc(F)c(OC(=O)C(=C)C)c(F)c2)c(F)c1F]
RM-15
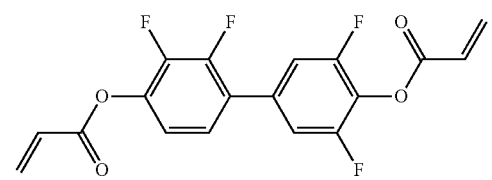
RM-16
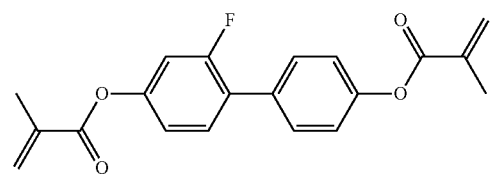 [SMILES: C=C(C)C(=O)Oc1ccc(-c2ccc(OC(=O)C(=C)C)cc2F)cc1]
RM-17
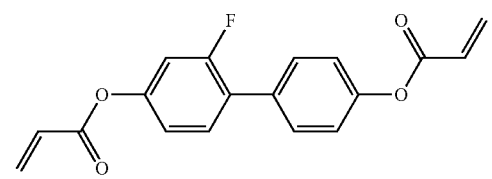
RM-18
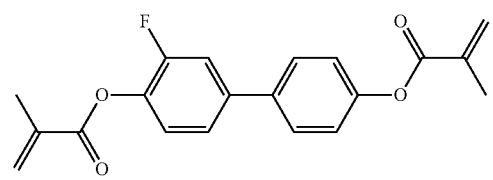 [SMILES: C=C(C)C(=O)Oc1ccc(-c2ccc(OC(=O)C(=C)C)c(F)c2)cc1]
RM-19
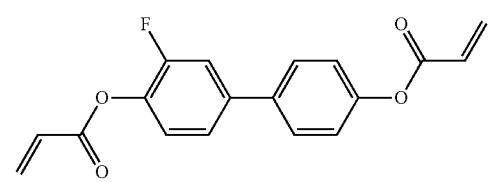 [SMILES: C=CC(=O)Oc1ccc(-c2ccc(OC(=O)C=C)c(F)c2)cc1]
RM-20
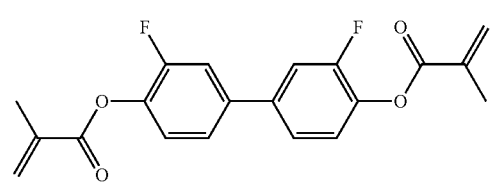
RM-21
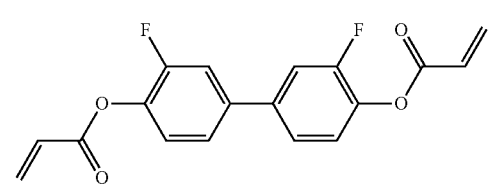
RM-22

TABLE E-continued
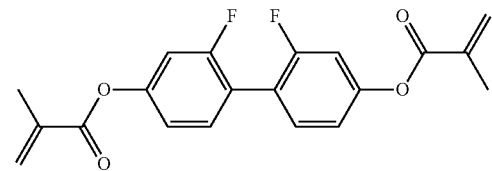
RM-23
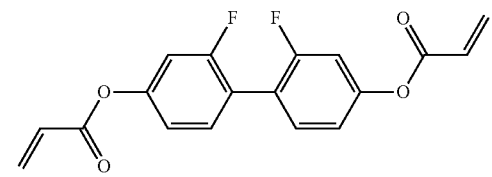
RM-24
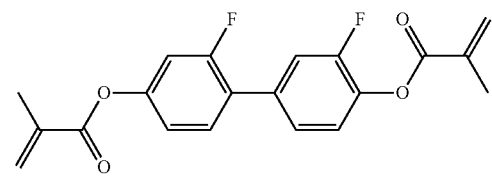
RM-25
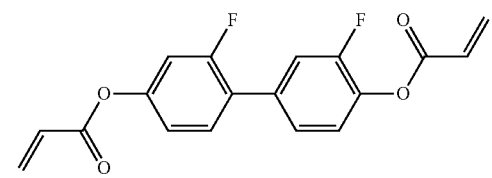 [SMILES: C=CC(=O)Oc1ccc(-c2ccc(OC(=O)C=C)c(F)c2)c(F)c1]
RM-26
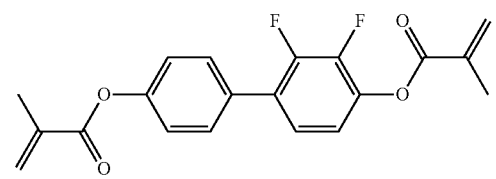
RM-27
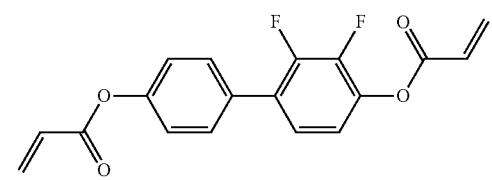 [SMILES: C=CC(=O)Oc1ccc(-c2ccc(OC(=O)C=C)c(F)c2F)cc1]
RM-28
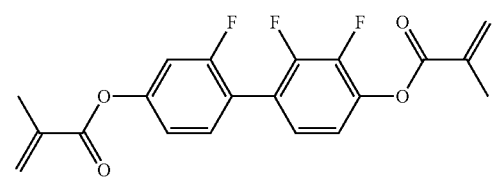 [SMILES: C=C(C)C(=O)Oc1ccc(-c2ccc(OC(=O)C(=C)C)c(F)c2F)c(F)c1]
RM-29
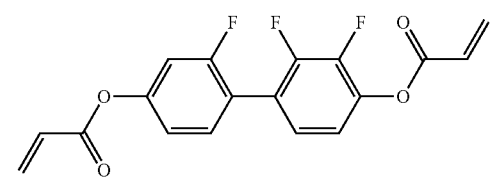
RM-30
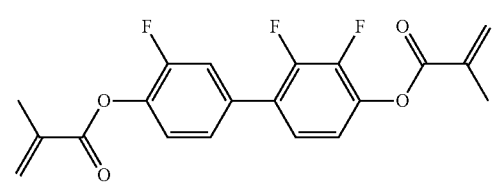 [SMILES: C=C(C)C(=O)Oc1ccc(-c2ccc(OC(=O)C(=C)C)c(F)c2F)cc1F]
RM-31

TABLE E-continued
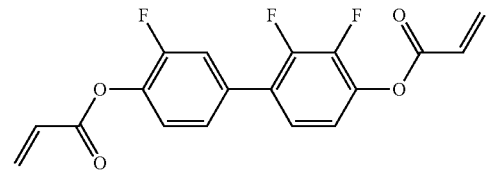
RM-32
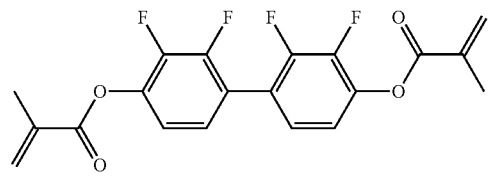
RM-33
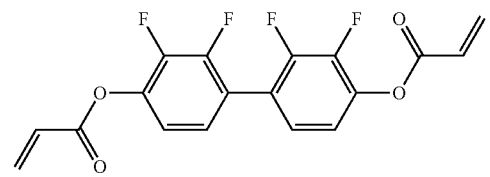
RM-34
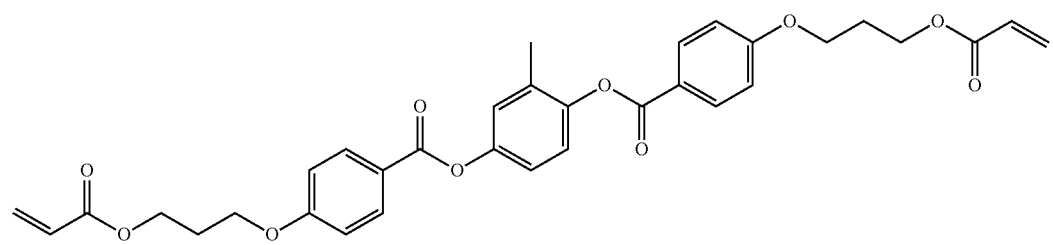 [SMILES: C=CC(=O)OCCCOc1ccc(C(=O)Oc2ccc(OC(=O)c3ccc(OCCCOC(=O)C=C)cc3)c(C)c2)cc1]
RM-35
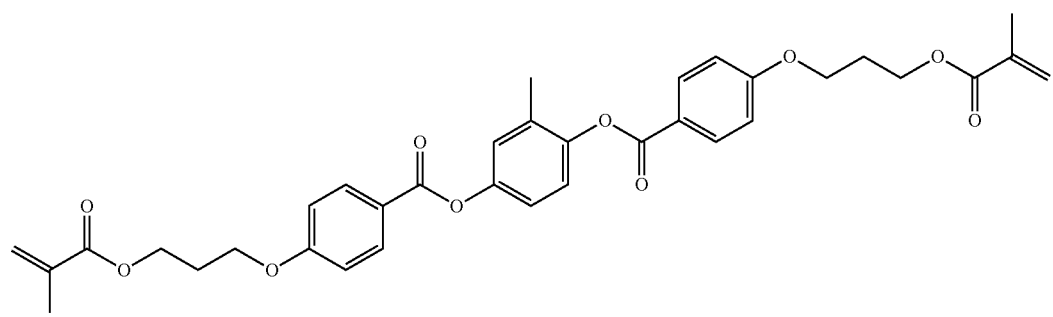 [SMILES: C=C(C)C(=O)OCCCOc1ccc(C(=O)Oc2ccc(OC(=O)c3ccc(OCCCOC(=O)C(=C)C)cc3)c(C)c2)cc1]
RM-36
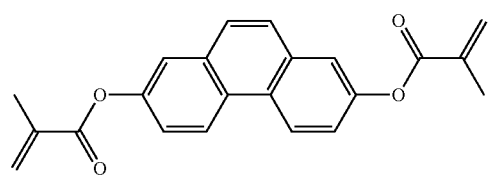 [SMILES: C=C(C)C(=O)Oc1ccc2c(ccc3cc(OC(=O)C(=C)C)ccc32)c1]
RM-37
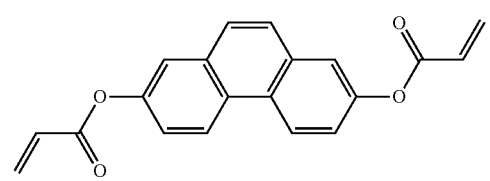
RM-38

TABLE E-continued
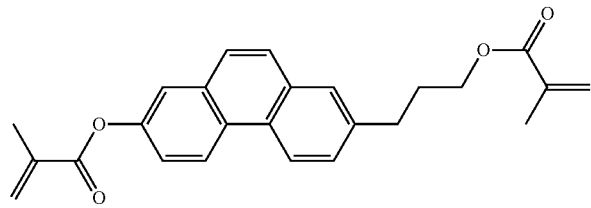 [SMILES: C=C(C)C(=O)OCCCc1ccc2c(ccc3cc(OC(=O)C(=C)C)ccc32)c1] RM-39
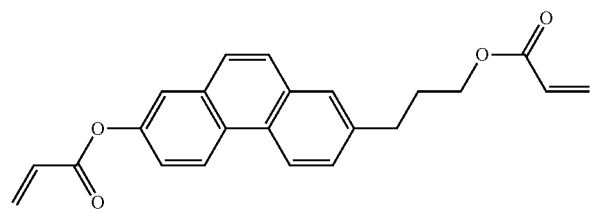 [SMILES: C=CC(=O)OCCCc1ccc2c(ccc3cc(OC(=O)C=C)ccc32)c1] RM-40
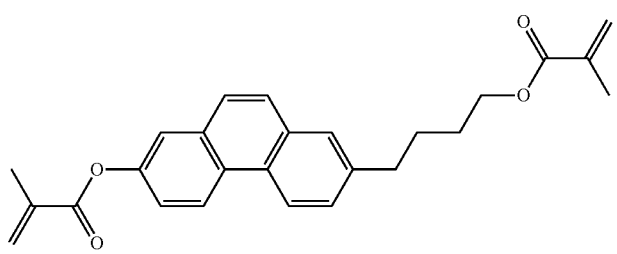 [SMILES: C=C(C)C(=O)OCCCCc1ccc2c(ccc3cc(OC(=O)C(=C)C)ccc32)c1] RM-41
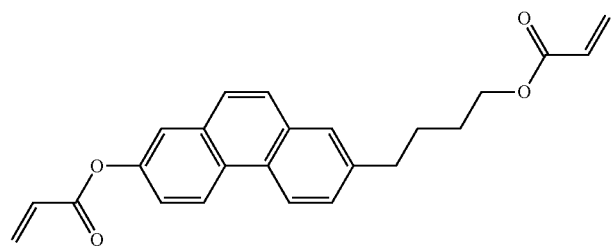 [SMILES: C=CC(=O)OCCCCc1ccc2c(ccc3cc(OC(=O)C=C)ccc32)c1] RM-42
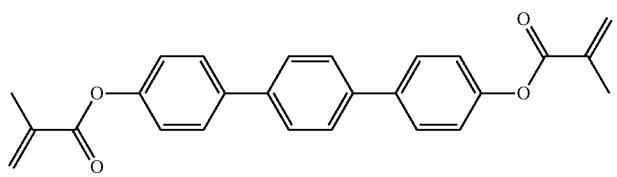 RM-43
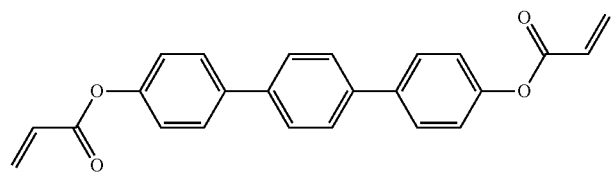 [SMILES: C=CC(=O)Oc1ccc(-c2ccc(-c3ccc(OC(=O)C=C)cc3)cc2)cc1] RM-44
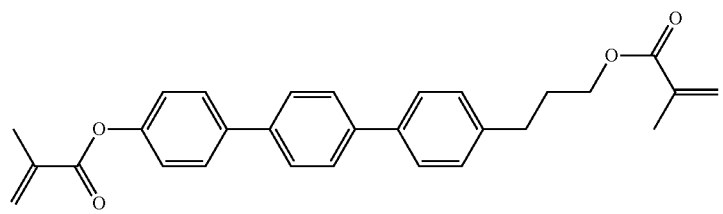 [SMILES: C=C(C)C(=O)OCCCc1ccc(-c2ccc(-c3ccc(OC(=O)C(=C)C)cc3)cc2)cc1] RM-45

TABLE E-continued
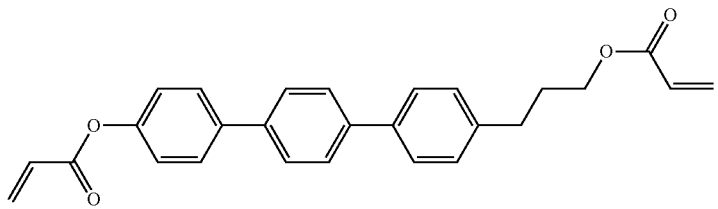 [SMILES: C=CC(=O)OCCCc1ccc(-c2ccc(-c3ccc(OC(=O)C=C)cc3)cc2)cc1] RM-46
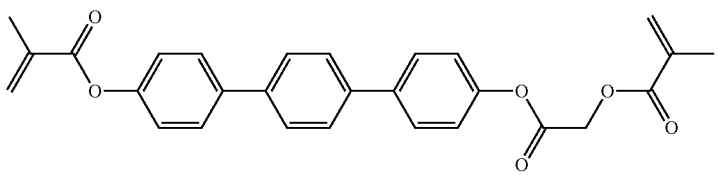 [SMILES: C=C(C)C(=O)OCC(=O)Oc1ccc(-c2ccc(-c3ccc(OC(=O)C(=C)C)cc3)cc2)cc1] RM-47
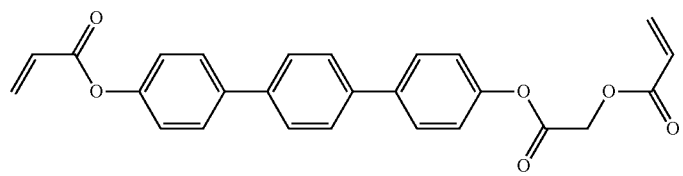 [SMILES: C=CC(=O)OCC(=O)Oc1ccc(-c2ccc(-c3ccc(OC(=O)C=C)cc3)cc2)cc1] RM-48
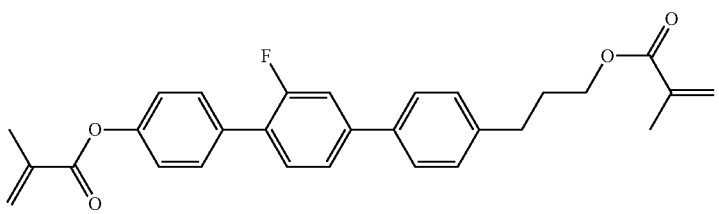 RM-49
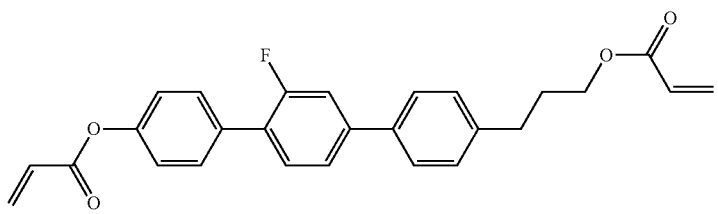 [SMILES: C=CC(=O)OCCCc1ccc(-c2ccc(-c3ccc(OC(=O)C=C)cc3)c(F)c2)cc1] RM-50
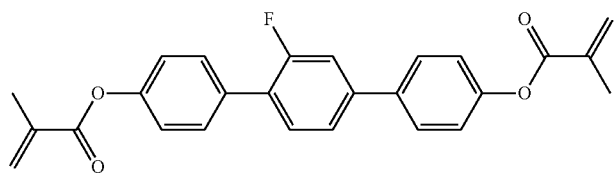 RM-51
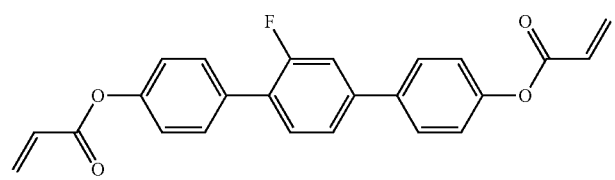 RM-52
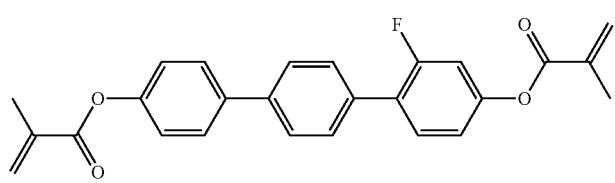 RM-53

TABLE E-continued
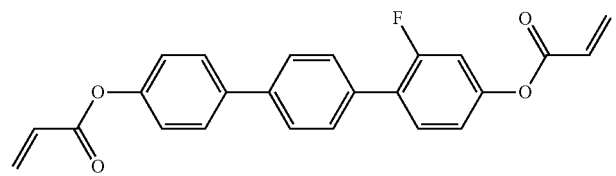 [SMILES: C=CC(=O)Oc1ccc(-c2ccc(-c3ccc(OC(=O)C=C)cc3F)cc2)cc1] RM-54
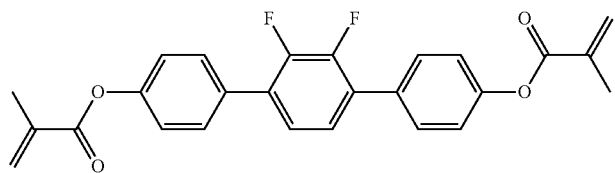 [SMILES: C=C(C)C(=O)Oc1ccc(-c2ccc(-c3ccc(OC(=O)C(=C)C)cc3)c(F)c2F)cc1] RM-55
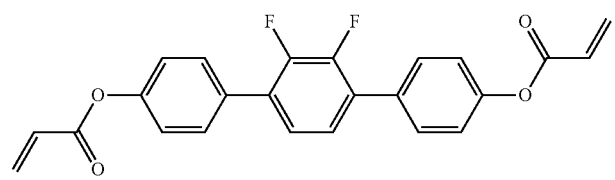 [SMILES: C=CC(=O)Oc1ccc(-c2ccc(-c3ccc(OC(=O)C=C)cc3)c(F)c2F)cc1] RM-56
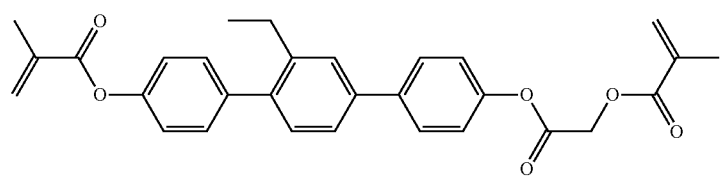 [SMILES: C=C(C)C(=O)OCC(=O)Oc1ccc(-c2ccc(-c3ccc(OC(=O)C(=C)C)cc3)c(CC)c2)cc1] RM-57
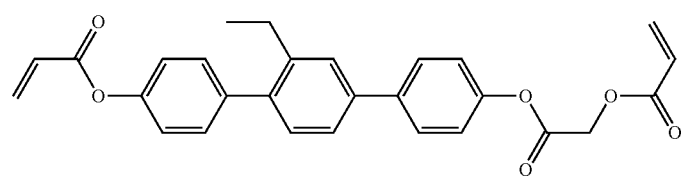 [SMILES: C=CC(=O)OCC(=O)Oc1ccc(-c2ccc(-c3ccc(OC(=O)C=C)cc3)c(CC)c2)cc1] RM-58
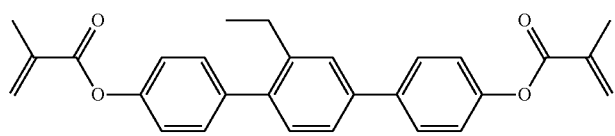 RM-59
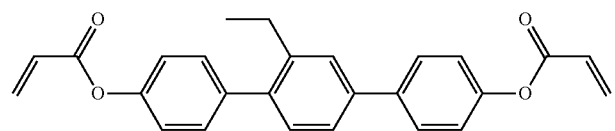 [SMILES: C=CC(=O)Oc1ccc(-c2ccc(-c3ccc(OC(=O)C=C)cc3)c(CC)c2)cc1] RM-60
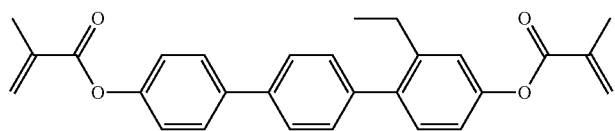 [SMILES: C=C(C)C(=O)Oc1ccc(-c2ccc(-c3ccc(OC(=O)C(=C)C)cc3CC)cc2)cc1] RM-61
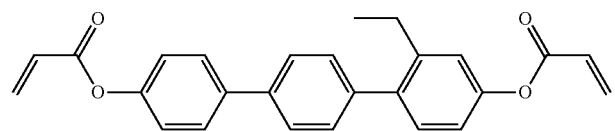 [SMILES: C=CC(=O)Oc1ccc(-c2ccc(-c3ccc(OC(=O)C=C)cc3CC)cc2)cc1] RM-62

TABLE E-continued
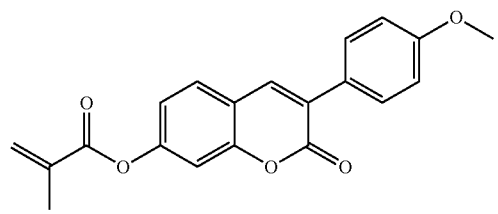 [SMILES: C=C(C)C(=O)Oc1ccc2cc(-c3ccc(OC)cc3)c(=O)oc2c1]
RM-63
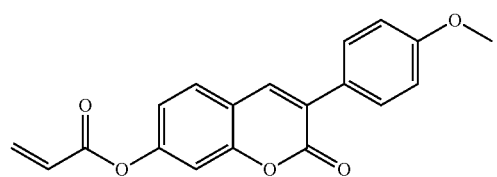 [SMILES: C=CC(=O)Oc1ccc2cc(-c3ccc(OC)cc3)c(=O)oc2c1]
RM-64
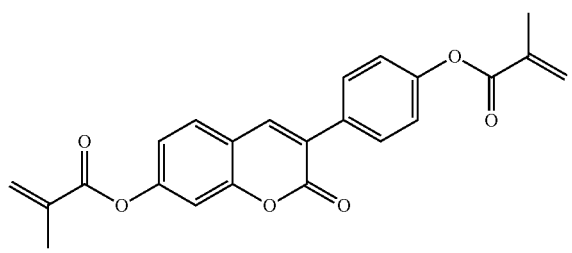 [SMILES: C=C(C)C(=O)Oc1ccc(-c2cc3ccc(OC(=O)C(=C)C)cc3oc2=O)cc1]
RM-65
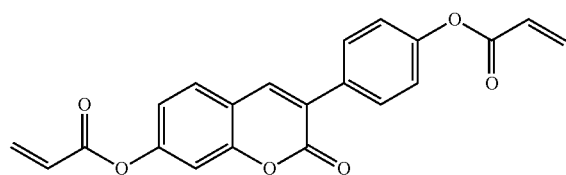 [SMILES: C=CC(=O)Oc1ccc(-c2cc3ccc(OC(=O)C=C)cc3oc2=O)cc1]
RM-66
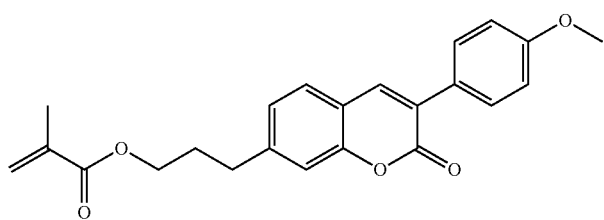 [SMILES: C=C(C)C(=O)OCCCc1ccc2cc(-c3ccc(OC)cc3)c(=O)oc2c1]
RM-67
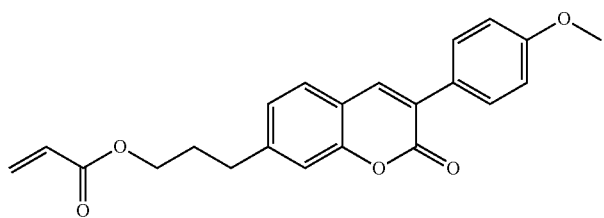 [SMILES: C=CC(=O)OCCCc1ccc2cc(-c3ccc(OC)cc3)c(=O)oc2c1]
RM-68
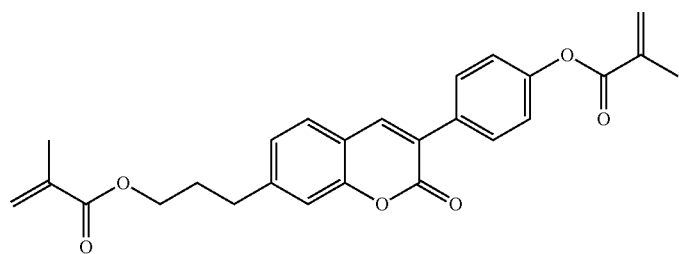 [SMILES: C=C(C)C(=O)OCCCc1ccc2cc(-c3ccc(OC(=O)C(=C)C)cc3)c(=O)oc2c1]
RM-69

TABLE E-continued
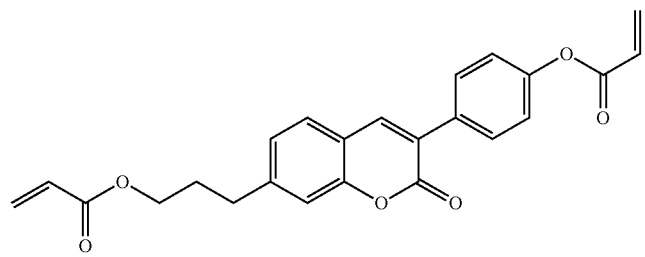 [SMILES: C=CC(=O)OCCCc1ccc2cc(-c3ccc(OC(=O)C=C)cc3)c(=O)oc2c1]
RM-70
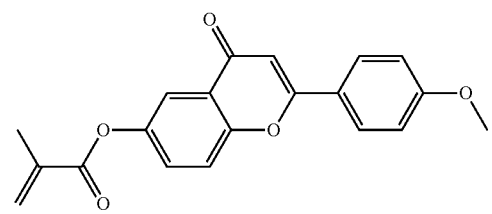 [SMILES: C=C(C)C(=O)Oc1ccc2oc(-c3ccc(OC)cc3)cc(=O)c2c1]
RM-71
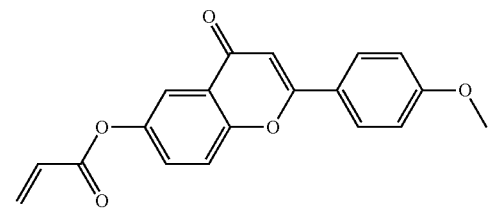 [SMILES: C=CC(=O)Oc1ccc2oc(-c3ccc(OC)cc3)cc(=O)c2c1]
RM-72
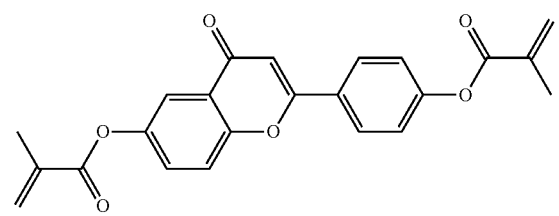 [SMILES: C=C(C)C(=O)Oc1ccc(-c2cc(=O)c3cc(OC(=O)C(=C)C)ccc3o2)cc1]
RM-73
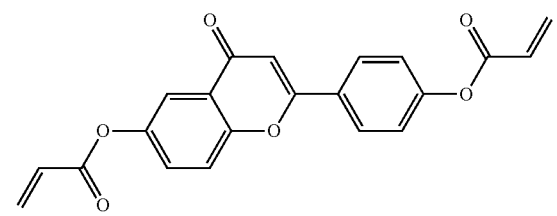 [SMILES: C=CC(=O)Oc1ccc(-c2cc(=O)c3cc(OC(=O)C=C)ccc3o2)cc1]
RM-74
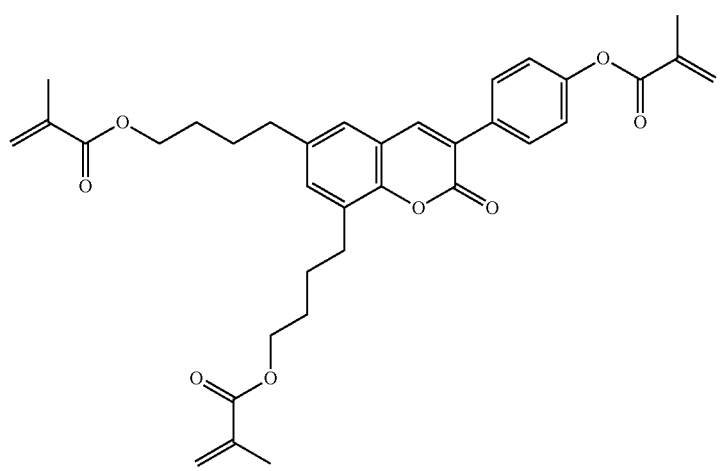 [SMILES: C=C(C)C(=O)OCCCCc1cc(CCCCOC(=O)C(=C)C)c2oc(=O)c(-c3ccc(OC(=O)C(=C)C)cc3)cc2c1]
RM-75

TABLE E-continued
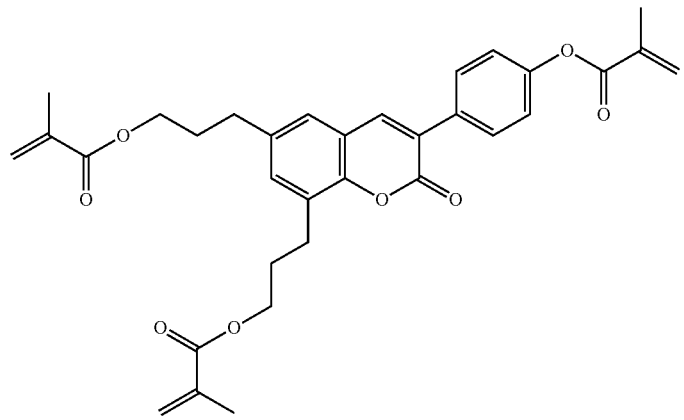 [SMILES: C=C(C)C(=O)OCCCc1cc(CCCOC(=O)C(=C)C)c2oc(=O)c(-c3ccc(OC(=O)C(=C)C)cc3)cc2c1]
RM-76
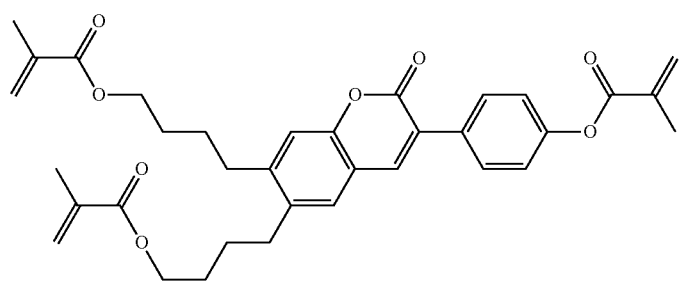 [SMILES: C=C(C)C(=O)OCCCCc1cc2cc(-c3ccc(OC(=O)C(=C)C)cc3)c(=O)oc2cc1CCCCOC(=O)C(=C)C]
RM-77
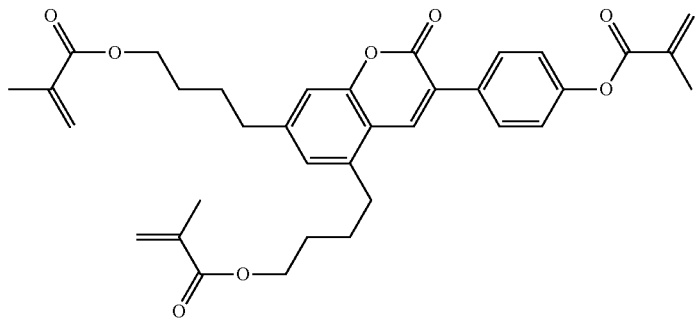 [SMILES: C=C(C)C(=O)OCCCCc1cc(CCCCOC(=O)C(=C)C)c2cc(-c3ccc(OC(=O)C(=C)C)cc3)c(=O)oc2c1]
RM-78
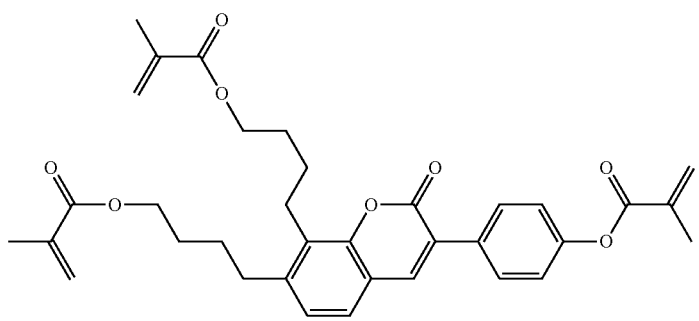 [SMILES: C=C(C)C(=O)OCCCCc1ccc2cc(-c3ccc(OC(=O)C(=C)C)cc3)c(=O)oc2c1CCCCOC(=O)C(=C)C]
RM-79
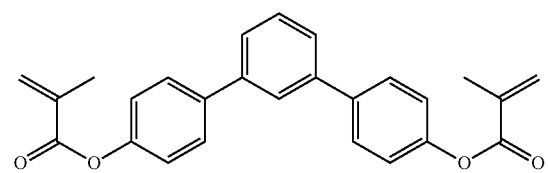 [SMILES: C=C(C)C(=O)Oc1ccc(-c2cccc(-c3ccc(OC(=O)C(=C)C)cc3)c2)cc1]
RM-80

TABLE E-continued
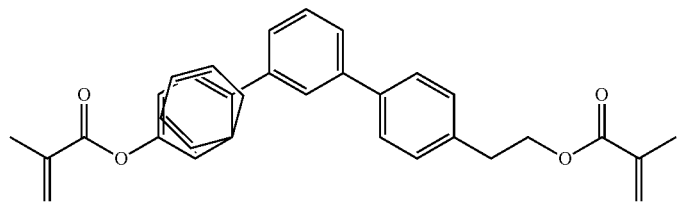
RM-81
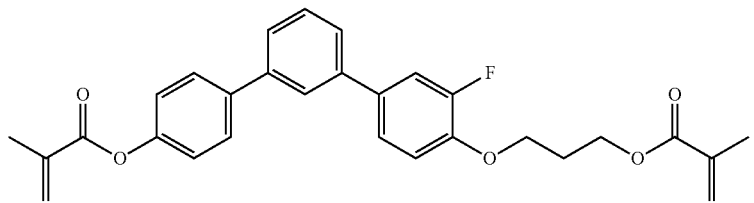 [SMILES: C=C(C)C(=O)OCCCOc1ccc(-c2cccc(-c3ccc(OC(=O)C(=C)C)cc3)c2)cc1F]
RM-82
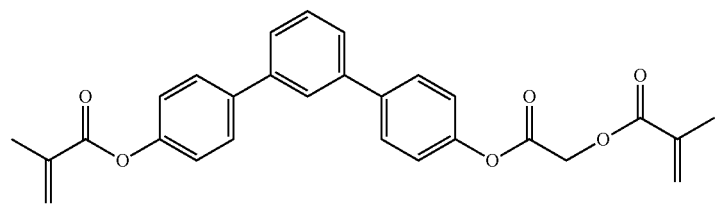 [SMILES: C=C(C)C(=O)OCC(=O)Oc1ccc(-c2cccc(-c3ccc(OC(=O)C(=C)C)cc3)c2)cc1]
RM-83
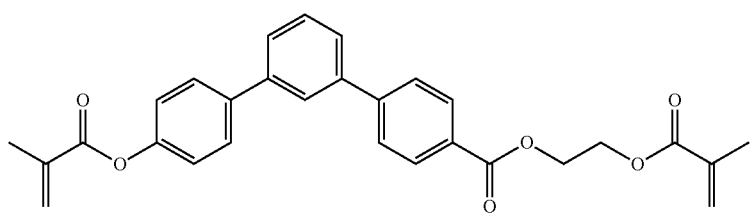 [SMILES: C=C(C)C(=O)OCCOC(=O)c1ccc(-c2cccc(-c3ccc(OC(=O)C(=C)C)cc3)c2)cc1]
RM-84
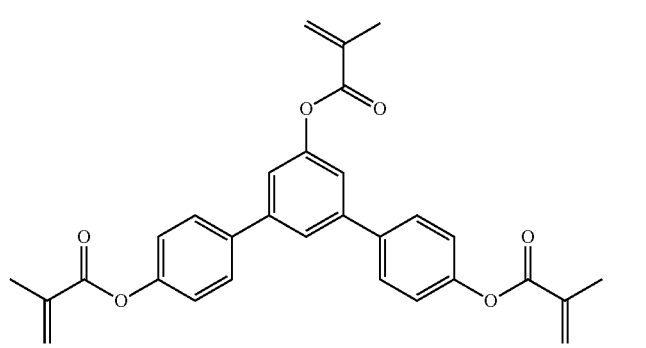 [SMILES: C=C(C)C(=O)Oc1ccc(-c2cc(OC(=O)C(=C)C)cc(-c3ccc(OC(=O)C(=C)C)cc3)c2)cc1]
RM-85
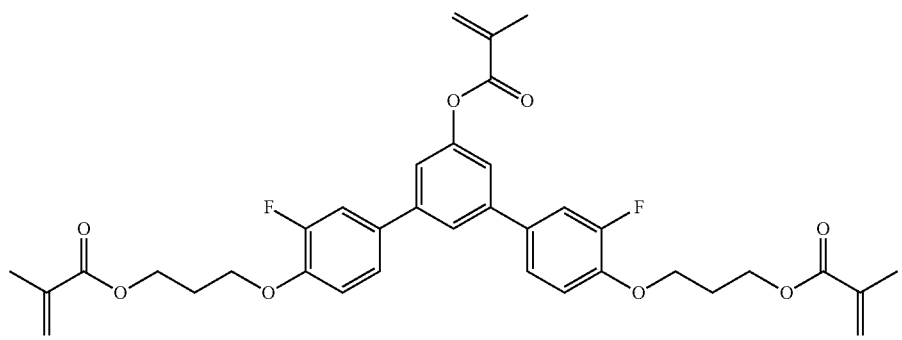 [SMILES: C=C(C)C(=O)OCCCOc1ccc(-c2cc(OC(=O)C(=C)C)cc(-c3ccc(OCCCOC(=O)C(=C)C)c(F)c3)c2)cc1F]
RM-86

TABLE E-continued
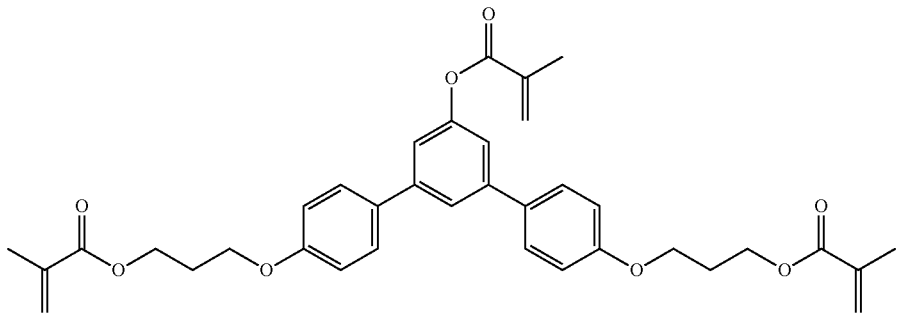 [SMILES: C=C(C)C(=O)OCCCOc1ccc(-c2cc(OC(=O)C(=C)C)cc(-c3ccc(OCCCOC(=O)C(=C)C)cc3)c2)cc1]
RM-87
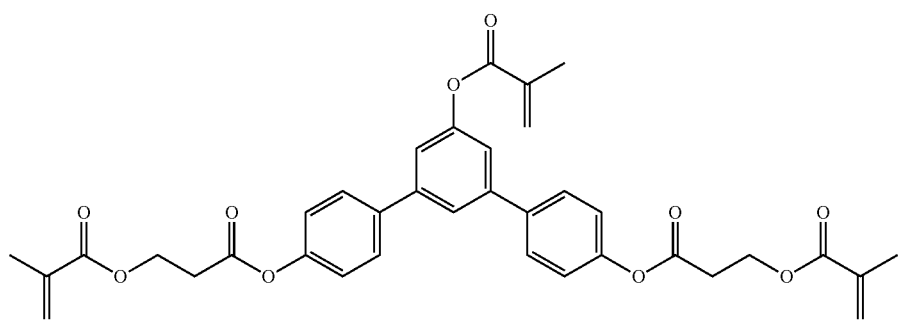 [SMILES: C=C(C)C(=O)OCCC(=O)Oc1ccc(-c2cc(OC(=O)C(=C)C)cc(-c3ccc(OC(=O)CCOC(=O)C(=C)C)cc3)c2)cc1]
RM-88
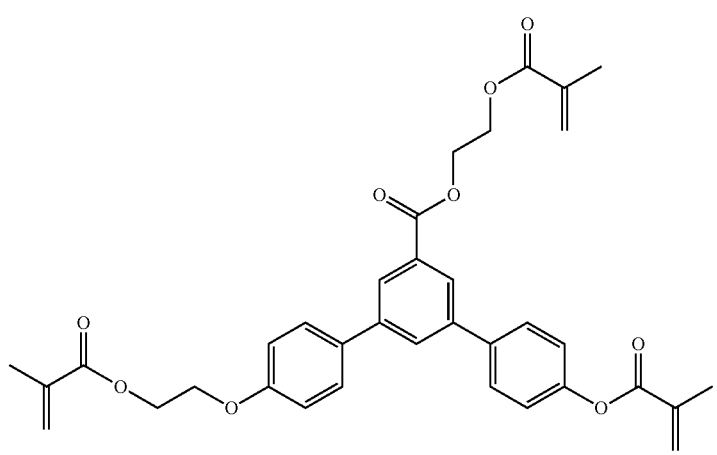 [SMILES: C=C(C)C(=O)OCCOC(=O)c1cc(-c2ccc(OCCOC(=O)C(=C)C)cc2)cc(-c2ccc(OC(=O)C(=C)C)cc2)c1]
RM-89
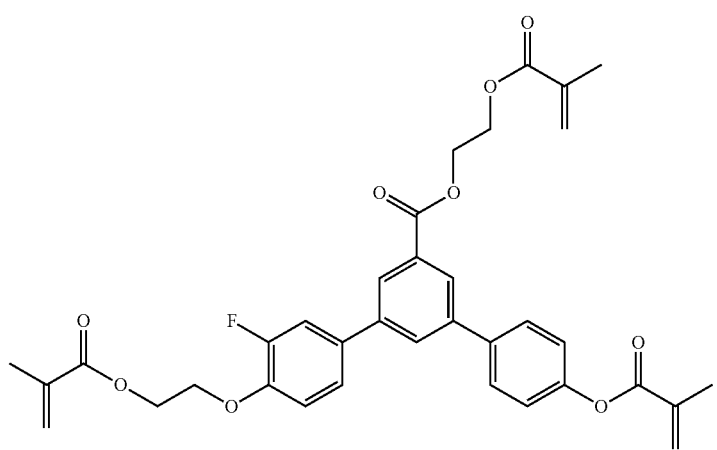 [SMILES: C=C(C)C(=O)OCCOC(=O)c1cc(-c2ccc(OC(=O)C(=C)C)cc2)cc(-c2ccc(OCCOC(=O)C(=C)C)c(F)c2)c1]
RM-90

TABLE E-continued
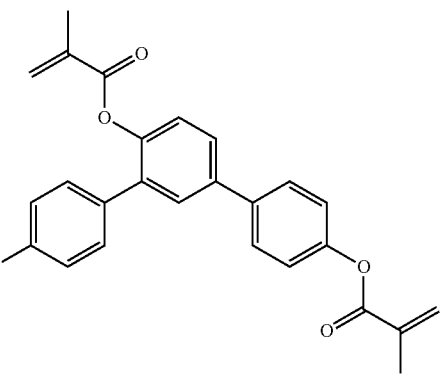
RM-91
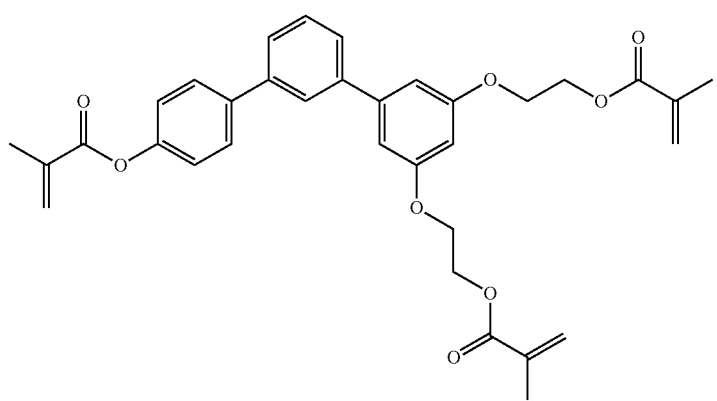 [SMILES: C=C(C)C(=O)OCCOc1cc(OCCOC(=O)C(=C)C)cc(-c2cccc(-c3ccc(OC(=O)C(=C)C)cc3)c2)c1]
RM-92
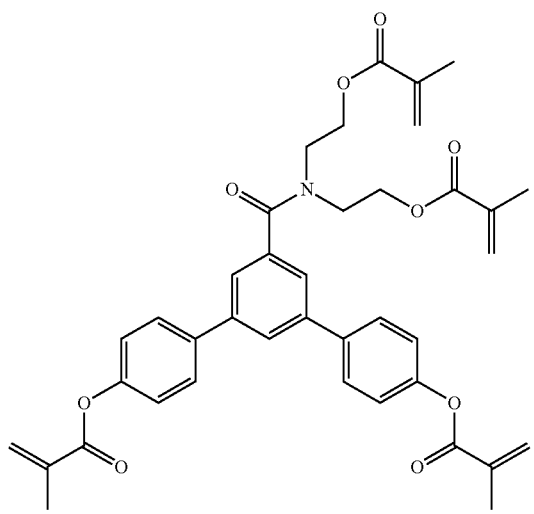 [SMILES: C=C(C)C(=O)OCCN(CCOC(=O)C(=C)C)C(=O)c1cc(-c2ccc(OC(=O)C(=C)C)cc2)cc(-c2ccc(OC(=O)C(=C)C)cc2)c1]
RM-93
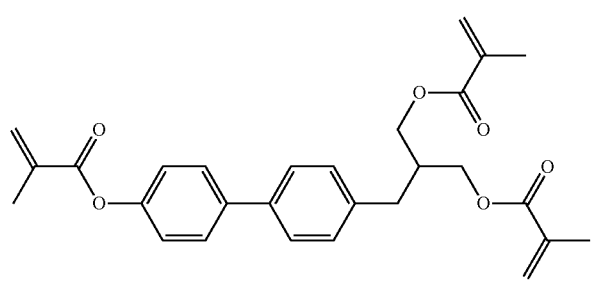 [SMILES: C=C(C)C(=O)OCC(COC(=O)C(=C)C)Cc1ccc(-c2ccc(OC(=O)C(=C)C)cc2)cc1]
RM-94

TABLE E-continued
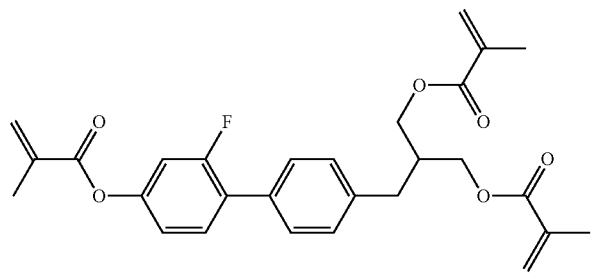 [SMILES: C=C(C)C(=O)OCC(COC(=O)C(=C)C)Cc1ccc(-c2ccc(OC(=O)C(=C)C)cc2F)cc1]
RM-95
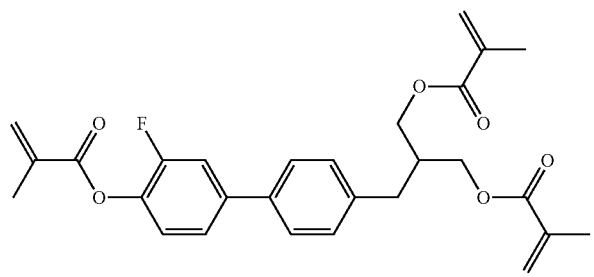
RM-96
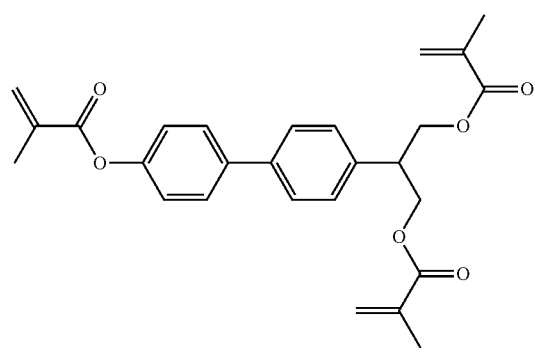 [SMILES: C=C(C)C(=O)OCC(COC(=O)C(=C)C)c1ccc(-c2ccc(OC(=O)C(=C)C)cc2)cc1]
RM-97
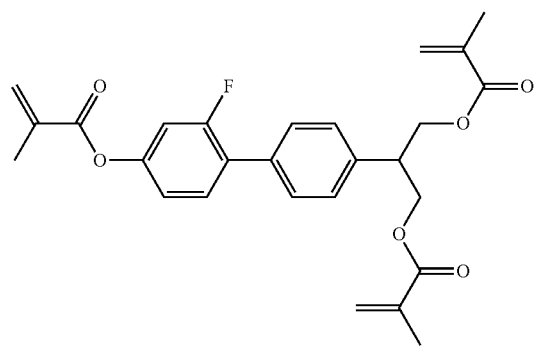 [SMILES: C=C(C)C(=O)OCC(COC(=O)C(=C)C)c1ccc(-c2ccc(OC(=O)C(=C)C)cc2F)cc1]
RM-98
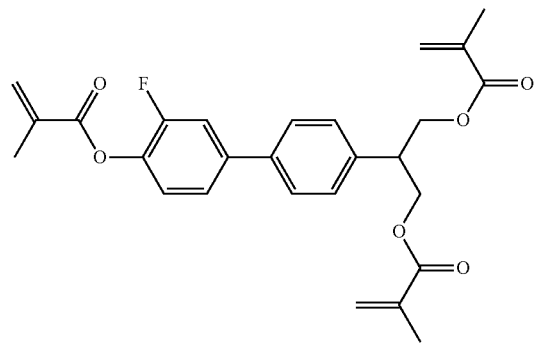
RM-99

TABLE E-continued
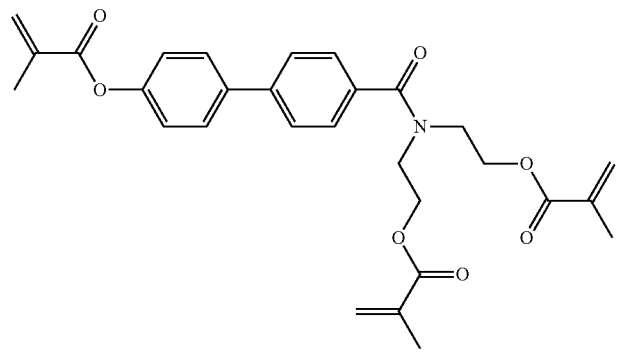 [SMILES: C=C(C)C(=O)OCCN(CCOC(=O)C(=C)C)C(=O)c1ccc(-c2ccc(OC(=O)C(=C)C)cc2)cc1]
RM-100
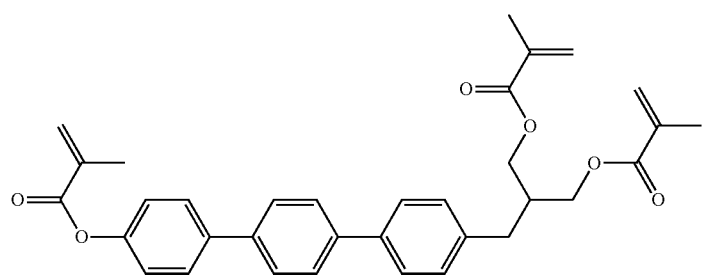 [SMILES: C=C(C)C(=O)OCC(COC(=O)C(=C)C)Cc1ccc(-c2ccc(-c3ccc(OC(=O)C(=C)C)cc3)cc2)cc1]
RM-101
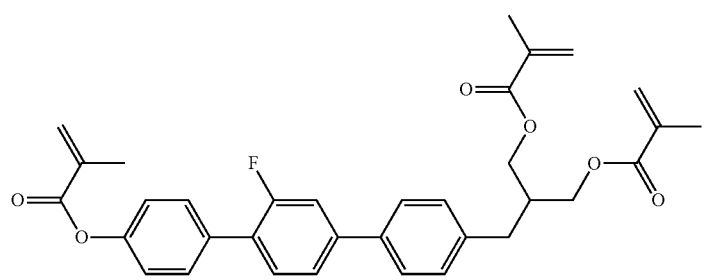
RM-102
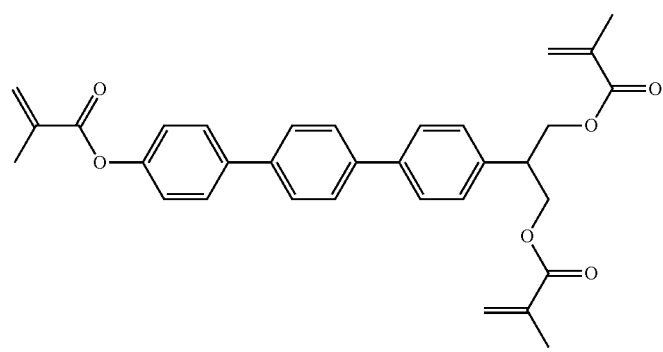 [SMILES: C=C(C)C(=O)OCC(COC(=O)C(=C)C)c1ccc(-c2ccc(-c3ccc(OC(=O)C(=C)C)cc3)cc2)cc1]
RM-103
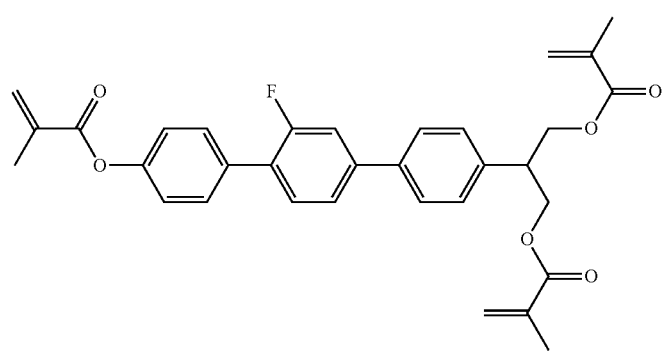 [SMILES: C=C(C)C(=O)OCC(COC(=O)C(=C)C)c1ccc(-c2ccc(-c3ccc(OC(=O)C(=C)C)cc3)c(F)c2)cc1]
RM-104

TABLE E-continued
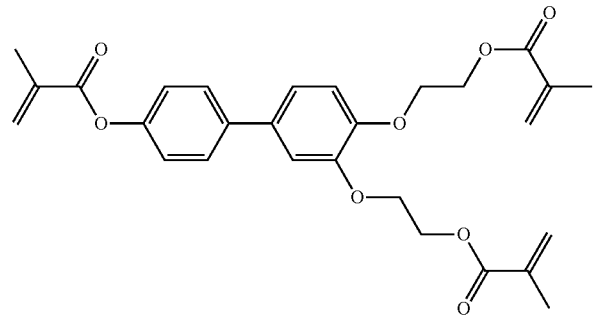 [SMILES: C=C(C)C(=O)OCCOc1ccc(-c2ccc(OC(=O)C(=C)C)cc2)cc1OCCOC(=O)C(=C)C]
RM-105
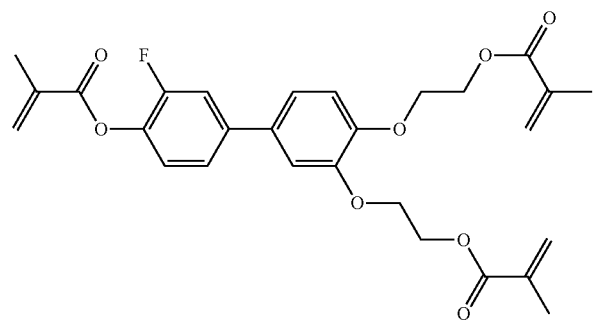 [SMILES: C=C(C)C(=O)OCCOc1ccc(-c2ccc(OC(=O)C(=C)C)c(F)c2)cc1OCCOC(=O)C(=C)C]
RM-106
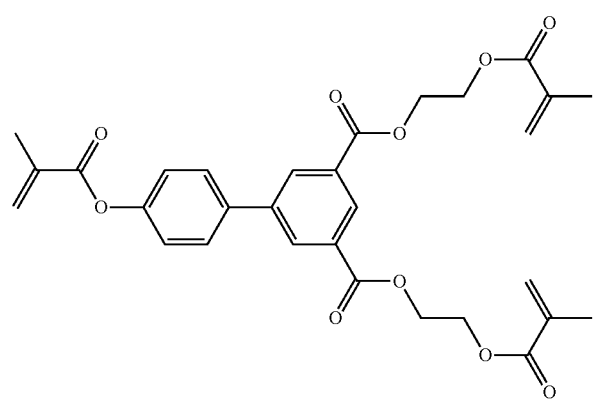 [SMILES: C=C(C)C(=O)OCCOC(=O)c1cc(C(=O)OCCOC(=O)C(=C)C)cc(-c2ccc(OC(=O)C(=C)C)cc2)c1]
RM-107
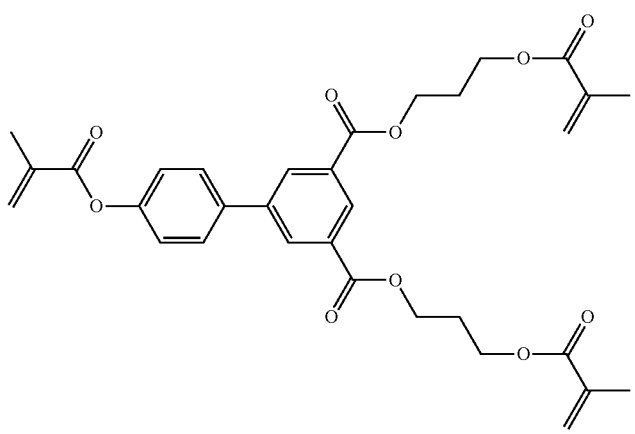 [SMILES: C=C(C)C(=O)OCCCOC(=O)c1cc(C(=O)OCCCOC(=O)C(=C)C)cc(-c2ccc(OC(=O)C(=C)C)cc2)c1]
RM-108

TABLE E-continued
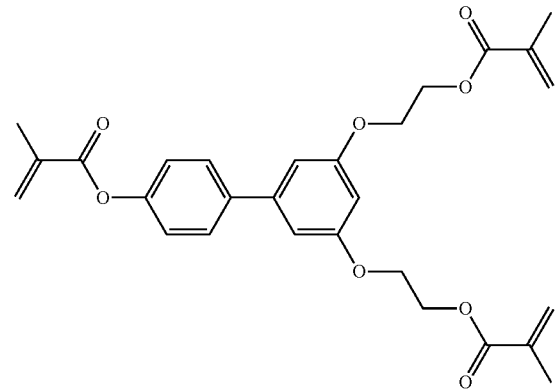 [SMILES: C=C(C)C(=O)OCCOc1cc(OCCOC(=O)C(=C)C)cc(-c2ccc(OC(=O)C(=C)C)cc2)c1]
RM-109
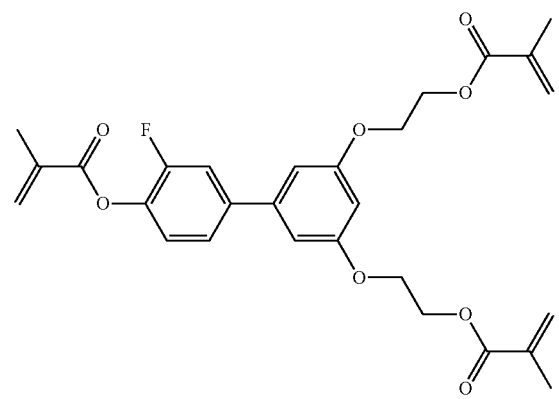 [SMILES: C=C(C)C(=O)OCCOc1cc(OCCOC(=O)C(=C)C)cc(-c2ccc(OC(=O)C(=C)C)c(F)c2)c1]
RM-110
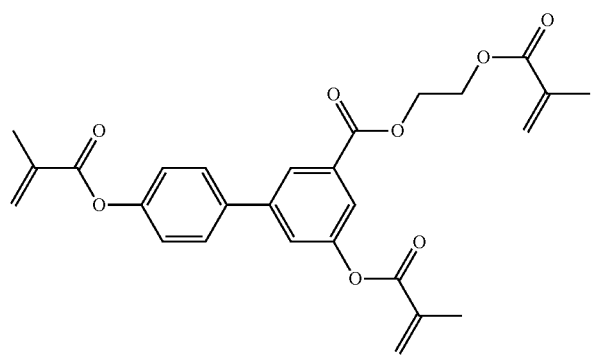 [SMILES: C=C(C)C(=O)OCCOC(=O)c1cc(OC(=O)C(=C)C)cc(-c2ccc(OC(=O)C(=C)C)cc2)c1]
RM-111
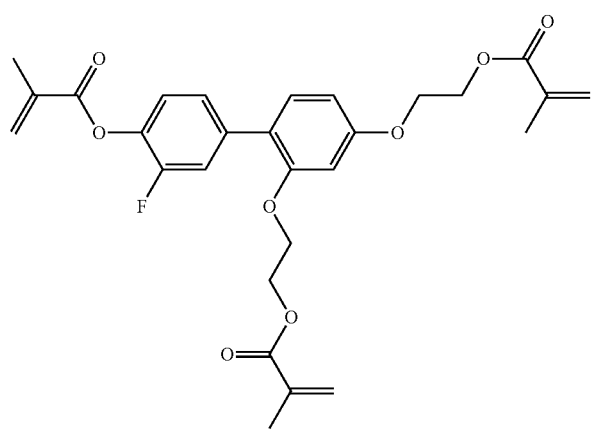 [SMILES: C=C(C)C(=O)OCCOc1ccc(-c2ccc(OC(=O)C(=C)C)c(F)c2)c(OCCOC(=O)C(=C)C)c1]
RM-112

TABLE E-continued
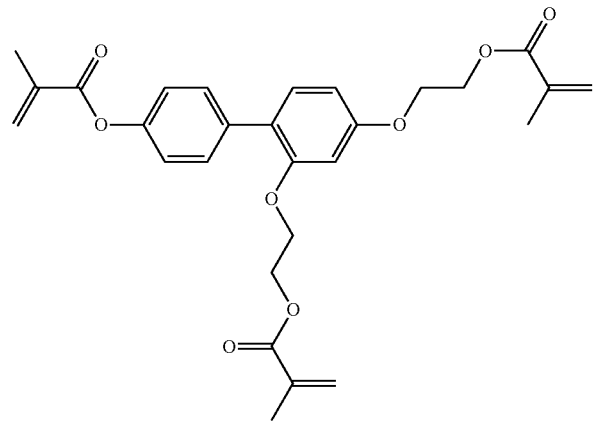 [SMILES: C=C(C)C(=O)OCCOc1ccc(-c2ccc(OC(=O)C(=C)C)cc2)c(OCCOC(=O)C(=C)C)c1]
RM-113
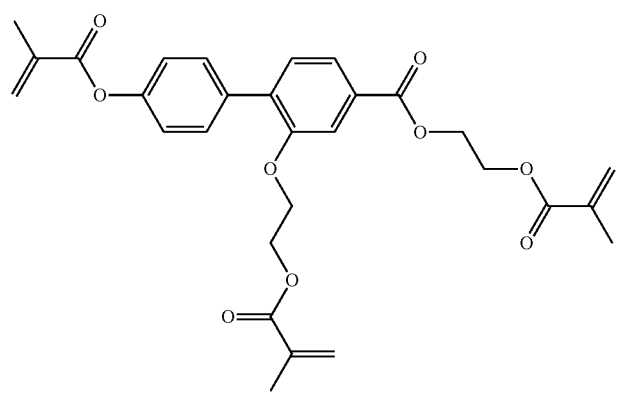 [SMILES: C=C(C)C(=O)OCCOC(=O)c1ccc(-c2ccc(OC(=O)C(=C)C)cc2)c(OCCOC(=O)C(=C)C)c1]
RM-114
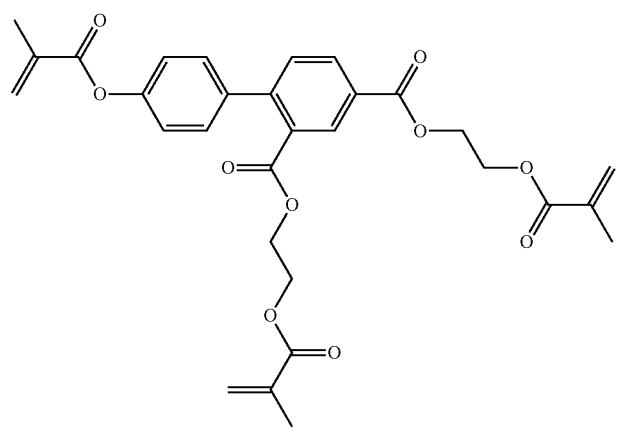 [SMILES: C=C(C)C(=O)OCCOC(=O)c1ccc(-c2ccc(OC(=O)C(=C)C)cc2)c(C(=O)OCCOC(=O)C(=C)C)c1]
RM-115
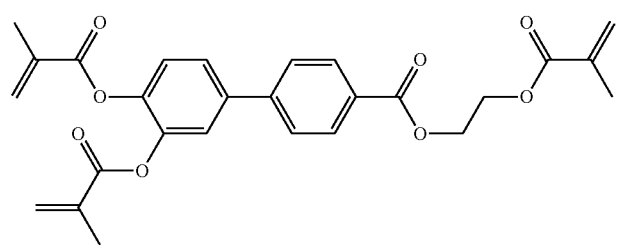 [SMILES: C=C(C)C(=O)OCCOC(=O)c1ccc(-c2ccc(OC(=O)C(=C)C)c(OC(=O)C(=C)C)c2)cc1]
RM-116

TABLE E-continued
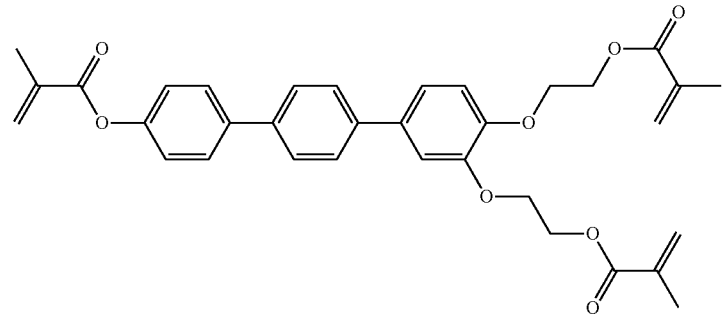 [SMILES: C=C(C)C(=O)OCCOc1ccc(-c2ccc(-c3ccc(OC(=O)C(=C)C)cc3)cc2)cc1OCCOC(=O)C(=C)C]
RM-117
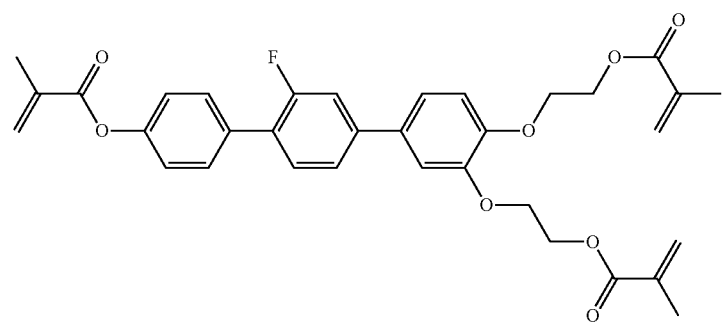 [SMILES: C=C(C)C(=O)OCCOc1ccc(-c2ccc(-c3ccc(OC(=O)C(=C)C)cc3)c(F)c2)cc1OCCOC(=O)C(=C)C]
RM-118
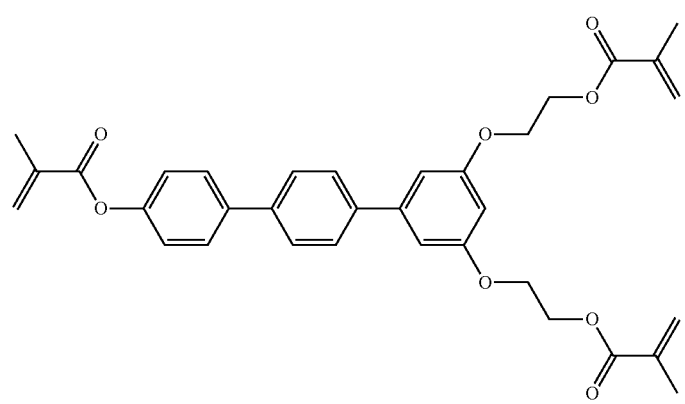 [SMILES: C=C(C)C(=O)OCCOc1cc(OCCOC(=O)C(=C)C)cc(-c2ccc(-c3ccc(OC(=O)C(=C)C)cc3)cc2)c1]
RM-119
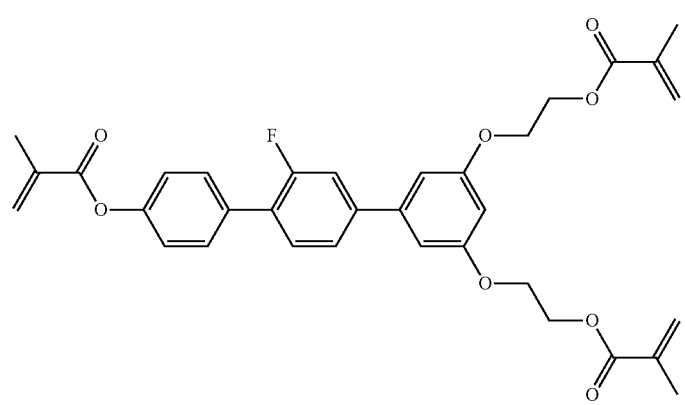
RM-120

TABLE E-continued

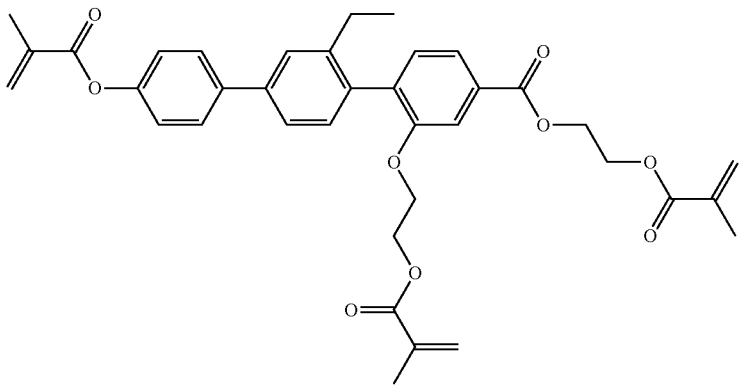 [SMILES: C=C(C)C(=O)OCCOC(=O)c1ccc(-c2ccc(-c3ccc(OC(=O)C(=C)C)cc3)cc2CC)c(OCCOC(=O)C(=C)C)c1]

RM-121

Table E shows illustrative compounds which can be used in the LC media in accordance with the present invention, preferably as reactive mesogenic compounds.

In a preferred embodiment of the present invention, the LC medium comprise one or more polymerisable compounds selected from the group of the compounds from Table E.

In addition, the following abbreviations and symbols are used:

$V_0$ threshold voltage, capacitive [V] at 20° C.,
$n_e$ extraordinary refractive index at 20° C. and 589 nm,
$n_o$ ordinary refractive index at 20° C. and 589 nm,
$\Delta n$ optical anisotropy at 20° C. and 589 nm,
$\varepsilon_\perp$ dielectric permittivity perpendicular to the director at 20° C. and 1 kHz,
$\varepsilon_\parallel$ dielectric permittivity parallel to the director at 20° C. and 1 kHz,
$\Delta \varepsilon$ dielectric anisotropy at 20° C. and 1 kHz,
cl.p., T(N,I) clearing point [° C.],
$\gamma_1$ rotational viscosity at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN].

Unless explicitly noted otherwise, all concentrations in the present application are quoted in percent by weight and relate to the corresponding mixture as a whole, comprising all solid or liquid-crystalline components, without solvents.

Unless explicitly noted otherwise, all temperature values indicated in the present application, such as, for example, for the melting point T(C,N), the transition from the smectic (S) to the nematic (N) phase T(S,N) and the clearing point T(N,I), are quoted in degrees Celsius (° C.). M.p. denotes melting point, cl.p.=clearing point. Furthermore, C=crystalline state, N=nematic phase, S=smectic phase and I=isotropic phase. The data between these symbols represent the transition temperatures.

All physical properties are and have been determined in accordance with "Merck Liquid Crystals, Physical Properties of Liquid Crystals", Status November 1997, Merck KGaA, Germany, and apply for a temperature of 20° C., and $\Delta n$ is determined at 589 nm and $\Delta \varepsilon$ at 1 kHz, unless explicitly indicated otherwise in each case.

The term "threshold voltage" for the present invention relates to the capacitive threshold ($V_0$), also known as the Freedericks threshold, unless explicitly indicated otherwise. In the examples, the optical threshold may also, as generally usual, be quoted for 10% relative contrast ($V_{10}$).

Unless stated otherwise, the process of polymerising the polymerisable compounds in the PSA displays as described above and below is carried out at a temperature where the LC medium exhibits a liquid crystal phase, preferably a nematic phase, and most preferably is carried out at room temperature.

Unless stated otherwise, methods of preparing test cells and measuring their electrooptical and other properties are carried out by the methods as described hereinafter or in analogy thereto.

The display or test cell used for measurement of the pretilt angle consists of two plane-parallel glass outer plates at a separation of 3-4 m, each of which has on the inside an electrode layer and a polyimide alignment layer on top, where the two polyimide layers are rubbed antiparallel to one another and effect a homeotropic edge alignment of the liquid-crystal molecules.

The monomers are polymerised by irradiation with UVA light of defined intensity for a prespecified time, with a voltage simultaneously being applied to the display (usually 10 V to 30 V alternating current, 1 kHz). In the examples, unless indicated otherwise, a metal halide lamp and an intensity of 50 mW/cm² is used for polymerisation. The intensity is measured using a standard UVA meter (Hoenle UV-meter high end with UVA sensor).

Example 1

The nematic LC host mixture N1 is formulated as follows.

| CY-3-O2 | 15.00% | cl.p. | 74.7° C. |
|---|---|---|---|
| CY-5-O2 | 6.50% | $\Delta n$ | 0.1082 |
| CCY-3-O2 | 11.00% | $\Delta \varepsilon$ | −3.0 |
| CPY-2-O2 | 5.50% | $\varepsilon_\parallel$ | 3.6 |
| CPY-3-O2 | 10.50% | $\gamma_1$ | 97 mPa s |
| CC-3-V | 28.50% | $K_{11}$ | 12.9 |
| CC-3-V1 | 10.00% | $K_{33}$ | 15.7 |
| PYP-2-3 | 12.50% | $V_0$ | 2.42 V |
| PPGU-3-F | 0.50% | | |

Polymerisable mixture P1 is prepared by adding 0.45% of the monomer RM-1 to the nematic LC host mixture N1.

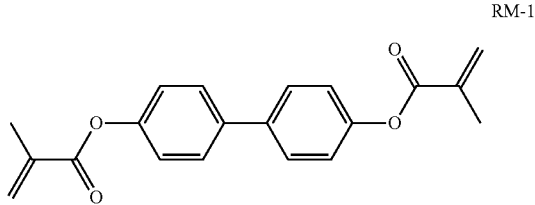 [SMILES: C=C(C)C(=O)Oc1ccc(-c2ccc(OC(=O)C(=C)C)cc2)cc1]

RM-1

Example 2

The nematic LC host mixture N2 is formulated as follows.

| | | | |
|---|---|---|---|
| CC-3-V | 15.00% | cl.p. | 74.4° C. |
| CC-3-V1 | 9.00% | Δn | 0.1086 |
| CCH-23 | 8.00% | Δε | −3.2 |
| CCH-34 | 7.50% | $\varepsilon_\parallel$ | 3.5 |
| CCY-3-O2 | 10.00% | $\gamma_1$ | 102 mPa s |
| CCY-5-O2 | 8.00% | $K_{11}$ | 14.3 |
| CPY-2-O2 | 3.00% | $K_{33}$ | 15.7 |
| CPY-3-O2 | 8.50% | $V_0$ | 2.33 V |
| CY-3-O2 | 7.00% | | |
| PY-3-O2 | 16.00% | | |
| PYP-2-3 | 8.00% | | |

Polymerisable mixture P2 is prepared by adding 0.3% of the monomer RM-1 to the nematic LC host mixture N2.

Use Examples

For each of the polymerisable mixtures P1 and P2 as described above PSVA-test cells are manufactured by the following method:

Polyimide doping: To the polyimide (PI) precursor AL60702 (JSR) either 100 ppm of the inhibitor Irganox®1076 (Ciba) or 100 ppm of the photoinitiator Irgacure®651 (Ciba) are added, or the PI precursor is used without doping.

Substrate cleaning: A glass substrate coated with a thin layer of indium tin oxide (ITO) is washed in 3 steps, first washing with a solution of a detergent (0.5%) in distilled (DI) water (20 min), then bubble washing with DI water (20 min), and finally washing with pure DI water (20 min).

PI layer coating: A solution of the doped or undoped PI precursor (6%), N-Methyl-2-pyrrolidone (39%), and butyl-cellosolve (54%) is coated on the washed ITO substrate by spin coating as follows. The PI solution (1.5 g) is dropped on the center of the substrate and spread in a spin coating machine (MIKASA) in two steps with different coating speed, in a first step at 80 rpm for 10 sec for evenly spreading over the entire substrate area, and in a second step at 760 rpm for 45 sec to achieve a PI layer with constant thickness (100 nm).

PI layer curing: In order to eliminate the solvent and cure the PI precursor the ITO substrate with the coated PI layer is subjected to a heat cure process with two steps. The substrate is heated in the first step at 60° C. for 1 min on a hot plate and in the second step at 230° C. for 90 min in a heating oven.

Cell assembly: The polymerisable LC mixture and a sealant material are dispensed on a first ITO substrate with a coated and cured PI layer, wherein the sealant is dispensed at the substrate edge area and the polymerisable LC mixture is dispensed dropwise on the central substrate area. A second ITO substrate with a coated and cured PI layer and photo-spacers (3.3 microns) is put onto the first substrate with the LC medium and the sealant in a vacuum assembly station (5 Pa, 30 sec).

Sealant curing: The sealant material is cured by exposure to UV radiation and heat in two steps, using a photomask to cover the area without the sealant. In the first step UV light (3000 mJ) is applied to the sealant area, and in the second step the cell is heated to (120° C. for 60 min).

PSVA first and second process: For pretilt angle generation, the monomer contained in the polymerisable LC mixture is cured in a first step by UV exposure (6J) while a voltage is applied to the ITO electrodes (14 Vpp). As a result a pretilt angle is generated in the LC molecules by the cured monomer at the top and bottom substrate. After the first UV curing step with applied voltage, the test cell is subjected to a second UV curing step without applied voltage to eliminate residual monomer in the LC mixture (UV exposure for 80 min using a fluorescent UV lamp type C with 305 nm 355 nm).

Pretilt measurement: The pretilt angle at the first substrate (top) and second substrate (bottom) is measured using a Mueller matrix imaging polarimeter (Axometrics Axostep).

Use Example A

In order to demonstrate the effect of adding an inhibitor or a photoinitiator to the PI alignment layer, test cells were prepared with two identical substrates, i.e. both substrates comprise either an undoped PI alignment layer, or a PI alignment layer doped with an inhibitor, or a PI alignment layer doped with an initiator. The test cell configurations are shown in Table 1:

TABLE 1

| | Test cell configuration (PI = polyimide) | |
|---|---|---|
| Ex. | Top (1st) substrate | Bottom (2nd) substrate |
| D1 | Undoped PI | Undoped PI |
| D2 | PI + photoinitiator | PI + photoinitiator |
| D3 | PI + inhibitor | PI + inhibitor |

Pretilt Measurement

The pretilt angles were determined after UV irradiation with 50 mW/cm² for 120 s (6J) by a Mueller matrix imaging polarimeter (Axometrics Axostep). The pretilt angles are shown in Table 2.

TABLE 2

| | Pretilt angles (°) | | | | |
|---|---|---|---|---|---|
| | Configuration | | | | |
| Mixture | D1 | D2 | D3 | Diff. D1 − D2 | Diff. D3 − D1 |
| P1 | 83.0 | 81.2 | 87.2 | 1.8 | 4.2 |
| P2 | 85.9 | 84.3 | 86.5 | 1.6 | 0.6 |

From Table 2 it can be seen that in the test cells comprising PI alignment layers doped with an initiator (D2) the generated pretilt angle is lower than in a test cell comprising undoped PI alignment layers (D1). On the other hand in the test cells comprising PI alignment layers doped with an inhibitor (D3) the generated pretilt angle is higher than in a test cell comprising undoped PI alignment layers (D1).

This proves that the addition of an inhibitor or an initiator to the alignment layer is an effective method to increase or reduce the pretilt angle.

Use Example B

Test cells according to the present invention were prepared with two different substrates, i.e. either with an undoped PI alignment layer, or with a PI alignment layer doped with an inhibitor, or with a PI alignment layer doped with an initiator. The test cell configurations are shown in Table 3. The LC medium used was P1.

TABLE 3

Test cell configuration (PI = polyimide)

| Example | Top (1$^{st}$) substrate | Bottom (2$^{nd}$) substrate |
|---|---|---|
| Reference | Undoped PI | Undoped PI |
| D4 | PI + inhibitor | Undoped PI |
| D5 | Undoped PI | PI + photoinitiator |
| D6 | PI + inhibitor | PI + photoinitiator |

Pretilt Measurement

To measure the pre-tilt angle an Axostep measurement equipment is used which enables to separately measure the pretilt angle of aligned LC medium at each of the top and bottom substrate.

The pretilt angles are shown in Table 4.

TABLE 4

Pretilt angles (°)

| | Example | | | |
|---|---|---|---|---|
| Substrate | Reference | D4 | D5 | D6 |
| Top (1$^{st}$) | 87.6 | 88.7 | 87.4 | 88.8 |
| Bottom (2$^{nd}$) | 87.5 | 87.4 | 85.4 | 85.4 |

From Table 4 it can be seen that in the reference test cell with two undoped PI alignment layers the pretilt angle is approximately the same at both substrates. In contrast thereto, in the test cells D4, D5 and D6 according to the invention, wherein the top substrate contains a PI alignment layer doped with an inhibitor and/or the bottom substrate contains a PI alignment layer doped with a photoinitiator, the pretilt angle at the top substrate is higher than the pretilt angle at the bottom substrate.

This demonstrates that it is possible to control the pretilt angle at the top substrate and the pretilt angle at the bottom substrate in a PSA display separately and independently from each other.

This method can therefore be used to adjust the pretilt angles in a curved display in order to reduce distortion of the orientation of the LC molecules.

The invention claimed is:

1. A method of manufacturing a liquid crystal display (LCD) of the polymer stabilized alignment (PSA) mode, which comprises
   a) providing a first substrate and a second substrate,
   b) depositing an alignment layer material, or a precursor thereof, on the first substrate and the second substrate, to form a first alignment layer on the first substrate and a second alignment layer on the second substrate,
   c) optionally curing the alignment layer material, or precursor thereof,
   d) interposing an LC medium comprising a polymerizable component between the first and the second substrate, such that it is in contact with the first alignment layer and the second alignment layer,
   e) polymerizing by photopolymerization the polymerizable component of the LC medium between the first and second substrate,
   wherein
   in b) the alignment layer material, or the precursor thereof, deposited on the first substrate contains a photopolymerization inhibitor which inhibits photopolymerization of the polymerizable component of the LC medium.

2. The method of claim 1, wherein the alignment layer material further comprises a polyimide and/or the alignment layer precursor material further comprises a polyamide precursor.

3. The method of claim 1, wherein in b) a solution of the alignment layer material, or the precursor thereof, in an organic solvent is deposited on the first and second substrate, and the solvent is dried off.

4. The method according to claim 1, wherein in c) the alignment layer material, or the precursor thereof, is cured by photocuring.

5. The method according to claim 4, wherein in c) the alignment layer material, or the precursor thereof, is cured by exposure to UV radiation.

6. The method according to claim 1, wherein in e) the polymerizable component of the LC medium is polymerized by exposure to UV radiation.

7. The method according to claim 1, wherein the polymerization inhibitor is Irganox®1076.

8. The method according to claim 7, wherein the polymerization initiator is Irgacure®651.

9. The method according to claim 1, wherein the first and second substrate have a curved shape.

10. The method according to claim 1, wherein the first and second substrate have a curved shape, with a radius of curvature of the first substrate lower than the radius of curvature of the second substrate.

11. The method according to claim 1, wherein the LC medium comprises a polymerizable component A) comprising one or more polymerizable mesogenic compounds, and a liquid-crystalline component B) comprising one or more mesogenic or liquid-crystalline compounds.

12. The method according to claim 1, wherein the polymerizable component of the LC medium after UV polymerization in e) generates a pretilt angle of the LC molecules of the LC medium relative to the first and the second substrate.

13. The method according to claim 12, wherein the pretilt angle of the LC molecules of the LC medium relative to the first substrate is higher than the pretilt angle of the LC molecules of the LC medium relative to the second substrate.

14. The method according to claim 1, wherein the first and second substrates are glass substrates.

15. The method according to claim 1, wherein the first substrate is equipped with a first electrode structure and the second substrate is equipped with a second electrode structure.

16. The method according to claim 1, wherein one of the first and second substrates is equipped with a first and a second electrode structure, and the other of the first and second substrates is not equipped with an electrode structure.

17. The method according to claim 1, wherein a sealant material is provided between the first substrate and the second substrate, and the first substrate and second substrate are glued together by curing the sealant material.

18. The method according to claim 17, wherein the sealant material is cured by exposure to photoradiation, wherein the photoradiation is selected such that it does not cause polymerization of the polymerizable component of the LC medium, and/or the LC medium is protected from the photoradiation used for curing the sealant material.

19. The method according to claim 18, wherein the LC medium is protected from the photoradiation used for curing the sealant material by a photomask.

20. The method according to claim 1, wherein in e) a voltage is applied to the first and second electrode.

21. The method according to claim 1, wherein in d) the LC medium is interposed between the first and second substrate by one drop filling (ODF) method.

22. The method according to claim 21, wherein d) comprises d1) dispensing an array of droplets of an LC medium comprising a photopolymerizable component on one of the first and second substrates, d2) providing the other of the first and second substrate on top of the substrate with the dispensed droplets of the LC medium, causing the droplets of the LC medium to spread and form a continuous layer between the two substrates.

23. The method according to claim 22, wherein the display is a PS-VA, PS-OCB, PS-IPS, PS-FFS, PS-UB-FFS, PS-posi-VA or PS-TN display.

24. An LC display prepared by a method according to claim 1.

25. A method of controlling the pretilt angle of the LC molecules in a PSA display at one of the two substrates independently from the pretilt angle of the LC molecules at the other of the two substrates, said method comprising performing a) to e) as defined in claim 1.

26. The method of claim 1, wherein in (b) the alignment layer material, or the precursor thereof, deposited on the second substrate contains a polymerization initiator which initiates polymerization of the polymerizable component of the medium.

* * * * *